US012662959B2

(12) United States Patent
Niergarth et al.

(10) Patent No.: US 12,662,959 B2
(45) **Date of Patent: \*Jun. 23, 2026**

(54) GAS TURBINE ENGINE

(71) Applicant: General Electric Company, Evendale, OH (US)

(72) Inventors: Daniel Alan Niergarth, Norwood, OH (US); Jeffrey Donald Clements, Mason, OH (US); Jeffrey S. Spruill, Hillsboro, OH (US); Erich Alois Krammer, West Chester, OH (US); Matthew Kenneth MacDonald, Austin, TX (US); Scott Alan Schimmels, Miamisburg, OH (US)

(73) Assignee: General Electric Company, Evendale, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/265,747

(22) Filed: Jul. 10, 2025

(65) Prior Publication Data

US 2025/0341182 A1 Nov. 6, 2025

Related U.S. Application Data

(63) Continuation-in-part of application No. 19/055,734, filed on Feb. 18, 2025, which is a continuation-in-part (Continued)

(51) Int. Cl.
*F02C 3/06* (2006.01)
*F02C 7/36* (2006.01)

(52) U.S. Cl.
CPC .................. *F02C 3/06* (2013.01); *F02C 7/36* (2013.01); *F05D 2200/13* (2013.01);

(Continued)

(58) Field of Classification Search
None
See application file for complete search history.

(56) References Cited

U.S. PATENT DOCUMENTS

| | | | |
|---|---|---|---|
| 2,264,297 | A | 12/1941 | Clay |
| 2,623,721 | A | 12/1952 | Harrington |

(Continued)

FOREIGN PATENT DOCUMENTS

| | | |
|---|---|---|
| CN | 1603596 A | 4/2005 |
| CN | 101576024 A | 11/2009 |

(Continued)

OTHER PUBLICATIONS

Bae, Integrally Cored Ceramic Investment Casting Mold Fabricated by Ceramic Stereolithography, Chapter 5, a Dissertation Submitted in Partial Fulfillment of the Requirements for the Degree of Doctor of Philosophy, Materials and Engineering, 2008, pp. 102-139.

(Continued)

*Primary Examiner* — Katheryn A Malatek
(74) *Attorney, Agent, or Firm* — Dority & Manning, P.A.

(57) ABSTRACT

A gas turbine engine includes a turbomachine having an engine core including a high-pressure compressor, a combustion section, a high-pressure turbine, and a high-pressure shaft coupled to the high-pressure compressor and the high-pressure turbine. The engine core has a length ($L_{CORE}$), and the high-pressure compressor has an exit stage diameter ($D_{CORE}$). The high-pressure compressor defines a high-pressure compressor exit area ($A_{HPCExit}$) in square inches. The gas turbine engine defines a redline exhaust gas temperature (EGT) in degrees Celsius, a total sea level static thrust output ($Fn_{Total}$) in pounds, and a corrected specific thrust, wherein the corrected specific thrust is greater than or equal to 42 and less than or equal to 90, the corrected specific determined as follows: $Fn_{Total} \times EGT/(A_{HPCExit}^2 \times 1000)$. The high-pressure shaft is characterized by a high- (Continued)

speed shaft rating (HSR) from 1.5 to 6.2, and a ratio of $L_{CORE}/D_{CORE}$ is from 2.1 to 4.3.

19 Claims, 26 Drawing Sheets

Related U.S. Application Data of application No. 18/481,515, filed on Oct. 5, 2023, now Pat. No. 12,410,753, which is a continuation-in-part of application No. 17/978,629, filed on Nov. 1, 2022, now abandoned.

(52) U.S. Cl.
CPC .... *F05D 2200/14* (2013.01); *F05D 2200/221* (2013.01); *F05D 2240/60* (2013.01)

(56) References Cited

U.S. PATENT DOCUMENTS

| | | |
|---|---|---|
| 3,420,055 A | 1/1969 | Lavash |
| 3,528,250 A | 9/1970 | Johnson |
| 3,628,885 A | 12/1971 | Sidenstick |
| 3,651,645 A | 3/1972 | Grieb |
| 3,779,007 A | 12/1973 | Lavash |
| 4,012,012 A | 3/1977 | Ligler |
| 4,064,692 A | 12/1977 | Johnson et al. |
| 4,078,604 A | 3/1978 | Christl et al. |
| 4,078,761 A | 3/1978 | Thompson |
| 4,120,150 A | 10/1978 | Wakeman |
| 4,137,705 A | 2/1979 | Andersen et al. |
| 4,254,618 A | 3/1981 | Elovic |
| 4,263,786 A | 4/1981 | Eng |
| 4,546,605 A | 10/1985 | Mortimer et al. |
| 4,696,156 A | 9/1987 | Burr et al. |
| 4,741,152 A | 5/1988 | Burr et al. |
| 4,773,212 A | 9/1988 | Griffin et al. |
| 4,776,536 A | 10/1988 | Hudson et al. |
| 4,966,005 A | 10/1990 | Cowell et al. |
| 5,024,580 A | 6/1991 | Olive |
| 5,074,118 A | 12/1991 | Kepler |
| 5,121,598 A | 6/1992 | Butler |
| 5,152,146 A | 10/1992 | Butler |
| 5,177,951 A | 1/1993 | Butler |
| 5,203,163 A | 4/1993 | Parsons |
| 5,241,814 A | 9/1993 | Butler |
| 5,255,505 A | 10/1993 | Cloyd et al. |
| 5,256,340 A | 10/1993 | Allison et al. |
| 5,261,227 A | 11/1993 | Giffin, III |
| 5,296,308 A | 3/1994 | Caccavale et al. |
| 5,297,386 A | 3/1994 | Kervistin |
| 5,305,616 A | 4/1994 | Coffinberry |
| 5,317,877 A | 6/1994 | Stuart |
| 5,370,499 A | 12/1994 | Lee |
| 5,387,380 A | 2/1995 | Cima et al. |
| 5,392,614 A | 2/1995 | Coffinberry |
| 5,402,638 A | 4/1995 | Johnson |
| 5,414,992 A | 5/1995 | Glickstein |
| 5,511,374 A | 4/1996 | Glickstein et al. |
| 5,544,700 A | 8/1996 | Shagoury |
| 5,545,003 A | 8/1996 | O'Connor et al. |
| 5,553,449 A | 9/1996 | Rodgers et al. |
| 5,558,303 A | 9/1996 | Koethe et al. |
| 5,615,547 A | 4/1997 | Beutin et al. |
| 5,619,855 A | 4/1997 | Burrus |
| 5,680,767 A | 10/1997 | Lee et al. |
| 5,724,816 A | 3/1998 | Ritter et al. |
| 5,782,076 A | 7/1998 | Huber et al. |
| 5,802,841 A | 9/1998 | Maeda |
| 5,819,525 A | 10/1998 | Gaul et al. |
| 5,853,044 A | 12/1998 | Wheaton et al. |
| 5,918,458 A | 7/1999 | Coffinberry et al. |
| 6,106,229 A | 8/2000 | Nikkanen et al. |
| 6,117,612 A | 9/2000 | Halloran et al. |
| 6,174,130 B1 | 1/2001 | King et al. |
| 6,182,435 B1 | 2/2001 | Niggemann et al. |
| 6,182,458 B1 | 2/2001 | Franklin, Jr. |
| 6,253,554 B1 | 7/2001 | Kobayashi et al. |
| 6,302,191 B1 | 10/2001 | Wickham et al. |
| 6,347,660 B1 | 2/2002 | Sikkenga et al. |
| 6,415,595 B1 | 7/2002 | Wilmot, Jr. et al. |
| 6,578,362 B1 | 6/2003 | Coffinberry |
| 6,584,778 B1 | 7/2003 | Griffiths et al. |
| 6,595,749 B2 | 7/2003 | Lee et al. |
| 6,749,518 B2 | 6/2004 | Carrier et al. |
| 6,805,535 B2 | 10/2004 | Tiemann |
| 6,913,064 B2 | 7/2005 | Beals et al. |
| 6,968,701 B2 | 11/2005 | Glahn et al. |
| 6,990,797 B2 | 1/2006 | Venkataramani et al. |
| 6,993,913 B2 | 2/2006 | Kobayashi et al. |
| 7,000,404 B2 | 2/2006 | Palmisano et al. |
| 7,140,174 B2 | 11/2006 | Johnson |
| 7,143,581 B2 | 12/2006 | Kobayashi et al. |
| 7,188,464 B2 | 3/2007 | Ackerman et al. |
| 7,216,475 B2 | 5/2007 | Johnson |
| 7,217,099 B2 | 5/2007 | Casanova et al. |
| 7,231,769 B2 | 6/2007 | Spadaccini et al. |
| 7,260,926 B2 | 8/2007 | Sabatino et al. |
| 7,306,026 B2 | 12/2007 | Memmen |
| 7,331,757 B2 | 2/2008 | Janssen et al. |
| 7,395,657 B2 | 7/2008 | Johnson |
| 7,448,433 B2 | 11/2008 | Ortiz et al. |
| 7,452,202 B2 | 11/2008 | Gram |
| 7,481,214 B2 | 1/2009 | Eilers |
| 7,527,475 B1 | 5/2009 | Liang |
| 7,533,713 B2 | 5/2009 | Pfeifer et al. |
| 7,608,131 B2 | 10/2009 | Jensen |
| 7,610,946 B2 | 11/2009 | Morris et al. |
| 7,624,592 B2 | 12/2009 | Lui et al. |
| 7,716,913 B2 | 5/2010 | Rolt |
| 7,717,676 B2 | 5/2010 | Cunha et al. |
| 7,753,104 B2 | 7/2010 | Luczak et al. |
| 7,770,381 B2 | 8/2010 | Johnson et al. |
| 7,836,680 B2 | 11/2010 | Schwarz et al. |
| 7,926,289 B2 | 4/2011 | Lee et al. |
| 8,015,788 B2 | 9/2011 | Stephenson et al. |
| 8,056,345 B2 | 11/2011 | Norris et al. |
| 8,066,052 B2 | 11/2011 | Blair |
| 8,256,202 B1 | 9/2012 | Paulino |
| 8,307,662 B2 | 11/2012 | Turco |
| 8,506,836 B2 | 8/2013 | Szuromi et al. |
| 8,511,987 B2 | 8/2013 | Reinhardt et al. |
| 8,596,076 B1 | 12/2013 | Gritton et al. |
| 8,641,807 B2 | 2/2014 | Thomas |
| 8,656,584 B2 | 2/2014 | Gabriel et al. |
| 8,747,055 B2 | 6/2014 | McCune et al. |
| 8,789,376 B2 | 7/2014 | Coffinberry |
| 8,851,151 B2 | 10/2014 | Frasier et al. |
| 8,943,827 B2 | 2/2015 | Prociw et al. |
| 8,955,330 B2 | 2/2015 | Narcus et al. |
| 8,961,114 B2 | 2/2015 | Ruthemeyer |
| 8,985,540 B1 | 3/2015 | Slesinski |
| 9,039,382 B2 | 5/2015 | Stapleton |
| 9,079,357 B2 | 7/2015 | Ebert et al. |
| 9,200,855 B2 | 12/2015 | Kington et al. |
| 9,410,482 B2 | 8/2016 | Krautheim et al. |
| 9,422,063 B2 | 8/2016 | Diaz |
| 9,429,072 B2 | 8/2016 | Diaz et al. |
| 9,458,764 B2 | 10/2016 | Alecu et al. |
| 9,464,669 B2 | 10/2016 | Kerr et al. |
| 9,650,147 B2 | 5/2017 | Selechert et al. |
| 9,677,501 B2 | 6/2017 | Pierluissi et al. |
| 9,835,035 B2 | 12/2017 | Mueller et al. |
| 9,845,768 B2 | 12/2017 | Pesyna et al. |
| 9,885,242 B2 | 2/2018 | Atkins et al. |
| 9,920,710 B2 | 3/2018 | Dawson et al. |
| 9,995,314 B2 | 6/2018 | Miller et al. |
| 10,022,790 B2 | 7/2018 | Lee et al. |
| 10,100,736 B2 | 10/2018 | Niergarth et al. |
| 10,119,466 B2 | 11/2018 | Schwarz et al. |
| 10,260,419 B2 | 4/2019 | Cerny et al. |
| 10,280,486 B2 | 5/2019 | Zhang et al. |
| 10,352,243 B2 | 7/2019 | Mizukami et al. |

(56)　　References Cited

U.S. PATENT DOCUMENTS

| | | | |
|---|---|---|---|
| 10,399,270 | B2 | 9/2019 | Xu et al. |
| 10,578,028 | B2 | 3/2020 | Becker, Jr. |
| 10,654,579 | B2 | 5/2020 | Diaz |
| 10,738,648 | B2 | 8/2020 | Valencia |
| 11,047,338 | B2 | 6/2021 | Dievart et al. |
| 11,073,090 | B2 | 7/2021 | Nestico et al. |
| 11,181,046 | B1 | 11/2021 | Brooks et al. |
| 11,199,132 | B2 | 12/2021 | Diaz et al. |
| 11,203,971 | B2 | 12/2021 | Kannangara et al. |
| 11,351,599 | B2 | 6/2022 | Deines et al. |
| 11,603,801 | B2 | 3/2023 | Payyoor et al. |
| 11,724,813 | B2 | 8/2023 | Payyoor et al. |
| 2001/0024000 | A1 | 9/2001 | Lee et al. |
| 2005/0109016 | A1 | 5/2005 | Ullyott |
| 2005/0205232 | A1 | 9/2005 | Wang et al. |
| 2005/0239562 | A1 | 10/2005 | Lin et al. |
| 2006/0034693 | A1 | 2/2006 | Lardellier |
| 2008/0006384 | A1 | 1/2008 | Memmen |
| 2008/0080979 | A1 | 4/2008 | Brassfield et al. |
| 2008/0110603 | A1 | 5/2008 | Fellague et al. |
| 2008/0113211 | A1 | 5/2008 | Bruce et al. |
| 2008/0135722 | A1 | 6/2008 | Wang et al. |
| 2008/0148708 | A1 | 6/2008 | Chou et al. |
| 2008/0190093 | A1 | 8/2008 | Gauthier et al. |
| 2008/0310955 | A1 | 12/2008 | Norris et al. |
| 2008/0314573 | A1 | 12/2008 | Schwarz et al. |
| 2009/0060714 | A1 | 3/2009 | Moors |
| 2009/0175718 | A1 | 7/2009 | Diaz et al. |
| 2009/0188234 | A1 | 7/2009 | Suciu et al. |
| 2009/0211273 | A1 | 8/2009 | Klewer |
| 2009/0229812 | A1 | 9/2009 | Pineo et al. |
| 2010/0003619 | A1 | 1/2010 | Das et al. |
| 2010/0025001 | A1 | 2/2010 | Lee et al. |
| 2010/0028645 | A1 | 2/2010 | Maguire et al. |
| 2010/0068464 | A1 | 3/2010 | Meyer |
| 2010/0068465 | A1 | 3/2010 | Su et al. |
| 2010/0107603 | A1 | 5/2010 | Smith |
| 2010/0113170 | A1 | 5/2010 | Schreiber et al. |
| 2010/0139288 | A1 | 6/2010 | Rago |
| 2010/0170262 | A1 | 7/2010 | Kaslusky et al. |
| 2010/0192593 | A1 | 8/2010 | Brown et al. |
| 2010/0212857 | A1 | 8/2010 | Bulin et al. |
| 2011/0079683 | A1 | 4/2011 | Stolte et al. |
| 2011/0088405 | A1 | 4/2011 | Turco |
| 2011/0132562 | A1 | 6/2011 | Merrill et al. |
| 2011/0132563 | A1 | 6/2011 | Merrill et al. |
| 2011/0150634 | A1 | 6/2011 | Bajusz et al. |
| 2011/0162387 | A1 | 7/2011 | Chir et al. |
| 2011/0302928 | A1 | 12/2011 | Mudawar |
| 2011/0310370 | A1 | 12/2011 | Rohner et al. |
| 2011/0314835 | A1 | 12/2011 | Liu |
| 2012/0067055 | A1 | 3/2012 | Held |
| 2012/0072091 | A1 | 3/2012 | Muramatsu et al. |
| 2012/0174583 | A1 | 7/2012 | Lehar |
| 2012/0192578 | A1 | 8/2012 | Finney |
| 2012/0243970 | A1 | 9/2012 | Hellgren et al. |
| 2012/0248657 | A1 | 10/2012 | Ebert et al. |
| 2012/0257960 | A1 | 10/2012 | Reinhardt et al. |
| 2012/0297789 | A1 | 11/2012 | Coffinberry |
| 2013/0052053 | A1 | 2/2013 | Colson et al. |
| 2013/0104564 | A1 | 5/2013 | Arar |
| 2013/0186100 | A1 | 7/2013 | Rhoden et al. |
| 2013/0195658 | A1 | 8/2013 | Saito et al. |
| 2013/0224423 | A1 | 8/2013 | Mikulak et al. |
| 2013/0247587 | A1 | 9/2013 | Lo |
| 2013/0333855 | A1 | 12/2013 | Merrill et al. |
| 2014/0079540 | A1 | 3/2014 | Morris et al. |
| 2014/0182264 | A1 | 7/2014 | Weisgerber et al. |
| 2014/0230444 | A1 | 8/2014 | Hao et al. |
| 2014/0271129 | A1 | 9/2014 | Mueller et al. |
| 2014/0352315 | A1 | 12/2014 | Diaz |
| 2014/0352562 | A1 | 12/2014 | Raymond, Jr. |
| 2015/0000291 | A1 | 1/2015 | Smith et al. |
| 2015/0037601 | A1 | 2/2015 | Blackmore |
| 2015/0048209 | A1 | 2/2015 | Hoyt et al. |

| | | | |
|---|---|---|---|
| 2015/0064015 | A1 | 3/2015 | Perez |
| 2015/0068629 | A1 | 3/2015 | Kottilingam et al. |
| 2015/0076739 | A1 | 3/2015 | Batchelder |
| 2015/0090070 | A1 | 4/2015 | Etter et al. |
| 2015/0100607 | A1 | 4/2015 | Kobashi et al. |
| 2015/0114611 | A1 | 4/2015 | Morris et al. |
| 2015/0202683 | A1 | 7/2015 | Bunker |
| 2015/0209910 | A1 | 7/2015 | Denney et al. |
| 2015/0306657 | A1 | 10/2015 | Frank |
| 2015/0321249 | A1 | 11/2015 | Shah et al. |
| 2015/0321250 | A1 | 11/2015 | Xu |
| 2015/0337730 | A1 | 11/2015 | Kupiszewski et al. |
| 2015/0345504 | A1 | 12/2015 | Kadau et al. |
| 2015/0354465 | A1 | 12/2015 | Suciu et al. |
| 2016/0038866 | A1 | 2/2016 | Gibson et al. |
| 2016/0059302 | A1 | 3/2016 | McBrien et al. |
| 2016/0108814 | A1 | 4/2016 | Schmitz |
| 2016/0201684 | A1 | 7/2016 | Schwarz et al. |
| 2016/0221262 | A1 | 8/2016 | Das et al. |
| 2016/0223011 | A1 | 8/2016 | Lee et al. |
| 2016/0298550 | A1 | 10/2016 | Kupratis et al. |
| 2016/0319670 | A1 | 11/2016 | Atkins et al. |
| 2016/0326963 | A1 | 11/2016 | Yamazaki |
| 2016/0341126 | A1 | 11/2016 | Kupratis et al. |
| 2017/0030266 | A1 | 2/2017 | Cerny et al. |
| 2017/0044984 | A1 | 2/2017 | Pesyna et al. |
| 2017/0087630 | A1 | 3/2017 | Lee et al. |
| 2017/0114721 | A1 | 4/2017 | Miller et al. |
| 2017/0159563 | A1 | 6/2017 | Sennoun |
| 2017/0159566 | A1 | 6/2017 | Sennoun et al. |
| 2017/0167382 | A1 | 6/2017 | Miller et al. |
| 2017/0184027 | A1 | 6/2017 | Moniz et al. |
| 2017/0260905 | A1 | 9/2017 | Schmitz |
| 2018/0003112 | A1 | 1/2018 | Kupratis et al. |
| 2018/0029944 | A1 | 2/2018 | Subramanian et al. |
| 2018/0161852 | A1 | 6/2018 | McCarren et al. |
| 2018/0161853 | A1 | 6/2018 | Deines et al. |
| 2018/0161854 | A1 | 6/2018 | Deines et al. |
| 2018/0161855 | A1 | 6/2018 | Deines et al. |
| 2018/0161856 | A1 | 6/2018 | Yang et al. |
| 2018/0161857 | A1 | 6/2018 | Garay et al. |
| 2018/0161858 | A1 | 6/2018 | Garay et al. |
| 2018/0161859 | A1 | 6/2018 | Garay et al. |
| 2018/0161866 | A1 | 6/2018 | Deines et al. |
| 2019/0078609 | A1 | 3/2019 | Mori et al. |
| 2019/0153978 | A1 | 5/2019 | Dievart et al. |
| 2019/0218971 | A1 | 7/2019 | Niergarth et al. |
| 2019/0359340 | A1 | 11/2019 | Pachidis et al. |
| 2020/0240327 | A1 | 7/2020 | Menheere et al. |
| 2021/0108570 | A1 | 4/2021 | Bemment |
| 2021/0115811 | A1 | 4/2021 | Arakawa et al. |
| 2021/0189956 | A1 | 6/2021 | Kannangara et al. |
| 2021/0189971 | A1 | 6/2021 | Gaskell et al. |
| 2021/0199013 | A1 | 7/2021 | Read et al. |
| 2022/0136434 | A1 | 5/2022 | Kannangara et al. |
| 2022/0154597 | A1 | 5/2022 | Unton |
| 2022/0288673 | A1 | 9/2022 | Deines et al. |
| 2022/0373019 | A1 | 11/2022 | Payyoor et al. |
| 2023/0136238 | A1 | 5/2023 | Payyoor et al. |
| 2023/0417152 | A1* | 12/2023 | Mondal ................. F01D 15/00 |
| 2024/0318614 | A1 | 9/2024 | Mondal et al. |

FOREIGN PATENT DOCUMENTS

| | | | |
|---|---|---|---|
| CN | 102078924 | A | 6/2011 |
| CN | 202291247 | U | 7/2012 |
| CN | 102802834 | A | 11/2012 |
| CN | 103008558 | A | 4/2013 |
| CN | 203441604 | U | 2/2014 |
| CN | 105579688 | A | 5/2016 |
| CN | 105822366 | A | 8/2016 |
| CN | 107035528 | A | 8/2017 |
| DE | 102009039255 | A1 | 3/2011 |
| EP | 0742634 | A2 | 11/1996 |
| EP | 2359959 | A1 | 8/2011 |
| EP | 2359962 | A2 | 8/2011 |
| EP | 2842911 | A1 | 3/2015 |
| EP | 2992982 | A1 | 3/2016 |
| EP | 3514349 | A1 | 7/2019 |

(56) References Cited

FOREIGN PATENT DOCUMENTS

| | | |
|---|---|---|
| FR | 3127024 A1 | 3/2023 |
| FR | 3127025 A1 | 3/2023 |
| GB | 2034822 A | 6/1980 |
| JP | H07208200 A | 8/1995 |
| JP | 2013/512783 A | 4/2013 |
| JP | 2014/208373 A | 11/2014 |
| JP | 2016/501139 A | 1/2016 |
| JP | 2015/516591 A | 6/2016 |
| JP | 2016/533905 A | 11/2016 |
| JP | 2019/065834 A | 4/2019 |
| WO | WO97/03281 A1 | 1/1997 |
| WO | WO03/2331 A1 | 6/2000 |
| WO | WO00/51761 A1 | 9/2000 |
| WO | WO2015/021168 A1 | 2/2015 |
| WO | WO2015/026535 A1 | 2/2015 |
| WO | WO2015/053846 A2 | 4/2015 |
| WO | WO2015/112885 A1 | 7/2015 |

OTHER PUBLICATIONS

Coy, The Little Gear that Could Reshape the Jet Engine, Bloomberg Business, 2015. https://www.bloomberg.com/news/articles/2015-10-15/pratt-s-purepower-gtf-jet-engine-innovation-took-almost-30-years.

Dalton, Ultra High Bypass Ration Low Noise Engine Study, NASA/CR-2003-212523, National Aeronautics and Space Administration, 2003, 1-187. https://ntrs.nasa.gov/citations/20040008591.

Gray et al., Energy Efficient Engine Program Technology Benefit/Cost Study, vol. II, NASA-CR-1174766, 1983, 1-118. https://ntrs.nasa.gov/citations/19900019249.

Hepher, The 'Great Engine Game' Behind New Boeing Jet Project, Reuters, 2016. https://www.reuters.com/article/business/the-great-engine-game-behind-new-boeing-jet-project-idUSKCN0VS204/.

Jane's Aero-Engines, Issue Seven, Edited by Bill Gunston, Jane's Information Group Inc., 2000, pp. 1-47, 61, 465-512.

Krithivasan, Detection of Propagation of Over-Heat Sections in Supply Air Duct of Aircrafts, Honeywell Technology Solutions Lab Pvt Ltd., Dec. 6, 2011, pp. 1-6.

Kumar et al., 30 Printing of Hollow Compounds, IJRET: International Journal of Research in Engineering and Technology, vol. 4, Issue 12, 2015, pp. 18-21.

Linkedin, Rotating Equipment Solutions, Shaft Length to Diameter Ratio (L/D)-API 6178 Centrifugal Compressor Selection, 2020. Retrieved from weblink: https://www.linkedin.com/pulse/shaft-length-diameter-ratio-ld-api-617-centrifugal-solutions.

Mikro Systems, Advanced Filtration to Improve Single Crystal Casting Yield, National Energy Technology Laboratory, Aug. 2013, pp. 1-4.

Pratt & Whitney, Civil Engines: Pratt & Whitney Gears up for the Future with GTF, Flight International, 2007. Accessed Feb. 13, 2025 from weblink: https://www.flightglobal.com/civil-engines-pratt-and-whitney-gears-up-for-the-future-with-gtf/77670.article.

Pratt & Whitney, TCDS No. E17NE, 2014, 8 Pages. Retrieved Feb. 13, 2025 from weblink: https://drs.faa.gov/browse/TCDSMODEL/doctypeDetails?Status=Current&TCDS%20Number=E17NE.

Rame et al., Development of AGAT, a Third-Generation Nickel-Based Superalloy for Single Crystal Turbine Blade Applications, the Minerals, Metals & Materials Society, Superalloys 2020, pp. 31-40.

Read, Powerplant Revolution, AeroSpace, 2014, 28-31.

Rauch, Design Study of an Air Pump and Integral Lift Engine ALF-504 Using the Lycoming 502 Core, NASA-CR-120,992, 1972, 182 pages. https://ntrs.nasa.gov/citations/19730004744.

Soares, Gas Turbines a Handbook of Air, Land and Sea Applications, Butterworth-Heinemann, an imprint of Elsevier Inc., 2008, 398-400. Book/Abstract Only https_//www.sciencedirect_com/book/9780750679695/gas-turbines.

Wemming, Validation and Integration of a Rubber Engine Model into an MDO Environment, 2010, 1-90. https://www.diva-portal.org/smash/get/diva2:361035/FULLTEXT02.pdf.

* cited by examiner

| HPC Exit Area | Redline EGT | SLS Thrust | CST |
|:---:|:---:|:---:|:---:|
| 29.1 | 1153 | 39262 | 53.6 |
| 27.1 | 1205 | 39258 | 64.5 |
| 28.4 | 1071 | 39292 | 52.2 |
| 26.1 | 1123 | 39288 | 64.6 |
| 24.7 | 1160 | 39285 | 74.5 |
| 26.2 | 1155 | 39262 | 66.2 |
| 27.0 | 1207 | 39257 | 64.9 |
| 27.0 | 1125 | 39289 | 60.6 |
| 24.6 | 1161 | 39285 | 75.0 |
| 29.1 | 1152 | 39262 | 53.3 |
| 28.4 | 1071 | 39292 | 52.1 |
| 27.0 | 1123 | 39287 | 60.3 |

GAS TURBINE ENGINE

CROSS-REFERENCE TO RELATED APPLICATIONS

This application is a continuation patent application of U.S. patent application Ser. No. 19/055,734, filed Feb. 18, 2025, which is a continuation-in-part patent application of U.S. patent application Ser. No. 18/481,515 filed Oct. 5, 2023, which is a continuation-in-part patent application of U.S. patent application Ser. No. 17/978,629 filed Nov. 1, 2022. Each of these applications are hereby incorporated by reference in their entirety.

FIELD

The present disclosure relates to a gas turbine engine.

BACKGROUND

A gas turbine engine typically includes a fan and a turbomachine. The turbomachine generally includes an inlet, one or more compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as for producing useful work to propel an aircraft in flight. The turbomachine is mechanically coupled to the fan for driving the fan during operation.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 17 depicts a ratio of the length of the engine core to the diameter of the engine core ($L_{CORE}/D_{CORE}$) as a function of a first high-speed shaft operating parameter ($HSP_X$) given by relationship (10) detailed below.

FIG. 18 depicts $L_{CORE}/D_{CORE}$ as a function of $HSP_X$, according to another embodiment.

FIG. 19 depicts $L_{CORE}/D_{CORE}$ as a function of $HSP_X$, according to another embodiment.

DETAILED DESCRIPTION

Figure 1:
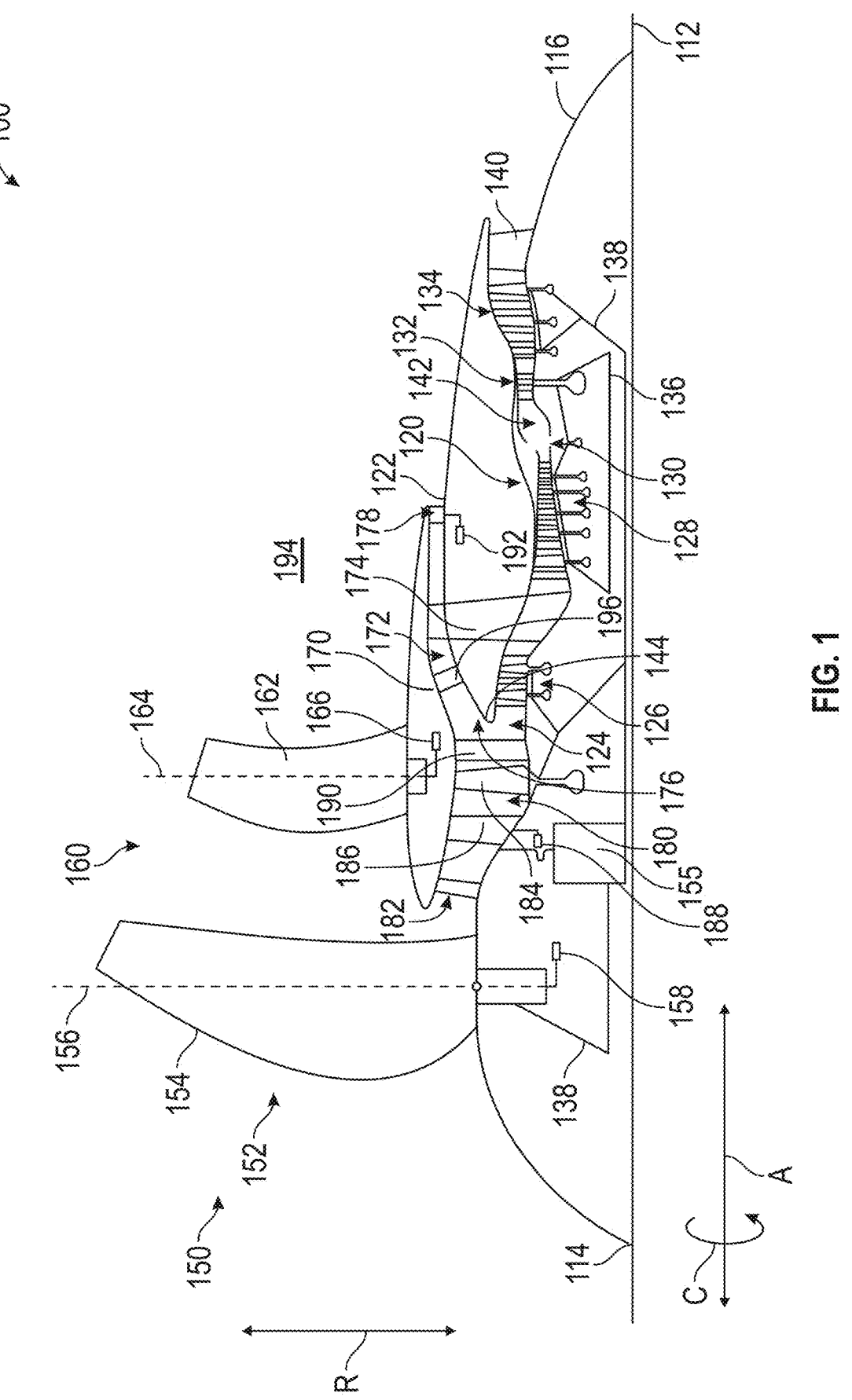
FIG. 1 is a schematic, cross-sectional view of a three-stream engine in accordance with an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The term "cooled cooling air system" is used herein to mean a system configured to provide a cooling airflow to one or more components exposed to a working gas flowpath of a turbomachine of a gas turbine engine at a location downstream of a combustor of the turbomachine and upstream of an exhaust nozzle of the turbomachine, the cooling airflow being in thermal communication with a heat exchanger for reducing a temperature of the cooling airflow at a location upstream of the one or more components.

Figure 4:
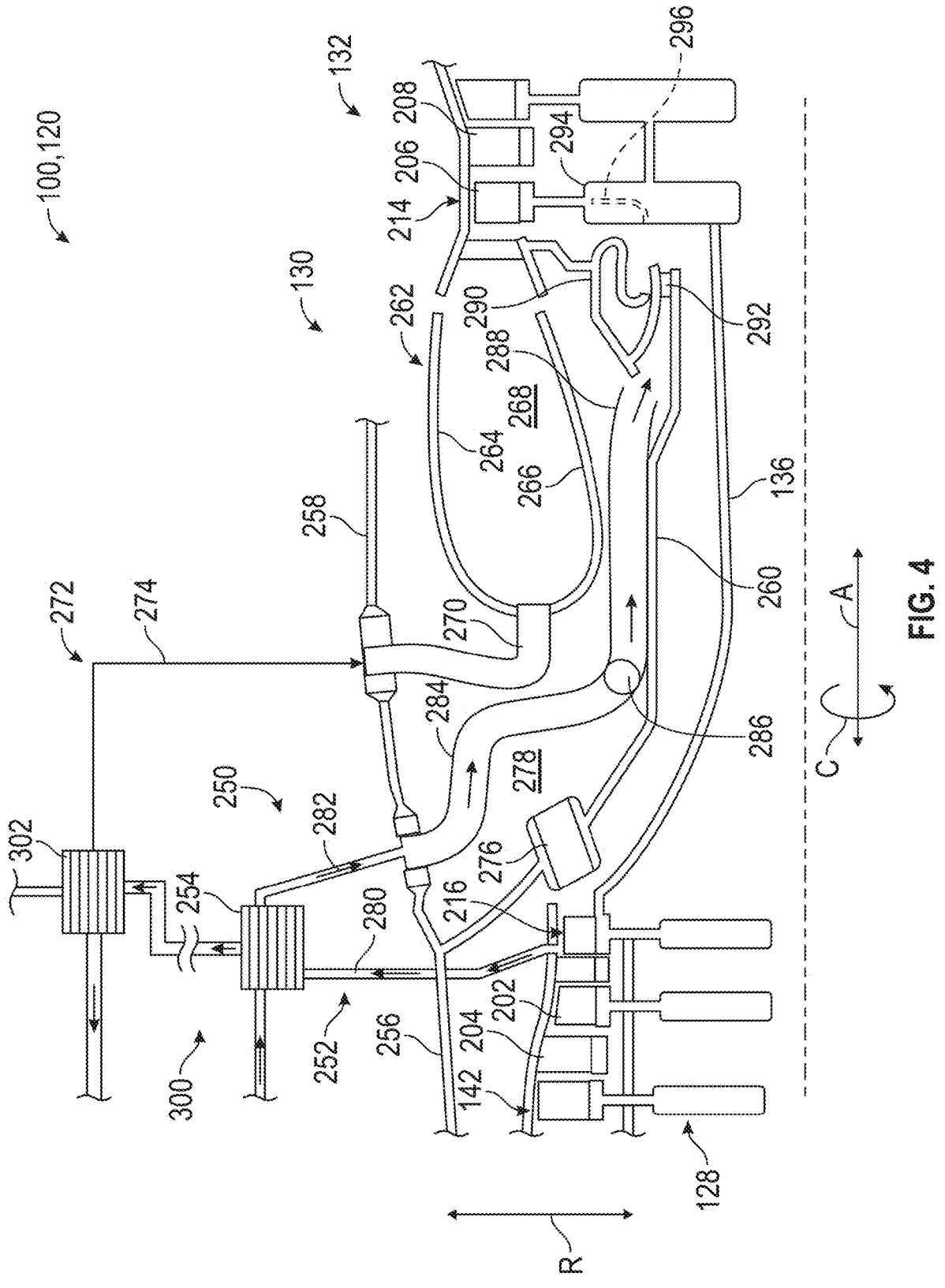
FIG. 4 is a close-up, schematic view of the exemplary three-stream engine of FIG. 1 showing the cooled cooling air system of FIG. 2.
Figure 9:
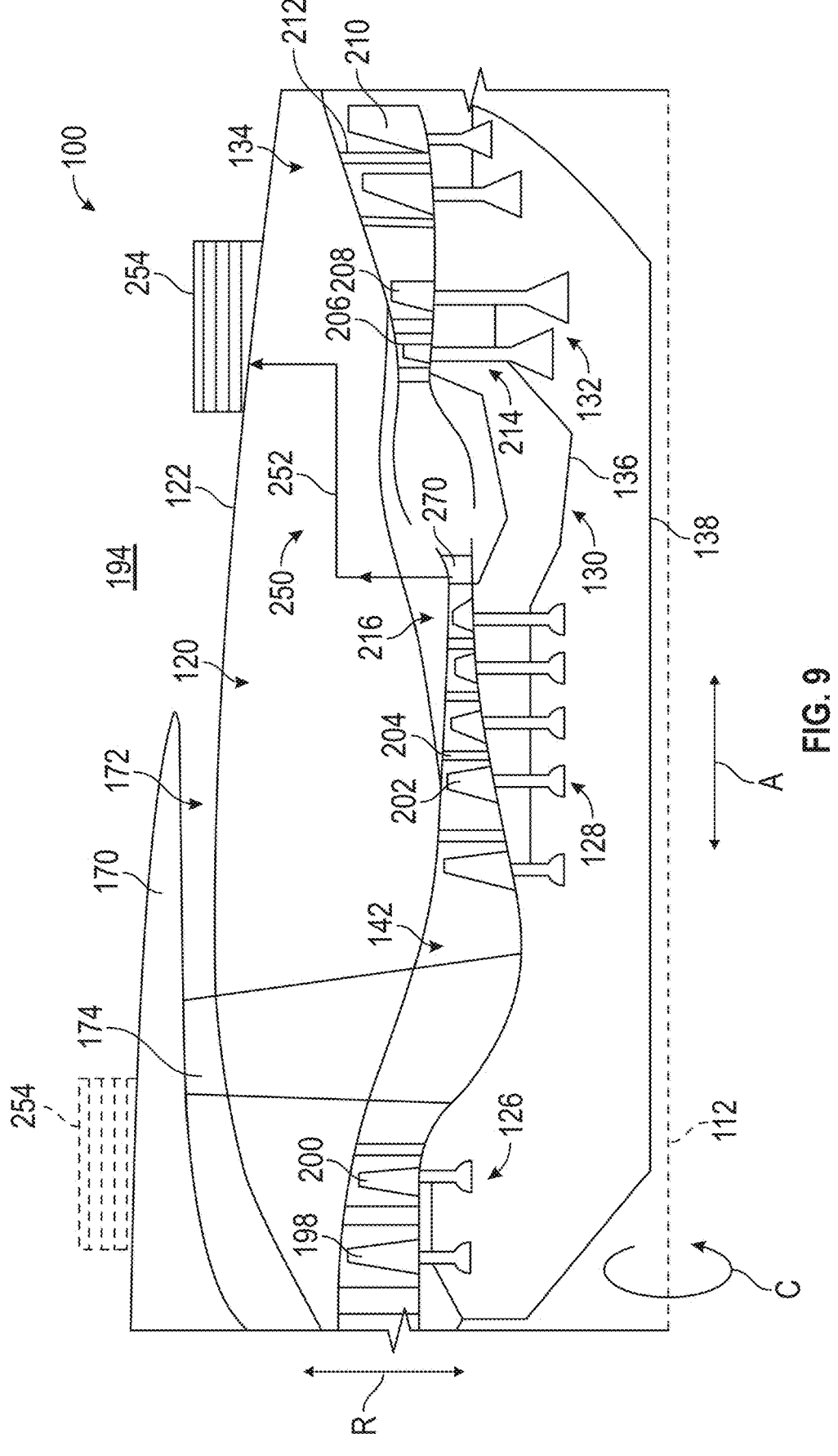
FIG. 9 is a schematic, close-up view of a gas turbine engine having a cooled cooling air system in accordance with another exemplary aspect of the present disclosure.

The cooled cooling air systems contemplated by the present disclosure may include a thermal bus cooled cooling air system (see, e.g., FIGS. 4 and 5) or a dedicated heat exchanger cooled cooling air system (i.e., a cooled cooling air system including a heat sink heat exchanger dedicated to the cooled cooling air system); a bypass heat exchanger cooled cooling air system having a heat sink heat exchanger thermally coupled to an airflow through a bypass passage (see, e.g., FIG. 9); an air-to-air cooled cooling air system (i.e., a cooled cooling air system having a heat sink heat exchanger configured to transfer heat to an airflow; see, e.g., FIG. 9); an oil-to-air cooled cooling air system (i.e., a cooled cooling air system having a heat sink heat exchanger configured to transfer heat to an oil flow); a fuel-to-air cooled cooling air system (i.e., a cooled cooling air system having a heat sink heat exchanger configured to transfer heat to a fuel flow, such as a Jet A fuel flow, a liquid hydrogen or hydrogen gas fuel flow, etc.; see, e.g., FIG. 4); or a combination thereof.

In one or more of the exemplary cooled cooling air systems described herein, the cooled cooling air system may receive the cooling air from a downstream end of a high-pressure compressor (i.e., a location closer to a last stage of the high-pressure compressor), an upstream end of the high-pressure compressor (i.e., a location closer to a first stage of the high-pressure compressor), a downstream end of a low-pressure compressor (i.e., a location closer to a last stage of the low-pressure compressor), an upstream end of the low-pressure compressor (i.e., a location closer to a first stage of the low-pressure compressor), a location between compressors, a bypass passage, a combination thereof, or any other suitable airflow source.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first," "second," "third," and "fourth," etc., may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like, refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

The phrases "from X to Y" and "between X and Y" each refers to a range of values inclusive of the endpoints (i.e., refers to a range of values that includes both X and Y).

A "third stream" as used herein means a non-primary air stream capable of increasing fluid energy to produce a minority of total propulsion system thrust. A pressure ratio of the third stream may be higher than that of the primary propulsion stream (e.g., a bypass or a propeller driven propulsion stream). The thrust may be produced through a dedicated nozzle or through mixing of an airflow through the third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degrees Fahrenheit ambient temperature operating conditions.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

The term "takeoff power level" refers to a power level of a gas turbine engine used during a takeoff operating mode of the gas turbine engine during a standard day operating condition.

The term "standard day operating condition" refers to ambient conditions of sea level altitude, 59 degrees Fahrenheit, and 60 percent relative humidity.

The term "propulsive efficiency" refers to an efficiency with which the energy contained in an engine's fuel is converted into kinetic energy for the vehicle incorporating the engine, to accelerate it, or to replace losses due to aerodynamic drag or gravity.

The term redline exhaust gas temperature (referred to herein as "redline EGT") refers to a maximum permitted takeoff temperature documented in a Federal Aviation Administration ("FAA")-type certificate data sheet. For example, in certain exemplary embodiments, the term redline EGT may refer to a maximum permitted takeoff temperature of an airflow after a first stage stator downstream of an HP turbine of an engine that the engine is rated to withstand. For example, with reference to the exemplary engine 100 discussed below with reference to FIG. 2, the term redline EGT refers to a maximum permitted takeoff temperature of an airflow after the first stator 208 downstream of the last stage of rotor blades 206 of the HP turbine 132 (at location 215 into the first of the plurality of LP turbine rotor blades 210). In embodiments wherein the engine is configured as a three-spool engine (as compared to the two-spool engine of FIG. 2; see FIG. 12), the term redline EGT refers to a maximum permitted takeoff temperature of an airflow after the first stator downstream of the last stage of rotor blades of the intermediate speed turbine (see the second turbine 516 of the engine 500 of FIG. 12). The term redline EGT is sometimes also referred to as an indicated turbine exhaust gas temperature or indicated turbine temperature.

The terms "low" and "high," or their respective comparative degrees (e.g., "lower" and "higher," where applicable), when used with the compressor, turbine, shaft, or spool components, each refers to relative pressures and/or relative speeds within an engine unless otherwise specified. For example, a "low-speed" component defines a component configured to operate at a rotational speed, such as a maximum allowable rotational speed, which is lower than that of a "high-speed" component of the engine. Alternatively, unless otherwise specified, the aforementioned terms may be understood in their superlative degree. For example, a "low-pressure turbine" may refer to the lowest maximum pressure within a turbine section, and a "high-pressure turbine" may refer to the highest maximum pressure within the turbine section. The terms "low" or "high" in such aforementioned regards may additionally, or alternatively, be understood as relative to minimum allowable speeds and/or pressures, or minimum or maximum allowable speeds and/or pressures relative to normal, desired, steady state, etc., operation of the engine.

As used herein, the terms "axial" and "axially" refer to directions and orientations that extend substantially parallel to a longitudinal centerline of the turbine engine. Moreover, the terms "radial" and "radially" refer to directions and orientations that extend substantially perpendicular to the longitudinal centerline of the turbine engine. In addition, as used herein, the terms "circumferential" and "circumferentially" refers to directions and orientations that extend arcuately about the longitudinal centerline of the turbine engine.

As used herein, "overall pressure ratio (OPR)" of a turbine engine is a ratio of the pressure at the exit of the compressor to the pressure at the inlet of the engine.

As used herein, "redline speed" means the maximum expected rotational speed of a shaft during normal operation of an engine. The redline speed may be expressed in terms of rotations per second in Hertz (Hz), rotations per minute (RPM), or as a linear velocity of the outer diameter of the shaft in terms of feet per second. For a gas turbine engine that has a high-speed shaft and a low-speed shaft, both the high-speed shaft and the low-speed shaft have redline speeds, The redline speeds of the shafts are typically reported in an engine Type Certificate Data Sheet (TCDS). Alternatively, redline speeds can be referred to as maximum permissible shaft speed at take-off flight conditions (e.g., over a 5 minute duration).

As used herein, "critical speed" means a rotational speed of the shaft that is about the same as the fundamental, or natural frequency of a first-order bending mode of the shaft (e.g., the shaft rotates at eighty Hz and the first-order modal frequency is eighty Hertz). When the shaft rotates at the critical speed, the shaft is expected to have a maximum amount of deflection, hence, instability, due to excitation of the first-order bending mode of the shaft. The critical speed may be expressed in terms of rotations per second in Hertz (Hz), rotations per minute (RPM), or as a linear velocity of the outer diameter of the shaft in terms of feet per second.

As used herein, "critical frequency" and "fundamental frequency" are referred to interchangeably and refer to the fundamental, or natural frequency, of the first-order bending mode of the shaft.

The term "subcritical speed" refers to a shaft redline speed that is less than the fundamental, or natural frequency of the first-order bending mode of the shaft (e.g., the shaft rotates at a redline speed of 70 Hz while the first-order modal frequency is about 80 Hertz). When the rotational speed is subcritical, the shaft is more stable than when rotating at a critical speed. A "subcritical shaft" is a shaft that has a redline speed below the critical speed of the shaft.

The term "supercritical speed" refers to a shaft rotational speed that is above the fundamental, or natural frequency of the first-order bending mode of the shaft (e.g., the shaft rotates at eighty Hz while the first-order modal frequency is about seventy Hertz). A supercritical shaft is less stable than a subcritical shaft because the shaft speed can pass through the critical speed since the fundamental mode of the shaft is below the redline speed. A "supercritical shaft" is a shaft that has a redline speed above the critical speed of the shaft.

As used herein, "bypass ratio" is a ratio between the mass flow rate of air drawn through the fan that goes around the core engine (e.g., through a bypass passage) to the mass flow rate of the air that enters the core engine (e.g., the turbomachine). In other words, the bypass ratio is the ratio of air that bypasses the core engine to the air that passes into the core engine.

The term "bypass passage" refers generally to a passage with an airflow from a fan of the gas turbine engine that flows over an upstream-most inlet to a turbomachine of the gas turbine engine. In a ducted gas turbine engine, the bypass passage is the passage defined between an outer nacelle (surrounding the fan of the gas turbine engine) and one or more cowls inward of the outer nacelle (e.g., a fan cowl, a core cowl or both if both are present; see, e.g., FIG. 8). In an unducted gas turbine engine, the bypass passage refers to an open sided passage (i.e., not explicitly defined by structure such as an outer nacelle) where airflow from the fan passes over an upstream-most inlet to the turbomachine (e.g., inlet 182 to inlet duct 180 in FIG. 1), defined at least in part by a primary fan outer fan area, which refers to an area defined by an annulus representing a portion of the fan located outward of an inlet splitter at the upstream-most inlet to the turbomachine (e.g., the inlet splitter of the fan cowl 170 in the embodiment of FIG. 1). An airflow through the bypass passage of a ducted engine or an unducted engine refers to all of the airflow from the fan that is not provided through the upstream-most inlet to the turbomachine.

As used herein, the term "ceramic matrix composite" ("CMC") refers to a subgroup of composite materials and a subgroup of ceramics. The terms "CMC" and "CMC material" are used interchangeably herein. When the engine component (e.g., the higher pressure turbine module, nozzle, or blades thereof) comprises or includes "CMC" or "CMC material," the engine component may include one of, or combinations of one or more of the ceramic matrix composite materials described herein. Such engine component may also include non-ceramic matrix composite materials, such as a metal alloy (e.g., a CMC material for an airfoil and a separate disk with a dovetail slot made from a metal alloy).

Reference to a "first" or a "second" or a "third" CMC material does not preclude the materials from including multiple CMC materials, different CMC materials, or the same CMC materials.

More specifically, CMC refers to a class of materials that includes a reinforcing material (e.g., reinforcing fibers) surrounded by a ceramic matrix phase. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Generally, particular CMCs may be referred to as their combination of type of fiber/type of matrix. For example, C/SiC for carbon-fiber-reinforced silicon carbide, SiC/SiC for silicon carbide-fiber-reinforced silicon carbide, SiC/SiN for silicon carbide fiber-reinforced silicon nitride, SiC/SiC—SiN for silicon carbide fiber-reinforced silicon carbide/silicon nitride matrix mixture, etc. In other examples, the CMCs may include a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O3·2SiO_2$), as well as glassy aluminosilicates.

In certain embodiments, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing and subsequent chemical processing to arrive at a component formed of a CMC material having a desired chemical composition. For example, the preform may undergo a cure or burn-out to yield a high char residue in the preform, and subsequent melt-infiltration ("MI") with silicon, or a cure or pyrolysis to yield a silicon carbide matrix in the preform, and subsequent chemical vapor infiltration ("CVI") with silicon carbide. Additional steps may be taken to improve densification of the preform, either before or after chemical vapor infiltration, by injecting the preform with a liquid resin or polymer followed by a thermal processing step to fill the voids with silicon carbide. CMC material as used herein may be formed using any known methods or hereafter developed including but not limited to melt infiltration, chemical vapor infiltration, polymer impregnation pyrolysis (PIP) and any combination thereof.

Such materials, along with certain monolithic ceramics (i.e., ceramic materials without a reinforcing material), are particularly suitable for higher temperature applications.

Additionally, these ceramic materials are lightweight compared to metal alloys (e.g., superalloys), yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

Here and throughout the specification and claims, range limitations are combined, and interchanged, such ranges are identified and include all the sub-ranges contained therein unless context or language indicates otherwise. For example, all ranges disclosed herein are inclusive of the endpoints, and the endpoints are independently combinable with each other.

Generally, a turbofan engine includes a fan and a turbomachine, with the turbomachine rotating the fan to generate thrust. The turbomachine includes a compressor section, a combustion section, a turbine section, and an exhaust section and defines a working gas flowpath therethrough. A relatively small amount of thrust may also be generated by an airflow exiting the working gas flowpath of the turbomachine through the exhaust section. In addition, certain turbofan engines may further include a third stream that contributes to a total thrust output of the turbofan engine, potentially allowing for a reduction in size of a core of the turbomachine for a given total turbofan engine thrust output.

Conventional turbofan engine design practice has limited a compressor pressure ratio based at least in part on the gas temperatures at the exit stage of a high-pressure compressor. These relatively high temperatures at the exit of the high-pressure compressor may also be avoided when they result in prohibitively high temperatures at an inlet to the turbine section, as well as when they result in prohibitively high exhaust gas temperatures through the exhaust section. For a desired turbofan engine thrust output produced from an increased pressure ratio across the high-pressure compressor, there is an increase in the gas temperature at the compressor exit, at a combustor inlet, at the turbine section inlet, and through an exhaust section of the turbofan engine.

The inventors have recognized that there are generally three approaches to making a gas turbine engine capable of operating at higher temperatures while providing a net benefit to engine performance: reducing the temperature of a gas used to cool core components, utilizing materials capable of withstanding higher operating temperature conditions, or a combination thereof.

Referring to the case of an engine that utilizes cooled cooling air for operating at higher temperatures, the inventors of the present disclosure discovered, unexpectedly, that the costs associated with achieving a higher compression by reducing gas temperatures used to cool core components to accommodate higher core gas temperatures may indeed produce a net benefit, contrary to prior expectations in the art. The inventors discovered during the course of designing several engine architectures of varying thrust classes and mission requirements (including the engines illustrated and described in detail herein) a relationship exists among the exhaust gas passing through the exhaust section, the desired maximum thrust for the engine, and the size of the exit stage of the high-pressure compressor, whereby including this technology produces a net benefit. Previously it was thought that the cost for including a technology to reduce the temperature of gas intended for cooling compressor and turbine components was too prohibitive, as compared to the benefits of increasing the core temperatures.

For example, the inventors of the present disclosure found that a cooled cooling air system may be included while maintaining or even increasing the maximum turbofan engine thrust output, based on this discovery. The cooled cooling air system may receive an airflow from the compressor section, reduce a temperature of the airflow using a heat exchanger, and provide the cooled airflow to one or more components of the turbine section, such as a first stage of high-pressure turbine rotor blades. In such a manner, a first stage of high-pressure turbine rotor blades may be capable of withstanding increased temperatures by using the cooled cooling air, while providing a net benefit to the turbofan engine, i.e., while taking into consideration the costs associated with accommodations made for the system used to cool the cooling air.

The inventors reached this conclusion after evaluating potentially negative impacts to engine performance brought on by introduction of a cooled cooling air system. For example, a cooled cooling air system may generally include a duct extending through a diffusion cavity between a compressor exit and a combustor within the combustion section, such that increasing the cooling capacity may concomitantly increase a size of the duct and thus increase a drag or blockage of an airflow through the diffusion cavity, potentially creating problems related to, e.g., combustor aerodynamics. Similarly, a dedicated or shared heat exchanger of the cooled cooling air system may be positioned in a bypass passage of the turbofan engine, which may create an aerodynamic drag or may increase a size of the shared heat exchanger and increase aerodynamic drag. Size and weight increases associated with maintaining certain risk tolerances were also taken into consideration. For example, a cooled cooling air system must be accompanied with adequate safeguards in the event of a burst pipe condition, which safeguards result in further increases in the overall size, complexity, and weight of the system.

With a goal of arriving at an improved turbofan engine capable of operating at higher temperatures at the compressor exit and turbine inlet, the inventors have proceeded in the manner of designing turbofan engines having an overall pressure ratio, total thrust output, redline exhaust gas temperature, and the supporting technology characteristics; checking the propulsive efficiency and qualitative turbofan engine characteristics of the designed turbofan engine; redesigning the turbofan engine to have higher or lower compression ratios based on the impact on other aspects of the architecture, total thrust output, redline exhaust gas temperature, and supporting technology characteristics; rechecking the propulsive efficiency and qualitative turbofan engine characteristics of the redesigned turbofan engine; etc. during the design of several different types of turbofan engines, including the turbofan engines described below with reference to FIGS. 1 and 4 through 8 through 11, which will now be discussed in greater detail.

One or more components of the engine described herein below may be manufactured or formed using any suitable process, such as an additive manufacturing process, such as a three-dimensional (3D) printing process. The use of such a process may allow such a component to be formed integrally, as a single monolithic component, or as any suitable number of sub-components. In particular, the additive manufacturing process may allow such a component to be integrally formed and include a variety of features not possible when using prior manufacturing methods. For example, the additive manufacturing methods described herein enable the manufacture of shafts having unique features, configurations, thicknesses, materials, densities, passageways, headers, and mounting structures that may not have been possible or practical using prior manufacturing methods. Some of these features are described herein.

Further, a turbomachine shaft coupled to the power turbine and the fan (either directly or through a gearbox) can experience vibrations during operation of the engine. For example, when the shaft rotates at the critical speed of the shaft, the shaft will vibrate excessively. The excessive vibration is due primarily to excitation of a first-order beam bending mode of the shaft. Thus, the shaft may be characterized by a first-order beam bending mode of the shaft, the fundamental resonance frequency (fundamental frequency) of this mode, and the critical speed of rotation of the shaft. If the first-order bending mode may be excited by a low-speed shaft rate occurring during a standard operating range of the engine, undetected vibration, as well as an increased risk of whirl instability, may result.

Newer engine architectures may be characterized by higher bypass ratio (e.g., greater than 8.0, greater than 10.0, or greater than 12.0) engine designs to improve overall efficiency of the engine in converting kinetic energy to mechanical energy in the form of propulsion. For example, the bypass ratio is greater than 8.0 for engine thrust class of less than 20,000 lbf, greater than 10.0 for engine thrust class of about 20,000 lbf, and greater than 12.0 for engine thrust class of greater than 30,000 lbf. Typically, the fan size is increased to achieve the higher bypass ratios and the low-pressure (LP) shaft that couples the LP turbine and the LP compressor is also increased to accommodate the larger fan sizes. The increase in the LP shaft, however, results in lower shaft speeds and lower overall power through the LP shaft to the fan. Additionally, the engine core (e.g., the high-pressure compressor, the combustor, and the high-pressure turbine) needs to fit within a smaller space as the bypass ratios are increased. These trends can result in reductions in stiffness-to-weight ratio for the shaft and structure that influences dynamics of the HP shaft. For example, with the higher bypass ratio engines, the flow size (e.g., mass flow rate) to the engine core decreases. Typically, the size (e.g., length and diameter) of the HP shaft is scaled down to accommodate the decreased flow size in order to decrease the overall size of the engine core (e.g., smaller engine core). However, components of the engine core (e.g., the blades, the vanes or the nozzles, the axial gaps between the blades and the vanes or the nozzles and/or the combustor) are unable to be scaled down to achieve the smaller engine core while maintaining the desired thrust for a particular engine thrust class.

The length of the engine core and the diameter of the engine core each affect the dynamics of the HP shaft. For example, the HP shaft dynamics is dependent on the engine core length to diameter ratio ($L_{CORE}/D_{CORE}$). Higher $L_{CORE}/D_{CORE}$ values result in reduced margins for Alford stability (e.g., a fundamental/first bending mode that is an excitation due to clearance changes around the periphery of the HP rotor) and for the third mode (e.g., an S-shaped bending mode that occurs at redline speeds) of the HP shaft. In particular, as the $L_{CORE}/D_{CORE}$ value increases, the Alford margin and the third mode margin decreases, thus, lowering the maximum allowable redline speeds at which the HP shaft may rotate before experiencing instability due to Alford forces and/or excessive excitation of the third mode.

Typically, the decreased Alford margin and the third mode margin are mitigated by increasing the radius ratio (e.g., a ratio of the hub radius to the tip radius) of the HP compressor (e.g., increasing diameter of the HP compressor) and reducing the HP compressor stage count (e.g., resulting in a reduced engine core length). However, this results in poorer aerodynamic performance of the HP compressor and/or of the HP turbine (e.g., higher tip clearance to blade height ratios), increased weight of the engine core (e.g., and of the overall engine), and a reduced overall pressure ratio (OPR) due to lower pressure ratio from the HP compressor. To enable higher OPRs, the pressure ratio is transferred to a booster (e.g., low-pressure compressor), resulting in increased HP compressor inlet temperatures (e.g., also referred to as T25). This causes higher HP shaft redline speeds (e.g., for similar inlet corrected flow conditions), thereby decreasing the Alford margin and the third mode margin. Increasing the HP shaft length also increases the LP shaft length to accommodate the longer HP shaft. Further, the higher HP shaft redline speed and the smaller engine core diameter restricts the LP shaft diameter (e.g., reduced core bearing diameters due to DN limits (e.g., DN is the product of diameter (D) in mm and speed (N) in RPM and is used to determine the correct lubricant viscosity for a particular bearing), reduced HP disk bore diameters, etc.), thus, limiting the design space for subcritical shaft designs or a feasible diameter for the LP shaft to support the required torque. For example, as the shaft speeds increase, the bearings that support the HP shaft have to be decreased in diameter to accommodate the faster shaft speeds and smaller core size. This puts a constraint on the diameter of the LP shaft, thereby affecting the dynamics of the LP shaft.

Thus, a balance is ultimately struck (penalties vs. benefits) to maintain or to enhance engine performance (e.g., by increasing the bypass ratio), while also enabling an increase in the redline speed of the HP shaft, or not lowering the critical speed, e.g., add one or two additional stages to a compressor to increase efficiency, to allow for smaller engine cores and higher bypass ratio engines without operating at instabilities due to Alford forces or the third bending mode of the HP shaft.

Different approaches for engine types, midshaft geometry, bearing support, and material compositions are needed for next-generation turbomachine engines, to permit high-speed operation without resulting in an unstable bending mode and Alford stability, and, therefore, vibrations during regular operation. The present disclosure provides for various embodiments that contemplate a suitable design to meet these requirements while lowering vibrations, or at least maintaining a tolerable vibration environment during flight conditions (e.g., takeoff or max thrust), and provides for a wide variety of shafts and HP compressor geometries having different combinations of HP inlet temperature, HP pressure ratio, shaft length, shaft diameter, HP compressor inlet size, and HP compressor exit size for a variety of contemplated engine designs, including different engine core sizes for different sized high-pressure compressors and high-pressure turbines. The various embodiments, as described herein including illustrated examples for both a ducted fan configuration and an open fan configuration of a gas turbine engine, include turbomachine shafts that employ one or more of the above-mentioned techniques to increase the maximum allowable redline speed of the HP shaft and/or to maintain a design speed for improved efficiency while mitigating or avoiding instability due to Alford forces and/or excessive excitation of the HP shaft third mode.

Referring now to FIG. 1, a schematic cross-sectional view of an engine 100 is provided according to an example embodiment of the present disclosure. The engine 100 is a gas turbine engine. Particularly, FIG. 1 provides a turbofan engine having a rotor assembly with a single stage of unducted rotor blades. In such a manner, the rotor assembly may be referred to herein as an "unducted fan," or the entire engine 100 may be referred to as an "unducted turbofan engine." In addition, the engine 100 of FIG. 1 includes a third stream extending from a location downstream of a ducted mid-fan to a bypass passage over the turbomachine, as will be explained in more detail below.

For reference, the engine 100 defines an axial direction A, a radial direction R, and a circumferential direction C. Moreover, the engine 100 defines an axial centerline or longitudinal centerline axis 112 that extends along the axial direction A. In general, the axial direction A extends parallel to the longitudinal centerline axis 112, the radial direction R extends outward from and inward to the longitudinal centerline axis 112 in a direction orthogonal to the axial direction A, and the circumferential direction extends three hundred sixty degrees (360°) around the longitudinal centerline axis 112. The engine 100 extends between a forward end 114 and an aft end 116, e.g., along the axial direction A.

The engine 100 includes a turbomachine 120 and a rotor assembly, also referred to a fan section 150, positioned upstream thereof. Generally, the turbomachine 120 includes, in serial flow order, a compressor section, a combustion section 130, a turbine section, and an exhaust section. Particularly, as shown in FIG. 1, the turbomachine 120 includes a core cowl 122 that defines a core inlet 124. The core cowl 122 further encloses at least in part a low-pressure system and a high-pressure system. For example, the core cowl 122 depicted encloses and supports at least in part a booster or a low-pressure ("LP") compressor 126 for pressurizing the air that enters the turbomachine 120 through core inlet 124. A high-pressure ("HP"), multi-stage, axial-flow compressor 128 receives pressurized air from the LP compressor 126 and further increases the pressure of the air. The pressurized air stream flows downstream to a combustor of the combustion section 130 where fuel is injected into the pressurized air stream and ignited to raise the temperature and energy level of the pressurized air.

It will be appreciated that as used herein, the terms "high/low speed" and "high/low-pressure" are used with respect to the high-pressure/high speed system and low-pressure/low speed system interchangeably. Further, it will be appreciated that the terms "high" and "low" are used in this same context to distinguish the two systems, and are not meant to imply any absolute speed and/or pressure values.

The high energy combustion products flow from the combustion section 130 downstream to a high-pressure turbine 132. The high-pressure turbine 132 drives the high-pressure compressor 128 through a high-pressure (HP) shaft 136. In this regard, the high-pressure turbine 132 is drivingly coupled with the high-pressure compressor 128. As will be appreciated, the high-pressure compressor 128, the combustion section 130, and the high-pressure turbine 132 may collectively be referred to as the "engine core" of the engine 100. The high energy combustion products then flow to a low-pressure turbine 134. The low-pressure turbine 134 drives the low-pressure compressor 126 and components of the fan section 150 through a low-pressure (LP) shaft 138. In this regard, the low-pressure turbine 134 is drivingly coupled with the low-pressure compressor 126 and components of the fan section 150. The LP shaft 138 is coaxial with the HP shaft 136 in this example embodiment. After driving each of the turbines 132, 134, the combustion products exit the turbomachine 120 through a turbomachine exhaust nozzle 140.

Accordingly, the turbomachine 120 defines a working gas flowpath or core duct, also referred to as a gas flow path 142, that extends between the core inlet 124 and the turbomachine exhaust nozzle 140. The working gas flowpath 142 is an annular duct positioned generally inward of the core cowl 122 along the radial direction R. The working gas flowpath 142 (e.g., the working gas flowpath through the turbomachine 120) may be referred to as a second stream.

The fan section 150 includes a fan 152, which is the primary fan in this example embodiment. For the depicted embodiment of FIG. 1, the fan 152 is an open rotor or unducted fan 152. In such a manner, the engine 100 may be referred to as an open rotor engine.

As depicted, the fan 152 includes an array of fan blades 154 (only one shown in FIG. 1). The fan blades 154 are rotatable, e.g., about the longitudinal centerline axis 112. As noted above, the fan 152 is drivingly coupled with the low-pressure turbine 134 via the LP shaft 138. For the embodiments shown in FIG. 1, the fan 152 is coupled with the LP shaft 138 via a speed reduction gearbox 155, e.g., in an indirect-drive or geared-drive configuration.

Moreover, the array of fan blades 154 can be arranged in equal spacing around the longitudinal centerline axis 112. Each fan blade 154 has a root and a tip and a span defined therebetween, and further defines a central blade axis 156. For this embodiment, each fan blade 154 of the fan 152 is rotatable about its respective central blade axis 156, e.g., in unison with one another. One or more actuators 158 are provided to facilitate such rotation and therefore may be used to change a pitch of the fan blades 154 about their respective central blades' axes 156.

The fan section 150 further includes a fan guide vane array 160 that includes fan guide vanes 162 (only one shown in FIG. 1) disposed around the longitudinal centerline axis 112. For this embodiment, the fan guide vanes 162 are not rotatable about the longitudinal centerline axis 112. Each fan guide vane 162 has a root and a tip and a span defined therebetween. The fan guide vanes 162 may be unshrouded as shown in FIG. 1 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. For this embodiment, each fan guide vane 162 of the fan guide vane array 160 is rotatable about its respective central blade axis 164, e.g., in unison with one another. One or more actuators 166 are provided to facilitate such rotation and therefore may be used to change a pitch of the fan guide vane 162 about its respective central blade axis 164. However, in other embodiments, each fan guide vane 162 may be fixed or unable to be pitched about its central blade axis 164. The fan guide vanes 162 are mounted to a fan cowl 170. Notably, the engine 100 defines a bypass passage 194 over the fan cowl 170 and core cowl 122.

As shown in FIG. 1, in addition to the fan 152, which is unducted, a ducted fan 184 is included aft of the fan 152, such that the engine 100 includes both a ducted and an unducted fan which both serve to generate thrust through the movement of air without passage through at least a portion of the turbomachine 120 (e.g., without passage through the HP compressor 128 and combustion section for the embodiment depicted). The ducted fan 184 is rotatable about the same axis (e.g., the longitudinal centerline axis 112) as the fan 152. The ducted fan 184 is, for the embodiment depicted, driven by the low-pressure turbine 134 (e.g. coupled to the LP shaft 138). In the embodiment depicted, as noted above, the fan 152 may be referred to as the primary fan, and the ducted fan 184 may be referred to as a secondary fan. It will be appreciated that these terms "primary" and "secondary"

are terms of convenience, and do not imply any particular importance, power, or the like.

The ducted fan 184 includes a plurality of fan blades (not separately labeled in FIG. 1) arranged in a single stage, such that the ducted fan 184 may be referred to as a single stage fan. The fan blades of the ducted fan 184 can be arranged in equal spacing around the longitudinal centerline axis 112. Each blade of the ducted fan 184 has a root and a tip and a span defined therebetween.

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan duct flowpath, or simply a fan duct 172. According to this embodiment, the fan duct flowpath or fan duct 172 may be understood as forming at least a portion of the third stream of the engine 100.

Incoming air may enter through the fan duct 172 through a fan duct inlet 176 and may exit through a fan exhaust nozzle 178 to produce propulsive thrust. The fan duct 172 is an annular duct positioned generally outward of the working gas flowpath 142 along the radial direction R. The fan cowl 170 and the core cowl 122 are connected together and supported by a plurality of substantially radially-extending, circumferentially-spaced stationary struts 174 (only one shown in FIG. 1). The stationary struts 174 may each be aerodynamically contoured to direct air flowing thereby. Other struts in addition to the stationary struts 174 may be used to connect and support the fan cowl 170 and/or core cowl 122. In many embodiments, the fan duct 172 and the working gas flowpath 142 may at least partially co-extend (generally axially) on opposite sides (e.g., opposite radial sides) of the core cowl 122. For example, the fan duct 172 and the working gas flowpath 142 may each extend directly from a leading edge 144 of the core cowl 122 and may partially co-extend generally axially on opposite radial sides of the core cowl 122.

The engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the working gas flowpath 142 and the fan duct 172 by the leading edge 144 of the core cowl 122. The inlet duct 180 is wider than the working gas flowpath 142 along the radial direction R. The inlet duct 180 is also wider than the fan duct 172 along the radial direction R. The secondary fan 184 is positioned at least partially in the inlet duct 180.

Notably, for the embodiment depicted, the engine 100 includes one or more features to increase an efficiency of a third stream thrust, $Fn_{3S}$ (e.g., a thrust generated by an airflow through the fan duct 172 exiting through the fan exhaust nozzle 178, generated at least in part by the ducted fan 184). In particular, the engine 100 further includes an array of inlet guide vanes 186 positioned in the inlet duct 180 upstream of the ducted fan 184 and downstream of the engine inlet 182. The array of inlet guide vanes 186 are arranged around the longitudinal centerline axis 112. For this embodiment, the inlet guide vanes 186 are not rotatable about the longitudinal centerline axis 112. Each inlet guide vane 186 defines a central blade axis (not labeled for clarity), and is rotatable about its respective central blade axis, e.g., in unison with one another. In such a manner, the inlet guide vanes 186 may be considered a variable geometry component. One or more actuators 188 are provided to facilitate such rotation and therefore may be used to change a pitch of the inlet guide vanes 186 about their respective central blade axes. However, in other embodiments, each inlet guide vane 186 may be fixed or unable to be pitched about its central blade axis.

Further, located downstream of the ducted fan 184 and upstream of the fan duct inlet 176, the engine 100 includes an array of outlet guide vanes 190. As with the array of inlet guide vanes 186, the array of outlet guide vanes 190 are not rotatable about the longitudinal centerline axis 112. However, for the embodiment depicted, unlike the array of inlet guide vanes 186, the array of outlet guide vanes 190 are configured as fixed-pitch outlet guide vanes.

Further, it will be appreciated that for the embodiment depicted, the fan exhaust nozzle 178 of the fan duct 172 is further configured as a variable geometry exhaust nozzle. In such a manner, the engine 100 includes one or more actuators 192 for modulating the variable geometry exhaust nozzle. For example, the variable geometry exhaust nozzle may be configured to vary a total cross-sectional area (e.g., an area of the nozzle in a plane perpendicular to the longitudinal centerline axis 112) to modulate an amount of thrust generated based on one or more engine operating conditions (e.g., temperature, pressure, mass flowrate, etc. of an airflow through the fan duct 172). A fixed geometry exhaust nozzle may also be adopted.

The combination of the array of inlet guide vanes 186 located upstream of the ducted fan 184, the array of outlet guide vanes 190 located downstream of the ducted fan 184, and the fan exhaust nozzle 178 may result in a more efficient generation of third stream thrust, $Fn_{3S}$, during one or more engine operating conditions. Further, by introducing a variability in the geometry of the inlet guide vanes 186 and the fan exhaust nozzle 178, the engine 100 may be capable of generating more efficient third stream thrust, $Fn_{3S}$, across a relatively wide array of engine operating conditions, including takeoff and climb as well as cruise.

Moreover, referring still to FIG. 1, in exemplary embodiments, air passing through the fan duct 172 may be relatively cooler (e.g., lower temperature) than one or more fluids utilized in the turbomachine 120. In this way, one or more heat exchangers 196 may be positioned in thermal communication with the fan duct 172. For example, one or more heat exchangers 196 may be disposed within the fan duct 172 and utilized to cool one or more fluids from the core engine with the air passing through the fan duct 172, as a resource for removing heat from a fluid, e.g., compressor bleed air, oil or fuel.

Although not depicted, the heat exchanger 196 may be an annular heat exchanger extending substantially 360 degrees in the fan duct 172 (e.g., at least 300 degrees, such as at least 330 degrees). In such a manner, the heat exchanger 196 may effectively utilize the air passing through the fan duct 172 to cool one or more systems of the engine 100 (e.g., a cooled cooling air system (described below), lubrication oil systems, compressor bleed air, electrical components, etc.). The heat exchanger 196 uses the air passing through the fan duct 172 as a heat sink and correspondingly increases the temperature of the air downstream of the heat exchanger 196 and exiting the fan exhaust nozzle 178.

As will be appreciated, the engine 100 defines a total sea level static thrust output $Fn_{Total}$, corrected to standard day conditions, which is generally equal to a maximum total engine thrust. It will be appreciated that "sea level static thrust corrected to standard day conditions" refers to an amount of thrust an engine is capable of producing while at rest relative to the earth and the surrounding air during standard day operating conditions.

The total sea level static thrust output $Fn_{Total}$ may generally be equal to a sum of: a fan stream thrust $Fn_{Fan}$ (i.e., an amount of thrust generated by the fan 152 through the bypass passage 194), the third stream thrust $Fn_{3S}$ (i.e., an amount of thrust generated through the fan duct 172), and a turbomachine thrust $Fn_{TM}$ (i.e., an amount of thrust generated by an airflow through the turbomachine exhaust nozzle 140), each during the static, sea level, standard day conditions. The engine 100 may define a total sea level static thrust output $Fn_{Total}$ greater than or equal to fifteen thousand pounds (15,000 pounds). For example, it will be appreciated that the engine 100 may be configured to generate at least twenty-five thousand pounds (25,000 pounds) and less than eighty thousand pounds (80,000 pounds), such as between twenty-five thousand pounds and fifty thousand pounds (25,000 pounds and 50,000 pounds), such as between thirty-five thousand pounds and forty-five thousand pounds (35,000 pounds and 45,000 pounds) of thrust during a takeoff operating power, corrected to standard day sea level conditions.

Figure 2:
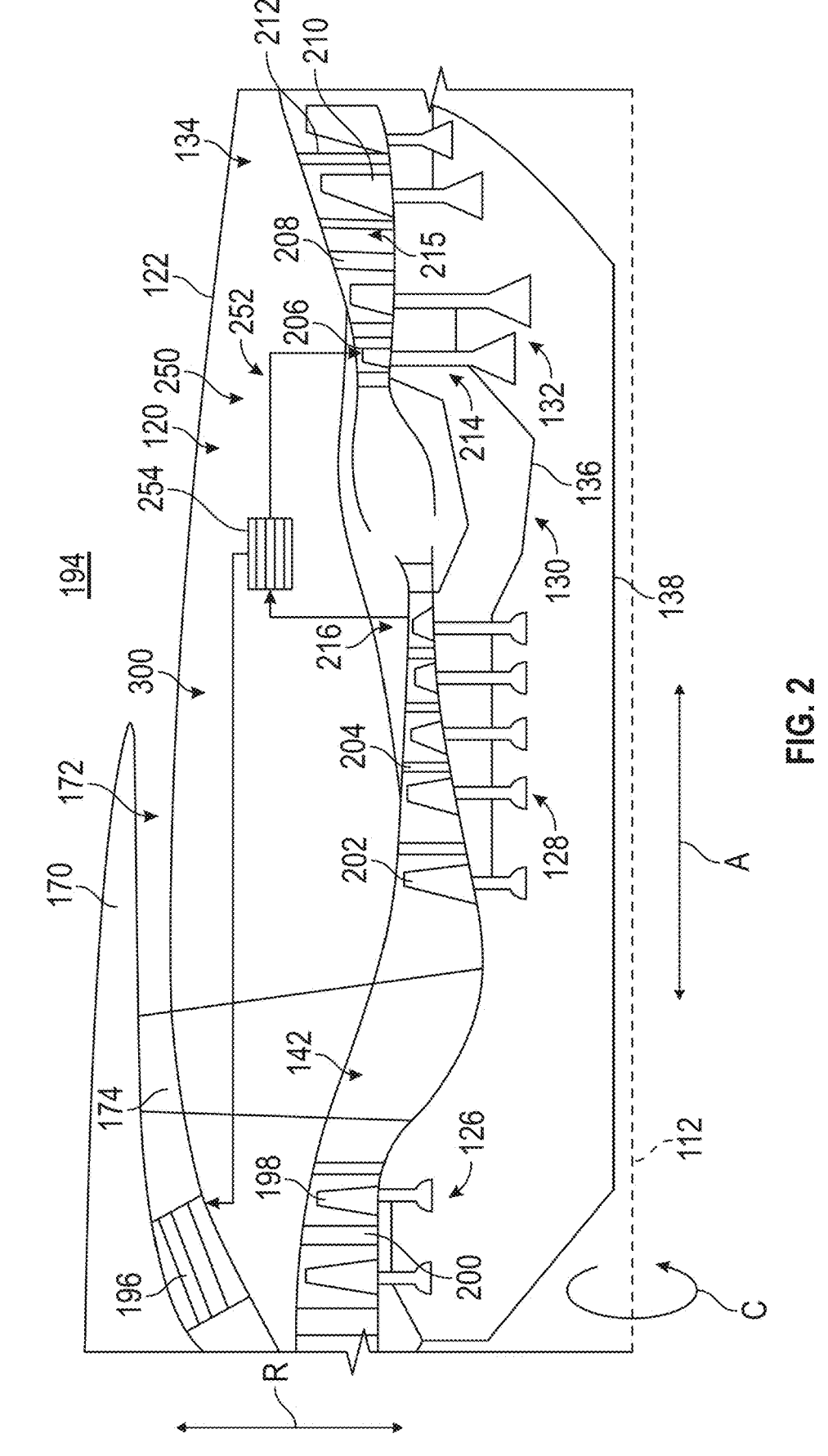
FIG. 2 is a close-up, schematic view of the exemplary three-stream engine of FIG. 1 with a cooled cooling air system in accordance with an exemplary embodiment of the present disclosure.

As will be appreciated, the engine 100 defines a redline exhaust gas temperature (referred to herein as "EGT"), which is defined above, and for the embodiment of FIG. 1 refers to a maximum permitted takeoff temperature of an airflow after the first stator 208 downstream of the last stage of rotor blades 206 of the HP turbine 132 (at location 215 into the first of the plurality of LP turbine rotor blades 210; see FIG. 2).

Referring now to FIG. 2, a close-up, simplified, schematic view of a portion of the engine 100 of FIG. 1 is provided. The engine 100, as noted above includes the turbomachine 120 having the LP compressor 126, the HP compressor 128, the combustion section 130, the HP turbine 132, and the LP turbine 134. The LP compressor 126 includes a plurality of stages of LP compressor rotor blades 198 and a plurality of stages of LP compressor stator vanes 200 alternatingly spaced with the plurality of stages of LP compressor rotor blades 198. Similarly, the HP compressor 128 includes a plurality of stages of HP compressor rotor blades 202 and a plurality of stages of HP compressor stator vanes 204 alternatingly spaced with the plurality of stages of HP compressor rotor blades 202. Moreover, within the turbine section, the HP turbine 132 includes at least one stage of HP turbine rotor blades 206 and at least one stage of HP turbine stator vanes 208, and the LP turbine 134 includes a plurality of stages of LP turbine rotor blades 210 and a plurality of stages of LP turbine stator vanes 212 alternatingly spaced with the plurality of stages of LP turbine rotor blades 210. With reference to the HP turbine 132, the HP turbine 132 includes at least a first stage 214 of HP turbine rotor blades 206.

Figure 3:
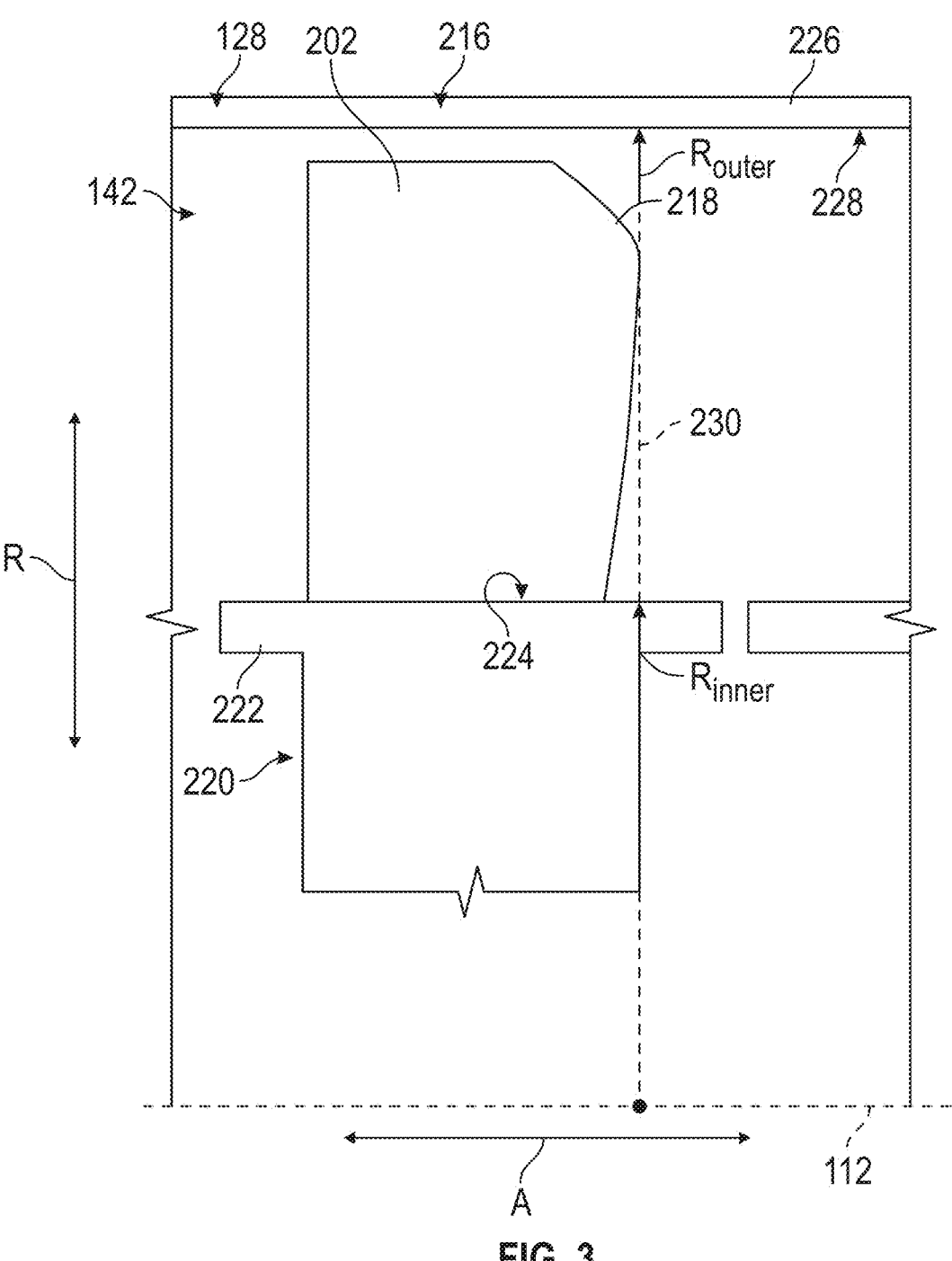
FIG. 3 is a close-up view of an aft-most stage of high-pressure compressor rotor blades within the exemplary three-stream engine of FIG. 1.

Referring particularly to the HP compressor 128, the plurality of stages of HP compressor rotor blades 202 includes an aftmost stage 216 of HP compressor rotor blades 202. Referring briefly to FIG. 3, a close-up view of an HP compressor rotor blade 202 in the aftmost stage 216 of HP compressor rotor blades 202 is provided. As will be appreciated, the HP compressor rotor blade 202 includes a trailing edge 218 and the aftmost stage 216 of HP compressor rotor blades 202 includes a rotor 220 having a base 222 to which the HP compressor rotor blade 202 is coupled. The base 222 includes a flowpath surface 224 defining in part the working gas flow path 142 through the HP compressor 128. Moreover, the HP compressor 128 includes a shroud or liner 226 located outward of the HP compressor rotor blade 202 along the radial direction R. The shroud or liner 226 also includes a flowpath surface 228 defining in part the working gas flow path 142 through the HP compressor 128.

The engine 100 (FIG. 3) defines a reference plane 230 intersecting with an aft-most point of the trailing edge 218 of the HP compressor rotor blade 202 depicted, the reference plane 230 being orthogonal to the axial direction A. Further, the HP compressor 128 defines a high-pressure compressor exit area ($A_{HPCExit}$) within the reference plane 230. More specifically, the HP compressor 128 defines an inner radius ($R_{INNER}$) extending along the radial direction R within the reference plane 230 from the longitudinal centerline axis 112 to the flowpath surface 224 of the base 222 of the rotor 220 of the aftmost stage 216 of HP compressor rotor blades 202, as well as an outer radius ($R_{OUTER}$) extending along the radial direction R within the reference plane 230 from the longitudinal centerline axis 112 to the flowpath surface 228 of the shroud or liner 226. The HP compressor 128 exit area is defined according to Expression (1):

$$A_{HPCExit} = \pi\left(R_{OUTER}^2 - R_{INNER}^2\right). \qquad \text{Expression (1)}$$

The inventors of the present disclosure have found that for a given total thrust output ($Fn_{Total}$), a decrease in size of the high-pressure compressor exit area ($A_{HPCExit}$) may generally relate in an increase in a compressor exit temperature (i.e., a temperature of the airflow through the working gas flowpath 142 at the reference plane 230), a turbine inlet temperature (i.e., a temperature of the airflow through the working gas flowpath 142 provided to the first stage 214 of HP turbine rotor blades 206; see FIG. 2), and the redline exhaust gas temperature (EGT). In particular, the inventors of the present disclosure have found that the high-pressure compressor exit area ($A_{HPCExit}$) may generally be used as an indicator of the above temperatures to be achieved by the engine 100 during operation for a given total thrust output ($Fn_{Total}$) of the engine 100.

Referring back to FIG. 2, the exemplary engine 100 depicted includes one or more technologies to accommodate the relatively small high-pressure compressor exit area ($A_{HPCExit}$) for the total thrust output ($Fn_{Total}$) of the engine 100. In particular, for the embodiment depicted, the exemplary engine 100 includes a cooled cooling air system 250. The exemplary cooled cooling air system 250 is in fluid communication with the HP compressor 128 and the first stage 214 of HP turbine rotor blades 206. More specifically, for the embodiment depicted, the cooled cooling air system 250 includes a duct assembly 252 and a cooled cooling air (CCA) heat exchanger 254. The duct assembly 252 is in fluid communication with the HP compressor 128 for receiving an airflow from the HP compressor 128 and providing such airflow to the first stage 214 of HP turbine rotor blades 206 during operation of the engine 100. The CCA heat exchanger 254 is in thermal communication with the airflow through the duct assembly 252 for reducing a temperature of the airflow through the duct assembly 252 upstream of the first stage 214 of HP turbine rotor blades 206.

Briefly, as will be explained in more detail below, the engine 100 depicted further includes a thermal transport bus 300, with the CCA heat exchanger 254 of the cooled cooling air system 250 in thermal communication with, or integrated into, the thermal transport bus 300. For the embodiment depicted, the engine 100 further includes the heat exchanger

196 in the fan duct 172 in thermal communication with, or integrated into, the thermal transport bus 300, such that heat from the CCA heat exchanger 254 of the cooled cooling air system 250 may be transferred to the heat exchanger 196 in the fan duct 172 using the thermal transport bus 300.

Referring now to FIG. 4, a close-up, schematic view of the turbomachine 120 of the engine 100 of FIG. 2, including the cooled cooling air system 250, is provided.

As is shown, the turbine section includes a compressor casing 256, and the combustion section 130 of the turbomachine 120 generally includes an outer combustor casing 258, an inner combustor casing 260, and a combustor 262. The combustor 262 generally includes an outer combustion chamber liner 264 and an inner combustion chamber liner 266, together defining at least in part a combustion chamber 268. The combustor 262 further includes a fuel nozzle 270 configured to provide a mixture of fuel and air to the combustion chamber 268 to generate combustion gases.

The engine 100 further includes a fuel delivery system 272 including at least a fuel line 274 in fluid communication with the fuel nozzle 270 for providing fuel to the fuel nozzle 270.

The turbomachine 120 includes a diffuser nozzle 276 located downstream of the aftmost stage 216 of HP compressor rotor blades 202 of the HP compressor 128, within the working gas flowpath 142. In the embodiment depicted, the diffuser nozzle 276 is coupled to, or integrated with the inner combustor casing 260, the outer combustor casing 258, or both. The diffuser nozzle 276 is configured to receive compressed airflow from the HP compressor 128 and straighten such compressed air prior to such compressed air being provided to the combustion section 130. The combustion section 130 defines a diffusion cavity 278 downstream of the diffuser nozzle 276 and upstream of the combustion chamber 268.

As noted above, the exemplary engine 100 further includes the cooled cooling air system 250. The cooled cooling air system 250 includes the duct assembly 252 and the CCA heat exchanger 254. More specifically, the duct assembly 252 includes a first duct 280 in fluid communication with the HP compressor 128 and the CCA heat exchanger 254. The first duct 280 more specifically extends from the HP compressor 128, through the compressor casing 256, to the CCA heat exchanger 254. For the embodiment depicted, the first duct 280 is in fluid communication with the HP compressor 128 at a location in between the last two stages of HP compressor rotor blades 202. In such a manner, the first duct 280 is configured to receive a cooling airflow from the HP compressor 128 and to provide the cooling airflow to the CCA heat exchanger 254.

It will be appreciated, however, that in other embodiments, the first duct 280 may additionally or alternatively be in fluid communication with the HP compressor 128 at any other suitable location, such as at any other location closer to a downstream end of the HP compressor 128 than an upstream end of the HP compressor 128, or alternatively at a location closer to the upstream end of the HP compressor 128 than the downstream end of the HP compressor 128.

The duct assembly 252 further includes a second duct 282 extending from the CCA heat exchanger 254 to the outer combustor casing 258 and a third duct 284 extending from the outer combustor casing 258 inwardly generally along the radial direction R. The CCA heat exchanger 254 may be configured to receive the cooling airflow and to extract heat from the cooling airflow to reduce a temperature of the cooling airflow. The second duct 282 may be configured to receive cooling airflow from the CCA heat exchanger 254 and provide the cooling airflow to the third duct 284. The third duct 284 extends through the diffusion cavity generally along the radial direction R.

Moreover, for the embodiment depicted, the duct assembly 252 further includes a manifold 286 in fluid communication with the third duct 284 and a fourth duct 288. The manifold 286 extends generally along the circumferential direction C of the engine 100, and the fourth duct 288 is more specifically a plurality of fourth ducts 288 extending from the manifold 286 at various locations along the circumferential direction C forward generally along the axial direction A towards the turbine section. In such a manner, the duct assembly 252 of the cooled cooling air system 250 may be configured to provide cooling airflow to the turbine section at a variety of locations along the circumferential direction C.

Notably, referring still to FIG. 4, the combustion section 130 includes an inner stator assembly 290 located at a downstream end of the inner combustion chamber liner 266, and coupled to the inner combustor casing 260. The inner stator assembly 290 includes a nozzle 292. The fourth duct 288, or rather, the plurality of fourth ducts 288, are configured to provide the cooling airflow to the nozzle 292. The nozzle 292 may include a plurality of vanes spaced along the circumferential direction C configured to impart a circumferential swirl to the cooling airflow provided through the plurality of fourth ducts 288 to assist with such airflow being provided to the first stage 214 of HP turbine rotor blades 206.

In particular, for the embodiment depicted, the HP turbine 132 further includes a first stage HP turbine rotor 294, with the plurality of HP turbine rotor blades 206 of the first stage 214 coupled to the first stage HP turbine rotor 294. The first stage HP turbine rotor 294 defines an internal cavity 296 configured to receive the cooling airflow from the nozzle 292 and provide the cooling airflow to the plurality of HP turbine rotor blades 206 of the first stage 214. In such a manner, the cooled cooling air system 250 may provide cooling airflow to the HP turbine rotor blades 206 to reduce a temperature of the plurality HP turbine rotor blades 206 at the first stage 214 during operation of the engine 100.

For example, in certain exemplary aspects, the cooled cooling air system 250 may be configured to provide a temperature reduction of the cooling airflow equal to at least fifteen percent (15%) of the EGT and up to forty-five percent (45%) of the EGT. Further, in certain exemplary aspects, the cooled cooling air system 250 may be configured to receive between two and a half percent (2.5%) and thirty-five percent (35%) of an airflow through the working gas flowpath 142 at an inlet to the HP compressor 128, such as between three percent (3%) and twenty percent (20%), such as between four percent (4%) and fifteen percent (15%).

In addition, as briefly mentioned above, the cooled cooling air system 250 may utilize the thermal transport bus 300 to reject heat from the cooling air extracted from the compressor section of the turbomachine 120. In particular, for the embodiment shown the CCA heat exchanger 254 is in thermal communication with or integrated into the thermal transport bus 300. Notably, the thermal transport bus 300 further includes a fuel heat exchanger 302 in thermal communication with the fuel line 274. In such a manner, the thermal transport bus 300 may extract heat from the cooling air extracted from the compressor section through the cooled cooling air system 250 and provide such heat to a fuel flow through the fuel line 274 upstream of the fuel nozzle 270.

For the embodiment depicted, the thermal transport bus 300 includes a conduit having a flow of thermal transport fluid therethrough. More specifically, referring now briefly to FIG. 5, a schematic view of a thermal transport bus 300 as may be utilized with the exemplary engine 100 described above with reference to FIGS. 1 through 4 is provided.

The thermal transport bus 300 includes an intermediary heat exchange fluid flowing therethrough and is formed of one or more suitable fluid conduits 304. The heat exchange fluid may be an incompressible fluid having a high temperature operating range. Additionally, or alternatively, the heat exchange fluid may be a single phase fluid, or alternatively, may be a phase change fluid. In certain exemplary embodiments, the heat exchange fluid may be a supercritical fluid, such as a supercritical $CO_2$.

The exemplary thermal transport bus 300 includes a pump 306 in fluid communication with the heat exchange fluid in the thermal transport bus 300 for generating a flow of the heat exchange fluid in/through the thermal transport bus 300.

Moreover, the exemplary thermal transport bus 300 includes one or more heat source exchangers 308 in thermal communication with the heat exchange fluid in the thermal transport bus 300. Specifically, the thermal transport bus 300 depicted includes a plurality of heat source exchangers 308. The plurality of heat source exchangers 308 are configured to transfer heat from one or more of the accessory systems of an engine within which the thermal transport bus 300 is installed (e.g., engine 100 of FIGS. 1 through 4) to the heat exchange fluid in the thermal transport bus 300. For example, in certain exemplary embodiments, the plurality of heat source exchangers 308 may include one or more of: a CCA heat source exchanger (such as CCA heat exchanger 254 in FIGS. 2 and 4); a main lubrication system heat source exchanger for transferring heat from a main lubrication system; an advanced clearance control (ACC) system heat source exchanger for transferring heat from an ACC system; a generator lubrication system heat source exchanger for transferring heat from the generator lubrication system; an environmental control system (ECS) heat exchanger for transferring heat from an ECS; an electronics cooling system heat exchanger for transferring heat from the electronics cooling system; a vapor compression system heat source exchanger; an air cycle system heat source exchanger; and an auxiliary system(s) heat source exchanger.

For the embodiment depicted, there are three heat source exchangers 308. The heat source exchangers 308 are each arranged in series flow along the thermal transport bus 300. However, in other exemplary embodiments, any other suitable number of heat source exchangers 308 may be included and one or more of the heat source exchangers 308 may be arranged in parallel flow along the thermal transport bus 300 (in addition to, or in the alternative to the serial flow arrangement depicted). For example, in other embodiments there may be a single heat source exchanger 308 in thermal communication with the heat exchange fluid in the thermal transport bus 300, or alternatively, there may be at least two heat source exchangers 308, at least four heat source exchangers 308, at least five heat source exchangers 308, or at least six heat source exchangers 308, and up to twenty heat source exchangers 308 in thermal communication with heat exchange fluid in the thermal transport bus 300.

Figure 5:
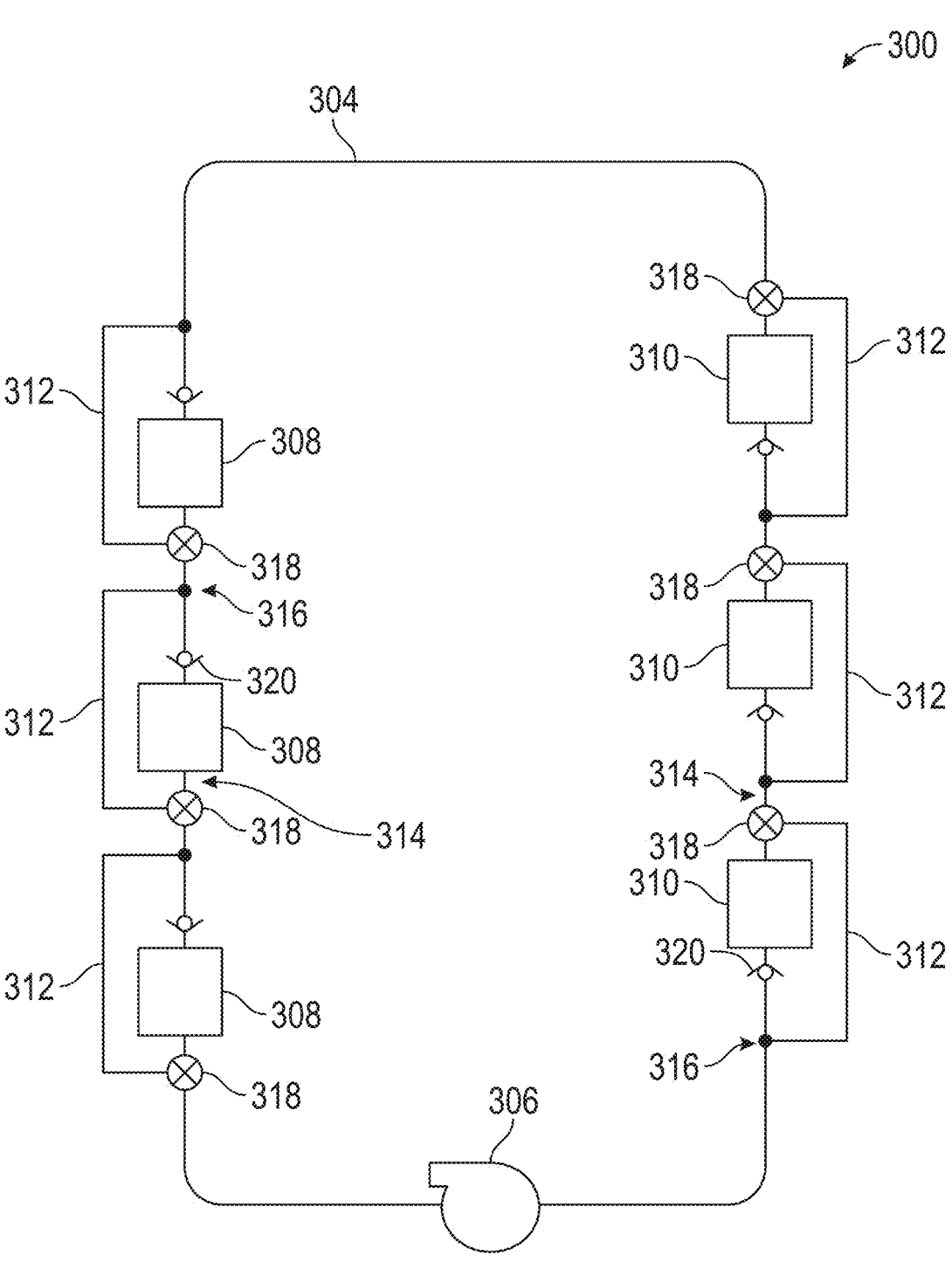
FIG. 5 is a schematic view of a thermal transport bus of the present disclosure.

Additionally, the exemplary thermal transport bus 300 of FIG. 5 further includes one or more heat sink exchangers 310 permanently or selectively in thermal communication with the heat exchange fluid in the thermal transport bus 300. The one or more heat sink exchangers 310 are located downstream of the plurality of heat source exchangers 308 and are configured for transferring heat from the heat exchange fluid in the thermal transport bus 300, e.g., to atmosphere, to fuel, to a fan stream, etc. For example, in certain embodiments the one or more heat sink exchangers 310 may include at least one of a RAM heat sink exchanger, a fuel heat sink exchanger, a fan stream heat sink exchanger, a bleed air heat sink exchanger, an engine intercooler heat sink exchanger, a bypass passage heat sink exchanger, or a cold air output heat sink exchanger of an air cycle system. The fuel heat sink exchanger is a "fluid to heat exchange fluid" heat exchanger wherein heat from the heat exchange fluid is transferred to a stream of liquid fuel (see, e.g., fuel heat exchanger 302 of the engine 100 of FIG. 4). Moreover, the fan stream heat sink exchanger is generally an "air to heat exchange fluid" heat exchanger which transfers heat from the heat exchange fluid to an airflow through the fan stream (see, e.g., heat exchanger 196 of FIGS. 1 and 2). Further, the bleed air heat sink exchanger is generally an "air to heat exchange fluid" heat exchanger which flows, e.g., bleed air from the LP compressor 126 over the heat exchange fluid to remove heat from the heat exchange fluid.

For the embodiment of FIG. 5, the one or more heat sink exchangers 310 of the thermal transport bus 300 depicted includes a plurality of individual heat sink exchangers 310. More particularly, for the embodiment of FIG. 5, the one or more heat sink exchangers 310 include three heat sink exchangers 310 arranged in series. The three heat sink exchangers 310 are configured as a bypass passage heat sink exchanger, a fuel heat sink exchanger, and a fan stream heat sink exchanger. However, in other exemplary embodiments, the one or more heat sink exchangers 310 may include any other suitable number and/or type of heat sink exchangers 310. For example, in other exemplary embodiments, a single heat sink exchanger 310 may be provided, at least two heat sink exchangers 310 may be provided, at least four heat sink exchangers 310 may be provided, at least five heat sink exchangers 310 may be provided, or up to twenty heat sink exchangers 310 may be provided. Additionally, in still other exemplary embodiments, two or more of the one or more heat sink exchangers 310 may alternatively be arranged in parallel flow with one another.

Referring still to the exemplary embodiment depicted in FIG. 5, one or more of the plurality of heat sink exchangers 310 and one or more of the plurality of heat source exchangers 308 are selectively in thermal communication with the heat exchange fluid in the thermal transport bus 300. More particularly, the thermal transport bus 300 depicted includes a plurality of bypass lines 312 for selectively bypassing each heat source exchanger 308 and each heat sink exchanger 310 in the plurality of heat sink exchangers 310. Each bypass line 312 extends between an upstream juncture 314 and a downstream juncture 316—the upstream juncture 314 located just upstream of a respective heat source exchanger 308 or heat sink exchanger 310, and the downstream juncture 316 located just downstream of the respective heat source exchanger 308 or heat sink exchanger 310.

Additionally, each bypass line 312 meets at the respective upstream juncture 314 with the thermal transport bus 300 via a three-way valve 318. The three-way valves 318 each include an inlet fluidly connected with the thermal transport bus 300, a first outlet fluidly connected with the thermal transport bus 300, and a second outlet fluidly connected with the bypass line 312. The three-way valves 318 may each be a variable throughput three-way valve, such that the three-way valves 318 may vary a throughput from the inlet to the first and/or second outlets. For example, the three-way valves 318 may be configured for providing anywhere between zero percent (0%) and one hundred percent (100%)

of the heat exchange fluid from the inlet to the first outlet, and similarly, the three-way valves 318 may be configured for providing anywhere between zero percent (0%) and one hundred percent (100%) of the heat exchange fluid from the inlet to the second outlet.

Notably, the three-way valves 318 may be in operable communication with a controller of an engine including the thermal transport bus 300 (e.g., engine 100 of FIGS. 1 through 4).

Further, each bypass line 312 also meets at the respective downstream juncture 316 with the thermal transport bus 300. Between each heat source exchanger 308 or heat sink exchanger 310 and downstream juncture 316, the thermal transport bus 300 includes a check valve 320 for ensuring a proper flow direction of the heat exchange fluid. More particularly, the check valve 320 prevents a flow of heat exchange fluid from the downstream juncture 316 towards the respective heat source exchanger 308 or heat sink exchanger 310.

As alluded to earlier, the inventors discovered, unexpectedly during the course of gas turbine engine design—i.e., designing gas turbine engines having a variety of different high-pressure compressor exit areas, total thrust outputs, redline exhaust gas temperatures, and supporting technology characteristics and evaluating an overall engine performance and other qualitative turbofan engine characteristics—a significant relationship between a total sea level static thrust output, a compressor exit area, and a redline exhaust gas temperature that enables increased engine core operating temperatures and overall engine propulsive efficiency. The relationship can be thought of as an indicator of the ability of a turbofan engine to have a reduced weight or volume as represented by a high-pressure compressor exit area, while maintaining or even improving upon an overall thrust output, and without overly detrimentally affecting overall engine performance and other qualitative turbofan engine characteristics. The relationship applies to an engine that incorporates a cooled cooling air system, builds portions of the core using material capable of operating at higher temperatures, or a combination of the two. Significantly, the relationship ties the core size (as represented by the exit area of the higher pressure compressor) to the desired thrust and exhaust gas temperature associated with the desired propulsive efficiency and practical limitations of the engine design, as described below.

Referring to the case of an engine that utilizes cooled cooling air for operating at higher temperatures, the inventors discovered, unexpectedly, that the costs associated with achieving a higher compression, enabled by reducing gas temperatures used to cool core components to accommodate higher core gas temperatures, may indeed produce a net benefit, contrary to expectations in the art. Referring to the case of utilizing more temperature-resistant material, such as a Carbon Matrix Composite (CMC), it was found that certain aspects of the engine size, weight and operating characteristics can be positively affected while taking into account the complexities and/or drawbacks associated with such material. In either case, the relationship now described can apply to identify the interrelated operating conditions and core size—i.e., total sea level static thrust, redline exhaust gas temperature, and compressor exit area, respectively.

The inventors of the present disclosure discovered bounding the relationship between a product of total thrust output and redline exhaust gas temperature at a takeoff power level and the high-pressure compressor exit area squared (corrected specific thrust) can result in a higher power density core. This bounded relationship, as described herein, takes into due account the amount of overall complexity and cost, and/or a low amount of reliability associated with implementing the technologies required to achieve the operating temperatures and exhaust gas temperature associated with the desired thrust levels. The amount of overall complexity and cost may be prohibitively high for gas turbine engines outside the bounds of the relationship as described herein, and/or the reliability may prohibitively low outside the bounds of the relationship as described herein. The relationship discovered, infra, can therefore identify an improved engine configuration suited for a particular mission requirement, one that takes into account efficiency, weight, cost, complexity, reliability, and other factors influencing the optimal choice for an engine configuration.

In addition to yielding an improved gas turbine engine, as explained in detail above, utilizing this relationship, the inventors found that the number of suitable or feasible gas turbine engine designs capable of meeting the above design requirements could be greatly diminished, thereby facilitating a more rapid down selection of designs to consider as a gas turbine engine is being developed. Such a benefit provides more insight to the requirements for a given gas turbine engine well before specific technologies, integration and system requirements are developed fully. Such a benefit avoids late-stage redesign.

The desired relationship providing for the improved gas turbine engine, discovered by the inventors, is expressed as:

$$CST = Fn_{Total} \times EGT/(A^2_{HPCExit} \times 1000), \quad \text{Expression (2)}$$

where CST is corrected specific thrust; $Fn_{Total}$ is a total sea level static thrust output of the gas turbine engine in pounds; EGT is redline exhaust gas temperature in degrees Celsius; and $A_{HPCExit}$ is a high-pressure compressor exit area in square inches.

CST values of an engine defined by Expression (2) in accordance with various embodiments of the present disclosure are from forty-two to ninety (42 to 90), such as from forty-five to eighty (45 to 80), such as from fifty to eighty (50 to 80). The units of the CST values may be pounds-degrees Celsius over square inches.

Figures 6, 7:
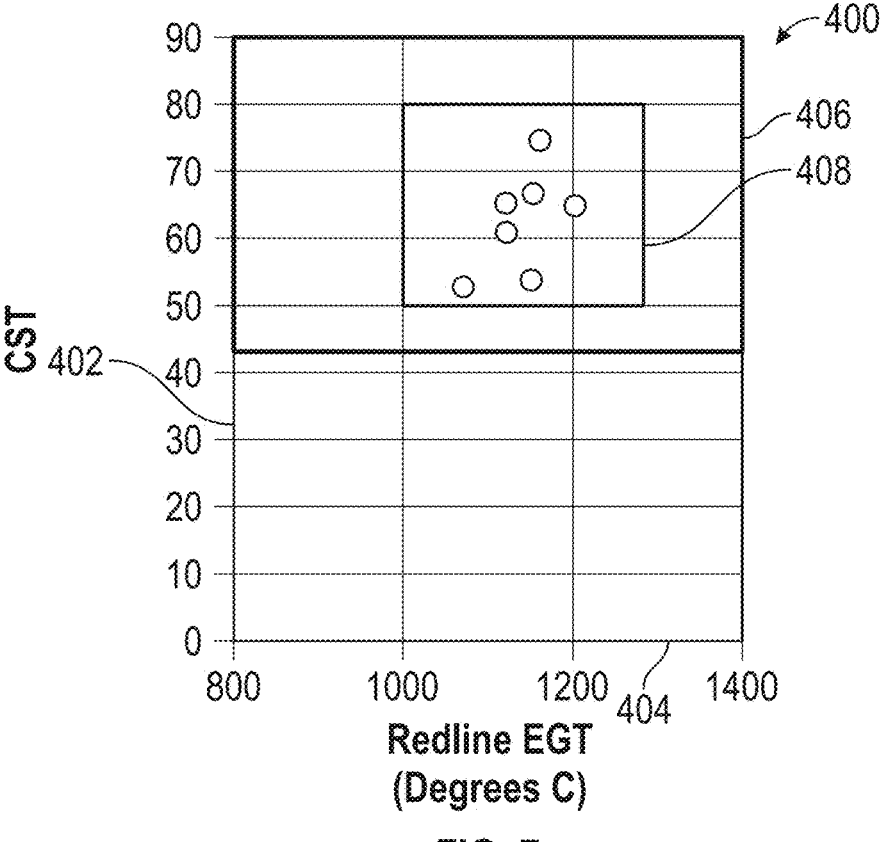
FIG. 6 is a table depicting numerical values showing the relationships between various parameters in accordance with various example embodiments of the present disclosure.
FIG. 7 is a graph depicting a range of corrected specific thrust values and redline exhaust gas temperature values of gas turbine engines in accordance with various example embodiments of the present disclosure.

Referring now to FIGS. 6 and 7, various exemplary gas turbine engines are illustrated in accordance with one or more exemplary embodiments of the present disclosure. In particular, FIG. 6 provides a table including numerical values corresponding to several of the plotted gas turbine engines in FIG. 7. FIG. 7 is a plot 400 of gas turbine engines in accordance with one or more exemplary embodiments of the present disclosure, showing the CST on a Y-axis 402 and the EGT on an X-axis 404.

As shown, the plot 400 in FIG. 7 depicts a first range 406, with the CST values between forty-two and ninety (42 and 90) and EGT values from eight hundred degrees Celsius to one thousand four hundred degrees Celsius (800° C. to 1400° C.). FIG. 7 additionally depicts a second range 408, with the CST values between fifty and eighty (50 and 80) and EGT values from one thousand degrees Celsius to one thousand three hundred degrees Celsius (1000° C. to 1300° C.). It will be appreciated that in other embodiments, the EGT value may be greater than one thousand one hundred degrees Celsius (1100° C.) and less than one thousand two hundred fifty degrees Celsius (1250° C.), such as greater than one thousand one hundred fifty degrees Celsius (1150° C.) and less than one thousand two hundred fifty degrees Celsius (1250° C.), such as greater than one thousand degrees Celsius (1000° C.) and less than one thousand three hundred degrees Celsius (1300° C.).

It will be appreciated that although the discussion above is generally related to an open rotor engine having a particular cooled cooling air system 250 (FIG. 2), in various embodiments of the present disclosure, the relationship outlined above with respect to Expression (2) may be applied to any other suitable engine architecture, including any other suitable technology(ies) to allow the gas turbine engine to accommodate higher temperatures to allow for a reduction in the high-pressure compressor exit area, while maintaining or even increasing the maximum turbofan engine thrust output without, e.g., prematurely wearing various components within the turbomachine exposed the working gas flowpath.

Figure 8:
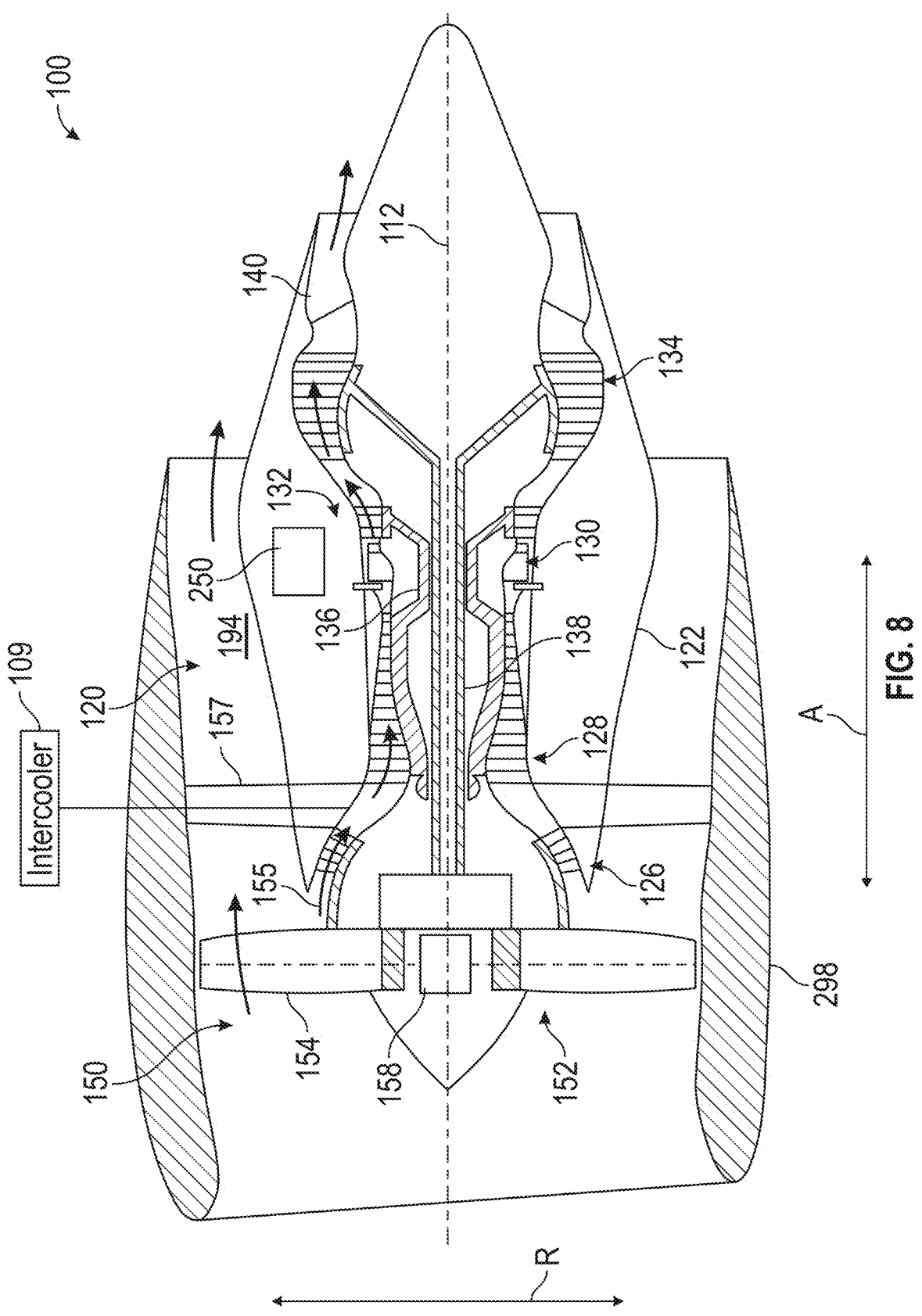
FIG. 8 is a schematic view of a ducted turbofan engine in accordance with an exemplary aspect of the present disclosure.

For example, reference will now be made to FIG. 8. FIG. 8 provides a schematic view of an engine 100 in accordance with another exemplary embodiment of the present disclosure. The exemplary embodiment of FIG. 8 may be configured in substantially the same manner as the exemplary engine 100 described above with respect to FIGS. 1 through 4, and the same or similar reference numerals may refer to the same or similar parts. However, as will be appreciated, for the embodiment shown, the engine 100 further includes an outer housing or nacelle 298 circumferentially surrounding at least in part a fan section 150 and a turbomachine 120. The nacelle 298 defines a bypass passage 194 between the nacelle 298 and the turbomachine 120.

In some embodiments, the engine 100 includes an intercooler 109. The intercooler 109 cools the engine flow path air downstream of the low-pressure compressor 126 before the engine flow path air enters the high-pressure compressor 128 during flight conditions (e.g., takeoff or maximum thrust). The intercooler 109 can include any type of intercooler. For example, the intercooler 109 can include a heat exchanger in an inter-compressor frame 157 or an inter-compressor casing (e.g., in the core cowl 122) in which cooling fluid is used to absorb heat with the flow path air. The cooling fluid can include a thermal bus or fuel. The thermal bus can absorb heat from the core air and reject the heat into a heat sink, such as, for example, fuel and/or bypass air. In some embodiments, the intercooler 109 can include a heat exchanger between the core air and the bypass air. In some embodiments, the intercooler 109 includes water or steam that is injected into the core flow path at the inter-compressor frame. While the intercooler 109 is described in relation to FIG. 8, any of the engines detailed herein can include an intercooler 109.

Briefly, it will be appreciated that the exemplary engine 100 of FIG. 8 is configured as a two-stream engine, i.e., an engine without a third stream (e.g., the fan duct 172 in the exemplary engine 100 of FIG. 2). With such a configuration, a total sea level static thrust output $Fn_{Total}$ of the engine 100 may generally be equal to a sum of: a fan stream thrust $Fn_{Fan}$ (i.e., an amount of thrust generated by a fan 152 through a bypass passage 194) and a turbomachine thrust $Fn_{TM}$ (i.e., an amount of thrust generated by an airflow through a turbomachine exhaust nozzle 140), each during the static, sea level, standard day conditions.

Further, for the exemplary embodiment of FIG. 8, the engine 100 additionally includes a cooled cooling air system 250 configured to provide a turbine section with cooled cooling air during operation of the engine 100, to allow the engine 100 to accommodate higher temperatures to allow for a reduction in a high-pressure compressor exit area, while maintaining or even increasing a maximum turbofan engine thrust output.

It will be appreciated that in other exemplary embodiments of the present disclosure, the cooled cooling air system 250 of the engine 100 may be configured in any other suitable manner. For example, the exemplary cooled cooling air system 250 described above with reference to FIGS. 2 and 3 is generally configured as a thermal bus cooled cooling air system. However, in other embodiments, the cooled cooling air system 250 may instead be a dedicated heat exchanger cooled cooling air system (i.e., a cooled cooling air system including a heat exchanger that transfers heat directly to a cooling medium). Additionally, in other embodiments, the cooled cooling air system 250 may be a bypass heat exchanger cooled cooling air system having a heat sink heat exchanger thermally coupled to an airflow through a bypass passage (see, e.g., FIG. 9, discussed below). Additionally, or alternatively, in other embodiments, the cooled cooling air system 250 may be one of an air-to-air cooled cooling air system (a cooled cooling air system having a heat sink heat exchanger configured to transfer heat to an airflow; see, e.g., FIG. 9, discussed below); an oil-to-air cooled cooling air system (a cooled cooling air system having a heat sink heat exchanger configured to transfer heat to an oil flow); or a fuel-to-air cooled cooling air system (a cooled cooling air system having a heat sink heat exchanger configured to transfer heat to a fuel flow, such as a Jet A fuel flow, a liquid hydrogen or hydrogen gas fuel flow, etc.; see, e.g., FIG. 4).

Figure 10:
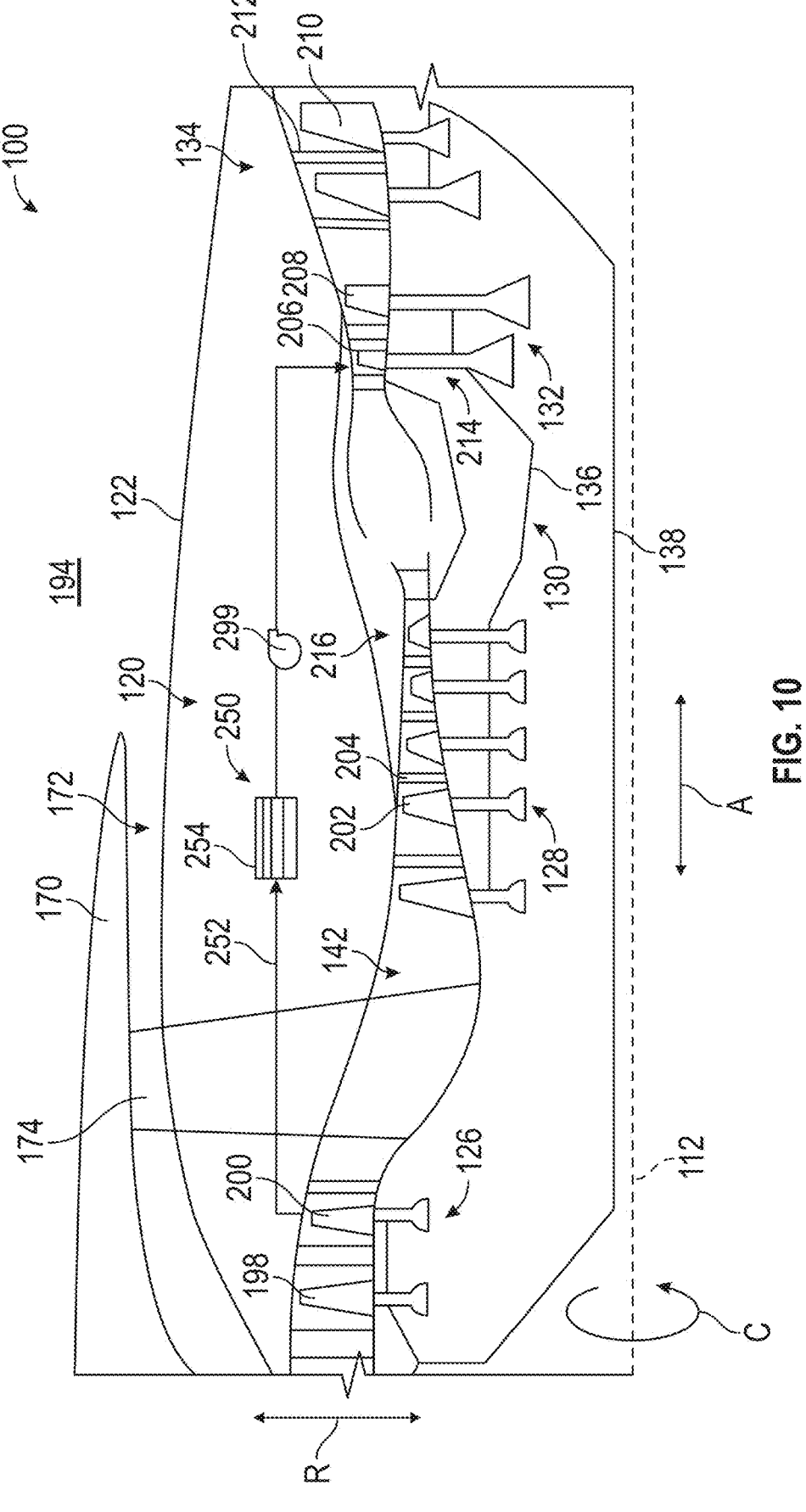
FIG. 10 is a schematic, close-up view of a gas turbine engine having a cooled cooling air system in accordance with yet another exemplary aspect of the present disclosure.
Figure 11:
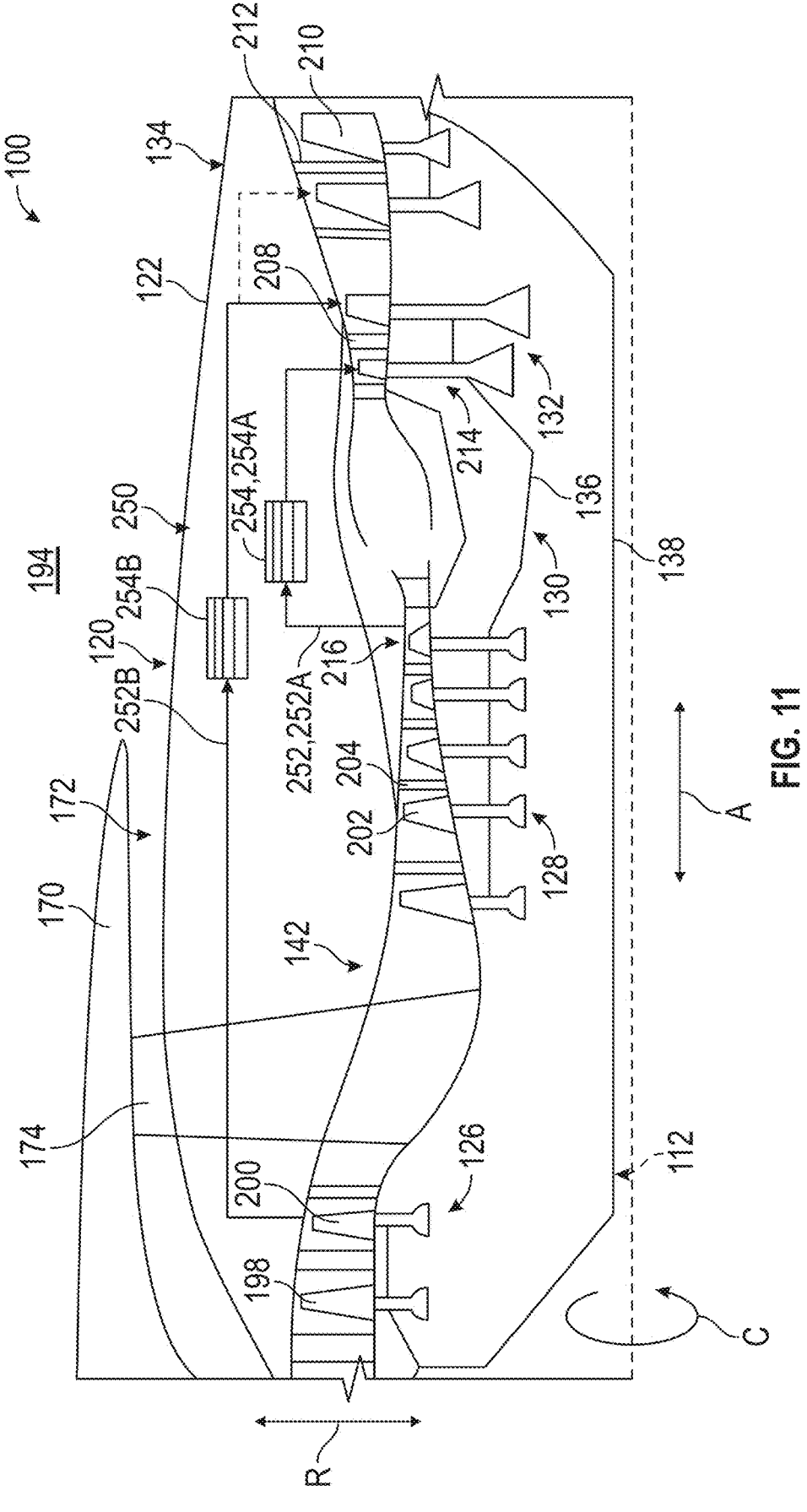
FIG. 11 is a schematic, close-up view of a gas turbine engine having a cooled cooling air system in accordance with still another exemplary aspect of the present disclosure.

More particularly, referring generally to FIGS. 9 through 11, in other exemplary embodiments, the cooled cooling air system 250 of the engine 100 may be configured in any other suitable manner. The exemplary engines 100 depicted in FIGS. 9 through 11 may be configured in a similar manner as exemplary engine 100 described above with reference to FIGS. 1 through 4, and the same or similar numbers may refer to the same or similar parts.

For example, each of the exemplary engines 100 depicted in FIGS. 9 through 11 generally includes a turbomachine 120 having an LP compressor 126, an HP compressor 128, a combustion section 130, an HP turbine 132, and an LP turbine 134 collectively defining at least in part a working gas flowpath 142 and arranged in serial flow order. The exemplary turbomachine 120 depicted additionally includes a core cowl 122, and the engine 100 includes a fan cowl 170. The engine 100 includes or defines a fan duct 172 positioned partially between the core cowl 122 and the fan cowl 170. Moreover, a bypass passage 194 is defined at least in part by the core cowl 122, the fan cowl 170, or both and extends over the turbomachine 120.

Moreover, the exemplary engines 100 depicted in FIGS. 9 to 11 additionally include a cooled cooling air system 250. The cooled cooling air system 250 generally includes a duct assembly 252 and a CCA heat exchanger 254.

However, referring particular to FIG. 9, it will be appreciated that for the exemplary embodiment depicted, the CCA heat exchanger 254 is positioned in thermal communication with the bypass passage 194, and more specifically, it is exposed to an airflow through or over the bypass passage 194. For the embodiment of FIG. 9, the CCA heat exchanger 254 is positioned on the core cowl 122. In such a manner, the CCA heat exchanger 254 may be an air-to-air CCA heat exchanger configured to exchange heat between an airflow extracted from the HP compressor 128 and the airflow through the bypass passage 194.

As is depicted in phantom, the cooled cooling air system 250 may additionally or alternatively be positioned at any other suitable location along the bypass passage 194, such as on the fan cowl 170. Further, although depicted in FIG. 9 as being positioned on the core cowl 122, in other embodiments, the CCA heat exchanger 254 may be embedded into the core cowl 122, and airflow through the bypass passage 194 may be redirected from the bypass passage 194 to the CCA heat exchanger 254.

As will be appreciated, a size of the CCA heat exchanger 254 may affect the amount of drag generated by the CCA heat exchanger 254 being positioned within or exposed to the bypass passage 194. Accordingly, sizing the cooled cooling air system 250 in accordance with the present disclosure may allow for a desired reduction in a HP compressor 128 exit area, while maintaining or even increasing a total thrust output for the engine 100, without creating an excess amount of drag on the engine 100 in the process.

Referring now particular to FIG. 10, it will be appreciated that for the exemplary embodiment depicted, the cooled cooling air system 250 is configured to receive the cooling airflow from an air source upstream of a downstream half of the HP compressor 128. In particular, for the exemplary embodiment of FIG. 10, the exemplary cooled cooling air system 250 is configured to receive the cooling airflow from a location upstream of the HP compressor 128, and more specifically, still, from the LP compressor 126. In order to allow for a relatively low-pressure cooling airflow to be provided to a first stage 214 of HP turbine rotor blades 206 of the HP turbine 132, the cooled cooling air system 250 further includes a pump 299 in airflow communication with the duct assembly 252 to increase a pressure of the cooling airflow through the duct assembly 252. For the exemplary aspect depicted, the pump 299 is positioned downstream of the CCA heat exchanger 254. In such a manner, the pump 299 may be configured to increase the pressure of the cooling airflow through the duct assembly 252 after the cooling airflow has been reduced in temperature by the CCA heat exchanger 254. Such may allow for a reduction in wear on the pump 299.

Referring now particularly to FIG. 11, it will be appreciated that the cooled cooling air system 250 includes a high-pressure portion and a low-pressure portion operable in parallel. In particular, the duct assembly 252 includes a high-pressure duct assembly 252A and a low-pressure duct assembly 252B, and the CCA heat exchanger 254 includes a high-pressure CCA heat exchanger 254A and a low-pressure CCA heat exchanger 254B.

The high-pressure duct assembly 252A is in fluid communication with the HP compressor 128 at a downstream half of the high-pressure compressor and is further in fluid communication with a first stage 214 of HP turbine rotor blades 206. The high-pressure duct assembly 252A may be configured to receive a high-pressure cooling airflow from the HP compressor 128 through the high-pressure duct assembly 252A and provide such high-pressure cooling airflow to the first stage 214 of HP turbine rotor blades 206. The high-pressure CCA heat exchanger 254A may be configured to reduce a temperature of the high-pressure cooling airflow through the high-pressure duct assembly 252A at a location upstream of the first stage 214 of HP turbine rotor blades 206.

The low-pressure duct assembly 252B is in fluid communication with a location upstream of the downstream half of the high-pressure compressor 128 and is further in fluid communication with the HP turbine 132 and a location downstream of the first stage 214 of HP turbine rotor blades 206. In particular, for the embodiment depicted, the low-pressure duct assembly 252B is in fluid communication with the LP compressor 126 and a second stage (not labeled) of HP turbine rotor blades 206. The low-pressure duct assembly 252B may be configured to receive a low-pressure cooling airflow from the LP compressor 126 through the low-pressure duct assembly 252B and provide such low-pressure cooling airflow to the second stage of HP turbine rotor blades 206. The low-pressure CCA heat exchanger 254B may be configured to reduce a temperature of the low-pressure cooling airflow through the low-pressure duct assembly 252B upstream of the second stage of HP turbine rotor blades 206.

Inclusion of the exemplary cooled cooling air system 250 of FIG. 11 may reduce an amount of resources utilized by the cooled cooling air system 250 to provide a desired amount of cooling for the turbomachine 120.

Further, for the exemplary embodiment of FIG. 11, it will be appreciated that the cooled cooling air system 250 may further be configured to provide cooling to one or more stages of LP turbine rotor blades 210, and in particular to a first stage (i.e., upstream-most stage) of LP turbine rotor blades 210. Such may further allow for, e.g., the higher operating temperatures described herein.

Figure 12:
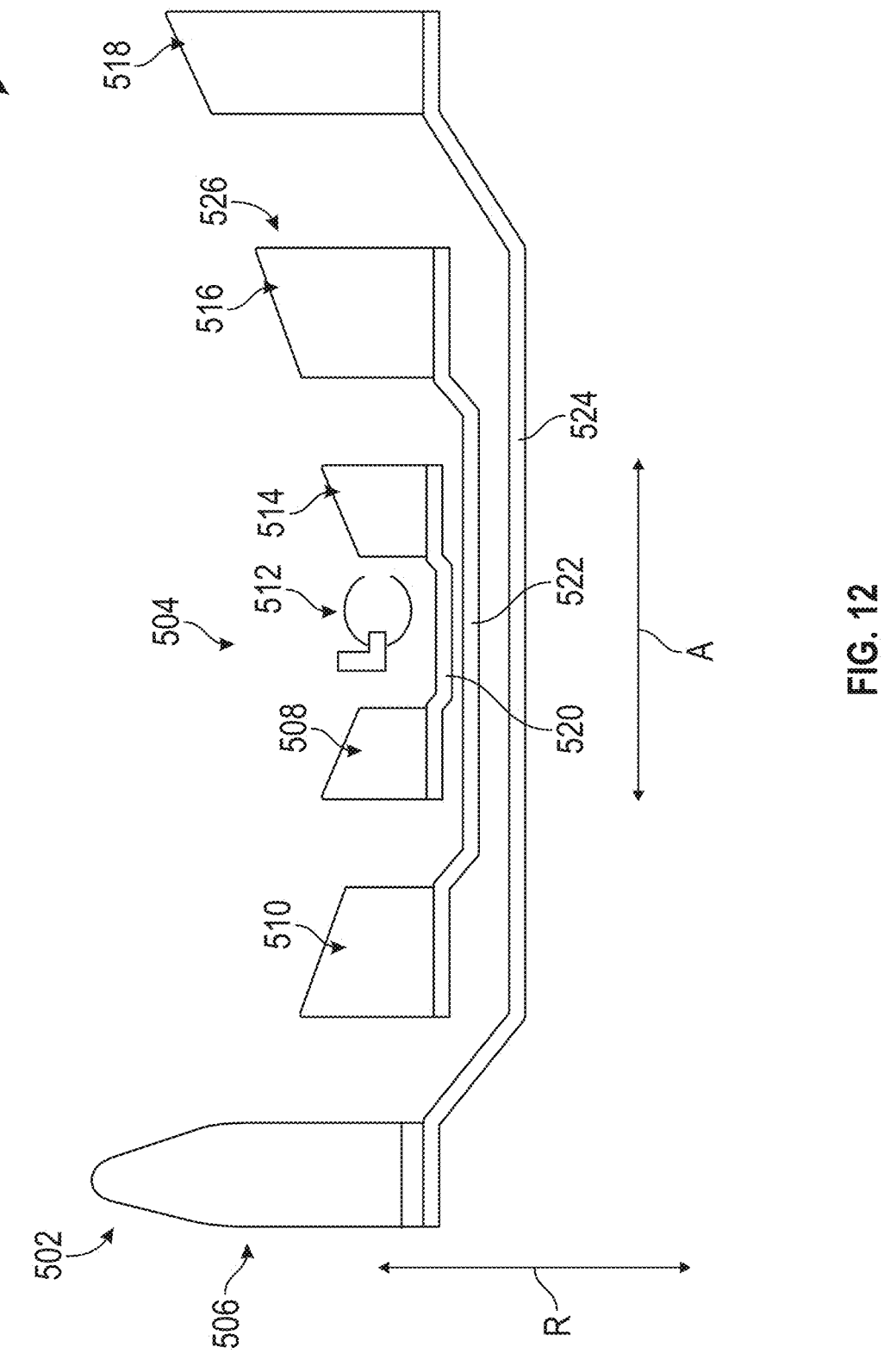
FIG. 12 is a schematic view of a turbofan engine in accordance with another exemplary aspect of the present disclosure.

Reference will now be made briefly to FIG. 12. FIG. 12 provides a schematic view of an engine 500 in accordance with another exemplary embodiment of the present disclosure. The exemplary embodiment of FIG. 12 may be configured in substantially the same manner as the exemplary engine 100 described above with respect to FIGS. 1 through 4, and the same or similar reference numerals may refer to the same or similar parts. However, as will be appreciated, for the embodiment shown, the engine 500 is configured as a three-spool engine, instead of a two-spool engine.

For example, the exemplary engine 500 is a gas turbine engine and includes a fan section 502 and a turbomachine 504. The fan section includes a fan 506. The turbomachine includes a first compressor 508, a second compressor 510, a combustion section 512, a first turbine 514, a second turbine 516, and a third turbine 518. The first compressor 508 may be a high-pressure compressor, the second compressor 510 may be a medium pressure compressor (or intermediate pressure compressor), the first turbine 514 may be a high-pressure turbine, the second turbine 516 may be a medium pressure turbine (or intermediate pressure turbine), and the third turbine 518 may be a low-pressure turbine. Further, the engine 500 includes a first shaft 520 extending between, and rotatable with both of, the first compressor 508 and first turbine 514; a second shaft 522 extending between, and rotatable with both of, the second compressor 510 and second turbine 516; and a third shaft 524 extending between, and rotatable with both of, the third turbine 518 and fan 506. In such a manner, it will be appreciated that the engine 500 may be referred to as a three-spool engine.

For the embodiment of FIG. 12, the term redline EGT refers to a maximum temperature of an airflow after the first stator downstream of the last stage of rotor blades of the intermediate speed turbine, e.g., at location 526 in FIG. 12 (assuming the intermediate speed turbine (the second turbine 516) includes a stage of stator vanes downstream of the last stage of rotor blades).

It will further be appreciated that the exemplary cooled cooling air systems 250 described hereinabove are provided by way of example only. In other exemplary embodiments, aspects of one or more of the exemplary cooled cooling air systems 250 depicted may be combined to generate still other exemplary embodiments. For example, in still other exemplary embodiments, the exemplary cooled cooling air system 250 of FIGS. 2 through 4 may not be utilized with a thermal transport bus (e.g., thermal transport bus 300), and instead may directly utilize a CCA heat exchanger 254 positioned within the fan duct 172. Similarly, in other example embodiment, the exemplary cooled cooling air systems 250 of FIGS. 9 through 11 may be utilized with a thermal transport bus (e.g., thermal transport bus 300 of FIG. 2, 4, or 5) to reject heat for the CCA heat exchanger 254. Additionally, although the exemplary cooled cooling air systems 250 depicted schematically in FIGS. 9 through 11 depict the duct assembly 252 as positioned outward of the working gas flow path 142 along the radial direction R, in other exemplary embodiments, the duct assemblies 252 may extend at least partially inward of the working gas flow path 142 along the radial direction R (see, e.g., FIG. 4). In still other exemplary embodiments, the cooled cooling air system 250 may include duct assemblies 252 positioned outward of the working gas flow path 142 along the radial direction R and inward of the working gas flow path 142 along the radial direction R (e.g., in FIG. 11, the high-pressure duct assembly 252A may be positioned inwardly of the working gas flow path 142 along the radial direction R and the low-pressure duct assembly 252B may be positioned outwardly of the working gas flow path 142 along the radial direction R).

Moreover, it will be appreciated that in still other exemplary aspects, the gas turbine engine may include additional or alternative technologies to allow the gas turbine engine to accommodate higher temperatures while maintaining or even increasing the maximum turbofan engine thrust output, as may be indicated by a reduction in the high-pressure compressor exit area, without, e.g., prematurely wearing on various components within the turbomachine exposed to the working gas flowpath.

For example, in additional or alternative embodiments, a gas turbine engine may incorporate advanced materials capable of withstanding the relatively high temperatures at downstream stages of a high-pressure compressor exit (e.g., at a last stage of high-pressure compressor rotor blades), and downstream of the high-pressure compressor (e.g., a first stage of an HP turbine, downstream stages of the HP turbine, an LP turbine, an exhaust section, etc.).

In particular, in at least certain exemplary embodiments, a gas turbine engine of the present disclosure may include an airfoil (e.g., rotor blade or stator vane) in one or more of the HP compressor, the first stage of the HP turbine, downstream stages of the HP turbine, the LP turbine, the exhaust section, or a combination thereof formed of a ceramic-matrix-composite or "CMC." As used herein, the term CMC refers to a class of materials that include a reinforcing material (e.g., reinforcing fibers) surrounded by a ceramic matrix phase. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Generally, particular CMCs may be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs may include a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain embodiments, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

One or more of these components formed of a CMC material may include an environmental-barrier-coating or "EBC." The term EBC refers to a coating system including one or more layers of ceramic materials, each of which provides specific or multi-functional protections to the underlying CMC. EBCs generally include a plurality of layers, such as rare earth silicate coatings (e.g., rare earth disilicates such as slurry or APS-deposited yttrium ytterbium disilicate (YbYDS)), alkaline earth aluminosilicates (e.g., including barium-strontium-aluminum silicate (BSAS), such as having a range of BaO, SrO, $Al_2O_3$, and/or $SiO_2$ compositions), hermetic layers (e.g., a rare earth disilicate), and/or outer coatings (e.g., comprising a rare earth monosilicate, such as slurry or APS-deposited yttrium monosilicate (YMS)). One or more layers may be doped as desired, and the EBC may also be coated with an abradable coating.

In such a manner, it will be appreciated that the EBCs may generally be suitable for application to "components" found in the relatively high temperature environments noted above. Examples of such components can include, for example, combustor components, turbine blades, shrouds, nozzles, heat shields, and vanes.

Additionally, or alternatively still, in other exemplary embodiments, a gas turbine engine of the present disclosure may include an airfoil (e.g., rotor blade or stator vane) in one or more of an HP compressor, a first stage of an HP turbine, downstream stages of the HP turbine, an LP turbine, an exhaust section, or a combination thereof formed in part, in whole, or in some combination of materials including but not limited to titanium, nickel, and/or cobalt based superalloys (e.g., those available under the name Inconel® available from Special Metals Corporation). One or more of these materials are examples of materials suitable for use in additive manufacturing processes.

Further, it will be appreciated that in at least certain exemplary embodiments of the present disclosure, a method of operating a gas turbine engine is provided. The method may be utilized with one or more of the exemplary gas turbine engines discussed herein, such as in FIGS. 1 through 4 and 8 through 11. The method includes operating the gas turbine engine at a takeoff power level, the gas turbine engine having a turbomachine with a high-pressure compressor defining a high-pressure compressor exit area ($A_{HPCExit}$) in square inches. The gas turbine engine further defines a redline exhaust gas temperature (EGT) in degrees Celsius, a total sea level static thrust output ($Fn_{Total}$) in pounds, and a corrected specific thrust. The corrected specific thrust is greater than or equal to forty-two (42) and less than or equal to ninety (90), the corrected specific thrust determined as follows: $Fn_{Total} \times EGT/(A_{HPCExit}^2 \times 1000)$.

In certain exemplary aspects, operating the gas turbine engine at the takeoff power level further includes reducing a temperature of a cooling airflow provided to a high-pressure turbine of the gas turbine engine with a cooled cooling air system. For example, in certain exemplary aspects, reducing the temperature of the cooling airflow provided to the high-pressure turbine of the gas turbine engine with the cooled cooling air system comprises providing a temperature reduction of the cooling airflow equal to at least fifteen percent (15%) of the EGT and up to forty-five percent (45%) of the EGT.

As will be appreciated from the description herein, various embodiments of a gas turbine engine are provided. Certain of these embodiments may be an unducted, single rotor gas turbine engine (see FIG. 1), a turboprop engine, or a ducted turbofan engine (see FIG. 8). Another example of a ducted turbofan engine can be found in U.S. patent application Ser. No. 16/811,368 (Published as U.S. Patent Application Publication No. 2021/0108597), filed Mar. 6, 2020 (FIG. 10, Paragraph [0062], et al.; including an annular fan case 13 surrounding the airfoil blades 21 of rotating element 20 and surrounding vanes 31 of stationary element 30; and including a third stream/fan duct 73 (shown in FIG. 10, described extensively throughout the application)). Various additional aspects of one or more of these embodiments are discussed below. These exemplary aspects may be combined with one or more of the exemplary gas turbine engine(s) discussed above with respect to FIGS. 1, 8, and 13.

For example, in some embodiments of the present disclosure, the engine may include a heat exchanger located in an annular duct, such as in a third stream. The heat exchanger may extend substantially continuously in a circumferential direction of the gas turbine engine (e.g., at least 300 degrees, such as at least 330 degrees).

In one or more of these embodiments, a threshold power or disk loading for a fan (e.g., an unducted single rotor or primary forward fan) may range from twenty-five horsepower per square foot (25 hp/ft$^2$) or greater at cruise altitude during a cruise operating mode. In particular embodiments of the engine, structures and methods provided herein generate power loading between eighty horsepower per square foot and one hundred sixty horsepower per square foot (80 hp/ft$^2$ and 160 hp/ft$^2$) or higher at cruise altitude during a cruise operating mode, depending on whether the engine is an open rotor or ducted engine.

In various embodiments, an engine of the present disclosure is applied to a vehicle with a cruise altitude up to approximately sixty-five thousand feet (65,000 ft). In certain embodiments, cruise altitude is between approximately twenty-eight thousand feet (28,000 ft) and approximately forty-five thousand feet (45,000 ft). In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately four point eight five pounds per square inch absolute (4.85 psia) and approximately point eight two pounds per square inch absolute (0.82 psia) based on a sea level pressure of approximately fourteen point seven pounds per square inch absolute (14.70 psia) and sea level temperature at approximately fifty-nine degrees Fahrenheit (59° F.). In another embodiment, cruise altitude is between approximately four point eight five pounds per square inch absolute (4.85 psia) and approximately two point one four pounds per square inch absolute (2.14 psia). It should be appreciated that in certain embodiments, the ranges of cruise altitude defined by pressure may be adjusted based on a different reference sea level pressure and/or sea level temperature.

In various exemplary embodiments, the fan (or rotor) may include twelve (12) fan blades. From a loading standpoint, such a blade count may allow a span of each blade to be reduced such that the overall diameter of the primary fan may also be reduced (e.g., to twelve feet in one exemplary embodiment). That said, in other embodiments, the fan may have any suitable blade count and any suitable diameter. In certain suitable embodiments, the fan includes at least eight (8) blades. In another suitable embodiment, the fan may have at least twelve (12) blades. In yet another suitable embodiment, the fan may have at least fifteen (15) blades. In yet another suitable embodiment, the fan may have at least eighteen (18) blades. In one or more of these embodiments, the fan includes twenty-six (26) or fewer blades, such as twenty (20) or fewer blades. Alternatively, in certain suitable embodiments, the fan may only include at least four (4) blades, such as with a fan of a turboprop engine.

Further, in certain exemplary embodiments, the rotor assembly may define a rotor diameter (or fan diameter) of at least ten feet (10 ft), such as at least eleven feet (11 ft), such as at least twelve feet (12 ft), such as at least thirteen feet (13 ft), such as at least fifteen feet (15 ft), such as at least seventeen feet (17 ft), such as up to twenty-eight feet (28 ft), such as up to twenty-six feet (26 ft), such as up to twenty-four feet (24 ft), such as up to eighteen feet (18 ft).

In various embodiments, it will be appreciated that the engine includes a ratio of a quantity of vanes to a quantity of blades that could be less than, equal to, or greater than 1:1. For example, in particular embodiments, the engine includes twelve (12) fan blades and ten (10) vanes. In other embodiments, the vane assembly includes a greater quantity of vanes to fan blades. For example, in particular embodiments, the engine includes ten (10) fan blades and twenty-three (23) vanes. For example, in certain embodiments, the engine may include a ratio of a quantity of vanes to a quantity of blades between 1:2 and 5:2. The ratio may be tuned based on a variety of factors including a size of the vanes to ensure a desired amount of swirl is removed for an airflow from the primary fan.

Additionally, in certain exemplary embodiments, where the engine includes the third stream and a mid-fan (a ducted fan aft of the primary, forward fan), a ratio R1/R2 may be between one and ten (1 and 100, or two and seven (2 and 7), or at least three point three (3.3), at least three point five (3.5), at least four (4) and less than or equal to seven (7), where R1 is the radius of the primary fan and R2 is the radius of the mid-fan.

It should be appreciated that various embodiments of the engine, such as the single unducted rotor engine depicted and described herein, may allow for normal subsonic aircraft cruise altitude operation at or above Mach 0.5. In certain embodiments, the engine allows for normal aircraft operation between Mach 0.55 and Mach 0.85 at cruise altitude. In still particular embodiments, the engine allows for normal aircraft operation between Mach 0.75 and Mach 0.85. In certain embodiments, the engine allows for rotor blade tip speeds at or less than seven hundred fifty feet per second (750 fps). In other embodiments, the rotor blade tip speed at a cruise flight condition can be six hundred fifty feet per second to nine hundred feet per second (650 fps to 900 fps), or seven hundred feet per second to eight hundred feet per second (700 fps to 800 fps). Alternatively, in certain suitable embodiments, the engine allows for normal aircraft operation of at least Mach 0.3, such as with turboprop engines.

A fan pressure ratio (FPR) for the primary fan of the fan assembly can be one point zero four to two point two (1.04 to 2.20), or in some embodiments one point zero five to one point two (1.05 to 1.2), or in some embodiments less than one point zero eight (1.08), as measured across the fan blades of the primary fan at a cruise flight condition.

In order for the gas turbine engine to operate with a fan having the above characteristics to define the above FPR, a gear assembly may be provided to reduce a rotational speed of the fan assembly relative to a driving shaft (such as a low-pressure shaft coupled to a low-pressure turbine). In some embodiments, a gear ratio of the input rotational speed to the output rotational speed is between three and four (3.0 and 4.0), between three point two and three point five (3.2 and 3.5), or between three point five and four point five (3.5 and 4.5). In some embodiments, a gear ratio of the input rotational speed to the output rotational speed is greater than four point one (4.1). For example, in particular embodiments, the gear ratio is within a range of four point one to fourteen (4.1 to 14.0), within a range of four point five to fourteen (4.5 to 14.0), or within a range of six to fourteen (6.0 to 14.0). In certain embodiments, the gear ratio is within a range of three point two to twelve (3.2 to 12) or within a range of four point five to eleven (4.5 to 11.0).

With respect to a turbomachine of the gas turbine engine, the compressors and/or turbines can include various stage counts. As disclosed herein, the stage count includes the number of rotors or blade stages in a particular component (e.g., a compressor or turbine). For example, in some embodiments, a low-pressure compressor may include one to eight (1 to 8) stages, a high-pressure compressor may include four to fifteen (4 to 15) stages, a high-pressure turbine may include one to two (1 to 2) stages, and/or a low-pressure turbine (LPT) may include one to seven (1 to 7) stages. In particular, the LPT may have four (4) stages, or between four and six (4 and 6) stages. For example, in certain embodiments, an engine may include a one (1) stage low-pressure compressor, an eleven (11) stage high-pressure compressor, a two (2) stage high-pressure turbine, and four (4) stages, or between four and seven (4 and 7) stages for the LPT. As another example, an engine can include a three (3) stage low-pressure compressor, a ten (10) stage high-pressure compressor, a two (2) stage high-pressure turbine, and a seven (7) stage low-pressure turbine.

A core engine is generally encased in an outer casing defining one half of a core diameter (Dcore), which may be thought of as the maximum extent from a centerline axis (datum for R). In certain embodiments, the engine includes a length (L) from a longitudinally (or axial) forward end to a longitudinally aft end. In various embodiments, the engine defines a ratio of L/Dcore that provides for reduced installed drag. In one embodiment, L/Dcore is at least two (2). In another embodiment, L/Dcore is at least two point five (2.5). In some embodiments, the L/Dcore is less than five (5), less than four (4), and less than three (3). In various embodiments, it should be appreciated that the L/Dcore is for a single unducted rotor engine.

The reduced installed drag may further provide for improved efficiency, such as improved specific fuel consumption. Additionally, or alternatively, the reduced installed drag may provide for cruise altitude engine and aircraft operation at the above describe Mach numbers at cruise altitude. Still particular embodiments may provide such benefits with reduced interaction noise between the blade assembly and the vane assembly and/or decreased overall noise generated by the engine by virtue of structures located in an annular duct of the engine.

Additionally, it should be appreciated that ranges of power loading and/or rotor blade tip speed may correspond to certain structures, core sizes, thrust outputs, etc., or other structures of the core engine. However, as previously stated, to the extent one or more structures provided herein may be known in the art, it should be appreciated that the present disclosure may include combinations of structures not previously known to combine, at least for reasons based in part on conflicting benefits versus losses, desired modes of operation, or other forms of teaching away in the art.

Although depicted above as an unshrouded or open rotor engine, it should be appreciated that aspects of the disclosure provided herein may be applied to shrouded or ducted engines, partially ducted engines, aft-fan engines, or other gas turbine engine configurations, including those for marine, industrial, or aero-propulsion systems. Certain aspects of the disclosure may be applicable to turbofan, turboprop, or turboshaft engines. However, it should be appreciated that certain aspects of the disclosure may address issues that may be particular to unshrouded or open rotor engines, such as, but not limited to, issues related to gear ratios, fan diameter, fan speed, length (L) of the engine, maximum diameter of the core engine (Dcore) of the engine, L/Dcore of the engine, desired cruise altitude, and/or desired operating cruise speed, or combinations thereof.

Figure 13:
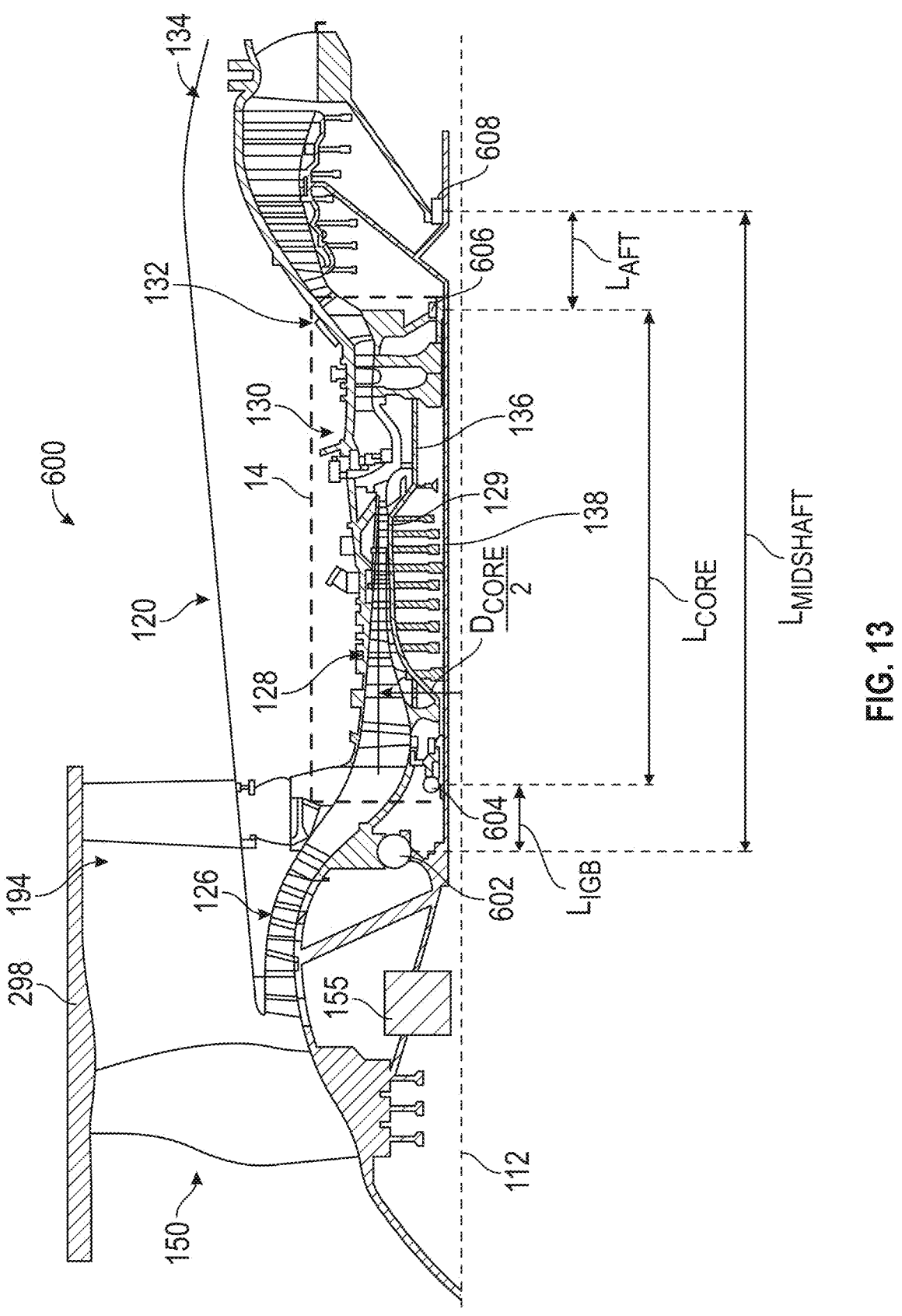
FIG. 13 is a cross-sectional view of an exemplary engine, taken along a longitudinal centerline axis of the engine, in accordance with another exemplary aspect of the present disclosure.

FIG. 13 is a cross-sectional view of an engine 600, taken along a longitudinal centerline axis 112 of the engine 600, in accordance with another exemplary embodiment of the present disclosure. The exemplary embodiment of FIG. 13 may be configured in substantially the same manner as the exemplary engine 100 described above with respect to FIG. 8, and the same or similar reference numerals may refer to the same or similar parts. In particular, the engine 600 includes the nacelle 298.

The engine 600 includes one or more bearings that rotationally support the shafts (e.g., the low-pressure shaft 138 or the high-pressure shaft 136). In particular, the engine 600 includes a first bearing 602, a second bearing 604, a third bearing 606, and a fourth bearing 608. The first bearing 602 rotationally supports the low-pressure shaft 138 on a forward side of the core engine and the fourth bearing 608 rotationally supports the low-pressure shaft 138 on an aft side of the core engine. The second bearing 604 supports the high-pressure shaft 136 on a forward side of the core engine and the third bearing 606 supports the high-pressure shaft 136 on the aft side of the core engine. The first bearing 602 and the second bearing 604 are ball bearings and the third bearing 606 and the fourth bearing 608 are roller bearings. The first bearing 602, the second bearing 604, the third bearing 606, and the fourth bearing 608 can include any type of bearing or rotational support for rotationally supporting the low-pressure shaft 138 or the high-pressure shaft 136. In some embodiments, the bearings can include two axially spaced bearings at each location.

In FIG. 13, the length $L_{MIDSHAFT}$ is a length of a portion of the low-pressure shaft 138, referred to as a midshaft. The length $L_{MIDSHAFT}$ is defined from the first bearing 602 (e.g., also referred to as an inboard low-pressure shaft forward bearing) to the fourth bearing 608 (e.g., also referred to as an inboard low-pressure shaft aft bearing). The length $L_{MIDSHAFT}$ is the lateral distance, parallel to the longitudinal centerline axis 112, defined between midpoints of the first bearing 602 and the fourth bearing 608.

The length $L_{IGB}$ is the length from the first bearing 602 (e.g., the inboard low-pressure shaft forward bearing) to the second bearing 604 (e.g., also referred to as a core forward bearing). The length $L_{IGB}$ is the lateral distance, parallel to the longitudinal centerline axis 112, defined between midpoints of the first bearing 602 and the second bearing 604.

The length $L_{CORE}$ is the length of the engine core (e.g., the length including the high-pressure compressor 128, the combustion section 130, and the high-pressure turbine 132). The length $L_{CORE}$ is defined between the second bearing 604 (e.g., core forward bearing) and the core aft bearing (e.g., a core aft bearing). The length $L_{CORE}$ is the lateral distance, parallel to the longitudinal centerline axis 112, defined between midpoints of the second bearing 604 and the third bearing 606. In this way, the length $L_{CORE}$ is the length of the high-pressure shaft 136 from the second bearing 604 to the third bearing 606. In particular, the length $L_{CORE}$ is defined as an axial distance between the core forward bearing and the core aft bearing with at least one stage of the high-pressure compressor 128 between the core forward bearing and the core aft bearing. In FIG. 13, the core forward bearing is positioned forward of a stage of the high-pressure compressor 128 and the core aft bearing is positioned aft of a stage of the high-pressure turbine 132. In some embodiments, one or more stages of the high-pressure compressor 128 can be positioned forward of the core forward bearing, while at least one stage of the high-pressure compressor 128 is positioned aft of the core forward bearing.

The length $L_{AFT}$ is the length from aft of the core to the inboard low-pressure shaft aft bearing (e.g., the fourth bearing 608). The length $L_{AFT}$ is the lateral distance, parallel to the longitudinal centerline axis 112, defined between midpoints of the third bearing 606 and the fourth bearing 608.

The core diameter $D_{CORE}$ represents the diameter of the engine core. The diameter $D_{CORE}$ is defined by the outer diameter of the exit from a last stage 129 of the high-pressure compressor 128, also referred to as the exit stage diameter. In this way, the last stage 129 defines an exit of the high-pressure compressor 128. The radius of the core is shown in FIG. 13 as $$\frac{D_{CORE}}{2}.$$

$$\frac{D_{CORE}}{2}.$$

Figure 14:
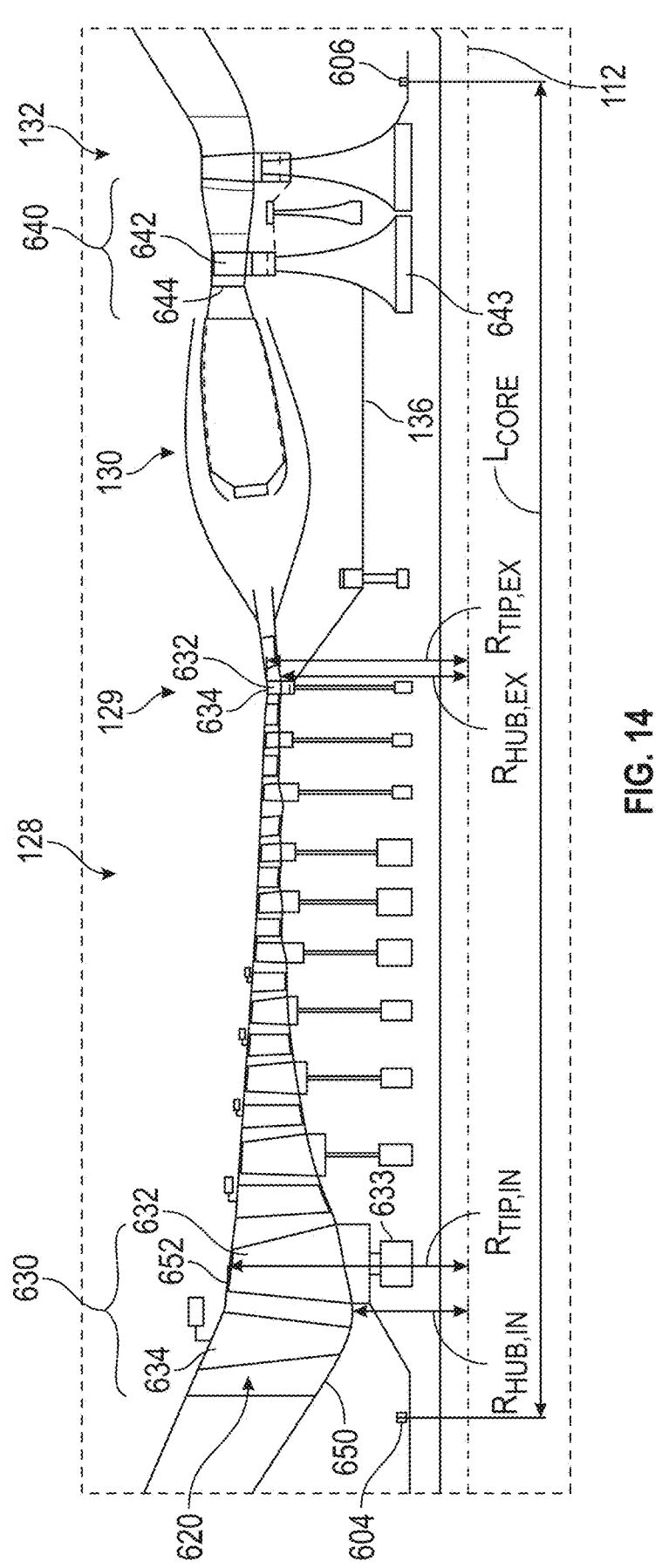
FIG. 14 is an enlarged, schematic view of the turbine engine of FIG. 13, taken at detail 14 in FIG. 13, according to the present disclosure.

FIG. 14 is an enlarged, cross-sectional view of the engine 600, taken at detail 14 in FIG. 13, according to the present disclosure. In particular, FIG. 14 shows an enlarged view of the engine core (the high-pressure compressor 128, the combustion section 130, and the high-pressure turbine 132). The high-pressure compressor 128 includes a high-pressure compressor inlet 620 and a plurality of compressor stages 630 (only one of which is labeled in FIG. 14 for clarity). Each compressor stage 630 includes a plurality of high-pressure compressor blades 632 provided on a rotor disk 633 (or blades and a disk integrated together in a blisk) and a plurality of high-pressure compressor vanes 634. The plurality of high-pressure compressor blades 632 rotate with respect to the plurality of high-pressure compressor vanes 634 to compress and to pressurize the air flow entering the high-pressure compressor 128 through the high-pressure compressor inlet 620. The high-pressure compressor inlet 620 is defined by a first compressor stage 630 of the high-pressure compressor 128.

Each high-pressure compressor blade 632 extends radially outward from a blade platform to a blade tip. The high-pressure compressor vanes 634 are positioned axial forward or axial aft of the high-pressure compressor blades 632. The rotor disk 633 for each compressor stage 630 is mounted to the high-pressure shaft 136. A stage of the high-pressure compressor 128 refers to a single disk of rotor blades or both the rotor blades and adjacent stator vanes (either meaning can apply within the context of this disclosure without loss of clarity).

The high-pressure turbine 132 has one high-pressure turbine stage 640 or two high-pressure turbine stages 640. In a single high-pressure turbine stage 640, high-pressure turbine blades 642 are provided on a rotor disk 643. Each high-pressure turbine blade 642 extends radially outwardly from a blade platform to a blade tip. The high-pressure turbine 132 can also include a plurality of high-pressure turbine stator vanes 644. The high-pressure turbine 132 may have both an upstream nozzle adjacent the combustor exit and an exit nozzle aft of the rotor, or a nozzle upstream of rotor blades or downstream of the rotor blades.

In FIG. 14, the radius $R_{HUB,IN}$ is a radius of a hub 650 at the high-pressure compressor inlet 620. The radius $R_{HUB,IN}$ is defined from the longitudinal centerline axis 112 to the hub 650 at the high-pressure compressor inlet 620 in the radial direction. The radius $R_{TIP,IN}$ is a radius of a tip 652 of the high-pressure compressor blade 632 of the first stage (e.g., at the high-pressure compressor inlet 620). The radius $R_{TIP,IN}$ is defined from the longitudinal centerline axis 112 to the tip 652 of the high-pressure compressor blade 632 at the high-pressure compressor inlet 620 in the radial direction.

Figure 15:
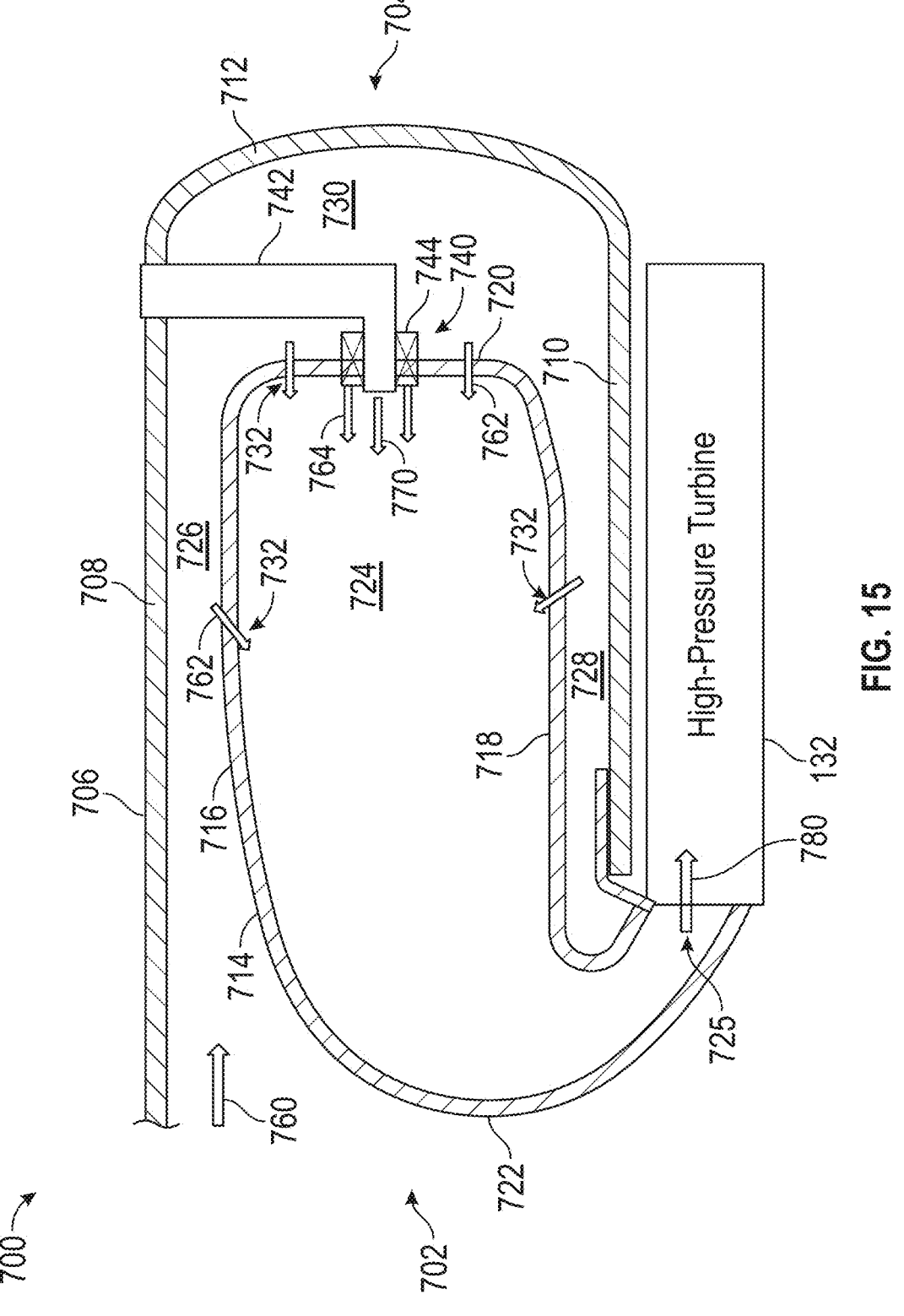
FIG. 15 is a schematic cross-sectional view of a combustor for the engine of FIG. 1, taken along a longitudinal centerline axis of the combustor, according to the present disclosure.

The radius $R_{HUB,EX}$ is a radius of the hub 650 at the last stage 129 (e.g., at the exit of the high-pressure compressor 128). The radius $R_{HUB,EX}$ is defined from the longitudinal centerline axis 112 to the hub 650 at the last stage 129 in the radial direction. The radius $R_{TIP,EX}$ is a radius of the tip 652 of the high-pressure compressor blade 632 of the last stage 129 of the high-pressure compressor 128. The radius $R_{TIP,EX}$ is defined from the longitudinal centerline axis 112 to the tip 652 of the high-pressure compressor blade 632 at the last stage 129 of the high-pressure compressor 128 in the radial direction. In this way, the radius $R_{TIP,EX}$ corresponds to the radius of the core FIG. 15 is a cross-sectional view of a combustion section 700 for the engine 100, taken along the longitudinal centerline axis 112, according to the present disclosure. The combustion section 700 can be utilized as the combustion section 130 (FIG. 1) of the engine 100. The combustion section 700 can be used in any of the engines disclosed herein.

The combustion section 700 is a reverse flow combustor. In a reverse flow combustor, the compressed air from the high-pressure compressor flows into the combustor at an aft end thereof and mixes with the fuel to generate the combustion gases, and the combustion gases flow from the aft end to the forward end before exiting the combustor into the HP turbine. In this way, the combustion gases within the combustor flow in an opposite direction as the direction of travel (e.g., a direction of thrust) of the engine 100. Such a configuration allows the high-pressure turbine 132 (shown schematically in FIG. 15) to be radially below, and axially aligned with, the combustion section 700. Accordingly, the reverse flow combustor configuration reduces $L_{CORE}$, and, thus, reduces $L_{CORE}/D_{CORE}$ for a given thrust level of the engine 100.

The combustion section 700 has a forward end 702 and an aft end 704. The combustion section 700 includes a combustor casing 706 and a combustor liner 714. The combustor casing 706 has an outer casing 708, an inner casing 710, and an aft end 712. The combustor liner 714 has an outer liner 716, an inner liner 718, an aft end 720, and a forward end 722. The aft end 720 can include an annular dome that defines the aft end 720. A combustion chamber 724 is formed within the combustor liner 714. The combustion chamber 724 includes an upstream end positioned at the aft end 720 and a downstream end positioned at the forward end 722. The combustion chamber 724 includes a combustion chamber outlet 725 at the downstream end and in fluid communication with the combustion chamber 724 and the HP turbine 132 for providing combustion gases into the high-pressure turbine 132, as detailed further below. The combustion chamber 724 is radially outward of, and axially aligned with, the high-pressure turbine 132.

The outer liner 716 and the inner liner 718 are disposed between the outer casing 708 and the inner casing 710. The outer liner 716 and the inner liner 718 are spaced radially from each other such that the combustion chamber 724 is defined therebetween. The outer casing 708 and the outer liner 716 form an outer passage 726 therebetween, and the inner casing 710 and the inner liner 718 form an inner passage 728 therebetween. An aft passage 730 connecting the outer passage 726 and the inner passage 728 is formed between the aft end 712 and the aft end 720.

The combustor liner 714 includes a plurality of liner cooling holes 732. The plurality of liner cooling holes 732 can include at least one of one or more liner cooling holes 732 extending through the outer liner 716, one or more liner cooling holes 732 extending through the inner liner 718, or one or more liner cooling holes 732 extending through the aft end 720.

The combustion section 700 includes one or more mixer assemblies 740 spaced circumferentially about the aft end 720 of the combustor liner 714 to deliver a mixture of fuel and air to the combustion chamber 724, as detailed further below. The combustion section 700 includes a fuel injector 742 for providing the fuel into the combustion chamber 724, and an air swirler 744 for providing the air into the combustion chamber 724 and mixing the fuel with the air.

In operation, the combustion section 700 receives compressed air 760 from the compressor section (e.g., from the high-pressure compressor 128 of FIG. 1). The compressed air 760 enters the combustion chamber 724 through the plurality of liner cooling holes 732 as a cooling air flow 762. The cooling air flow 762 provides liner cooling and film cooling along the inner wall of the combustor liner 714.

The compressed air 760 also enters the combustion chamber 724 through the one or more mixer assemblies 740. In particular, the air swirler 744 directs the compressed air 760 into the combustion chamber 724 as a compressed air stream 764. At the same time, the fuel injector 742 supplies the fuel into the combustion chamber 724 as a fuel stream 770. The air swirler 744 swirls the compressed air stream 764 to mix the compressed air stream 764 with the fuel stream 770. The fuel stream 770 and the compressed air stream 764 enter the combustion chamber 724 at an upstream end (e.g., the aft end 704 of the combustion chamber 724) and are ignited to combust within a combustion zone of the combustion chamber 724 to generate combustion gases 780. The combustion gases 780 flow downstream (toward the forward end 722 of the combustion chamber 724) and are directed into the high-pressure turbine 132 through the combustion chamber outlet 725. In particular, the combustion chamber 724 directs the combustion gases 780 axially forward from the aft end 720 to the forward end 722. At the forward end 722, the combustion chamber 724 directs the combustion gases 780 radially inward towards the combustion chamber outlet 725. The combustion chamber outlet 725 then directs the combustion gases 780 axially into the high-pressure turbine 132. As illustrated in FIG. 15, the combustion section 700 is arranged such that the aft end 704 of the combustion section 700 forms, with respect to the flow, the upstream end of the combustion chamber 724 and the forward end 702 of the combustion section 700 forms, with respect to the flow, a downstream end of the combustion chamber 724, thus defining a reverse flow combustor.

Figure 16A:
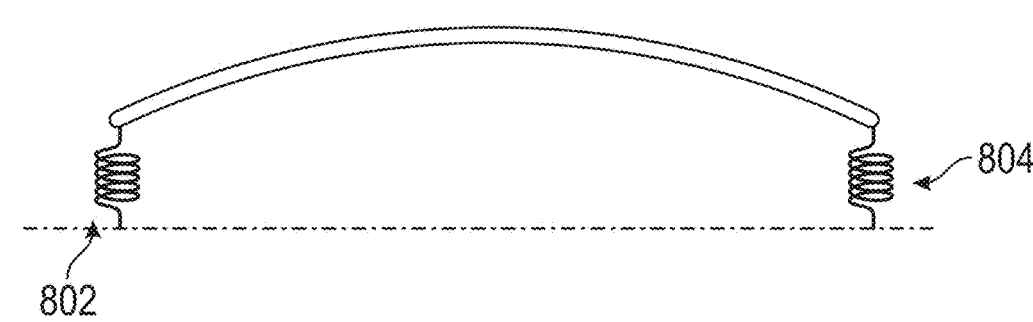
FIG. 16A shows a first bending mode of a shaft.
Figure 16B:
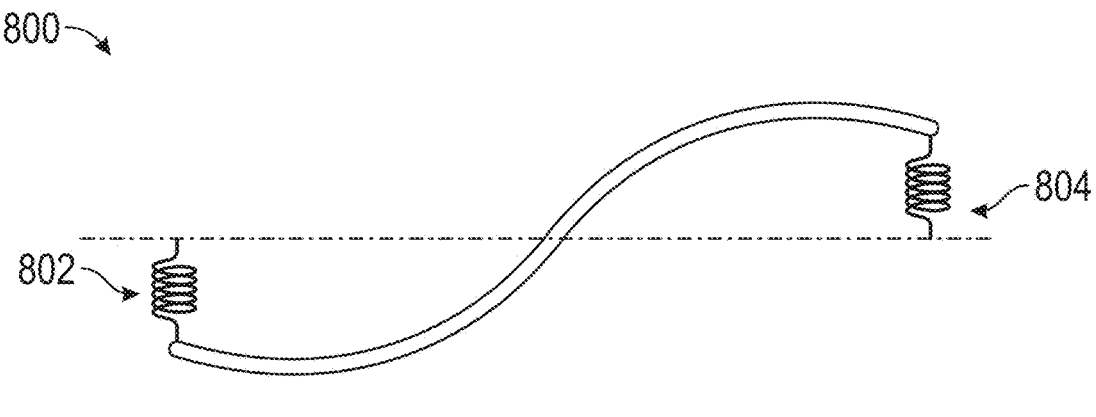
FIG. 16B shows a second bending mode of a shaft.
Figure 16C:
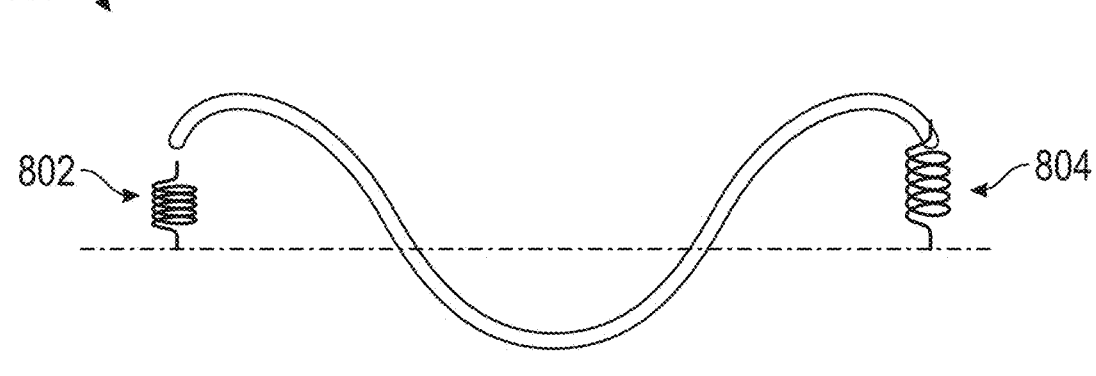
FIG. 16C shows a third bending mode of a shaft.

FIGS. 16A to 16C show a schematic view of a high-pressure shaft 800 corresponding to the predominate three typical mode shapes of the high-pressure shaft that need to be taken into consideration when designing an engine core and avoiding dynamic instability in the high-pressure shaft. For example, the high-pressure shaft 800 illustrated in FIGS. 16A to 16C can be the high-pressure shaft 136 of FIGS. 13 and 14. The deformed high-pressure shaft is supported by the high-pressure shaft forward bearing 802 and the high-pressure shaft aft bearing 804, respectively. The bearings are represented by their stiffnesses (shown as springs). FIG. 16A illustrates a first mode, also referred to as a fundamental bounce mode, also known as a bow rotor mode, of the high-pressure shaft 800. The first mode can occur at sub-idle speeds of the high-pressure shaft 800, which are about sixty percent to eighty percent below a redline speed of the high-pressure shaft (e.g., about forty percent below cruise speeds). In FIG. 16B, the high-pressure shaft 800 has a second mode, also known as the pitch mode. The second mode occurs at near to cruise speeds of the high-pressure shaft 800, which are about twenty percent to thirty percent below the high-pressure shaft redline speeds. In FIG. 16C, the high-pressure shaft 800 has a third mode, also known as a S-shaped mode. The third mode occurs near redline speeds of the high-pressure shaft 800.

The present disclosure also provides for improvement upon the operating speed of a high-speed shaft, also referred to as the high-pressure shaft. With regard to the speed of the high-pressure shaft, consideration was given not simply to those factors (e.g., the length of the engine core, the diameter of the engine core, or the number of stages present in the high-pressure compressor or the high-pressure turbine) affecting the high-speed shaft, but also to factors considering the inlet temperature of the high-pressure compressor and the inlet corrected flow. In contrast to existing gas turbine engines requiring higher bypass ratios and smaller engine cores, embodiments considered presented challenges in determining how the engine core (e.g., the high-pressure shaft) could be reduced in size without operating at or near the Alford margin and/or the third mode margin of the high-pressure shaft, while enabling higher bypass ratio engines and without affecting performance of the high-pressure compressor and/or the high-pressure turbine.

Modifying an existing shaft to increase the redline speed of the shaft is challenging, and the impact of the different types of improvements and configurations on redline speed is not easily predictable without empirical experimentation and simulation, which can be enormously expensive and time-consuming. In some cases, a modification may even result in lowering the redline speed. For example, to reduce high-pressure compressor length, the number of high-pressure compressor stages can be reduced and the pressure ratio can be reduced. Further, transferring the pressure ratio to the low-pressure compressor results in higher high-pressure compressor inlet temperature and reduced high-pressure compressor inlet corrected flow, both of which result in higher redline speed and, hence, reduced Alford margin and/or reduced third mode margin.

Further, different materials for the engine core (rotor disks, airfoils) and changes in radius (e.g., changes in the radius ratio of the core), can also impact the high-pressure compressor pressure ratio and the inlet temperature and such modifications can impact the dynamics of the high-speed shaft, the low-speed shaft, and the interaction between these two shafts as can occur through dynamic excitation transmitted through shaft bearings. Next generation engines will operate with a higher power density (power/weight), which can mean lengthening the core by adding additional compression stages to the high-pressure compressor. Additionally, or alternatively, a core operating at a higher power density is expected to operate at higher temperatures at the compressor exit stage and the downstream turbine stages. In this regard, higher-temperature-tolerant material can be used to enable operating at higher temperatures, such as, a ceramic matrix composite (CMC) material. The use of such higher temperature-tolerant material is expected to bring about changes in weight and component size and volume, which is expected to influence the behavior of both the high-speed shaft and the low-speed shaft. The dynamics of the low-speed shaft and the high-speed shaft can also change when the engine core changes in size and weight, in response to a need to operate at higher power densities enabled by use of higher temperature-tolerant material.

CMC material is expected to be used in the HPT, LPT, and HPC parts of a core engine as this type of material can withstand higher temperatures than more traditional metal alloys. Given the differences in material properties for a CMC material, particularly, the higher strength to weight ratio (or higher specific modulus) of CMC versus a metal alloy used in existing gas turbine engines in use currently, there is a need to ascertain the expected effects on high-pressure shaft dynamics and low-pressure shaft dynamics. Use of a CMC material introduces opportunities to increase a critical speed of the low-pressure shaft, not only due to a weight reduction but also in making more space available for increasing the low-pressure shaft diameter extending through the core given the higher strength of these materials. The components made, at least in-part, from CMC material may include the high-pressure compressor rotors and disks, the high-pressure turbine nozzles and/or rotors and rotor disks, and the low-pressure turbine nozzles and/or rotors and disks. CMC allows for components to be made more stiff or reduced in size while having the same strength properties as metal alloys, thereby having equivalent capability for sustaining high stresses associated with centrifugal forces at high temperatures and operating speeds, in addition to reducing the weight of the core, as compared to metals. CMC also introduces new and untested structural dynamics, which can introduce tradeoffs or compromise among a desired aero-performance (temperatures, rotation rates, pressure ratios) and stable dynamics at cruise, takeoff/max thrust and redline speeds for both the high-pressure shaft and low-pressure shaft. Accordingly, components of the high-pressure compressor and/or components of the high-pressure turbine in the embodiments 1 to 145 in TABLES 1 to 5 below can be made from CMC. For example, rotors, blades, blades and discs, a single stage, or multiple stages in the high-pressure compressor module and/or in the high-pressure turbine module may be formed partially or wholly of CMC.

The following relationships take into account the tradeoffs that need to be made, so that the design accounts not only for features of the core length, size and weight, and representative of a higher overall pressure ratio and increased operating temperatures, but also the effects that these changes in the core can have on the high-pressure compressor inlet temperature and the inlet corrected flow that affect the high-pressure shaft redline speed.

A first relationship concerns the high-pressure shaft redline speed, or high-speed shaft rating HSR given by (3):

$$HSR = \frac{1}{k} * N2_{r/l} * D_{CORE} * \left(\frac{L_{CORE}}{D_{CORE}}\right)^2 \qquad (3)$$

$L_{CORE}$ and $D_{CORE}$ are defined as described previously, and $L_{CORE}/D_{CORE}$ is a ratio of the length of the engine core to the diameter of the engine core. $N2_{r/l}$ is the redline speed for the high-pressure shaft, for example, reported in the engine Type Certificate Data Sheet (TCDS), and k is a constant with a value of $10^6$ inch-RPM. The redline speed $N2_{r/l}$ is from 10,580 RPM to 35,788 RPM. $L_{CORE}$ is from 36.4 inches (in) to 66.8 inches (in). $D_{CORE}$ is from 9.4 inches to 31.8 inches. HSR is from 1.5 to 6.2.

For stable operating conditions, the high-pressure shaft third mode should be placed as a percentage below the redline speed of the high-pressure shaft or above the redline speed of the high-pressure shaft and satisfying (4a), (4b), (4c), or (4d):

$$-0.1 > (-0.1822 * HSR + HST) > 0 \qquad (4a)$$

$$-0.2 > (-0.1822 * HSR + HST) > 0 \qquad (4b)$$

$$-0.3 > (-0.1822 * HSR + HST) > 0 \qquad (4c)$$

$$(-0.1822 * HSR + HST) > -0.1 \qquad (4d)$$

HST accounts for the effects that the HPC pressure ratio and the HPC exit temperature can have on the third mode.

T25 is the temperature in Rankine (°R) at the high-pressure compressor (HPC) inlet. A good approximation for HST can be made in terms of only the T25, using (5):

$$HST = -0.726 * T25/T_{STD} + 1.61 \qquad (5)$$

where T25 is from 579°R to 803°R, HST is from 0.49 to 0.8, and $T_{STD}$ is the standard temperature defined by a constant value of 518.67°R.

For stable operating conditions, the high-pressure shaft second mode is a function of the minimum speed of the high-pressure shaft at cruise as a percentage of the redline speed of the HP shaft. For example, for stable operating conditions, the high-pressure shaft second mode should satisfy (6):

$$\left(-0.1215 * HSR + \left(\frac{2 * HST - 1}{3}\right)\right) < -0.1 \qquad (6)$$

Relationships (4a) to (4d) and (6) account for individual configurations of the high-pressure shaft that have variations in mode margin due to additional parameters, such as, for example, the bearing support stiffness, additional mass added for maintainability, and/or features such as power screws. For example, if the excess margin is 20% of the third mode, but the second mode is at −10% margin, then the mitigation is to soften the bearing support such that the third mode margin falls to 10% and the second mode margin becomes-20%. Accordingly, the relationships (4a) to (4d) and (6) provide for providing a balance among the third mode margin and the second mode margin of the high-pressure shaft.

Such a configuration of the high-pressure shaft third mode in relationships (4a) to (4d) accounts for stable operating conditions while considering variations in architectural differences in various types of turbine engines, as well as ensuring that the high-pressure shaft is not excessively excited at the high-pressure shaft second mode during high power steady state operations (e.g., cruise, climb, and/or takeoff). For example, the third mode margin can be −10% of the redline speed of the high-pressure shaft per relationship (4a), −20% of the redline speed of the high-pressure shaft per relationship (4b), or −30% of the redline speed of the high-pressure shaft per relationship (4c). The third mode margin can also be greater than −10% of the redline speed of the high-pressure shaft per relationship (4d) to account for the architectural differences in various types of turbine engines. For example, the third mode may fall within −10% of redline speed of the high-pressure shaft and the bearing support structure can be stiffened or softened to move the third mode margin to just above the redline speed of the high-pressure shaft.

Further, such a configuration of the high-pressure shaft second mode in relationship (6) accounts for stable operating conditions while considering variations in architectural differences in various types of engines, as well as ensuring that the high-pressure shaft is not excessively excited at the high-pressure shaft second mode during high power steady state operations (e.g., cruise, climb, and/or takeoff). For example, the second mode margin can be −10% of the redline speed of the high-pressure shaft per relationship (6).

Another relationship for HSR concerns the low-pressure shaft redline speed, or high-speed shaft rating $HSR_{LP}$ given by (7):

$$HSR_{LP} = \frac{1}{k} * N1_{r/l} * D_{CORE} * \left(\frac{L_{CORE}}{D_{CORE}}\right)^2 \qquad (7)$$

$L_{CORE}$ and $D_{CORE}$ are defined as described previously. $N1r/l$ is the redline speed for the LP shaft, for example, reported in the engine Type Certificate Data Sheet (TCDS), and k is a constant with a value of $10^6$ inch-RPM. For stable operating conditions, the high-pressure shaft first mode is a function of the minimum speed of the LP shaft at cruise as a percentage of the redline speed of the LP shaft. For example, for stable operating conditions, the high-pressure shaft first mode is placed either below (as a percentage) or just above the redline speed of the LP shaft satisfying relationship (8a), (8b), (8c), or (8d):

$$-0.1 > \left(\frac{0.55}{(HSR_{LP})^2} + LST\right) > 0 \qquad (8a)$$

$$-0.2 > \left(\frac{0.55}{(HSR_{LP})^2} + LST\right) > 0 \qquad (8b)$$

$$-0.3 > \left(\frac{0.55}{(HSR_{LP})^2} + LST\right) > 0 \qquad (8c)$$

$$\left(\frac{0.55}{(HSR_{LP})^2} + LST\right) > -0.1 \qquad (8d)$$

LP Speed Temperature Correction (LST) accounts for the effects that the HPC pressure ratio and the HPC exit temperature can have on the first mode. T25 is the temperature in Rankine (°R) at the high-pressure compressor (HPC) inlet. A good approximation for LST can be made in terms of only the T25, using (9):

$$LST = -1.193 * T25/T_{STD} + 1.18 \qquad (9)$$

where T25 is from 579°R to 803°R, LST is from −0.67 to −0.15, and $T_{STD}$ is the standard temperature defined by a constant value of 518.67°R.

Relationships (3) through (9) when used individually or together (depending on application or changes made to a design) can identify an improved core accounting for characteristics associated with a higher power density (use of CMC material, increased number of HPC and/or HPT stages, increased bore height or length of the LP shaft) and bounding those features within constraints to avoid dynamic instability by interaction between one or more vibration modes of the LP shaft and HP shaft. Further, relationships (8a) to (8d) account for individual configurations of the HP shaft that have variations in mode margin due to additional parameters, such as, for example, the bearing support stiffness, additional mass added for maintainability, and/or features such as power screws. For example, if the first mode is within −20% of the redline speed of the LP shaft (e.g., is between the redline speed of the LP shaft and −20% of the redline speed of the LP), then the mitigation is to either soften or to stiffen the bearing support such that the first mode margin falls below −20% of the redline speed of the LP shaft or above the redline speed of the LP shaft. Such a configuration of the high-pressure shaft first mode in relationships (8a) to (8d) accounts for stable operating conditions while considering variations in architectural differences in various types of turbine engine, as well as ensuring that the HP shaft is not excessively excited at the high-pressure shaft first mode during high power steady state operations (e.g., cruise, climb, and/or takeoff). For example, the first mode margin can be −10% of the redline speed of the LP shaft per relationship (8a), −20% of the redline speed of the LP shaft per relationship (8b), or −30% of the redline speed of the LP shaft per relationship (8c). The first mode margin can also be greater than −10% of the redline speed of the LP shaft per relationship (8d) to account for the architectural differences in various types of turbine engines. For example, the first mode may fall within −10% of redline speed of the LP shaft and the bearing support structure can be stiffened or softened to move the first mode margin to just above the redline speed of the LP shaft.

The area of the exit of the HP compressor (e.g., area at the last stage of the HP compressor), also referred to as the HP compressor exit flow area, provides a measure of the bypass ratio (BPR) of the engine. As mentioned earlier, as the BPR increases (e.g., BPR greater than 8.0, greater than 10.0, or greater than 12.0), the engine core size (e.g., the HP compressor exit flow area) decreases and the $L_{CORE}/D_{CORE}$ increases, thereby making it challenging to meet the HP shaft third mode margins. To ensure stable operation of the HP shaft, the $L_{CORE}/D_{CORE}$ is from 2.1 to 4.3. As detailed further below with respect to FIGS. 17 to 19, a first relationship concerns the $L_{CORE}/D_{CORE}$ as a function of a first high-speed shaft operating parameter $HSP_X$ that is given by the following relationship (10):

$$HSP_X = \frac{(A_{ex})^2 * P_{STD} * OPR_{T/O}}{FN_{T/O} * (N_{Stg}/10)^2} \qquad (10)$$

where $P_{STD}$ is standard pressure (e.g., absolute pressure of one atmosphere) defined by a constant value of 14.696 psi (or 14.7 psi), $FN_{T/O}$ is sea-level static thrust at takeoff flight conditions corresponding to a maximum thrust rating for an engine core configuration, for example, reported in the engine Type Certificate Data Sheet (TCDS) and is from 12,000 lbf to 107,480 lbf, $OPR_{T/O}$ is the overall pressure ratio of the engine at takeoff flight conditions corresponding to the maximum thrust rating for an engine core configuration reported in, for example, ICAO ENGINE nvPM EMISSIONS DATA SHEET and is from 26.3 to 82, $N_{Stg}$ is the number of stages in the HP compressor and is 8, 9, 10, or 11, and $A_{EX}$ is the area of the HP compressor exit and is provided by the following relationship (11):

$$A_{EX} = \pi * \left(R_{TIP,EX}^2 - R_{HUB,EX}^2\right) \qquad (11)$$

where $R_{TIP,EX}$ and $R_{HUB,EX}$ are measured as detailed above with respect to FIG. 6. $A_{EX}$ is from 11 $in^2$ to 95 $in^2$.

Further, the HP compressor inlet temperature and the inlet corrected flow also affect the HP shaft redline speed. Accordingly, the present disclosure also provides for certain relationships among the HP compressor inlet temperature and the inlet corrected flow at takeoff flight conditions, and the HP dynamics that influence the design of the engine core from the perspective of maintaining stable dynamics during engine operations.

A second relationship concerns the HP compressor tip radius ratio and the HP compressor area ratio, referred to as an area ratio high-speed shaft rating ($HSP_{AR}$) and is given by (12):

$$HSP_{AR} = \frac{\left(\frac{L_{core}}{D_{core}}\right)^2 * AR}{\sqrt{\frac{R_{HUB,IN}}{R_{TIP,IN}}} * \sqrt{\frac{R_{TIP,EX}}{R_{TIP,IN}}}} \tag{12}$$

where $R_{HUB,IN}/R_{TIP,IN}$ is referred to as the inlet radius ratio, $R_{TIP,EX}/R_{TIP,IN}$ is referred to as the HP compressor tip radius ratio, and AR is the area ratio of the compressor and is the ratio of the area at the inlet of the HP compressor to the area at the exit of the HP compressor ($A_{IN}/A_{EX}$). $A_{IN}$ is the HP compressor inlet flow area and is given by the following relationship (13):

$$A_{IN} = \pi * \left(R_{TIP,IN}^2 - R_{HUB,IN}^2\right) \tag{13}$$

where $R_{TIP,IN}$ and $R_{HUB,IN}$ are measured as detailed above with respect to FIG. 14. AR is from 5.6 to 13.9, the inlet radius ratio is from 0.32 to 0.6, $R_{TIP,EX}$ is from 4.73 in. to 15.83 in., and $R_{TIP,IN}$ is from 5.50 in. to 16.32 in.

A third relationship concerns the HP compressor tip radius ratio and the HP compressor inlet area, referred to as an inlet area high-speed shaft rating (HSP_$A_{IN}$) and is given by (14):

$$HSP\_A_{IN} = \frac{\left(\frac{L_{core}}{D_{core}}\right)^2 * A_{IN}}{\sqrt{\frac{R_{HUB,IN}}{R_{TIP,IN}}} * \sqrt{\frac{R_{TIP,EX}}{R_{TIP,IN}}}} \tag{14}$$

where $R_{HUB,IN}/R_{TIP,IN}$ is referred to as the inlet radius ratio, $R_{TIP,EX}/R_{TIP,IN}$ is referred to as the HP compressor tip radius ratio, and AN is the area at the inlet of the HP compressor. $A_{IN}$ is from 77 in$^2$ to 703 in$^2$.

As detailed further below with respect to FIG. 23, HSP_$A_{IN}$ is a function of a second high-speed shaft operating parameter (HSP$_{X1}$). HSP$_{X1}$ is given by (15):

$$HSP_{X1} = \frac{A_{EX} * 1000}{FN_{T/O} * \left(N_{Stg}/10\right)^2} \tag{15}$$

OPR$_{T/O}$ is the overall pressure ratio of the engine at takeoff flight conditions and is from 26.3 to 82, FN$_{T/O}$ is sea-level static thrust at takeoff flight conditions and is from 12,000 lbf to 107,480 lbf, and $A_{EX}$ is the area of the HP compressor exit and is provided by relationship (11) above.

A fourth relationship concerns the HP compressor exit rim speed, the HP compressor exit temperature, and the HP compressor stage count, referred to as an exit rim speed high-speed shaft rating (HSP_U$_{RIM,R/L}$) and is given by (16):

$$HSP\_U_{RIM,R/L} = \frac{\left(\frac{L_{CORE}}{D_{CORE}}\right)^2}{N_{stg} * A_{F,IN}^{1/3}} * \left(\frac{T3_{T/O}}{U_{RIM,R/L}}\right)^3 \tag{16}$$

where $N_{stg}$ is the number of stages of the HP compressor and is 8, 9, 10, or 11, $T3_{T/O}$ is the exit temperature of the HP compressor at takeoff flight conditions and is from 1455°R to 2020°R, $A_{F,IN}$ is the frontal area of the HP compressor, and $U_{RIM,R/L}$ is the exit rim speed of the HP compressor at redline speeds (e.g., the rotational speed of the exit stage of the HP compressor at the hub of the exit stage). $A_{F,IN}$ is given by (17):

$$A_{F,IN} = \pi * (R_{TIP,IN})^2 \tag{17}$$

The frontal area $A_{F,IN}$ is from 95 in$^2$ to 837 in$^2$, and $R_{TIP,IN}$ is from 5.50 in to 16.32 in. $U_{RIM,R/L}$ is given by (18):

$$U_{RIM,R/L} = \frac{\pi * N2_{R/L}}{30} * \frac{R_{HUB,EX}}{12} \tag{18}$$

where $N2_{R/L}$ is in RPM, $R_{HUB,EX}$ is in inches and $U_{RIM,R/L}$ is in ft/s.

The exit rim speed of the HP compressor $U_{RIM,R/L}$ is from 1,084 ft/s to 1,557 ft/s, the redline speed of the HP compressor $N2_{R/L}$ is from 10,580 RPM to 35,788 RPM, and $R_{HUB,EX}$ is from 4.31 in to 14.85 in. T3r/o is from 1,455°R to 2,020°R, and is given by (19):

$$T3_{T/O} = T25_{T/O} * (3.465 * AR - 5.7)^{\frac{\gamma-1}{\gamma * \eta_{Poly}}} \tag{19}$$

where $T25_{T/O}$ is the HP compressor inlet temperature at takeoff flight conditions, AR is the area ratio of the HP compressor, $\gamma$ is the gas constant of air and is equal to 1.37, $\eta_{Poly}$ is the compressor efficiency and is approximately equal to 0.9. $T25_{T/O}$ is from 579°R to 803°R and is given by (20):

$$T25_{T/O} = T_{ISA} * \left(\frac{1.25 * OPR_{T/O}}{3.465 * AR - 5.7}\right)^{\frac{\gamma-1}{\gamma * \eta_{Poly}}} + T_{IC} \tag{20}$$

where $T_{ISA}$ is ambient temperature and is approximately equal to 545.67°R, $OPR_{T/O}$ is the overall pressure ratio of the engine at takeoff flight conditions, $\gamma$ is the gas constant of air and is equal to 1.37, $\eta_{Poly}$ is the compression efficiency and is approximately equal to 0.9, $T_{IC}$ is the intercooler temperature drop (e.g., reduction) at takeoff flight conditions upstream of the HP compressor (e.g., between the LP compressor and the HP compressor), and is from −100°R to 0°R, AR is the area ratio of the compressor and is the ratio of the area at the inlet of the HP compressor to the area at the exit of the HP compressor ($A_{IN}/A_{EX}$).

A fifth relationship concerns the HP compressor tip radius ratio and HP compressor inlet temperature, referred to as a radius ratio high-speed shaft rating (HSP$_{RR}$) and is given by (21):

$$HSP_{RR} = \frac{\left(\frac{L_{core}}{D_{core}} * \frac{T25_{T/O}}{T_{STD}}\right)^2}{\sqrt{\frac{R_{HUB,IN}}{R_{TIP,IN}}} * \sqrt{\frac{R_{TIP,EX}}{R_{TIP,IN}}}} \tag{21}$$

where $R_{HUB,IN}/R_{TIP,IN}$ is referred to as the inlet radius ratio, $R_{TIP,EX}/R_{TIP,IN}$ is referred to as the HP compressor tip radius ratio, $T_{STD}$ is the standard temperature and is equal to 518.67°R, and $T25_{T/O}$ is the HP compressor inlet temperature at takeoff flight conditions. The $T25_{T/O}$ is given by the relationship (20) above.

As discussed above, the HP compressor inlet temperature and the inlet corrected flow impact the HP shaft redline speed. The lower HP compressor inlet temperature and the higher inlet corrected flow at the takeoff flight conditions can be obtained by: 1. Increased HP compressor pressure ratio with low HP compressor inlet radius ratio, higher HP compressor exit radius, or higher HP compressor stage count, 2. Intercooling the HP compressor inlet air, 3. Lowering the HP compressor inlet pressure, 4. Water/steam ingestion forward of the HP compressor inlet, 5. Lower specific (corrected) flow, 6. Lower exhaust gas temperature (EGT), 7. Lower OPR or BPR. The lower HP compressor inlet radius ratio and the water/steam ingestion have favorable effects on performance (e.g., increase performance of the HP compressor), the higher HP compressor exit radius, the higher HP compressor stage count, the intercooling, the lowering HP compressor inlet pressure, and the lower specific flow have minor effects on the performance of the HP compressor, while the lower exhaust gas temperature and the lower OPR or BPR have negative effects on the overall engine performance.

Accordingly, the relationships (3) to (21) detailed herein, when used together or individually can identify an improved engine core accounting for characteristics associated with lower HP compressor inlet temperatures and higher HP compressor inlet corrected flow, accounting for the factors and tradeoffs discussed above, and bounding those features within constraints to avoid dynamic instability by interaction between one or more vibration modes of the HP shaft. For example, the relationships (3) to (21) result in the unexpected result of lowering the HP compressor tip radius ratio and increasing the HP compressor pressure ratio, thereby lowering the HP compressor inlet temperature at a fixed OPR and increasing the HP compressor inlet corrected flow while accounting for a feasible $L_{CORE}/D_{CORE}$ for avoiding undesired HP shaft dynamics (e.g., the Alford stability and/or the third mode of the HP shaft). Thus, the relationships detailed above among the $L_{CORE}/D_{CORE}$, the HP compressor inlet radius ratio, the HP compressor exit radius, and/or the HP compressor inlet temperature and the HP compressor inlet corrected flow, provide for optimizing performance (e.g., higher T3 or OPR, and/or larger HP compressor blade heights and/or improved clearance) at optimal $L_{CORE}/D_{CORE}$. The relationships detailed above also account for a feasible dynamics margin design space for HP compressor stage count of 9, 10, or greater, and/or for 8 stages at lower HP compressor tip radius ratios with improved performance. The relationships, thus, provide for higher OPR or BPR or exhaust gas temperature configurations with HP compressor stage counts of 8 or greater and either subcritical or supercritical midshaft of the LP shaft.

TABLES 1 to 6 list embodiments of the HP compressor and the HP shaft along with their associated HSR, HSR_{LP}, $L_{CORE}/D_{CORE}$, HSP_{AR}, HSP_A_{IN}, HSP_U_{RIM,R/L}, and HSP_{RR} values. TABLES 1 to 6 include embodiments 1 to 145 and show values for various parameters of each of the relationships (3) to (21) detailed above. The parameters shown in each of TABLES 1 to 6 can be combined such that each embodiment 1 to 145 includes values for every parameter shown in TABLES 1 to 6. Embodiments 121 to 131 include a reverse flow combustor, such as the combustion section 700 of FIG. 15. Embodiments 1 to 120 and 132 to 145 include a combustor that is not a reverse flow combustor (e.g., the flow through the combustor is in the same direction as the direction of thrust of the turbine engine).

TABLE 1 lists embodiments of HSR and HSR_{LP}, along with the associated N2_{R/L} and N1R/L values. The embodiments inform of the dimensions or qualities of the HP compressor, the HP shaft, and the LP shaft that are believed reasonable and practical for the HP compressor, the HP shaft, and the LP shaft for providing a balance among improving the third mode margin of the HP shaft, without overly reducing performance of the HP compressor and/or the HP turbine. In other words, the HSR and HSR_{LP} indicates the operating ranges of interest, taking into account the constraints in which the HP compressor operates, e.g., the HP compressor inlet temperature and the HP compressor inlet corrected flow, that have not been previously considered in HP compressor and HP shaft designs, as detailed above, as well as ensuring the HP dynamics do not excite the LP shaft and vice-versa.

TABLE 1

| Emb. | N2_{R/L} (RPM) | L_{CORE}/ D_{CORE} | HSR | HST | N1_{R/L} (RPM) | HSR_{LP} | LST |
|---|---|---|---|---|---|---|---|
| 1 | 24788 | 3.4 | 3.9 | 0.56 | 10137 | 1.6 | −0.54 |
| 2 | 23020 | 2.9 | 2.9 | 0.57 | 9772 | 1.2 | −0.53 |
| 3 | 22481 | 2.9 | 3.1 | 0.64 | 8515 | 1.2 | −0.41 |
| 4 | 22417 | 3.0 | 3.2 | 0.64 | 8515 | 1.2 | −0.41 |
| 5 | 22246 | 2.8 | 2.6 | 0.57 | 9772 | 1.2 | −0.53 |
| 6 | 20928 | 2.9 | 2.8 | 0.59 | 10137 | 1.3 | −0.49 |
| 7 | 19967 | 2.8 | 2.6 | 0.63 | 10137 | 1.3 | −0.44 |
| 8 | 21281 | 2.6 | 2.5 | 0.56 | 9772 | 1.1 | −0.54 |
| 9 | 21695 | 2.8 | 2.7 | 0.56 | 9772 | 1.2 | −0.54 |
| 10 | 19922 | 3.0 | 2.9 | 0.56 | 9346 | 1.4 | −0.54 |
| 11 | 20809 | 2.7 | 2.7 | 0.52 | 9346 | 1.2 | −0.61 |
| 12 | 20809 | 2.5 | 2.3 | 0.52 | 9346 | 1.0 | −0.61 |
| 13 | 20809 | 2.3 | 1.9 | 0.57 | 9346 | 0.8 | −0.52 |
| 14 | 35788 | 4.3 | 6.2 | 0.59 | 8771 | 1.5 | −0.50 |
| 15 | 35788 | 4.0 | 5.5 | 0.64 | 8771 | 1.4 | −0.42 |
| 16 | 12306 | 2.1 | 1.5 | 0.70 | 10393 | 1.2 | −0.32 |
| 17 | 10580 | 2.1 | 1.5 | 0.64 | 7748 | 1.1 | −0.42 |
| 18 | 24181 | 2.8 | 2.7 | 0.58 | 10632 | 1.2 | −0.51 |
| 19 | 23523 | 2.7 | 2.7 | 0.53 | 10076 | 1.2 | −0.59 |
| 20 | 18378 | 2.2 | 1.7 | 0.73 | 9791 | 0.9 | −0.27 |
| 21 | 18401 | 2.3 | 1.7 | 0.67 | 9696 | 0.9 | −0.37 |
| 22 | 21259 | 2.5 | 2.2 | 0.65 | 10096 | 1.0 | −0.39 |
| 23 | 23255 | 2.8 | 2.7 | 0.67 | 10423 | 1.2 | −0.37 |
| 24 | 20398 | 2.5 | 2.1 | 0.66 | 10329 | 1.1 | −0.38 |
| 25 | 24432 | 2.8 | 2.9 | 0.55 | 10616 | 1.3 | −0.57 |
| 26 | 19914 | 2.4 | 2.0 | 0.77 | 10539 | 1.1 | −0.20 |
| 27 | 19790 | 2.4 | 2.0 | 0.73 | 10174 | 1.0 | −0.26 |
| 28 | 24618 | 3.0 | 3.1 | 0.67 | 11814 | 1.5 | −0.36 |
| 29 | 23073 | 2.7 | 2.6 | 0.67 | 10795 | 1.2 | −0.36 |
| 30 | 24152 | 2.9 | 2.9 | 0.66 | 11535 | 1.4 | −0.38 |
| 31 | 24437 | 2.8 | 2.8 | 0.64 | 11113 | 1.3 | −0.41 |
| 32 | 23043 | 2.7 | 2.6 | 0.61 | 10323 | 1.2 | −0.47 |
| 33 | 20310 | 2.5 | 2.1 | 0.77 | 10081 | 1.1 | −0.20 |
| 34 | 23662 | 2.7 | 2.6 | 0.70 | 11102 | 1.2 | −0.31 |
| 35 | 24039 | 2.8 | 2.8 | 0.69 | 11420 | 1.3 | −0.32 |
| 36 | 20133 | 2.6 | 2.3 | 0.69 | 9988 | 1.1 | −0.34 |
| 37 | 20410 | 2.7 | 2.6 | 0.61 | 9229 | 1.2 | −0.45 |
| 38 | 22900 | 2.9 | 3.0 | 0.58 | 9844 | 1.3 | −0.51 |
| 39 | 28164 | 3.6 | 4.3 | 0.68 | 9745 | 1.5 | −0.35 |
| 40 | 25626 | 3.6 | 4.5 | 0.58 | 6545 | 1.2 | −0.51 |
| 41 | 23225 | 3.3 | 3.6 | 0.64 | 7866 | 1.2 | −0.41 |
| 42 | 21410 | 3.3 | 3.5 | 0.69 | 8122 | 1.3 | −0.34 |
| 43 | 19521 | 2.8 | 2.6 | 0.58 | 9891 | 1.3 | −0.51 |
| 44 | 18233 | 2.8 | 2.6 | 0.62 | 9936 | 1.4 | −0.45 |
| 45 | 19710 | 2.6 | 2.2 | 0.54 | 11250 | 1.3 | −0.58 |
| 46 | 18510 | 2.6 | 2.2 | 0.61 | 11406 | 1.3 | −0.47 |
| 47 | 15207 | 2.5 | 2.1 | 0.72 | 11633 | 1.6 | −0.28 |
| 48 | 17374 | 2.4 | 1.9 | 0.62 | 12784 | 1.4 | −0.44 |
| 49 | 20022 | 2.7 | 2.7 | 0.61 | 9295 | 1.3 | −0.46 |
| 50 | 19304 | 2.4 | 2.0 | 0.57 | 11428 | 1.2 | −0.53 |
| 51 | 17220 | 2.4 | 2.0 | 0.65 | 11778 | 1.3 | −0.40 |
| 52 | 18140 | 2.2 | 1.7 | 0.59 | 12842 | 1.2 | −0.50 |
| 53 | 16123 | 2.2 | 1.7 | 0.66 | 13224 | 1.4 | −0.38 |
| 54 | 18670 | 2.5 | 2.1 | 0.64 | 11034 | 1.3 | −0.41 |
| 55 | 15873 | 2.3 | 1.9 | 0.73 | 11849 | 1.4 | −0.26 |
| 56 | 27161 | 2.8 | 2.9 | 0.65 | 8771 | 0.9 | −0.40 |
| 57 | 22208 | 2.4 | 2.1 | 0.78 | 10971 | 1.0 | −0.18 |
| 58 | 24006 | 2.6 | 2.6 | 0.61 | 9004 | 1.0 | −0.47 |

TABLE 1-continued

| Emb. | $N2_{R/L}$ (RPM) | $L_{CORE}/D_{CORE}$ | HSR | HST | $N1_{R/L}$ (RPM) | $HSR_{LP}$ | LST |
|---|---|---|---|---|---|---|---|
| 59 | 20495 | 2.3 | 1.9 | 0.64 | 11554 | 1.1 | −0.41 |
| 60 | 17397 | 2.1 | 1.7 | 0.73 | 12849 | 1.2 | −0.26 |
| 61 | 24405 | 2.3 | 2.1 | 0.49 | 9321 | 0.8 | −0.67 |
| 62 | 18478 | 2.2 | 1.8 | 0.74 | 12364 | 1.2 | −0.25 |
| 63 | 19700 | 2.3 | 2.0 | 0.61 | 10906 | 1.1 | −0.47 |
| 64 | 20730 | 2.5 | 2.2 | 0.77 | 8367 | 0.9 | −0.20 |
| 65 | 26513 | 3.0 | 3.5 | 0.58 | 8624 | 1.1 | −0.52 |
| 66 | 20516 | 2.8 | 2.7 | 0.69 | 8012 | 1.1 | −0.33 |
| 67 | 27440 | 3.1 | 3.4 | 0.61 | 9166 | 1.1 | −0.46 |
| 68 | 22948 | 2.8 | 2.7 | 0.58 | 9942 | 1.2 | −0.51 |
| 69 | 23902 | 2.7 | 2.8 | 0.64 | 9569 | 1.1 | −0.41 |
| 70 | 23444 | 2.9 | 2.9 | 0.53 | 6816 | 0.9 | −0.59 |
| 71 | 22409 | 2.4 | 2.1 | 0.67 | 8736 | 0.8 | −0.36 |
| 72 | 26430 | 2.8 | 2.9 | 0.59 | 7546 | 0.8 | −0.50 |
| 73 | 24926 | 3.2 | 3.5 | 0.65 | 9124 | 1.3 | −0.40 |
| 74 | 24030 | 2.9 | 3.0 | 0.72 | 7481 | 0.9 | −0.28 |
| 75 | 24497 | 3.1 | 3.4 | 0.73 | 8976 | 1.2 | −0.27 |
| 76 | 25286 | 3.0 | 3.3 | 0.61 | 9854 | 1.3 | −0.46 |
| 77 | 27176 | 2.9 | 3.2 | 0.49 | 6886 | 0.8 | −0.66 |
| 78 | 24306 | 3.1 | 3.1 | 0.72 | 10523 | 1.4 | −0.28 |
| 79 | 21613 | 2.4 | 2.0 | 0.66 | 9631 | 0.9 | −0.38 |
| 80 | 27294 | 3.4 | 4.0 | 0.70 | 8494 | 1.2 | −0.31 |
| 81 | 26052 | 3.6 | 4.2 | 0.71 | 8157 | 1.3 | −0.31 |
| 82 | 26029 | 3.5 | 4.2 | 0.67 | 8882 | 1.4 | −0.37 |
| 83 | 21762 | 2.7 | 2.6 | 0.72 | 7908 | 0.9 | −0.29 |
| 84 | 24839 | 3.4 | 3.8 | 0.60 | 8481 | 1.3 | −0.48 |
| 85 | 25546 | 3.1 | 3.4 | 0.54 | 9088 | 1.2 | −0.57 |
| 86 | 23396 | 3.0 | 3.2 | 0.78 | 10436 | 1.4 | −0.19 |
| 87 | 21419 | 2.7 | 2.5 | 0.76 | 8521 | 1.0 | −0.21 |
| 88 | 26095 | 3.1 | 3.4 | 0.70 | 9709 | 1.3 | −0.32 |
| 89 | 23364 | 2.9 | 2.9 | 0.72 | 9835 | 1.2 | −0.28 |
| 90 | 24653 | 3.4 | 3.9 | 0.74 | 8923 | 1.4 | −0.25 |
| 91 | 23589 | 3.3 | 3.7 | 0.59 | 8376 | 1.3 | −0.50 |
| 92 | 20805 | 2.7 | 2.5 | 0.80 | 8693 | 1.0 | −0.15 |
| 93 | 23344 | 3.2 | 3.6 | 0.60 | 6345 | 1.0 | −0.48 |
| 94 | 26303 | 3.4 | 4.0 | 0.72 | 8481 | 1.3 | −0.29 |
| 95 | 23050 | 2.7 | 2.5 | 0.71 | 8264 | 0.9 | −0.30 |
| 96 | 23094 | 3.3 | 3.6 | 0.65 | 8411 | 1.3 | −0.39 |
| 97 | 24334 | 3.4 | 3.8 | 0.72 | 7411 | 1.2 | −0.29 |
| 98 | 24109 | 2.8 | 2.8 | 0.73 | 9936 | 1.2 | −0.26 |
| 99 | 27525 | 3.1 | 3.5 | 0.65 | 8938 | 1.1 | −0.39 |
| 100 | 26067 | 2.8 | 3.1 | 0.49 | 7071 | 0.8 | −0.66 |
| 101 | 24924 | 3.1 | 3.4 | 0.52 | 9768 | 1.3 | −0.60 |
| 102 | 25797 | 3.6 | 4.3 | 0.70 | 8334 | 1.4 | −0.31 |
| 103 | 24704 | 3.4 | 4.0 | 0.65 | 8037 | 1.3 | −0.40 |
| 104 | 26645 | 3.4 | 3.8 | 0.61 | 9325 | 1.3 | −0.46 |
| 105 | 23578 | 3.3 | 3.7 | 0.71 | 8428 | 1.3 | −0.30 |
| 106 | 27652 | 3.4 | 3.9 | 0.66 | 8802 | 1.2 | −0.38 |
| 107 | 21015 | 3.1 | 3.3 | 0.66 | 8078 | 1.3 | −0.39 |
| 108 | 24454 | 2.7 | 2.6 | 0.66 | 9936 | 1.1 | −0.38 |
| 109 | 25294 | 2.8 | 2.9 | 0.68 | 9283 | 1.1 | −0.35 |
| 110 | 24002 | 3.3 | 3.8 | 0.68 | 8082 | 1.3 | −0.35 |
| 111 | 25956 | 3.2 | 3.6 | 0.62 | 9610 | 1.3 | −0.45 |
| 112 | 23911 | 3.2 | 3.5 | 0.69 | 8746 | 1.3 | −0.33 |
| 113 | 24993 | 3.1 | 3.3 | 0.55 | 6672 | 0.9 | −0.56 |
| 114 | 24106 | 2.8 | 2.8 | 0.64 | 7524 | 0.9 | −0.42 |

TABLE 1-continued

| Emb. | $N2_{R/L}$ (RPM) | $L_{CORE}/D_{CORE}$ | HSR | HST | $N1_{R/L}$ (RPM) | $HSR_{LP}$ | LST |
|---|---|---|---|---|---|---|---|
| 115 | 26699 | 3.1 | 3.6 | 0.59 | 7611 | 1.0 | −0.49 |
| 116 | 24229 | 2.9 | 3.2 | 0.65 | 8541 | 1.1 | −0.39 |
| 117 | 21483 | 2.6 | 2.4 | 0.68 | 7855 | 0.9 | −0.34 |
| 118 | 23965 | 3.0 | 3.2 | 0.64 | 8443 | 1.1 | −0.42 |
| 119 | 26550 | 2.9 | 3.1 | 0.53 | 7813 | 0.9 | −0.59 |
| 120 | 24214 | 3.1 | 3.2 | 0.61 | 8266 | 1.1 | −0.46 |
| 121 | 32209 | 3.8 | 4.5 | 0.73 | 8771 | 1.2 | −0.27 |
| 122 | 30420 | 3.7 | 4.3 | 0.72 | 8771 | 1.2 | −0.28 |
| 123 | 32209 | 3.7 | 4.4 | 0.73 | 8771 | 1.2 | −0.27 |
| 124 | 29302 | 3.4 | 3.6 | 0.58 | 8771 | 1.1 | −0.51 |
| 125 | 29982 | 3.6 | 4.0 | 0.64 | 8771 | 1.2 | −0.41 |
| 126 | 28112 | 3.7 | 4.3 | 0.69 | 8771 | 1.3 | −0.33 |
| 127 | 28852 | 3.9 | 4.8 | 0.79 | 8771 | 1.5 | −0.17 |
| 128 | 27120 | 3.9 | 4.6 | 0.75 | 9745 | 1.7 | −0.23 |
| 129 | 28059 | 3.6 | 4.0 | 0.69 | 8771 | 1.2 | −0.33 |
| 130 | 30335 | 3.6 | 4.1 | 0.67 | 7894 | 1.1 | −0.36 |
| 131 | 28034 | 3.8 | 4.6 | 0.76 | 8771 | 1.4 | −0.21 |
| 132 | 19914 | 3.6 | 4.5 | 0.77 | 9346 | 2.1 | −0.20 |
| 133 | 24039 | 3.4 | 4.2 | 0.69 | 9346 | 1.6 | −0.32 |
| 134 | 20133 | 3.4 | 4.1 | 0.69 | 9346 | 1.9 | −0.34 |
| 135 | 23255 | 3.1 | 3.3 | 0.67 | 9346 | 1.3 | −0.37 |
| 136 | 23344 | 3.3 | 3.8 | 0.71 | 9346 | 1.5 | −0.30 |
| 137 | 20183 | 3.8 | 4.1 | 0.66 | 9346 | 1.9 | −0.38 |
| 138 | 28788 | 3.9 | 4.1 | 0.74 | 9346 | 1.3 | −0.24 |
| 139 | 23444 | 3.1 | 3.5 | 0.64 | 9346 | 1.4 | −0.41 |
| 140 | 23344 | 3.5 | 4.1 | 0.69 | 9346 | 1.6 | −0.33 |
| 141 | 25626 | 3.8 | 4.9 | 0.79 | 9346 | 1.8 | −0.16 |
| 142 | 23344 | 3.7 | 4.8 | 0.78 | 9346 | 1.9 | −0.19 |
| 143 | 23344 | 3.3 | 3.8 | 0.78 | 9346 | 1.5 | −0.19 |
| 144 | 23344 | 3.5 | 4.5 | 0.74 | 9346 | 1.8 | −0.25 |
| 145 | 28788 | 4.0 | 4.4 | 0.73 | 9346 | 1.4 | −0.26 |

With reference to TABLE 1, $N2_{R/L}$ is in a range from 10,580 RPM to 35,788 RPM, HSR is in a range from 1.5 to 6.2, HST is in a range from 0.49 to 0.8, N1R/L is in a range from 6,345 RPM to 13,225 RPM, $HSR_{LP}$ is in a range from 0.8 to 2.1, and LST is in a range from −0.67 to −0.15.

TABLE 2 lists embodiments of the HP compressor and the HP shaft along with the associated HSR and $L_{CORE}/D_{CORE}$ values of the HP compressor and the HP shaft. The embodiments inform of the dimensions or qualities of the HP compressor and the HP shaft that are believed reasonable and practical for the HP compressor and the HP shaft for providing a balance among improving the third mode margin of the HP shaft, without overly reducing performance of the HP compressor and/or the HP turbine. In other words, the HSR and the $L_{CORE}/D_{CORE}$ ratio indicates the operating ranges of interest, taking into account the constraints in which the HP compressor operates, e.g., the HP compressor inlet temperature and the HP compressor inlet corrected flow, that have not been previously considered in HP compressor and HP shaft designs, as detailed above.

TABLE 2

| Emb. | $FN_{T/O}$ (lbf) | $EGT_{T/O}$ (° C.) | $N2_{R/L}$ (RPM) | $OPR_{T/O}$ | $N_{Stg}$ | $R_{TIP,EX}$ (in) | $R_{HUB,EX}$ (in) | $A_{EX}$ (in$^2$) | $L_{CORE}$ (in) | $L_{CORE}/D_{CORE}$ | HSR | $HSP_X$ |
|---|---|---|---|---|---|---|---|---|---|---|---|---|
| 1 | 35940 | 1113 | 24788 | 49.5 | 10 | 6.9 | 6.39 | 21 | 46.5 | 3.4 | 3.9 | 9.3 |
| 2 | 36228 | 1113 | 23020 | 44.1 | 9 | 7.6 | 7.1 | 22 | 43.9 | 2.9 | 2.9 | 10.8 |
| 3 | 36228 | 1175 | 22481 | 41.8 | 10 | 7.9 | 7.39 | 22 | 46.2 | 2.9 | 3.1 | 8.5 |
| 4 | 36228 | 1175 | 22417 | 40.7 | 10 | 7.7 | 7.26 | 22 | 46.8 | 3.0 | 3.2 | 7.7 |
| 5 | 36228 | 1113 | 22246 | 44.1 | 9 | 7.8 | 7.31 | 23 | 43 | 2.8 | 2.6 | 12.2 |
| 6 | 36228 | 1113 | 20928 | 44.1 | 10 | 8 | 7.43 | 29 | 46.2 | 2.9 | 2.8 | 15.1 |
| 7 | 36228 | 1113 | 19967 | 44.1 | 11 | 8.4 | 7.78 | 32 | 47.2 | 2.8 | 2.6 | 15 |
| 8 | 3628 | 1113 | 21281 | 44.1 | 9 | 8.4 | 7.86 | 26 | 43.9 | 2.6 | 2.5 | 15.5 |
| 9 | 36228 | 1113 | 21695 | 44.1 | 9 | 8 | 7.5 | 25 | 44.9 | 2.8 | 2.7 | 13.5 |
| 10 | 39515 | 1113 | 19922 | 44.1 | 9 | 8.4 | 7.8 | 32 | 49.8 | 3.0 | 2.9 | 20.6 |
| 11 | 39515 | 1113 | 20809 | 44.1 | 8 | 8.8 | 8.11 | 34 | 47.7 | 2.7 | 2.7 | 30.4 |
| 12 | 27633 | 1113 | 20809 | 37.4 | 8 | 8.8 | 8.11 | 34 | 43.7 | 2.5 | 2.3 | 36.9 |
| 13 | 19324 | 1113 | 20809 | 31.7 | 8 | 8.8 | 8.11 | 34 | 39.7 | 2.3 | 1.9 | 44.7 |

TABLE 2-continued

| Emb. | $FN_{T/O}$ (lbf) | $EGT_{T/O}$ (° C.) | $N2_{R/L}$ (RPM) | $OPR_{T/O}$ | $N_{Sig}$ | $R_{TIP,EX}$ (in) | $R_{HUB,EX}$ (in) | $A_{EX}$ (in²) | $L_{CORE}$ (in) | $L_{CORE}/D_{CORE}$ | HSR | $HSP_X$ |
|---|---|---|---|---|---|---|---|---|---|---|---|---|
| 14 | 18124 | 1113 | 35788 | 40.9 | 9 | 4.7 | 4.31 | 12 | 40.3 | 4.3 | 6.2 | 5.7 |
| 15 | 12674 | 1113 | 35788 | 34.6 | 9 | 4.7 | 4.31 | 12 | 38.2 | 4.0 | 5.5 | 6.9 |
| 16 | 75161 | 1113 | 12306 | 47.8 | 10 | 13 | 12.57 | 68 | 56.2 | 2.1 | 1.5 | 43 |
| 17 | 107480 | 1113 | 10580 | 56.4 | 10 | 16 | 14.85 | 95 | 66.8 | 2.1 | 1.5 | 69.1 |
| 18 | 25247 | 1063 | 24181 | 44.9 | 8 | 7.4 | 6.83 | 24 | 40.9 | 2.8 | 2.7 | 24.2 |
| 19 | 25288 | 1080 | 23523 | 41.7 | 8 | 7.6 | 7.06 | 26 | 41.7 | 2.7 | 2.7 | 25.4 |
| 20 | 29198 | 1158 | 18378 | 32.5 | 8 | 9.2 | 8.7 | 30 | 40.9 | 2.2 | 1.7 | 23.4 |
| 21 | 26169 | 1208 | 18401 | 26.3 | 8 | 9.2 | 8.6 | 34 | 41.7 | 2.3 | 1.7 | 26 |
| 22 | 23249 | 1088 | 21259 | 32.5 | 8 | 8.2 | 7.59 | 28 | 40.9 | 2.5 | 2.2 | 25.7 |
| 23 | 29699 | 1071 | 23255 | 53.5 | 9 | 7.4 | 6.94 | 22 | 41.7 | 2.8 | 2.8 | 16.2 |
| 24 | 20081 | 1073 | 20398 | 32.5 | 9 | 8.2 | 7.72 | 26 | 40.9 | 2.5 | 2.1 | 19.5 |
| 25 | 27940 | 1102 | 24432 | 62.9 | 9 | 7.4 | 6.93 | 19 | 41.7 | 2.8 | 2.9 | 14.8 |
| 26 | 24574 | 1074 | 19914 | 53.5 | 10 | 8.6 | 8.3 | 18 | 41.7 | 2.4 | 2 | 10.1 |
| 27 | 28698 | 1119 | 19790 | 53.4 | 10 | 8.5 | 8.12 | 19 | 40.9 | 2.4 | 2 | 10.2 |
| 28 | 22111 | 1160 | 24618 | 53.5 | 10 | 7 | 6.67 | 15 | 41.7 | 3.0 | 3.1 | 8.4 |
| 29 | 24668 | 1079 | 23073 | 62.9 | 10 | 7.5 | 7.17 | 16 | 40.9 | 2.7 | 2.6 | 9.7 |
| 30 | 25477 | 1186 | 24152 | 62.9 | 10 | 7.2 | 6.83 | 15 | 41.7 | 2.9 | 2.9 | 7.6 |
| 31 | 26508 | 1103 | 24437 | 82 | 10 | 7.2 | 6.93 | 13 | 40.9 | 2.8 | 2.8 | 8.1 |
| 32 | 31781 | 1128 | 23043 | 62.9 | 10 | 7.7 | 7.3 | 20 | 41.7 | 2.7 | 2.6 | 11.7 |
| 33 | 29444 | 1134 | 20310 | 34.9 | 8 | 8.6 | 8.06 | 29 | 42.4 | 2.5 | 2.1 | 22.3 |
| 34 | 25868 | 1165 | 23662 | 40.6 | 8 | 7.4 | 6.86 | 22 | 40.3 | 2.7 | 2.6 | 17.3 |
| 35 | 25169 | 1135 | 24039 | 51.2 | 9 | 7.4 | 7.03 | 18 | 41.9 | 2.8 | 2.8 | 12.5 |
| 36 | 29459 | 1107 | 20133 | 43 | 9 | 8.7 | 8.16 | 26 | 44.5 | 2.6 | 2.3 | 17.7 |
| 37 | 30518 | 1065 | 20410 | 58.8 | 10 | 8.7 | 8.28 | 22 | 47 | 2.7 | 2.6 | 13.9 |
| 38 | 25749 | 1069 | 22900 | 64.6 | 10 | 7.8 | 7.4 | 18 | 45.4 | 2.9 | 3 | 11.6 |
| 39 | 18136 | 1113 | 28164 | 40.6 | 10 | 5.8 | 5.48 | 11 | 41.9 | 3.6 | 4.3 | 4.3 |
| 40 | 36229 | 1113 | 25626 | 40.7 | 9 | 6.6 | 6.03 | 24 | 48.3 | 3.6 | 4.5 | 11.4 |
| 41 | 36254 | 1113 | 23225 | 40.6 | 10 | 7.2 | 6.66 | 23 | 47.3 | 3.3 | 3.6 | 8.8 |
| 42 | 36253 | 1113 | 21410 | 40.4 | 10 | 7.7 | 7.23 | 23 | 50.3 | 3.3 | 3.5 | 8.6 |
| 43 | 52524 | 1113 | 19521 | 40.7 | 9 | 8.6 | 7.92 | 34 | 48.2 | 2.8 | 2.6 | 16.5 |
| 44 | 52523 | 1113 | 18233 | 41 | 9 | 9.1 | 8.48 | 34 | 51.2 | 2.8 | 2.6 | 16.6 |
| 45 | 52525 | 1113 | 19710 | 40.1 | 9 | 8.5 | 7.85 | 36 | 43.7 | 2.6 | 2.2 | 17.7 |
| 46 | 52561 | 1113 | 18510 | 40.7 | 10 | 9 | 8.36 | 35 | 46 | 2.6 | 2.2 | 13.9 |
| 47 | 52558 | 1113 | 15207 | 40.1 | 10 | 11 | 10.17 | 34 | 54.1 | 2.5 | 2.1 | 12.7 |
| 48 | 52560 | 1113 | 17374 | 40.6 | 10 | 9.5 | 8.9 | 34 | 45.2 | 2.4 | 1.9 | 13.1 |
| 49 | 52523 | 1113 | 20022 | 40.8 | 9 | 8.9 | 8.3 | 34 | 49 | 2.7 | 2.7 | 16.8 |
| 50 | 52524 | 1113 | 19304 | 40.8 | 9 | 9.3 | 8.61 | 36 | 44.2 | 2.4 | 2 | 18.2 |
| 51 | 52522 | 1113 | 17220 | 40.9 | 9 | 10 | 9.65 | 34 | 48.1 | 2.4 | 2 | 16.7 |
| 52 | 52523 | 1113 | 18140 | 40.8 | 9 | 9.8 | 9.16 | 35 | 43.2 | 2.2 | 1.7 | 17.1 |
| 53 | 52522 | 1113 | 16123 | 40.8 | 9 | 11 | 10.31 | 33 | 47.2 | 2.2 | 1.7 | 15.8 |
| 54 | 52560 | 1113 | 18670 | 40.7 | 10 | 9.5 | 8.9 | 35 | 46.7 | 2.5 | 2.1 | 14 |
| 55 | 52558 | 1113 | 15873 | 39.9 | 10 | 11 | 10.47 | 34 | 51.5 | 2.3 | 1.9 | 13.3 |
| 56 | 18124 | 1113 | 27161 | 40.8 | 9 | 6.7 | 6.42 | 12 | 37.6 | 2.8 | 2.9 | 5.7 |
| 57 | 18136 | 1113 | 22208 | 39.4 | 10 | 8.3 | 8.04 | 12 | 39.4 | 2.4 | 2.1 | 4.7 |
| 58 | 36228 | 1113 | 54006 | 40.9 | 9 | 7.9 | 7.4 | 24 | 41.6 | 2.6 | 2.6 | 11.8 |
| 59 | 36228 | 1113 | 20495 | 41 | 9 | 9.1 | 8.67 | 24 | 41.3 | 2.3 | 1.9 | 12.1 |
| 60 | 36228 | 1113 | 17397 | 40.2 | 9 | 11 | 10.21 | 24 | 45 | 2.1 | 1.7 | 11.4 |
| 61 | 36230 | 1113 | 24405 | 40.1 | 9 | 7.8 | 7.28 | 27 | 36.4 | 2.3 | 2.1 | 14.4 |
| 62 | 36253 | 1113 | 18478 | 39.8 | 10 | 10 | 9.61 | 24 | 43.6 | 2.2 | 1.8 | 9.5 |
| 63 | 52523 | 1113 | 19700 | 40.9 | 9 | 9.6 | 9.02 | 36 | 44.7 | 2.3 | 2 | 17.9 |
| 64 | 29791 | 1141 | 20730 | 46.7 | 10 | 8.7 | 8.42 | 16 | 42.9 | 2.5 | 2.2 | 5.6 |
| 65 | 38564 | 1123 | 26513 | 48.5 | 8 | 7.1 | 6.58 | 21 | 43.1 | 3.0 | 3.5 | 13 |
| 66 | 41861 | 1258 | 20516 | 39.3 | 10 | 8.3 | 7.81 | 22 | 46.9 | 2.8 | 2.7 | 6.7 |
| 67 | 34695 | 1249 | 27440 | 40.3 | 9 | 6.7 | 6.2 | 19 | 40.8 | 3.1 | 3.4 | 7.4 |
| 68 | 45080 | 1187 | 22948 | 40.2 | 9 | 7.6 | 6.99 | 26 | 42.5 | 2.8 | 2.7 | 11.1 |
| 69 | 38835 | 1252 | 23902 | 42.3 | 8 | 7.8 | 7.37 | 19 | 42.6 | 2.7 | 2.8 | 9.4 |
| 70 | 41411 | 1128 | 23444 | 39.3 | 8 | 7.6 | 7 | 29 | 43.7 | 2.9 | 2.9 | 17.7 |
| 71 | 40010 | 1281 | 22409 | 44.2 | 9 | 8.3 | 7.93 | 18 | 39.9 | 2.4 | 2.1 | 6.8 |
| 72 | 34589 | 1261 | 26430 | 40.1 | 8 | 7.1 | 6.62 | 19 | 39 | 2.8 | 2.9 | 9.5 |
| 73 | 36392 | 1184 | 24926 | 45.2 | 10 | 6.7 | 6.29 | 18 | 43.6 | 3.2 | 3.5 | 6.1 |
| 74 | 29097 | 1266 | 24030 | 46.7 | 9 | 7.4 | 7.07 | 13 | 42.5 | 2.9 | 3 | 5.1 |
| 75 | 29975 | 1273 | 24497 | 47.3 | 10 | 7.1 | 6.77 | 13 | 44.3 | 3.1 | 3.4 | 4 |
| 76 | 35983 | 1230 | 25286 | 38.4 | 8 | 7.1 | 6.62 | 21 | 43.2 | 3.0 | 3.3 | 10.3 |
| 77 | 35202 | 1136 | 27176 | 39.2 | 8 | 6.9 | 6.33 | 26 | 40.4 | 2.9 | 3.1 | 16.8 |
| 78 | 28834 | 1252 | 24306 | 42.3 | 10 | 6.9 | 6.54 | 14 | 42.2 | 3.1 | 3.1 | 4.2 |
| 79 | 38443 | 1282 | 21613 | 38.2 | 9 | 8.5 | 8.13 | 20 | 40.2 | 2.4 | 2 | 7.5 |
| 80 | 27754 | 1263 | 27294 | 43.6 | 10 | 6.2 | 5.82 | 13 | 42.4 | 3.4 | 4 | 4.1 |
| 81 | 27382 | 1156 | 26052 | 43.3 | 10 | 6.4 | 5.96 | 15 | 45.4 | 3.6 | 4.2 | 5.4 |
| 82 | 34118 | 1225 | 26029 | 48.9 | 10 | 6.4 | 5.99 | 15 | 45.2 | 3.5 | 4.2 | 4.8 |
| 83 | 41362 | 1282 | 21762 | 48.9 | 10 | 8 | 7.65 | 17 | 43.3 | 2.7 | 2.6 | 4.9 |
| 84 | 33372 | 1118 | 24839 | 44.3 | 10 | 6.8 | 6.35 | 20 | 46 | 3.4 | 3.8 | 7.9 |
| 85 | 44425 | 1118 | 25546 | 43.2 | 9 | 7 | 6.29 | 28 | 43.2 | 3.1 | 3.4 | 13.4 |
| 86 | 28190 | 1269 | 23396 | 45.3 | 10 | 7.5 | 7.19 | 13 | 45.3 | 3.0 | 3.2 | 3.8 |
| 87 | 35231 | 1273 | 21419 | 47.9 | 10 | 8.1 | 7.83 | 15 | 43.4 | 2.7 | 2.5 | 4.3 |
| 88 | 28272 | 1262 | 26095 | 44.8 | 10 | 6.7 | 6.33 | 13 | 41.4 | 3.1 | 3.4 | 4.1 |
| 89 | 42416 | 1282 | 23364 | 48.5 | 10 | 7.6 | 7.26 | 17 | 43.9 | 2.9 | 2.9 | 4.9 |
| 90 | 28346 | 1263 | 24653 | 40 | 10 | 6.8 | 6.49 | 15 | 46.4 | 3.4 | 3.9 | 4.5 |

TABLE 2-continued

| Emb. | $FN_{T/O}$ (lbf) | $EGT_{T/O}$ (° C.) | $N2_{R/L}$ (RPM) | $OPR_{T/O}$ | $N_{Stg}$ | $R_{TIP,EX}$ (in) | $R_{HUB,EX}$ (in) | $A_{EX}$ (in²) | $L_{CORE}$ (in) | $L_{CORE}/D_{CORE}$ | HSR | $HSP_X$ |
|---|---|---|---|---|---|---|---|---|---|---|---|---|
| 91 | 43315 | 1115 | 23589 | 41.3 | 9 | 7.2 | 6.59 | 27 | 47.4 | 3.3 | 3.7 | 12.5 |
| 92 | 33540 | 1259 | 20805 | 47.8 | 10 | 8.5 | 8.24 | 14 | 45.2 | 2.7 | 2.5 | 4.3 |
| 93 | 42603 | 1139 | 23344 | 41.4 | 9 | 7.4 | 6.8 | 26 | 47.5 | 3.2 | 3.6 | 12.1 |
| 94 | 29583 | 1278 | 26303 | 47.6 | 10 | 6.5 | 6.13 | 13 | 44.3 | 3.4 | 4 | 3.8 |
| 95 | 31357 | 1281 | 23050 | 41.7 | 10 | 7.6 | 7.24 | 15 | 40.7 | 2.7 | 2.5 | 4.7 |
| 96 | 44345 | 1215 | 23094 | 42.4 | 10 | 7.3 | 6.78 | 23 | 47.5 | 3.3 | 3.6 | 7.2 |
| 97 | 36178 | 1233 | 24334 | 45.9 | 10 | 6.9 | 6.5 | 17 | 46.5 | 3.4 | 3.8 | 5.2 |
| 98 | 33158 | 1260 | 24109 | 46 | 10 | 7.4 | 7.02 | 15 | 41.6 | 2.8 | 2.8 | 4.4 |
| 99 | 32153 | 1279 | 27525 | 48.7 | 10 | 6.6 | 6.27 | 14 | 40.9 | 3.1 | 3.5 | 4.3 |
| 100 | 44003 | 1118 | 26067 | 48.4 | 8 | 7.4 | 6.78 | 26 | 41.9 | 2.8 | 3.1 | 17.6 |
| 101 | 42640 | 1127 | 24924 | 41.3 | 9 | 6.9 | 6.22 | 27 | 43 | 3.1 | 3.4 | 13.1 |
| 102 | 30510 | 1281 | 25797 | 39.3 | 10 | 6.4 | 6.02 | 16 | 46 | 3.6 | 4.3 | 4.7 |
| 103 | 39341 | 1137 | 24704 | 43.8 | 9 | 6.9 | 6.37 | 22 | 47.6 | 3.4 | 4 | 9.7 |
| 104 | 38354 | 1216 | 26645 | 43.6 | 10 | 6.3 | 5.83 | 19 | 42.8 | 3.4 | 3.8 | 6.3 |
| 105 | 39061 | 1277 | 23578 | 48.7 | 10 | 7 | 6.64 | 16 | 46.9 | 3.3 | 3.7 | 4.6 |
| 106 | 34146 | 1256 | 27652 | 45.3 | 10 | 6.2 | 5.83 | 16 | 41.9 | 3.4 | 3.9 | 4.9 |
| 107 | 44129 | 1158 | 21015 | 42.1 | 10 | 7.9 | 7.38 | 25 | 49.6 | 3.1 | 3.3 | 8.5 |
| 108 | 39281 | 1281 | 24454 | 47.1 | 9 | 7.5 | 7.13 | 17 | 40.3 | 2.7 | 2.6 | 6.1 |
| 109 | 27391 | 1213 | 25294 | 45 | 9 | 7.2 | 6.87 | 14 | 40.6 | 2.8 | 2.9 | 5.8 |
| 110 | 36428 | 1203 | 24002 | 43.8 | 10 | 7 | 6.61 | 19 | 47.1 | 3.3 | 3.8 | 6.2 |
| 111 | 45242 | 1281 | 25956 | 44.8 | 10 | 6.7 | 6.15 | 20 | 42.8 | 3.2 | 3.6 | 6.1 |
| 112 | 31468 | 1271 | 23911 | 46.1 | 10 | 6.9 | 6.55 | 14 | 44.7 | 3.2 | 3.5 | 4.2 |
| 113 | 44365 | 1118 | 24993 | 44.5 | 9 | 7 | 6.32 | 27 | 42.7 | 3.1 | 3.3 | 13.1 |
| 114 | 40875 | 1186 | 24106 | 46.7 | 8 | 7.7 | 7.31 | 20 | 42.6 | 2.8 | 2.8 | 11 |
| 115 | 38425 | 1246 | 26699 | 40.3 | 9 | 6.8 | 6.28 | 21 | 42.5 | 3.1 | 3.6 | 8.6 |
| 116 | 42939 | 1208 | 24229 | 44.4 | 8 | 7.6 | 7.14 | 21 | 44.7 | 2.9 | 3.2 | 10.8 |
| 117 | 38881 | 1139 | 21483 | 46.8 | 9 | 8.5 | 8.13 | 20 | 43.8 | 2.6 | 2.4 | 9.1 |
| 118 | 43139 | 1250 | 23965 | 43.5 | 10 | 7.3 | 6.8 | 21 | 44.3 | 3.0 | 3.2 | 6.5 |
| 119 | 36707 | 1195 | 26550 | 40.8 | 8 | 7.2 | 6.66 | 23 | 41.1 | 2.9 | 3.1 | 13 |
| 120 | 43047 | 1201 | 24214 | 42.7 | 10 | 7.2 | 6.65 | 23 | 43.8 | 3.1 | 3.2 | 7.7 |
| 121 | 18124 | 1113 | 32209 | 40.9 | 9 | 4.95 | 4.55 | 12 | 37.1 | 3.8 | 4.5 | 5.7 |
| 122 | 12674 | 1113 | 30420 | 41.6 | 9 | 5.20 | 4.82 | 12 | 38.2 | 3.7 | 4.3 | 8.2 |
| 123 | 18124 | 1113 | 32209 | 40.9 | 9 | 4.95 | 4.55 | 12 | 36.8 | 3.7 | 4.4 | 5.7 |
| 124 | 18125 | 1113 | 29302 | 40.3 | 9 | 5.39 | 5.01 | 12 | 36.4 | 3.4 | 3.6 | 5.1 |
| 125 | 18124 | 1113 | 29982 | 40.8 | 9 | 5.26 | 4.89 | 12 | 37.6 | 3.6 | 4.0 | 4.6 |
| 126 | 18124 | 1113 | 28112 | 41.0 | 9 | 5.56 | 5.22 | 11 | 41.2 | 3.7 | 4.3 | 4.4 |
| 127 | 18137 | 1113 | 28852 | 40.6 | 10 | 5.43 | 5.08 | 12 | 42.4 | 3.9 | 4.8 | 4.4 |
| 128 | 18136 | 1113 | 27120 | 52.7 | 10 | 5.74 | 5.41 | 12 | 44.3 | 3.9 | 4.6 | 5.7 |
| 129 | 18137 | 1113 | 28059 | 40.6 | 10 | 5.57 | 5.23 | 12 | 39.6 | 3.6 | 4.0 | 4.4 |
| 130 | 18124 | 1113 | 30335 | 41.1 | 9 | 5.21 | 4.84 | 12 | 37.3 | 3.6 | 4.1 | 4.7 |
| 131 | 18124 | 1113 | 28034 | 36.9 | 9 | 5.58 | 5.23 | 12 | 42.8 | 3.8 | 4.6 | 4.1 |
| 132 | 24574 | 1074 | 19914 | 53.5 | 10 | 8.64 | 8.30 | 18 | 62.2 | 3.6 | 4.5 | 10.1 |
| 133 | 25169 | 1135 | 24039 | 51.2 | 9 | 7.43 | 7.03 | 18 | 51.0 | 3.4 | 4.2 | 12.5 |
| 134 | 38011 | 1107 | 20133 | 43.0 | 9 | 8.65 | 8.16 | 26 | 59.0 | 3.4 | 4.1 | 13.7 |
| 135 | 29699 | 1071 | 23255 | 53.5 | 9 | 7.43 | 6.94 | 22 | 46.1 | 3.1 | 3.3 | 16.2 |
| 136 | 45593 | 1139 | 23344 | 36.1 | 8 | 7.62 | 7.00 | 29 | 50.0 | 3.3 | 3.8 | 14.8 |
| 137 | 25477 | 1186 | 20183 | 62.9 | 9 | 7.16 | 6.83 | 15 | 54.0 | 3.8 | 4.1 | 9.4 |
| 138 | 13600 | 1113 | 28788 | 42.1 | 8 | 4.73 | 4.31 | 12 | 36.8 | 3.9 | 4.1 | 9.8 |
| 139 | 41411 | 1128 | 23444 | 39.3 | 8 | 7.62 | 7.00 | 29 | 48.0 | 3.1 | 3.5 | 17.7 |
| 140 | 42603 | 1139 | 23344 | 48.7 | 9 | 7.39 | 6.80 | 26 | 51.0 | 3.5 | 4.1 | 14.2 |
| 141 | 30229 | 1113 | 25626 | 31.8 | 9 | 6.62 | 6.03 | 24 | 50.3 | 3.8 | 4.9 | 10.7 |
| 142 | 44695 | 1139 | 23344 | 36.1 | 9 | 7.62 | 7.00 | 29 | 56.0 | 3.7 | 4.8 | 11.9 |
| 143 | 41695 | 1139 | 23344 | 36.1 | 8 | 7.62 | 7.00 | 29 | 50.0 | 3.3 | 3.8 | 16.2 |
| 144 | 44695 | 1139 | 23344 | 40.7 | 9 | 7.62 | 7.00 | 29 | 54.0 | 3.5 | 4.5 | 13.5 |
| 145 | 12000 | 1113 | 28788 | 44.1 | 9 | 4.73 | 4.31 | 12 | 38.2 | 4.0 | 4.4 | 9.2 |

The ranges of $FN_{T/O}$, $N2_{R/L}$, $OPR_{T/O}$, $R_{HUB,EX}$, $A_{EX}$, $L_{CORE}$, and $L_{CORE}/D_{CORE}$ are detailed above. HSR is given by relationship (1) above and is from 1.5 to 6.2. The exhaust gas temperature (EGT) is from 1,063° C. to 1,282° C. at redline speeds of the HP shaft. The EGT is a measure of BPR of the turbine engine along with the fan diameter. The EGT is limited by material capability of the LP turbine inlet blades. For example, the LP turbine inlet blades can include metallic single crystal blades uncooled (e.g., minimum capability), cooled (+200° C.), or CMC blade uncooled (+100° C. to +150° C.). The fan diameter is a function of the thrust requirement, and the core size is decided by the EGT and the OPR. In general, lower $FN_{T/O}$, higher EGT, and/or higher $OPR_{T/O}$ results in lower core size (e.g., lower $L_{CORE}$ and lower $D_{CORE}$), but higher $L_{CORE}/D_{CORE}$, higher $N2_{R/L}$, and higher HSR, and, thus, making it more challenging to meet dynamics margins (e.g., Alford stability and/or third mode margin). Accordingly, embodiments 1 to 145 provide for lowering the core size, while accounting for the dynamics margins and overall engine performance.

Figure 17:
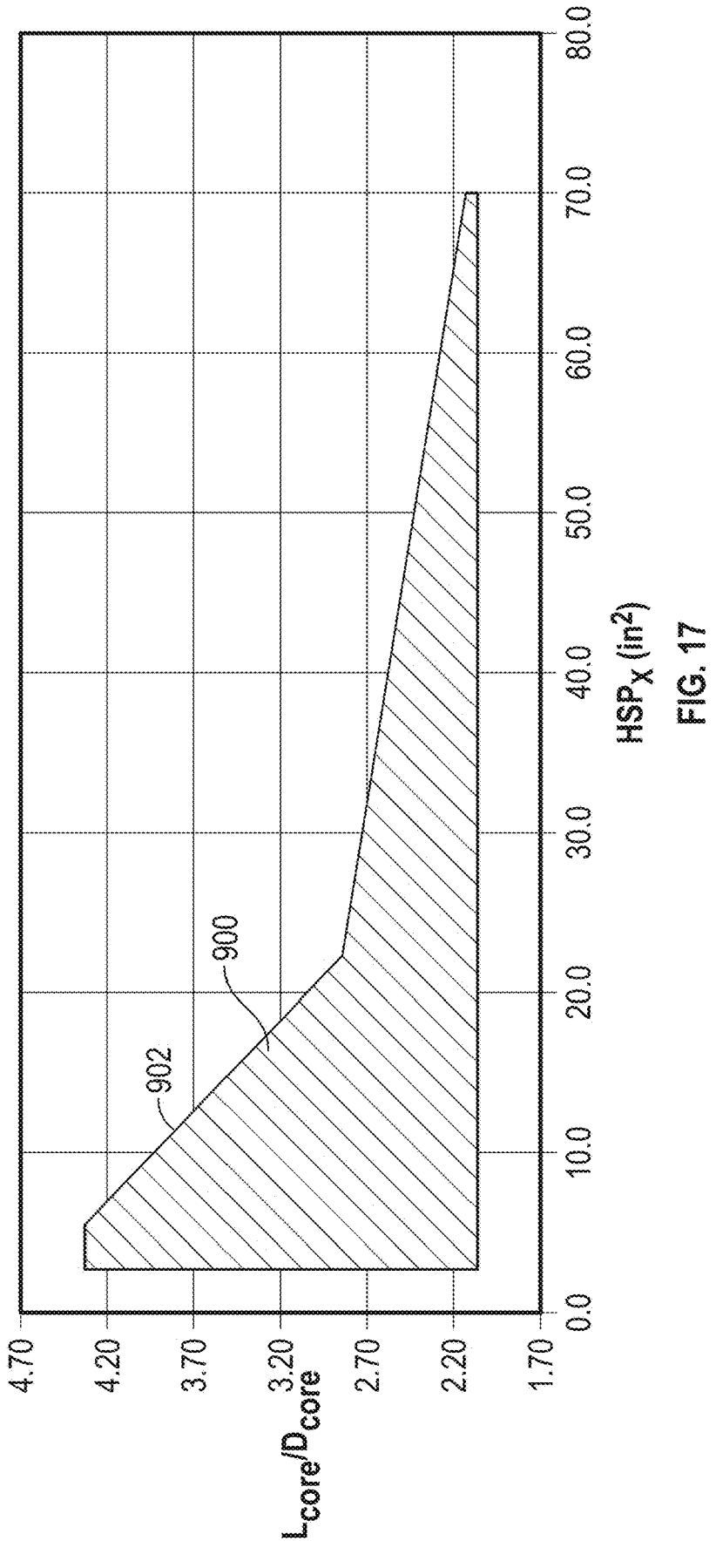
FIG. 17 represents, in graph form, a range of a high-speed shaft rating (HSR). In particular.

FIG. 17 represents, in graph form, the $L_{CORE}/D_{CORE}$ as a function of the $HSP_X$. $HSP_X$ is given by relationship (8) detailed above. $L_{CORE}/D_{CORE}$ is in a range from 2.1 to 4.3 and $HSP_X$ is in a range from 3.8 in² to 69.1 in². An area 900 represents the boundaries of $L_{CORE}/D_{CORE}$ and $HSP_X$. $L_{CORE}/D_{CORE}$ and $HSP_X$ are bounded by an upper bound 902. The upper bound 902 is given by (22):

$$\frac{L_{CORE}}{D_{CORE}} < MAX(4.8 - 0.088 * (HSP_X), 3.18 - 0.015 * (HSP_X)) \tag{22}$$

With reference to TABLE 2 and FIG. 17, in general, $L_{CORE}/D_{CORE}$ decreases as $HSP_X$ increases, and $L_{CORE}/D_{CORE}$ increases as $HSP_X$ decreases. $HSP_X$ increases with increased $A_{EX}$ and/or increases $OPR_{T/O}$, and decreases with increased $FN_{T/O}$. The area 900 shows the behavior of lower core size, leading to higher $L_{CORE}/D_{CORE}$ due to $L_{CORE}$ not scaling with flow size, as detailed above. For direct drive engines, reducing the core size leads to an increase in $L_{CORE}/D_{CORE}$ (e.g., up to 3.25), which has an effect on the dynamics margins, thereby limiting the design of the engine core. For geared engines (e.g., indirect drive), the $L_{CORE}/D_{CORE}$ is limited to about 3.0, which has been achieved with 8 stage compressors. The BPR can be increased in three ways: 1. Increased thrust from the same engine core size by increasing the fan size, 2. Smaller engine core size with increased OPR by increasing the LP compressor pressure ratio or increasing T25, or 3. Smaller engine core size with increased EGT. All three methods of increasing the BPR lead to lowering the $HSP_X$, thereby increasing $L_{CORE}/D_{CORE}$. To increase $L_{CORE}/D_{CORE}$ with minimal effects on the dynamics margins, the HP compressor tip radius ratio is increased, and the number of HP compressor stages is reduced. Additionally, smaller blade heights at the HP compressor exit can be utilized.

Accordingly, the area 900 illustrates feasible dynamics zone for higher stage count compressors with higher $L_{CORE}/D_{CORE}$ than engines without the benefit of the present disclosure (e.g., engines at lower $HSP_x$). This is achieved by balancing the HP compressor inlet temperature, corrected inlet flows, and higher HP compressor pressure ratios with the radius ratio.

Figure 18:
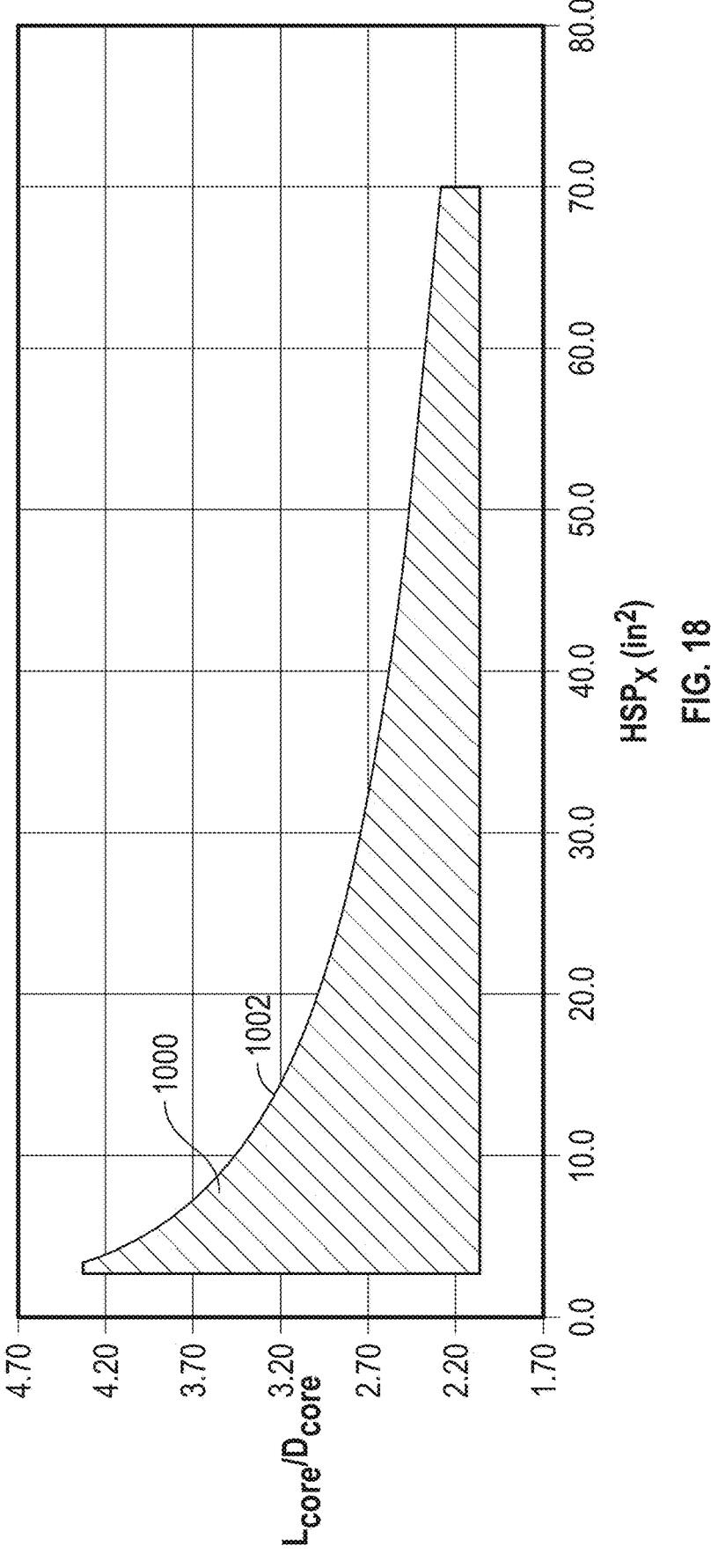
FIG. 18 represents, in graph form, a range of a high-speed shaft rating (HSR), according to another embodiment. In particular.

FIG. 18 represents, in graph form, the $L_{CORE}/D_{CORE}$ as a function of the $HSP_X$, according to another embodiment. $HSP_X$ is given by relationship (10) detailed above. $L_{CORE}/D_{CORE}$ is in a range from 2.1 to 4.3 and $HSP_X$ is in a range from 3.8 in$^2$ to 69.1 in$^2$. An area 1000 represents the boundaries of $L_{CORE}/D_{CORE}$ and $HSP_X$. $L_{CORE}/D_{CORE}$ and $HSP_X$ are bounded by an upper bound 1002. The upper bound 1002 is given by (23):

$$\frac{L_{CORE}}{D_{CORE}} < \frac{4.08}{(HSP_X - 8)^{0.14}} \tag{23}$$

With reference to TABLE 2 and FIG. 18, in general, $L_{CORE}/D_{CORE}$ decreases as $HSP_X$ increases, and $L_{CORE}/D_{CORE}$ increases as $HSP_X$ decreases, as detailed above. $HSP_X$ increases with increased $A_{EX}$ and/or increases $OPR_{T/O}$, and decreases with increased $FN_{T/O}$, as detailed above.

Figure 19:
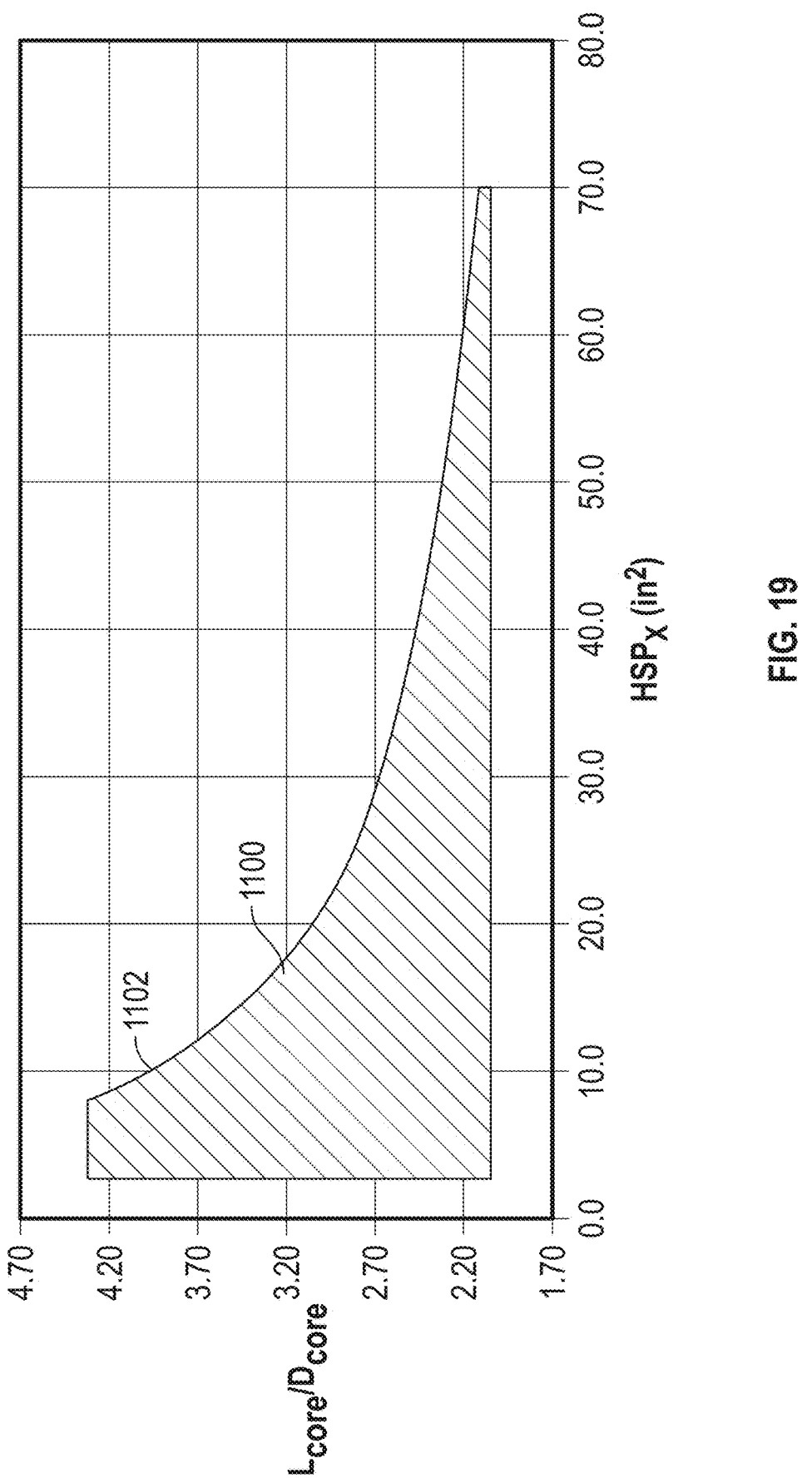
FIG. 19 represents, in graph form, a range of a high-speed shaft rating (HSR), according to another embodiment. In particular.

FIG. 19 represents, in graph form, the $L_{CORE}/D_{CORE}$ as a function of the $HSP_X$, according to another embodiment. $HSP_X$ is given by relationship (10) detailed above. $L_{CORE}/D_{CORE}$ is in a range from 2.1 to 4.3 and $HSP_X$ is in a range from 3.8 in$^2$ to 69.1 in$^2$. An area 1100 represents the boundaries of $L_{CORE}/D_{CORE}$ and $HSP_X$. $L_{CORE}/D_{CORE}$ and $HSP_X$ are bounded by an upper bound 1102. The upper bound 1102 is given by (24):

$$\frac{L_{CORE}}{D_{CORE}} < MAX\left(9.55 * (HSP_X)^{-0.38}, 6.95 * (HSP_X)^{-0.28}\right) \tag{24}$$

With reference to TABLE 2 and FIG. 19, in general, $L_{CORE}/D_{CORE}$ decreases as $HSP_X$ increases, and $L_{CORE}/D_{CORE}$ increases as $HSP_X$ decreases, as detailed above. $HSP_X$ increases with increased $A_{EX}$ and/or increases $OPR_{T/}$ $o$, and decreases with increased $FN_{T/O}$, as detailed above. The upper bound 1102 is given by $9.55*(HSP_X)^{-0.38}$ for values of $HSP_X$ from 3.8 in$^2$ to 25 in$^2$, and is given by $6.95*(HSP_X)^{-0.28}$ for values of $HSP_X$ from 25 in$^2$ to 69.1 in$^2$.

In general, the areas 900, 1000, and 1100 having the upper bounds 902, 1002, and 1102, respectively, provide for an improved engine having: 1. an enhanced engine performance (i.e., a higher thermodynamic performance meaning a lower specific fuel consumption at a given thrust level and at a given overall pressure ratio (OPR) of the turbine engine, and 2. a dynamics constraint that ensures the HP shaft avoids operating at, or near, the third mode of the HP shaft to avoid exciting the third mode of the HP shaft during normal operation of the turbine engine. The enhanced engine performance (higher thermodynamic cycle performance) of the present disclosure is achieved by the turbine engine having a higher bypass ratio by reducing the size of the engine core as compared to turbine engines that fall outside of the areas 900, 1000, and 1100. In particular, the enhanced engine performance is achieved by the turbine engine having: 1. an improved overall compression efficiency by moving the pressure ratio from the LP compressor to the HP compressor, 2. an improved HP turbine efficiency due to higher HP turbine inlet temperature, and 3. a reduced HP system weight due to a lower radius of the engine core by lowering the inlet radius ratio of the HP compressor.

The areas 900, 1000, and 1100 being bounded by the upper bounds 902, 1002, 1102 represent the enhanced engine performance. In particular, at a given value of $L_{CORE}/D_{CORE}$, the areas 900, 1000, and 1100 represent the largest engine core size at a given thrust level and at a given OPR that results in the enhanced engine performance (higher thermodynamic cycle performance) without overly sacrificing the engine performance. For example, if $L_{CORE}/D_{CORE}$ and $HSP_X$ (i.e., $HSP_X$ is a function of the exit area of the HP compressor, the OPR at takeoff, the sea-level static thrust at takeoff, and the number of stages in the HP compressor) are within the areas 900, 1000, and 1100, then the turbine engine has a lower engine core size (as represented by the exit area of the HP compressor in $HSP_X$), and, thus, a higher bypass ratio, for the given thrust level (as given in $HSP_X$) and the given OPR (as given in $HSP_X$), resulting in the enhanced engine performance (lower specific fuel consumption at the given thrust level and at the given OPR of the turbine engine.) If $L_{CORE}/D_{CORE}$ and $HSP_X$ are outside of the areas 900, 1000, and 1100, then the engine core size will be too large, resulting in poorer engine performance for the given thrust level and the given OPR.

The dynamics constraint (e.g., the third mode of the HP shaft) of the claimed invention is greater than −10% of the redline speed of the HP shaft for stable operating conditions and is given by equation (4d), discussed above. Additionally, the dynamics constraint of equation (4d) also ensures balancing with the first mode and the second mode of the HP shaft to meet dynamics requirements under all nominal conditions (the design point (e.g., cruise conditions) where the turbine engine is intended to normally perform at an optimum performance level) and off design conditions (conditions other than the design point, such as, low power operation (e.g., idle conditions, start conditions, etc.), transient operation, or non-standard ambient conditions or altitude). The stable operating conditions of the present disclosure are achieved by the turbine engine in embodiments 1 to 145 having a lower $L_{CORE}/D_{CORE}$ (HP shaft L/D) and a lower HP shaft redline speed due to higher HP compressor inlet corrected flow and lower HP compressor inlet temperature for a given thrust level and a given OPR.

The areas 900, 1000, and 1100 represent the dynamics constraint of equation (4d). In particular, if $L_{CORE}/D_{CORE}$ and $HSP_X$ are within the areas 900, 1000, and 1100, then the third mode will meet the required dynamics constraint of equation (4d) (being greater than –0.1), and, thus, the HP shaft will have stable operating conditions, and the third mode will not be excited. If $L_{CORE}/D_{CORE}$ and $HSP_X$ are outside of the areas 900, 1000, and 1100, then the third mode will not meet the required dynamics constraint of equation (4d) (being less than –0.1), and, thus, the third mode of the HP shaft will be excited during normal operation of the turbine engine, thereby resulting in excessive vibrations of the HP shaft. Thus, the areas 900, 1000, and 1100 provide for an improved turbine engine having enhanced engine performance (i.e., a lower specific fuel consumption at a given thrust level and at a given OPR of the turbine engine), while ensuring that the dynamics (e.g., the third mode of the HP shaft) are constrained to be greater than –10% of the redline speed to ensure stable operating conditions of the HP shaft without exciting the third mode, and balancing with the first mode and the second mode of the HP shaft during an entire operation of the turbine engine (including steady state conditions and transient conditions).

TABLE 3 lists embodiments of the HP compressor and the HP shaft along with the associated $HSP_{AR}$ values of the HP compressor and the HP shaft. The embodiments inform of the dimensions or qualities of the HP compressor and the HP shaft that are believed reasonable and practical for the HP compressor and the HP shaft for providing a balance among improving the third mode margin of the HP shaft, without overly reducing performance of the HP compressor and/or the HP turbine. In other words, the $HSP_{AR}$ indicates the operating range of interest, taking into account the constraints in which the HP compressor operates, e.g., the HP compressor inlet temperature and the HP compressor inlet corrected flow, that have not been previously considered in HP compressor and HP shaft designs, as detailed above.

TABLE 3

| Emb. | $FN_{T/O}$ (lbf) | $OPR_{T/O}$ | $N_{Stg}$ | $R_{HUB,IN}/R_{TIP,IN}$ | $R_{TIP,IN}$ (in) | $R_{TIP,EX}$ (in) | $A_{IN}$ (in²) | $A_{EX}$ (in²) | AR | $HSP_X$ (in²) | $HSP_{AR}$ |
|---|---|---|---|---|---|---|---|---|---|---|---|
| 1 | 35940 | 49.5 | 10 | 0.47 | 8.35 | 6.9 | 170 | 21 | 7.9 | 9.3 | 144 |
| 2 | 36228 | 44.1 | 9 | 0.56 | 8.68 | 7.58 | 162 | 22 | 7.3 | 10.8 | 87 |
| 3 | 36228 | 41.8 | 10 | 0.47 | 8.85 | 7.86 | 192 | 22 | 8.6 | 8.5 | 115 |
| 4 | 36228 | 40.7 | 10 | 0.47 | 8.6 | 7.72 | 181 | 22 | 8.4 | 7.7 | 118 |
| 5 | 36228 | 44.1 | 9 | 0.56 | 8.9 | 7.8 | 171 | 23 | 7.3 | 12.2 | 79 |
| 6 | 36228 | 44.1 | 10 | 0.56 | 10.25 | 8.03 | 227 | 29 | 7.8 | 15.1 | 97 |
| 7 | 36228 | 44.1 | 11 | 0.56 | 11.2 | 8.41 | 270 | 32 | 8.5 | 15 | 103 |
| 8 | 36228 | 44.1 | 9 | 0.56 | 9.4 | 8.38 | 190 | 26 | 7.2 | 15.5 | 70 |
| 9 | 36228 | 44.1 | 9 | 0.56 | 9.1 | 8.01 | 178 | 25 | 7.2 | 13.5 | 80 |
| 10 | 39515 | 44.1 | 9 | 0.56 | 10.35 | 8.43 | 230 | 32 | 7.2 | 20.6 | 93 |
| 11 | 39515 | 44.1 | 8 | 0.57 | 10.25 | 8.76 | 223 | 34 | 6.5 | 30.4 | 69 |
| 12 | 27633 | 37.4 | 8 | 0.57 | 9.69 | 8.76 | 199 | 34 | 5.8 | 36.9 | 50 |
| 13 | 19324 | 31.7 | 8 | 0.57 | 9.69 | 8.76 | 199 | 34 | 5.8 | 44.7 | 41 |
| 14 | 18124 | 40.9 | 9 | 0.4 | 5.68 | 4.73 | 85 | 12 | 7.2 | 5.7 | 228 |
| 15 | 12674 | 34.6 | 9 | 0.4 | 5.68 | 4.73 | 85 | 12 | 7.2 | 6.9 | 205 |
| 16 | 75161 | 47.8 | 10 | 0.4 | 13.98 | 13.4 | 516 | 68 | 7.6 | 43 | 54 |
| 17 | 107480 | 56.4 | 10 | 0.4 | 16.32 | 15.83 | 703 | 95 | 7.4 | 69.1 | 53 |
| 18 | 25247 | 44.9 | 8 | 0.52 | 8.02 | 7.37 | 148 | 24 | 6.1 | 24.2 | 68 |
| 19 | 25288 | 41.7 | 8 | 0.56 | 8.76 | 7.62 | 165 | 26 | 6.4 | 25.4 | 68 |
| 20 | 29198 | 32.5 | 8 | 0.57 | 10.07 | 9.24 | 213 | 30 | 7.1 | 23.4 | 48 |
| 21 | 26169 | 26.3 | 8 | 0.58 | 9.96 | 9.2 | 207 | 34 | 6.2 | 26 | 44 |
| 22 | 23249 | 32.5 | 8 | 0.54 | 9.2 | 8.17 | 190 | 28 | 6.7 | 25.7 | 61 |
| 23 | 29699 | 53.5 | 9 | 0.47 | 8.37 | 7.43 | 172 | 22 | 7.7 | 16.2 | 95 |
| 24 | 20081 | 32.5 | 9 | 0.54 | 9.09 | 8.23 | 184 | 26 | 7.1 | 19.5 | 63 |
| 25 | 27940 | 62.9 | 9 | 0.56 | 8.23 | 7.35 | 145 | 19 | 7.6 | 14.8 | 86 |
| 26 | 24574 | 53.5 | 10 | 0.5 | 9.06 | 8.64 | 194 | 18 | 10.9 | 10.1 | 92 |
| 27 | 28698 | 53.4 | 10 | 0.55 | 9.55 | 8.49 | 201 | 19 | 10.4 | 10.2 | 87 |
| 28 | 22111 | 53.5 | 10 | 0.46 | 7.39 | 7.03 | 136 | 15 | 8.8 | 8.4 | 118 |
| 29 | 24668 | 62.9 | 10 | 0.53 | 8.45 | 7.52 | 162 | 16 | 10.1 | 9.7 | 109 |
| 30 | 25477 | 62.9 | 10 | 0.54 | 7.91 | 7.16 | 139 | 15 | 9.6 | 7.6 | 116 |
| 31 | 26508 | 82 | 10 | 0.57 | 8.16 | 7.23 | 141 | 13 | 10.5 | 8.1 | 118 |
| 32 | 31781 | 62.9 | 10 | 0.43 | 8.21 | 7.73 | 173 | 20 | 8.6 | 11.7 | 99 |
| 33 | 29444 | 34.9 | 8 | 0.46 | 9.13 | 8.61 | 207 | 29 | 7.2 | 22.3 | 67 |
| 34 | 25868 | 40.6 | 8 | 0.52 | 8.11 | 7.35 | 151 | 22 | 6.9 | 17.3 | 76 |
| 35 | 25169 | 51.2 | 9 | 0.44 | 7.6 | 7.43 | 147 | 18 | 8 | 12.5 | 97 |
| 36 | 29459 | 43 | 9 | 0.47 | 9.12 | 8.65 | 202 | 26 | 7.8 | 17.7 | 77 |
| 37 | 30518 | 58.8 | 10 | 0.51 | 9.72 | 8.69 | 219 | 22 | 9.9 | 13.9 | 107 |
| 38 | 25749 | 64.6 | 10 | 0.55 | 9.01 | 7.77 | 177 | 18 | 10 | 11.6 | 123 |
| 39 | 18136 | 40.6 | 10 | 0.54 | 6.89 | 5.8 | 106 | 11 | 9.2 | 4.3 | 178 |
| 40 | 36229 | 40.7 | 9 | 0.4 | 7.95 | 6.62 | 167 | 24 | 7.1 | 11.4 | 163 |
| 41 | 36254 | 40.6 | 10 | 0.4 | 8.53 | 7.19 | 192 | 23 | 8.3 | 8.8 | 155 |
| 42 | 36253 | 40.4 | 10 | 0.4 | 9.03 | 7.71 | 215 | 23 | 9.4 | 8.6 | 171 |
| 43 | 52524 | 40.7 | 9 | 0.54 | 10.46 | 8.59 | 243 | 34 | 7.1 | 16.5 | 84 |
| 44 | 52523 | 41 | 9 | 0.54 | 10.97 | 9.1 | 268 | 34 | 7.8 | 16.6 | 93 |
| 45 | 52525 | 40.1 | 9 | 0.6 | 10.6 | 8.54 | 226 | 36 | 6.3 | 17.7 | 59 |
| 46 | 52561 | 40.7 | 10 | 0.54 | 10.91 | 9 | 265 | 35 | 7.6 | 13.9 | 74 |
| 47 | 52558 | 40.1 | 10 | 0.54 | 12.48 | 10.69 | 347 | 34 | 10.3 | 12.7 | 97 |
| 48 | 52560 | 40.6 | 10 | 0.6 | 11.55 | 9.49 | 268 | 34 | 7.9 | 13.1 | 63 |
| 49 | 52523 | 40.8 | 9 | 0.4 | 9.99 | 8.94 | 263 | 34 | 7.6 | 16.8 | 96 |
| 50 | 52524 | 40.8 | 9 | 0.54 | 10.57 | 9.25 | 249 | 36 | 6.9 | 18.2 | 57 |
| 51 | 52522 | 40.9 | 9 | 0.54 | 11.4 | 10.2 | 289 | 34 | 8.4 | 16.7 | 68 |
| 52 | 52523 | 40.8 | 9 | 0.6 | 11.17 | 9.75 | 251 | 35 | 7.2 | 17.1 | 49 |

TABLE 3-continued

| Emb. | $FN_{T/O}$ (lbf) | $OPR_{T/O}$ | $N_{Stg}$ | $R_{HUB,IN}/$ $R_{TIP,IN}$ | $R_{TIP,IN}$ (in) | $R_{TIP,EX}$ (in) | $A_{IN}$ (in²) | $A_{EX}$ (in²) | AR | $HSP_X$ (in²) | $HSP_{AR}$ |
|---|---|---|---|---|---|---|---|---|---|---|---|
| 53 | 52522 | 40.8 | 9 | 0.6 | 12.09 | 10.81 | 294 | 33 | 8.8 | 15.8 | 57 |
| 54 | 52560 | 40.7 | 10 | 0.4 | 10.55 | 9.51 | 294 | 35 | 8.4 | 14 | 84 |
| 55 | 52558 | 39.9 | 10 | 0.4 | 11.82 | 10.98 | 369 | 34 | 10.7 | 13.3 | 97 |
| 56 | 18124 | 40.8 | 9 | 0.6 | 7.06 | 6.71 | 100 | 12 | 8.5 | 5.7 | 88 |
| 57 | 18136 | 39.4 | 10 | 0.54 | 8.26 | 8.27 | 152 | 12 | 12.5 | 4.7 | 96 |
| 58 | 36228 | 40.9 | 9 | 0.4 | 8.32 | 7.9 | 182 | 24 | 7.6 | 11.8 | 86 |
| 59 | 36228 | 41 | 9 | 0.54 | 9.56 | 9.1 | 203 | 24 | 8.4 | 12.1 | 60 |
| 60 | 36228 | 40.2 | 9 | 0.54 | 10.72 | 10.57 | 256 | 24 | 10.8 | 11.4 | 67 |
| 61 | 36230 | 40.1 | 9 | 0.6 | 8.66 | 7.84 | 151 | 27 | 5.6 | 14.4 | 41 |
| 62 | 36253 | 39.8 | 10 | 0.4 | 10.08 | 10.01 | 268 | 24 | 11 | 9.5 | 83 |
| 63 | 52523 | 40.9 | 9 | 0.4 | 10.12 | 9.62 | 270 | 36 | 7.6 | 17.9 | 66 |
| 64 | 29791 | 46.7 | 10 | 0.46 | 8.88 | 8.71 | 194 | 16 | 12.4 | 5.6 | 111 |
| 65 | 38564 | 48.5 | 8 | 0.45 | 7.87 | 7.08 | 156 | 21 | 7.3 | 13 | 108 |
| 66 | 41861 | 39.3 | 10 | 0.45 | 9.07 | 8.25 | 205 | 22 | 9.3 | 6.7 | 117 |
| 67 | 34695 | 40.3 | 9 | 0.45 | 7.51 | 6.66 | 142 | 19 | 7.6 | 7.4 | 113 |
| 68 | 45080 | 40.2 | 9 | 0.54 | 9.14 | 7.57 | 185 | 26 | 7.1 | 11.1 | 83 |
| 69 | 38835 | 42.3 | 8 | 0.53 | 8.55 | 7.78 | 165 | 19 | 8.5 | 9.4 | 92 |
| 70 | 41411 | 39.3 | 8 | 0.51 | 8.69 | 7.62 | 174 | 29 | 6.1 | 17.7 | 75 |
| 71 | 40010 | 44.2 | 9 | 0.54 | 8.53 | 8.29 | 161 | 18 | 8.7 | 6.8 | 70 |
| 72 | 34589 | 40.1 | 8 | 0.55 | 7.86 | 7.06 | 135 | 19 | 7.1 | 9.5 | 77 |
| 73 | 36392 | 45.2 | 10 | 0.48 | 8.02 | 6.74 | 155 | 18 | 8.4 | 6.1 | 138 |
| 74 | 29097 | 46.7 | 9 | 0.56 | 8.03 | 7.36 | 140 | 13 | 10.6 | 5.1 | 124 |
| 75 | 29975 | 47.3 | 10 | 0.45 | 7.56 | 7.08 | 143 | 13 | 10.9 | 4 | 165 |
| 76 | 35983 | 38.4 | 8 | 0.51 | 8.03 | 7.1 | 151 | 21 | 7.4 | 10.3 | 102 |
| 77 | 35202 | 39.2 | 8 | 0.45 | 7.58 | 6.94 | 143 | 26 | 5.6 | 16.8 | 73 |
| 78 | 28834 | 42.3 | 10 | 0.55 | 7.91 | 6.88 | 138 | 14 | 9.8 | 4.2 | 134 |
| 79 | 38443 | 38.2 | 9 | 0.55 | 8.83 | 8.52 | 171 | 20 | 8.4 | 7.5 | 64 |
| 80 | 27754 | 43.6 | 10 | 0.47 | 7.19 | 6.17 | 126 | 13 | 9.5 | 4.1 | 175 |
| 81 | 27382 | 43.3 | 10 | 0.42 | 7.46 | 6.35 | 144 | 15 | 9.5 | 5.4 | 203 |
| 82 | 34118 | 48.9 | 10 | 0.49 | 7.71 | 6.38 | 142 | 15 | 9.4 | 4.8 | 185 |
| 83 | 41362 | 48.9 | 10 | 0.53 | 8.96 | 7.99 | 182 | 17 | 10.9 | 4.9 | 117 |
| 84 | 33372 | 44.3 | 10 | 0.43 | 7.91 | 6.83 | 160 | 20 | 8 | 7.9 | 148 |
| 85 | 44425 | 43.2 | 9 | 0.43 | 8.17 | 6.96 | 172 | 28 | 6.2 | 13.4 | 100 |
| 86 | 28190 | 45.3 | 10 | 0.41 | 7.78 | 7.46 | 158 | 13 | 12.4 | 3.8 | 182 |
| 87 | 35231 | 47.9 | 10 | 0.53 | 8.98 | 8.12 | 182 | 15 | 12.4 | 4.3 | 127 |
| 88 | 28272 | 44.8 | 10 | 0.49 | 7.3 | 6.66 | 127 | 13 | 9.6 | 4.1 | 138 |
| 89 | 42416 | 48.5 | 10 | 0.41 | 8.43 | 7.63 | 186 | 17 | 10.9 | 4.9 | 149 |
| 90 | 28346 | 40 | 10 | 0.4 | 7.88 | 6.84 | 164 | 15 | 11.1 | 4.5 | 216 |
| 91 | 43315 | 41.3 | 9 | 0.45 | 8.86 | 7.21 | 196 | 27 | 7.3 | 12.5 | 129 |
| 92 | 33540 | 47.8 | 10 | 0.45 | 8.93 | 8.52 | 200 | 14 | 13.9 | 4.3 | 150 |
| 93 | 42603 | 41.4 | 9 | 0.44 | 8.82 | 7.39 | 198 | 26 | 7.6 | 12.1 | 129 |
| 94 | 29583 | 47.6 | 10 | 0.46 | 7.4 | 6.45 | 135 | 13 | 10.7 | 3.8 | 198 |
| 95 | 31357 | 41.7 | 10 | 0.56 | 8.55 | 7.57 | 158 | 15 | 10.2 | 4.7 | 105 |
| 96 | 44345 | 42.4 | 10 | 0.4 | 8.73 | 7.29 | 201 | 23 | 8.9 | 7.2 | 163 |
| 97 | 36178 | 45.9 | 10 | 0.41 | 8.11 | 6.89 | 172 | 17 | 10.3 | 5.2 | 199 |
| 98 | 33158 | 46 | 10 | 0.48 | 8.11 | 7.35 | 158 | 15 | 10.8 | 4.4 | 131 |
| 99 | 32153 | 48.7 | 10 | 0.41 | 6.94 | 6.61 | 125 | 14 | 9 | 4.3 | 138 |
| 100 | 44003 | 48.4 | 8 | 0.44 | 7.93 | 7.37 | 159 | 26 | 6 | 17.6 | 76 |
| 101 | 42640 | 41.3 | 9 | 0.51 | 8.56 | 6.89 | 171 | 27 | 6.3 | 13.1 | 96 |
| 102 | 30510 | 39.3 | 10 | 0.41 | 7.61 | 6.42 | 152 | 16 | 9.6 | 4.7 | 211 |
| 103 | 39341 | 43.8 | 9 | 0.41 | 8.26 | 6.9 | 178 | 22 | 8.1 | 9.7 | 165 |
| 104 | 38354 | 43.6 | 10 | 0.45 | 7.59 | 6.33 | 144 | 19 | 7.4 | 6.3 | 137 |
| 105 | 39061 | 48.7 | 10 | 0.49 | 8.39 | 7.01 | 168 | 16 | 10.6 | 4.6 | 185 |
| 106 | 34146 | 45.3 | 10 | 0.44 | 7.32 | 6.24 | 136 | 16 | 8.6 | 4.9 | 159 |
| 107 | 44129 | 42.1 | 10 | 0.44 | 9.29 | 7.9 | 219 | 25 | 8.9 | 8.5 | 144 |
| 108 | 39281 | 47.1 | 9 | 0.55 | 8.24 | 7.5 | 149 | 17 | 8.9 | 6.1 | 91 |
| 109 | 27391 | 45 | 9 | 0.53 | 7.5 | 7.19 | 126 | 14 | 9.1 | 5.8 | 101 |
| 110 | 36428 | 43.8 | 10 | 0.41 | 8.35 | 7.04 | 182 | 19 | 9.7 | 6.2 | 184 |
| 111 | 45242 | 44.8 | 10 | 0.43 | 7.81 | 6.65 | 156 | 20 | 7.6 | 6.1 | 130 |
| 112 | 31468 | 46.1 | 10 | 0.55 | 7.83 | 6.89 | 135 | 14 | 9.6 | 4.2 | 147 |
| 113 | 44365 | 44.5 | 9 | 0.49 | 8.52 | 6.97 | 174 | 27 | 6.5 | 13.1 | 96 |
| 114 | 40875 | 46.7 | 8 | 0.5 | 8.51 | 7.74 | 171 | 20 | 8.4 | 11 | 94 |
| 115 | 38425 | 40.3 | 9 | 0.4 | 7.62 | 6.8 | 153 | 21 | 7.2 | 8.6 | 118 |
| 116 | 42939 | 44.4 | 8 | 0.44 | 8.37 | 7.6 | 178 | 21 | 8.3 | 10.8 | 114 |
| 117 | 38881 | 46.8 | 9 | 0.48 | 8.96 | 8.52 | 194 | 20 | 9.5 | 9.1 | 93 |
| 118 | 43139 | 43.5 | 10 | 0.43 | 8.39 | 7.28 | 181 | 21 | 8.7 | 6.5 | 132 |
| 119 | 36707 | 40.8 | 8 | 0.45 | 7.54 | 7.18 | 143 | 23 | 6.3 | 13 | 79 |
| 120 | 43047 | 42.7 | 10 | 0.42 | 8.39 | 7.18 | 182 | 23 | 7.9 | 7.7 | 123 |
| 121 | 18124 | 40.9 | 9 | 0.32 | 5.50 | 4.95 | 85 | 12 | 7.2 | 5.7 | 189 |
| 122 | 12674 | 41.6 | 9 | 0.43 | 5.77 | 5.20 | 85 | 12 | 7.2 | 8.2 | 157 |
| 123 | 18124 | 40.9 | 9 | 0.32 | 5.50 | 4.95 | 85 | 12 | 7.2 | 5.7 | 186 |
| 124 | 18125 | 40.3 | 9 | 0.56 | 5.99 | 5.39 | 77 | 12 | 6.2 | 5.1 | 100 |
| 125 | 18124 | 40.8 | 9 | 0.47 | 5.84 | 5.26 | 84 | 12 | 7.1 | 4.6 | 141 |
| 126 | 18124 | 41.0 | 9 | 0.49 | 6.17 | 5.56 | 91 | 11 | 7.9 | 4.4 | 164 |
| 127 | 18137 | 40.6 | 10 | 0.32 | 5.87 | 5.43 | 97 | 12 | 8.4 | 4.4 | 235 |
| 128 | 18136 | 52.7 | 10 | 0.32 | 6.20 | 5.74 | 109 | 12 | 9.4 | 5.7 | 258 |
| 129 | 18137 | 40.6 | 10 | 0.32 | 5.68 | 5.57 | 91 | 12 | 7.9 | 4.4 | 178 |

TABLE 3-continued

| Emb. | $FN_{T/O}$ (lbf) | $OPR_{T/O}$ | $N_{Stg}$ | $R_{HUB,IN}/R_{TIP,IN}$ | $R_{TIP,IN}$ (in) | $R_{TIP,EX}$ (in) | $A_{IN}$ (in²) | $A_{EX}$ (in²) | AR | $HSP_X$ (in²) | $HSP_{AR}$ |
|---|---|---|---|---|---|---|---|---|---|---|---|
| 130 | 18124 | 41.1 | 9 | 0.38 | 5.79 | 5.21 | 90 | 12 | 7.6 | 4.7 | 166 |
| 131 | 18124 | 36.9 | 9 | 0.39 | 6.19 | 5.58 | 102 | 12 | 8.8 | 4.1 | 217 |
| 132 | 24574 | 53.5 | 10 | 0.40 | 8.57 | 8.64 | 194 | 18 | 10.9 | 10.1 | 223 |
| 133 | 25169 | 51.2 | 9 | 0.44 | 7.60 | 7.43 | 147 | 18 | 8.0 | 12.5 | 144 |
| 134 | 38011 | 43.0 | 9 | 0.47 | 9.12 | 8.65 | 202 | 26 | 7.8 | 13.7 | 136 |
| 135 | 29699 | 53.5 | 9 | 0.47 | 8.37 | 7.43 | 172 | 22 | 7.7 | 16.2 | 115 |
| 136 | 45593 | 36.1 | 8 | 0.32 | 8.69 | 7.62 | 213 | 29 | 7.5 | 14.8 | 152 |
| 137 | 25477 | 62.9 | 9 | 0.54 | 7.91 | 7.16 | 139 | 15 | 9.6 | 9.4 | 194 |
| 138 | 13600 | 42.1 | 8 | 0.32 | 5.68 | 4.73 | 91 | 12 | 7.7 | 9.8 | 227 |
| 139 | 41411 | 39.3 | 8 | 0.51 | 8.69 | 7.62 | 174 | 29 | 6.1 | 17.7 | 90 |
| 140 | 42603 | 48.7 | 9 | 0.44 | 8.82 | 7.39 | 198 | 26 | 7.6 | 14.2 | 149 |
| 141 | 30229 | 31.8 | 9 | 0.40 | 7.95 | 6.62 | 167 | 24 | 7.1 | 10.7 | 177 |
| 142 | 44695 | 36.1 | 9 | 0.32 | 8.69 | 7.62 | 213 | 29 | 7.5 | 11.9 | 190 |
| 143 | 41695 | 36.1 | 8 | 0.32 | 8.69 | 7.62 | 213 | 29 | 7.5 | 16.2 | 152 |
| 144 | 44695 | 40.7 | 9 | 0.32 | 8.69 | 7.62 | 213 | 29 | 7.5 | 13.5 | 177 |
| 145 | 12000 | 44.1 | 9 | 0.32 | 5.68 | 4.73 | 91 | 12 | 7.7 | 9.2 | 244 |

The embodiments 1 to 145 of TABLE 3 are the same as the embodiments 1 to 145 of TABLES 1 and 2, but TABLE 3 includes parameters in the $HSP_{AR}$ relationship (12) above. The ranges of $FN_{T/O}$, $N2_{R/L}$, $OPR_{T/O}$, $N_{STG}$, $R_{HUB,IN}/R_{TIP,IN}$, $R_{TIP,IN}$, $R_{TIP,EX}$, $A_{IN}$, $A_{EX}$, AR, and $L_{CORE}/D_{CORE}$ are detailed above. In general, lower $FN_{T/O}$, higher EGT, and/or higher $OPR_{T/O}$ results in lower core size (e.g., lower $L_{CORE}$ and lower $D_{CORE}$), but higher $L_{CORE}/D_{CORE}$, higher $N2_{R/L}$, and higher HSR, and, thus, making it more challenging to meet dynamics margins (e.g., Alford stability and/or third mode margin). $A_{IN}$ and $A_{EX}$ are proportional to engine core size. $A_{IN}$ increases to achieve higher HP compressor pressure ratios. AR is indicative of the HP compressor pressure ratio, and, thus, indicative of T25. Accordingly, embodiments 1 to 145 provide for lowering the core size, while accounting for the dynamics margins and overall engine performance.

Figure 20:
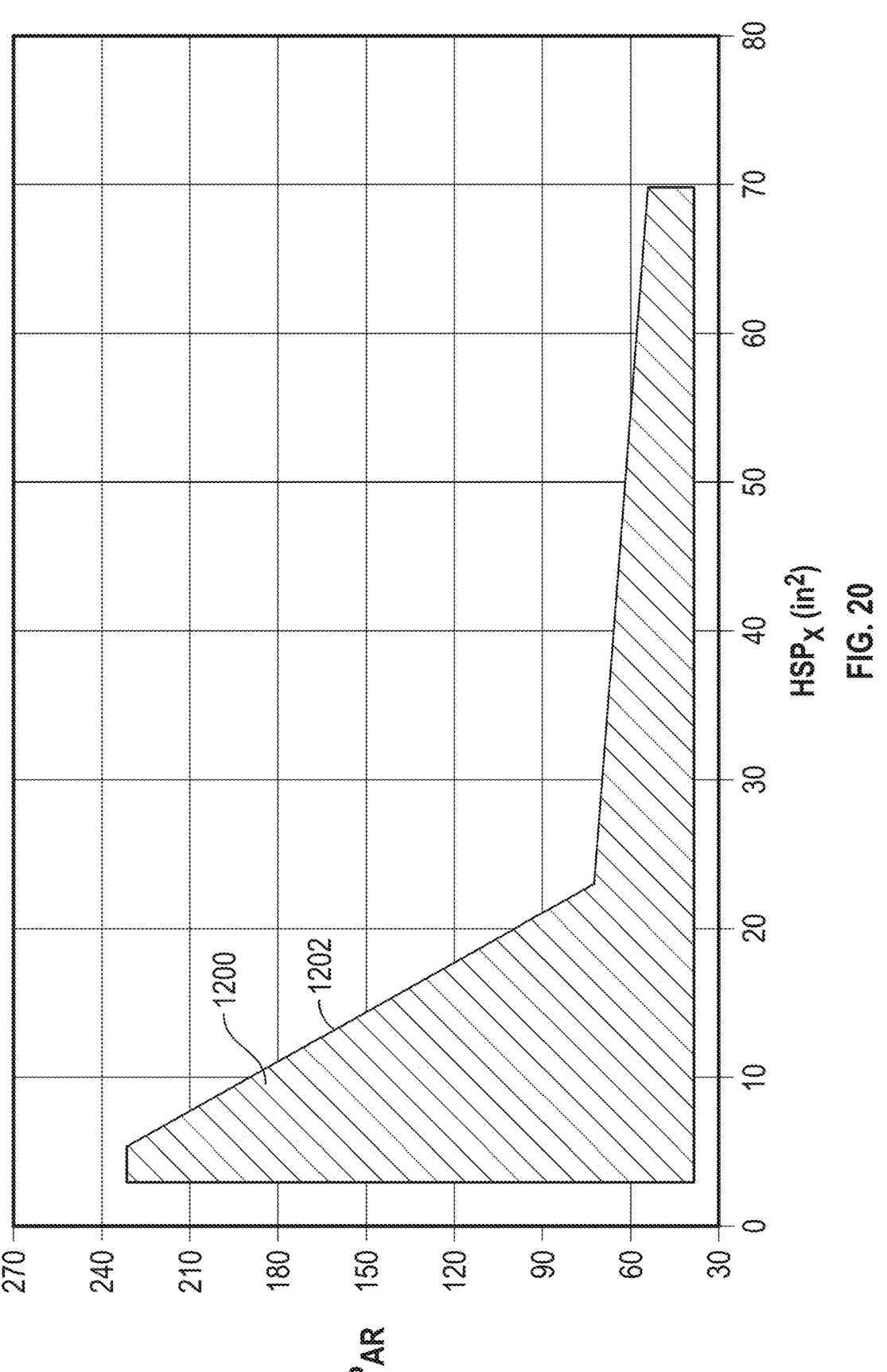
FIG. 20 represents, in graph form, an area ratio high-speed shaft rating ($HSP_{AR}$) as a function of the $HSP_X$.

FIG. 20 represents, in graph form, the $HSP_{AR}$ as a function of the $HSP_X$. $HSP_X$ is given by relationship (10) detailed above. $HSP_{AR}$ is in a range from 41 to 258 and $HSP_X$ is in a range from 3.8 in² to 69.1 in². An area 1200 represents the boundaries of $HSP_{AR}$ and $HSP_X$. $HSP_{AR}$ is given by relationship (12) above. $HSP_{AR}$ and $HSP_X$ are bounded by an upper bound 1202. The upper bound 1002 is given by (25):

$$HSP_{AR} < MAX(280 - 9*(HSP_X), 82 - 0.4*(HSP_X)) \qquad (25)$$

With reference to TABLE 3 and FIG. 12, in general, $HSP_{AR}$ increases as $HSP_X$ increases, and $HSP_{AR}$ decreases as $HSP_X$ increases. $HSP_X$ increases with increased $A_{EX}$ and/or increases $OPR_{T/O}$, and decreases with increased $FN_{T/O}$. In general, better engine performance, higher BPR, smaller engine core size, higher $L_{CORE}/D_{CORE}$, and higher T25 result in reduced dynamics margins. Higher AR, higher HP compressor pressure ratio, lower T25, and higher inlet corrected flow result in lower $N2_{R/L}$. Increased radius ratio, reduced blade height, reduce HP compressor speeds, and lower HP compressor pressure ratios result in diminishing returns on dynamics margins with poor performance. Accordingly, embodiments 1 to 145 provide for balancing higher AR with increased radius ratios to meet dynamics margins with improved performance of the engine core (and of the overall engine).

The lower the $HSP_{AR}$, the greater the third mode margin and the lower the HP compressor tip radius ratio for improved performance of the HP compressor and the HP turbine. Thus, the $HSP_{AR}$ is selected for providing a balance among improving the third mode margin of the HP shaft, without overly sacrificing performance of the HP compressor and/or the HP turbine.

Figure 21:
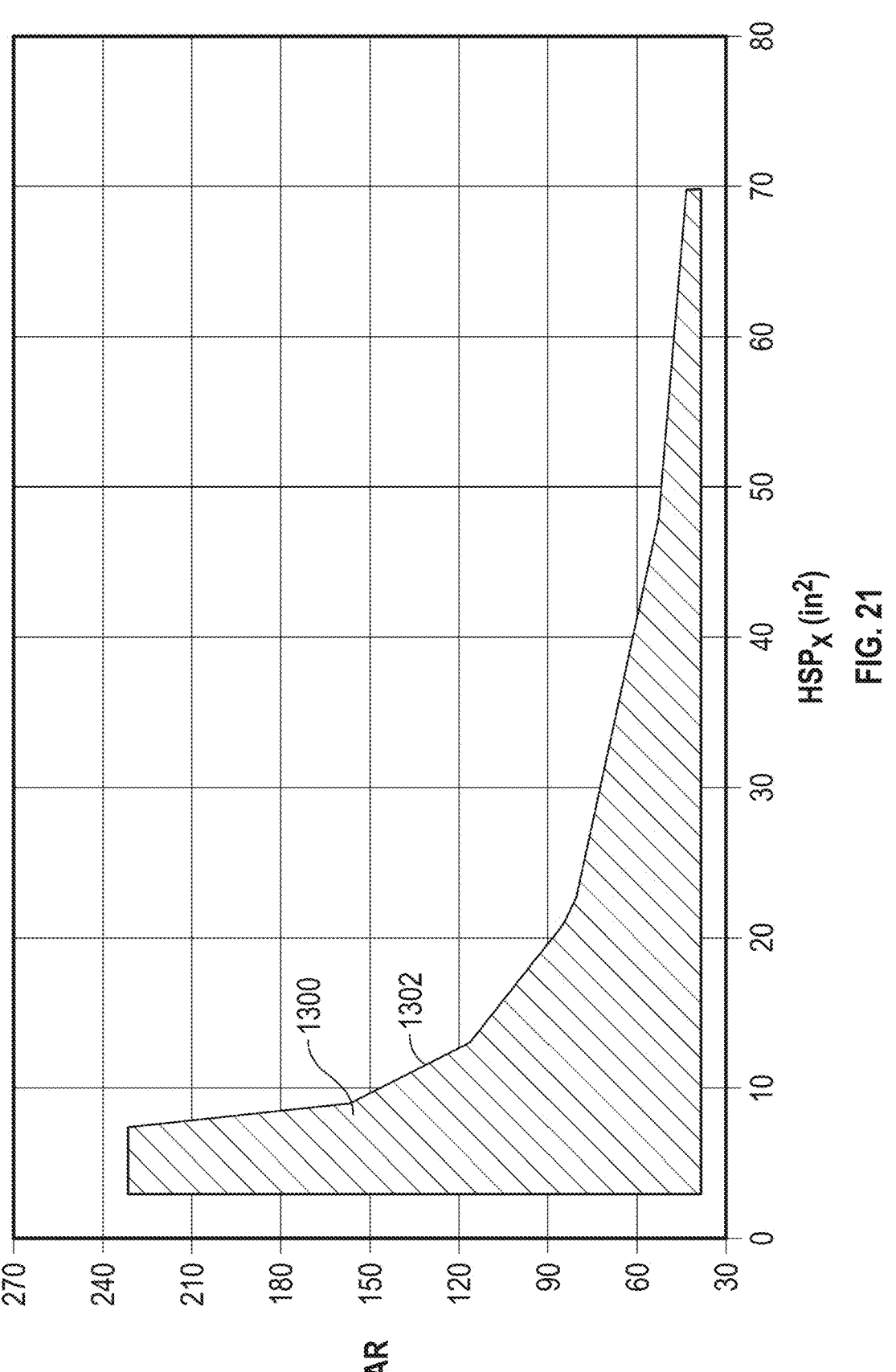
FIG. 21 represents, in graph form, an area ratio high-speed shaft rating ($HSP_{AR}$) as a function of the $HSP_X$, according to another embodiment.

FIG. 21 represents, in graph form, the $HSP_{AR}$ as a function of the $HSP_X$, according to another embodiment. $HSP_X$ is given by relationship (10) detailed above. $HSP_{AR}$ is in a range from 41 to 258 and $HSP_X$ is in a range from 3.8 in² to 69.1 in². An area 1300 represents the boundaries of $HSP_{AR}$ and $HSP_X$. $HSP_{AR}$ is bounded by an upper bound 1302. The upper bound 1302 is given by (26):

$$HSP_{AR} < \frac{350}{(HSP_X - 4)^{0.5}} \qquad (26)$$

With reference to TABLE 3 and FIG. 21, in general, $HSP_{AR}$ increases as $HSP_X$ increases, and $HSP_{AR}$ decreases as $HSP_X$ increases, as detailed above. $HSP_X$ increases with increased $A_{EX}$ and/or increases $OPR_{T/O}$, and decreases with increased $FN_{T/O}$, as detailed above.

Figure 22:
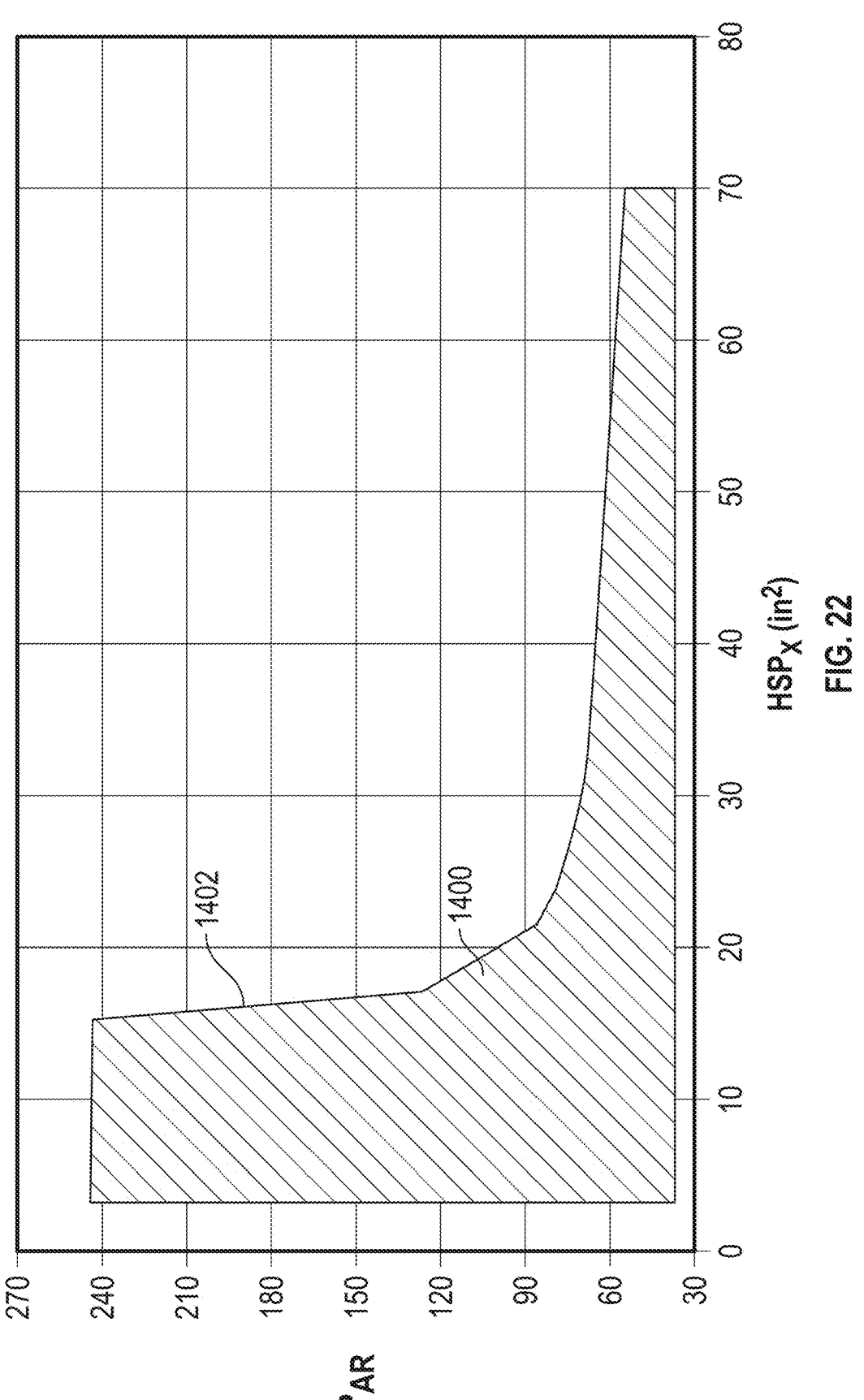
FIG. 22 represents, in graph form, an area ratio high-speed shaft rating ($HSP_{AR}$) as a function of the $HSP_X$, according to another embodiment.

FIG. 22 represents, in graph form, the $HSP_{AR}$ as a function of the $HSP_X$, according to another embodiment. $HSP_X$ is given by relationship (10) detailed above. $HSP_{AR}$ is in a range from 41 to 258 and $HSP_X$ is in a range from 3.8 in² to 69.1 in². An area 1400 represents the boundaries of $HSP_{AR}$ and $HSP_X$. $HSP_{AR}$ and $HSP_X$ are bounded by an upper bound 1402. The upper bound 1402 is given by (27a) and (27b):

$$HSP_{AR} \leq 258, \text{ for } 3.8 \leq HSP_X \leq 16 \qquad (27a)$$

$$HSP_{AR} < 120*(HSP_X - 16)^{-0.2}, \text{ for } HSP_X > 16 \qquad (27b)$$

With reference to TABLE 3 and FIG. 22, in general, $HSP_{AR}$ decreases as $HSP_X$ increases, and $HSP_{AR}$ increases as $HSP_X$ decreases, as detailed above. $HSP_X$ increases with increased $A_{EX}$ and/or increases $OPR_{T/O}$, and decreases with increased $FN_{T/O}$, as detailed above. The upper bound 1402 is 258 for values of $HSP_X$ from 3.8 in² to 16 in², and is given by $120*(HSP_X-16)^{-0.2}$ for values of $HSP_X$ from 16 in² to 69.1 in².

In general, the areas 1200, 1300, and 1400 having the upper bounds 1202, 1302, and 1402, respectively, provide for an improved engine having: 1. an enhanced engine performance (i.e., a higher thermodynamic performance meaning a lower specific fuel consumption at a given thrust level and at a given overall pressure ratio (OPR) of the turbine engine, and 2. a dynamics constraint that ensures the HP shaft avoids operating at, or near, the third mode of the HP shaft to avoid exciting the third mode of the HP shaft during normal operation of the turbine engine, as detailed above with respect to FIGS. 17 to 19.

TABLE 4 lists embodiments of the HP compressor and the HP shaft along with the associated HSP_$A_{IN}$ values of the HP compressor and the HP shaft. The embodiments inform the dimensions or qualities of the HP compressor and the HP shaft that are believed reasonable and practical for the HP compressor and the HP shaft for providing a balance among improving the third mode margin of the HP shaft, without overly reducing performance of the HP compressor and/or the HP turbine. In other words, the HSP_$A_{IN}$ indicates the operating range of interest, taking into account the constraints in which the HP compressor operates, e.g., the HP compressor inlet temperature and the HP compressor inlet corrected flow, that have not been previously considered in HP compressor and HP shaft designs, as detailed above.

TABLE 4

| Emb. | $FN_{T/O}$ (lbf) | $N2_{R/L}$ (RPM) | $R_{HUB,IN}/R_{TIP,IN}$ | $R_{TIP,IN}$ (in) | $R_{TIP,EX}$ (in) | $A_{IN}$ (in²) | $A_{EX}$ (in²) | $L_{CORE}/D_{CORE}$ | $HSP_{X1}$ (in²/klbf) | $HSP\_A_{IN}$ (in²) |
|---|---|---|---|---|---|---|---|---|---|---|
| 1 | 35940 | 24788 | 0.47 | 8.35 | 6.9 | 170 | 21 | 3.4 | 0.6 | 3081 |
| 2 | 36228 | 23020 | 0.56 | 8.68 | 7.58 | 162 | 22 | 2.9 | 0.76 | 1927 |
| 3 | 36228 | 22481 | 0.47 | 8.85 | 7.86 | 192 | 22 | 2.9 | 0.62 | 2572 |
| 4 | 36228 | 22417 | 0.47 | 8.6 | 7.72 | 181 | 22 | 3 | 0.6 | 2565 |
| 5 | 36228 | 22246 | 0.56 | 8.9 | 7.8 | 171 | 23 | 2.8 | 0.8 | 1852 |
| 6 | 36228 | 20928 | 0.56 | 10.25 | 8.03 | 227 | 29 | 2.9 | 0.8 | 2828 |
| 7 | 36228 | 19967 | 0.56 | 11.2 | 8.41 | 270 | 32 | 2.8 | 0.73 | 3288 |
| 8 | 36228 | 21281 | 0.56 | 9.4 | 8.38 | 190 | 26 | 2.6 | 0.9 | 1841 |
| 9 | 36228 | 21695 | 0.56 | 9.1 | 8.01 | 178 | 25 | 2.8 | 0.84 | 1988 |
| 10 | 39515 | 19922 | 0.56 | 10.35 | 8.43 | 230 | 32 | 3 | 1.0 | 2970 |
| 11 | 39515 | 20809 | 0.57 | 10.25 | 8.76 | 223 | 34 | 2.7 | 1.36 | 2369 |
| 12 | 27633 | 20809 | 0.57 | 9.69 | 8.76 | 199 | 34 | 2.5 | 1.95 | 1729 |
| 13 | 19324 | 20809 | 0.57 | 9.69 | 8.76 | 199 | 34 | 2.3 | 2.79 | 1427 |
| 14 | 18124 | 35788 | 0.4 | 5.68 | 4.73 | 85 | 12 | 4.3 | 0.8 | 2683 |
| 15 | 12674 | 35788 | 0.4 | 5.68 | 4.73 | 85 | 12 | 4 | 1.15 | 2406 |
| 16 | 75161 | 12306 | 0.4 | 13.98 | 13.4 | 516 | 68 | 2.1 | 0.9 | 3665 |
| 17 | 107480 | 10580 | 0.4 | 16.32 | 15.83 | 703 | 95 | 2.1 | 0.88 | 5017 |
| 18 | 25247 | 24181 | 0.52 | 8.02 | 7.37 | 148 | 24 | 2.8 | 1.51 | 1645 |
| 19 | 25288 | 23523 | 0.56 | 8.76 | 7.62 | 165 | 26 | 2.7 | 1.6 | 1771 |
| 20 | 29198 | 18378 | 0.57 | 10.07 | 9.24 | 213 | 30 | 2.2 | 1.62 | 1444 |
| 21 | 26169 | 18401 | 0.58 | 9.96 | 9.2 | 207 | 34 | 2.3 | 2 | 1462 |
| 22 | 23249 | 21259 | 0.54 | 9.2 | 8.17 | 190 | 28 | 2.5 | 1.9 | 1726 |
| 23 | 29699 | 23255 | 0.47 | 8.37 | 7.43 | 172 | 22 | 2.8 | 0.92 | 2110 |
| 24 | 20081 | 20398 | 0.54 | 9.09 | 8.23 | 184 | 26 | 2.5 | 1.58 | 1628 |
| 25 | 27940 | 24432 | 0.56 | 8.23 | 7.35 | 145 | 19 | 2.8 | 0.84 | 1642 |
| 26 | 24574 | 19914 | 0.5 | 9.06 | 8.64 | 194 | 18 | 2.4 | 0.72 | 1641 |
| 27 | 28698 | 19790 | 0.55 | 9.55 | 8.49 | 201 | 19 | 2.4 | 0.67 | 1682 |
| 28 | 22111 | 24618 | 0.46 | 7.39 | 7.03 | 136 | 15 | 3 | 0.7 | 1819 |
| 29 | 24668 | 23073 | 0.53 | 8.45 | 7.52 | 162 | 16 | 2.7 | 0.65 | 1757 |
| 30 | 25477 | 24152 | 0.54 | 7.91 | 7.16 | 139 | 15 | 2.9 | 0.57 | 1682 |
| 31 | 26508 | 24437 | 0.57 | 8.16 | 7.23 | 141 | 13 | 2.8 | 0.51 | 1585 |
| 32 | 31781 | 23043 | 0.43 | 8.21 | 7.73 | 173 | 20 | 2.7 | 0.63 | 1981 |
| 33 | 29444 | 20310 | 0.46 | 9.13 | 8.61 | 207 | 29 | 2.5 | 1.52 | 1911 |
| 34 | 25868 | 23662 | 0.52 | 8.11 | 7.35 | 151 | 22 | 2.7 | 1.32 | 1656 |
| 35 | 25169 | 24039 | 0.44 | 7.6 | 7.43 | 147 | 18 | 2.8 | 0.9 | 1784 |
| 36 | 29459 | 20133 | 0.47 | 9.12 | 8.65 | 202 | 26 | 2.6 | 1.08 | 1998 |
| 37 | 30518 | 20410 | 0.51 | 9.72 | 8.69 | 219 | 22 | 2.7 | 0.73 | 2369 |
| 38 | 25749 | 22900 | 0.55 | 9.01 | 7.77 | 177 | 18 | 2.9 | 0.69 | 2191 |
| 39 | 18136 | 28164 | 0.54 | 6.89 | 5.8 | 106 | 11 | 3.6 | 0.63 | 2045 |
| 40 | 36229 | 25626 | 0.4 | 7.95 | 6.62 | 167 | 24 | 3.6 | 0.81 | 3841 |
| 41 | 36254 | 23225 | 0.4 | 8.53 | 7.19 | 192 | 23 | 3.3 | 0.64 | 3582 |
| 42 | 36253 | 21410 | 0.4 | 9.03 | 7.71 | 215 | 23 | 3.3 | 0.63 | 3912 |
| 43 | 52524 | 19521 | 0.54 | 10.46 | 8.59 | 243 | 34 | 2.8 | 0.81 | 2881 |
| 44 | 52523 | 18233 | 0.54 | 10.97 | 9.1 | 268 | 34 | 2.8 | 0.8 | 3166 |
| 45 | 52525 | 19710 | 0.6 | 10.6 | 8.54 | 226 | 36 | 2.6 | 0.84 | 2126 |
| 46 | 52561 | 18510 | 0.54 | 10.91 | 9 | 265 | 35 | 2.6 | 0.66 | 2596 |
| 47 | 52558 | 15207 | 0.54 | 12.48 | 10.69 | 347 | 34 | 2.5 | 0.64 | 3269 |
| 48 | 52560 | 17374 | 0.6 | 11.55 | 9.49 | 268 | 34 | 2.4 | 0.65 | 2161 |
| 49 | 52523 | 20022 | 0.4 | 9.99 | 8.94 | 263 | 34 | 2.7 | 0.81 | 3313 |
| 50 | 52524 | 19304 | 0.54 | 10.57 | 9.25 | 249 | 36 | 2.4 | 0.84 | 2063 |
| 51 | 52522 | 17220 | 0.54 | 11.4 | 10.2 | 289 | 34 | 2.4 | 0.81 | 2318 |
| 52 | 52523 | 18140 | 0.6 | 11.17 | 9.75 | 251 | 35 | 2.2 | 0.82 | 1707 |
| 53 | 52522 | 16123 | 0.6 | 12.09 | 10.81 | 294 | 33 | 2.2 | 0.79 | 1915 |
| 54 | 52560 | 18670 | 0.4 | 10.55 | 9.51 | 294 | 35 | 2.5 | 0.67 | 2953 |
| 55 | 52558 | 15873 | 0.4 | 11.82 | 10.98 | 369 | 34 | 2.3 | 0.66 | 3333 |
| 56 | 18124 | 27161 | 0.6 | 7.06 | 6.71 | 100 | 12 | 2.8 | 0.8 | 1038 |
| 57 | 18136 | 22208 | 0.54 | 8.26 | 8.27 | 152 | 12 | 2.4 | 0.67 | 1167 |
| 58 | 36228 | 24006 | 0.4 | 8.32 | 7.9 | 182 | 24 | 2.6 | 0.82 | 2057 |
| 59 | 36228 | 20495 | 0.54 | 9.56 | 9.1 | 203 | 24 | 2.3 | 0.83 | 1460 |
| 60 | 36228 | 17397 | 0.54 | 10.72 | 10.57 | 256 | 24 | 2.1 | 0.81 | 1584 |
| 61 | 36230 | 24405 | 0.6 | 8.66 | 7.84 | 151 | 27 | 2.3 | 0.91 | 1101 |

TABLE 4-continued

| Emb. | $FN_{T/O}$ (lbf) | $N2_{R/L}$ (RPM) | $R_{HUB,IN}/$ $R_{TIP,IN}$ | $R_{TIP,IN}$ (in) | $R_{TIP,EX}$ (in) | $A_{IN}$ (in²) | $A_{EX}$ (in²) | $L_{CORE}/$ $D_{CORE}$ | $HSP_{X1}$ (in²/klbf) | $HSP\_A_{IN}$ (in²) |
|---|---|---|---|---|---|---|---|---|---|---|
| 62 | 36253 | 18478 | 0.4 | 10.08 | 10.01 | 268 | 24 | 2.2 | 0.67 | 2020 |
| 63 | 52523 | 19700 | 0.4 | 10.12 | 9.62 | 270 | 36 | 2.3 | 0.84 | 2367 |
| 64 | 29791 | 20730 | 0.46 | 8.88 | 8.71 | 194 | 16 | 2.5 | 0.53 | 1743 |
| 65 | 38564 | 26513 | 0.45 | 7.87 | 7.08 | 156 | 21 | 3 | 0.86 | 2282 |
| 66 | 41861 | 20516 | 0.45 | 9.07 | 8.25 | 205 | 22 | 2.8 | 0.53 | 2578 |
| 67 | 34695 | 27440 | 0.45 | 7.51 | 6.66 | 142 | 19 | 3.1 | 0.66 | 2115 |
| 68 | 45080 | 22948 | 0.54 | 9.14 | 7.57 | 185 | 26 | 2.8 | 0.72 | 2172 |
| 69 | 38835 | 23902 | 0.53 | 8.55 | 7.78 | 165 | 19 | 2.7 | 0.78 | 1774 |
| 70 | 41411 | 23444 | 0.51 | 8.69 | 7.62 | 174 | 29 | 2.9 | 1.08 | 2137 |
| 71 | 40010 | 22409 | 0.54 | 8.53 | 8.29 | 161 | 18 | 2.4 | 0.57 | 1278 |
| 72 | 34589 | 26430 | 0.55 | 7.86 | 7.06 | 135 | 19 | 2.8 | 0.85 | 1464 |
| 73 | 36392 | 24926 | 0.48 | 8.02 | 6.74 | 155 | 18 | 3.2 | 0.5 | 2529 |
| 74 | 29097 | 24030 | 0.56 | 8.03 | 7.36 | 140 | 13 | 2.9 | 0.56 | 1637 |
| 75 | 29975 | 24497 | 0.45 | 7.56 | 7.08 | 143 | 13 | 3.1 | 0.44 | 2160 |
| 76 | 35983 | 25286 | 0.51 | 8.03 | 7.1 | 151 | 21 | 3 | 0.89 | 2098 |
| 77 | 35202 | 27176 | 0.45 | 7.58 | 6.94 | 143 | 26 | 2.9 | 1.14 | 1879 |
| 78 | 28834 | 24306 | 0.55 | 7.91 | 6.88 | 138 | 14 | 3.1 | 0.49 | 1877 |
| 79 | 38443 | 21613 | 0.55 | 8.83 | 8.52 | 171 | 20 | 2.4 | 0.66 | 1308 |
| 80 | 27754 | 27294 | 0.47 | 7.19 | 6.17 | 126 | 13 | 3.4 | 0.48 | 2321 |
| 81 | 27382 | 26052 | 0.42 | 7.46 | 6.35 | 144 | 15 | 3.6 | 0.56 | 3090 |
| 82 | 34118 | 26029 | 0.49 | 7.71 | 6.38 | 142 | 15 | 3.5 | 0.44 | 2798 |
| 83 | 41362 | 21762 | 0.53 | 8.96 | 7.99 | 182 | 17 | 2.7 | 0.4 | 1953 |
| 84 | 33372 | 24839 | 0.43 | 7.91 | 6.83 | 160 | 20 | 3.4 | 0.6 | 2966 |
| 85 | 44425 | 25546 | 0.43 | 8.17 | 6.96 | 172 | 28 | 3.1 | 0.77 | 2743 |
| 86 | 28190 | 23396 | 0.41 | 7.78 | 7.46 | 158 | 13 | 3 | 0.45 | 2321 |
| 87 | 35231 | 21419 | 0.53 | 8.98 | 8.12 | 182 | 17 | 2.7 | 0.42 | 1872 |
| 88 | 28272 | 26095 | 0.49 | 7.3 | 6.66 | 127 | 13 | 3.1 | 0.47 | 1829 |
| 89 | 42416 | 23364 | 0.41 | 8.43 | 7.63 | 186 | 17 | 2.9 | 0.4 | 2538 |
| 90 | 28346 | 24653 | 0.4 | 7.88 | 6.84 | 164 | 15 | 3.4 | 0.52 | 3179 |
| 91 | 43315 | 23589 | 0.45 | 8.86 | 7.21 | 196 | 27 | 3.3 | 0.77 | 3472 |
| 92 | 33540 | 20805 | 0.45 | 8.93 | 8.52 | 200 | 14 | 2.7 | 0.43 | 2150 |
| 93 | 42603 | 23344 | 0.44 | 8.82 | 7.39 | 198 | 26 | 3.2 | 0.76 | 3379 |
| 94 | 29583 | 26303 | 0.46 | 7.4 | 6.45 | 135 | 13 | 3.4 | 0.43 | 2515 |
| 95 | 31357 | 23050 | 0.56 | 8.55 | 7.57 | 158 | 15 | 2.7 | 0.49 | 1619 |
| 96 | 44345 | 23094 | 0.4 | 8.73 | 7.29 | 201 | 23 | 3.3 | 0.51 | 3681 |
| 97 | 36178 | 24334 | 0.41 | 8.11 | 6.89 | 172 | 17 | 3.4 | 0.46 | 3319 |
| 98 | 33158 | 24109 | 0.48 | 8.11 | 7.35 | 158 | 15 | 2.8 | 0.44 | 1921 |
| 99 | 32153 | 27525 | 0.41 | 6.94 | 6.61 | 125 | 14 | 3.1 | 0.43 | 1918 |
| 100 | 44003 | 26067 | 0.44 | 7.93 | 7.37 | 159 | 26 | 2.8 | 0.94 | 2012 |
| 101 | 42640 | 24924 | 0.51 | 8.56 | 6.89 | 171 | 27 | 3.1 | 0.79 | 2614 |
| 102 | 30510 | 25797 | 0.41 | 7.61 | 6.42 | 152 | 16 | 3.6 | 0.52 | 3318 |
| 103 | 39341 | 24704 | 0.41 | 8.26 | 6.9 | 178 | 22 | 3.4 | 0.69 | 3614 |
| 104 | 38354 | 26645 | 0.45 | 7.59 | 6.33 | 144 | 19 | 3.4 | 0.51 | 2666 |
| 105 | 39061 | 23578 | 0.49 | 8.39 | 7.01 | 168 | 16 | 3.3 | 0.4 | 2928 |
| 106 | 34146 | 27652 | 0.44 | 7.32 | 6.24 | 136 | 16 | 3.4 | 0.46 | 2507 |
| 107 | 44129 | 21015 | 0.44 | 9.29 | 7.9 | 219 | 25 | 3.1 | 0.56 | 3548 |
| 108 | 39281 | 24454 | 0.55 | 8.24 | 7.5 | 149 | 17 | 2.7 | 0.53 | 1523 |
| 109 | 27391 | 25294 | 0.53 | 7.5 | 7.19 | 126 | 14 | 2.8 | 0.63 | 1410 |
| 110 | 36428 | 24002 | 0.41 | 8.35 | 7.04 | 182 | 19 | 3.3 | 0.51 | 3434 |
| 111 | 45242 | 25956 | 0.43 | 7.81 | 6.65 | 156 | 20 | 3.2 | 0.45 | 2654 |
| 112 | 31468 | 23911 | 0.55 | 7.83 | 6.89 | 135 | 14 | 3.2 | 0.45 | 2063 |
| 113 | 44365 | 24993 | 0.49 | 8.52 | 6.97 | 174 | 27 | 3.1 | 0.75 | 2585 |
| 114 | 40875 | 24106 | 0.5 | 8.51 | 7.74 | 171 | 20 | 2.8 | 0.78 | 1929 |
| 115 | 38425 | 26699 | 0.4 | 7.62 | 6.8 | 153 | 21 | 3.1 | 0.68 | 2503 |
| 116 | 42939 | 24229 | 0.44 | 8.37 | 7.6 | 178 | 21 | 2.9 | 0.78 | 2435 |
| 117 | 38881 | 21483 | 0.48 | 8.96 | 8.52 | 194 | 20 | 2.6 | 0.65 | 1900 |
| 118 | 43139 | 23965 | 0.43 | 8.39 | 7.28 | 181 | 21 | 3 | 0.49 | 2763 |
| 119 | 36707 | 26550 | 0.45 | 7.54 | 7.18 | 143 | 23 | 2.9 | 0.96 | 1793 |
| 120 | 43047 | 24214 | 0.42 | 8.39 | 7.18 | 182 | 23 | 3.1 | 0.53 | 2828 |
| 121 | 18124 | 32209 | 0.32 | 5.50 | 4.95 | 85 | 12 | 3.8 | 0.80 | 2219 |
| 122 | 12674 | 30420 | 0.43 | 5.77 | 5.20 | 85 | 12 | 3.7 | 1.15 | 1841 |
| 123 | 18124 | 32209 | 0.32 | 5.50 | 4.95 | 85 | 12 | 3.7 | 0.80 | 2187 |
| 124 | 18125 | 29302 | 0.56 | 5.99 | 5.39 | 77 | 12 | 3.4 | 0.69 | 1241 |
| 125 | 18124 | 29982 | 0.47 | 5.84 | 5.26 | 84 | 12 | 3.6 | 0.65 | 1648 |
| 126 | 18124 | 28112 | 0.49 | 6.17 | 5.56 | 91 | 11 | 3.7 | 0.63 | 1883 |
| 127 | 18137 | 28852 | 0.32 | 5.87 | 5.43 | 97 | 12 | 3.9 | 0.64 | 2717 |
| 128 | 18136 | 27120 | 0.32 | 6.20 | 5.74 | 109 | 12 | 3.9 | 0.64 | 2977 |
| 129 | 18137 | 28059 | 0.32 | 5.68 | 5.57 | 91 | 12 | 3.6 | 0.64 | 2065 |
| 130 | 18124 | 30335 | 0.38 | 5.79 | 5.21 | 90 | 12 | 3.6 | 0.65 | 1963 |
| 131 | 18124 | 28034 | 0.39 | 6.19 | 5.58 | 102 | 12 | 3.8 | 0.64 | 2535 |
| 132 | 24574 | 19914 | 0.40 | 8.57 | 8.64 | 194 | 18 | 3.6 | 0.72 | 3961 |
| 133 | 25169 | 24039 | 0.44 | 7.60 | 7.43 | 147 | 18 | 3.4 | 0.90 | 2646 |
| 134 | 38011 | 20133 | 0.47 | 9.12 | 8.65 | 202 | 26 | 3.4 | 0.84 | 3506 |
| 135 | 29699 | 23255 | 0.47 | 8.37 | 7.43 | 172 | 22 | 3.1 | 0.92 | 2569 |
| 136 | 45593 | 23344 | 0.32 | 8.69 | 7.62 | 213 | 29 | 3.3 | 0.98 | 4323 |
| 137 | 25477 | 20183 | 0.54 | 7.91 | 7.16 | 139 | 15 | 3.8 | 0.70 | 2815 |
| 138 | 13600 | 28788 | 0.32 | 5.68 | 4.73 | 91 | 12 | 3.9 | 1.35 | 2668 |

TABLE 4-continued

| Emb. | $FN_{T/O}$ (lbf) | $N2_{R/L}$ (RPM) | $R_{HUB,IN}/R_{TIP,IN}$ | $R_{TIP,IN}$ (in) | $R_{TIP,EX}$ (in) | $A_{IN}$ (in$^2$) | $A_{EX}$ (in$^2$) | $L_{CORE}/D_{CORE}$ | $HSP_{X1}$ (in$^2$/klbf) | $HSP\_A_{IN}$ (in$^2$) |
|---|---|---|---|---|---|---|---|---|---|---|
| 139 | 41411 | 23444 | 0.51 | 8.69 | 7.62 | 174 | 29 | 3.1 | 1.08 | 2576 |
| 140 | 42603 | 23344 | 0.44 | 8.82 | 7.39 | 198 | 26 | 3.5 | 0.76 | 3890 |
| 141 | 30229 | 25626 | 0.40 | 7.95 | 6.62 | 167 | 24 | 3.8 | 0.97 | 4178 |
| 142 | 44695 | 23344 | 0.32 | 8.69 | 7.62 | 213 | 29 | 3.7 | 0.79 | 5423 |
| 143 | 41695 | 23344 | 0.32 | 8.69 | 7.62 | 213 | 29 | 3.3 | 1.07 | 4323 |
| 144 | 44695 | 23344 | 0.32 | 8.69 | 7.62 | 213 | 29 | 3.5 | 0.79 | 5042 |
| 145 | 12000 | 28788 | 0.32 | 5.68 | 4.73 | 91 | 12 | 4.0 | 1.21 | 2874 |

The embodiments 1 to 145 of TABLE 4 are the same as the embodiments 1 to 145 of TABLES 1 to 3, but TABLE 4 includes parameters in the HSP_A$_{IN}$ relationship (14) above. The ranges of FN$_{T/O}$, N2$_{R/L}$, OPR$_{T/O}$, R$_{HUB,IN}$/R$_{TIP,IN}$, R$_{TIP,IN}$, R$_{TIP,EX}$, R$_{HUB,EX}$, A$_{IN}$, A$_{EX}$, and L$_{CORE}$/D$_{CORE}$ are detailed above. In general, lower FN$_{T/O}$, higher EGT, and/or higher OPR$_{T/O}$ results in lower core size (e.g., lower L$_{CORE}$ and lower D$_{CORE}$), but higher L$_{CORE}$/D$_{CORE}$, higher N2$_{R/L}$, and higher HSR, and, thus, making it more challenging to meet dynamics margins (e.g., Alford stability and/or third mode margin). A$_{IN}$ and A$_{EX}$ is proportional to the engine core size. A$_{IN}$ is indicative of the HP compressor inlet corrected flow and the HP compressor pressure ratio, and, thus, indicative of T25. Accordingly, embodiments 1 to 145 provide for lowering the core size, while accounting for the dynamics margins and overall engine performance.

Figure 23:
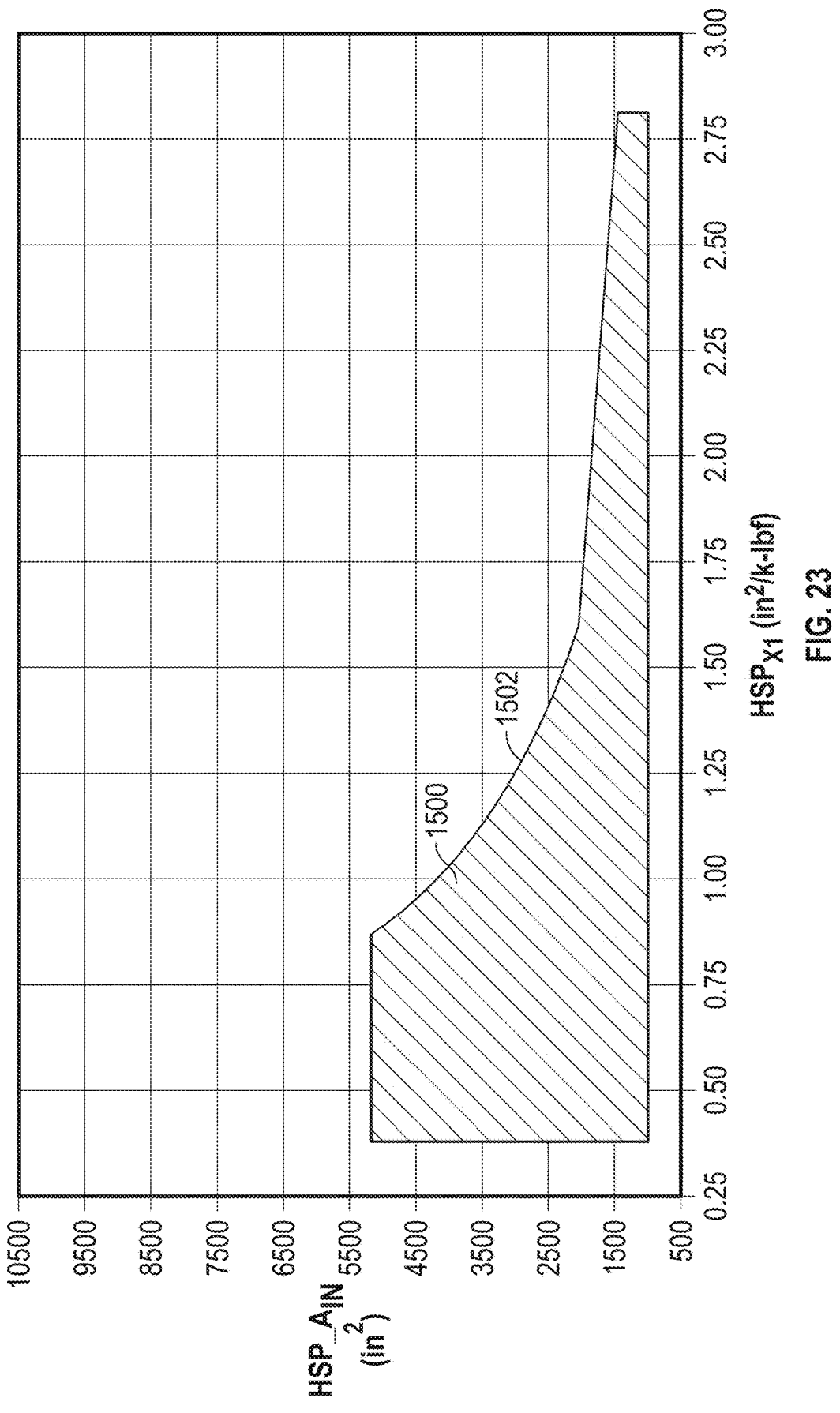
FIG. 23 represents, in graph form, an inlet area high-speed shaft rating ($HSP\_A_{IN}$) as a function of a second high-speed shaft operating parameter ($HSP_{X1}$) as given by relationship (14) detailed below.

FIG. 23 represents, in graph form, the HSP_A$_{IN}$ as a function of the HSP$_{X1}$. HSP$_{X1}$ is given by relationship (15) detailed above. HSP_A$_{IN}$ is in a range from 1038 in$^2$ to 5423 in$^2$, and HSP$_{X1}$ is in a range from 0.4 in$^2$/k-lbf to 2.79 in$^2$/k-lbf. In some embodiments, HSP_A$_{IN}$ is in a range from 1,420 in$^2$ to 3,920 in$^2$. An area 1200 represents the boundaries of HSP_A$_{IN}$ and HSP$_{X1}$. HSP_A$_{IN}$ and HSP$_{X1}$ are bounded by an upper bound 1202. The upper bound 1202 is given by the relationship (28):

$$HSP\_A_{IN} < MAX\left(\frac{4200}{(HSP_{X_1})^{1.5}}, 2850 - 500*(HSP_{X_1})\right) \quad (28)$$

With reference to TABLE 4 and FIG. 23, in general, HSP_A$_{IN}$ increases as HSP$_{X1}$ increases, and HSP_A$_{IN}$ decreases as HSP$_{X1}$ increases. The upper bound 1502 is given by $$\frac{4200}{(HSP_{X_1})^{1.5}}$$

for values of HSP$_{X1}$ from 0.4 in$^2$/k-lbf to 1.6 in$^2$/k-lbf, and is given by 2850-500*(HSP$_{X1}$) for values of HSP$_X$ from 1.6 in$^2$/k-lbf to 2.79 in$^2$/k-lbf. HSP$_{X1}$ increases with increased A$_{EX}$, and decreases with increased FN$_{T/O}$. In general, better engine performance, higher BPR, smaller engine core size, higher L$_{CORE}$/D$_{CORE}$, and higher T25 result in reduced dynamics margins. Higher AR, higher HP compressor pressure ratio, lower T25, and higher inlet corrected flow result in lower N2$_{R/L}$. Increased radius ratio, reduced blade height, reduce HP compressor speeds, and lower HP compressor pressure ratios result in diminishing returns on dynamics margins with poor performance. Accordingly, embodiments 1 to 145 provide for balancing higher A$_{IN}$ with increased radius ratios to meet dynamics margins with improved performance of the engine core (and of the overall engine).

The lower the HSP_A$_{IN}$, the greater the third mode margin and the lower the HP compressor tip radius ratio for improved performance of the HP compressor and the HP turbine. Thus, the HSP_A$_{IN}$ is selected for providing a balance among improving the third mode margin of the HP shaft, without overly sacrificing performance of the HP compressor and/or the HP turbine.

Accordingly, the area 1500 having the upper bound 1502 provides for an improved engine having: 1. an enhanced engine performance (i.e., a higher thermodynamic performance meaning a lower specific fuel consumption at a given thrust level and at a given overall pressure ratio (OPR) of the turbine engine, and 2. a dynamics constraint that ensures the HP shaft avoids operating at, or near, the third mode of the HP shaft to avoid exciting the third mode of the HP shaft during normal operation of the turbine engine, as detailed above with respect to FIGS. 17 to 19.

TABLE 5 lists embodiments of the HP compressor and HP shaft along with the associated HSP_U$_{RIM,R/L}$ values of the HP compressor and the HP shaft. The embodiments inform of the dimensions or qualities of the HP compressor and the HP shaft that are believed reasonable and practical for the HP compressor and the HP shaft for providing a balance among improving the third mode margin of the HP shaft, without overly reducing performance of the HP compressor and/or the HP turbine. In other words, the HSP_U$_{RIM,R/L}$ indicates the operating range of interest, taking into account the constraints in which the HP compressor operates, e.g., the HP compressor inlet temperature and the HP compressor inlet corrected flow, that have not been previously considered in HP compressor and HP shaft designs, as detailed above.

TABLE 5

| Emb. | $N2_{R/L}$ (RPM) | $OPR_{T/O}$ | $T_{IC}$ (°R) | $N_{Stg}$ | AR | $T25_{T/O}$ (°R) | $T3_{T/O}$ (°R) | $HSP_X$ (in$^2$) | $A_{F,IN}$ (in$^2$) | $U_{RIM,R/L}$ (ft/s) | $HSP\_U_{RIM,R/L}$ (in$^{-2/3}$(ft/s/°R)$^{-3}$ |
|---|---|---|---|---|---|---|---|---|---|---|---|
| 1 | 24788 | 49.5 | 0 | 10 | 7.9 | 747 | 1881 | 9.3 | 219 | 1382 | 0.48 |
| 2 | 23020 | 44.1 | 0 | 9 | 7.3 | 745 | 1818 | 10.8 | 236 | 1426 | 0.31 |
| 3 | 22481 | 41.8 | 0 | 10 | 8.6 | 690 | 1788 | 8.5 | 246 | 1450 | 0.26 |
| 4 | 22417 | 40.7 | 0 | 10 | 8.4 | 690 | 1774 | 7.7 | 232 | 1420 | 0.29 |
| 5 | 22246 | 44.1 | 0 | 9 | 7.3 | 745 | 1818 | 12.2 | 249 | 1419 | 0.28 |
| 6 | 20928 | 44.1 | 0 | 10 | 7.8 | 725 | 1818 | 15.1 | 330 | 1357 | 0.29 |

TABLE 5-continued

| Emb. | $N2_{R/L}$ (RPM) | $OPR_{T/O}$ | $T_{IC}$ (°R) | $N_{Stg}$ | AR | $T25_{T/O}$ (°R) | $T3_{T/O}$ (°R) | $HSP_X$ (in²) | $A_{F,IN}$ (in²) | $U_{RIM,R/L}$ (ft/s) | $HSP\_U_{RIM,R/L}$ (in$^{-2/3}$(ft/s/°R)$^{-3}$) |
|---|---|---|---|---|---|---|---|---|---|---|---|
| 7 | 19967 | 44.1 | 0 | 11 | 8.5 | 702 | 1818 | 15 | 394 | 1356 | 0.24 |
| 8 | 21281 | 44.1 | 0 | 9 | 7.2 | 749 | 1818 | 15.5 | 278 | 1460 | 0.24 |
| 9 | 21695 | 44.1 | 0 | 9 | 7.2 | 749 | 1818 | 13.5 | 260 | 1420 | 0.29 |
| 10 | 19922 | 44.1 | 0 | 9 | 7.2 | 748 | 1818 | 20.6 | 337 | 1356 | 0.34 |
| 11 | 20809 | 44.1 | 0 | 8 | 6.5 | 780 | 1818 | 30.4 | 330 | 1473 | 0.25 |
| 12 | 20809 | 37.4 | 0 | 8 | 5.8 | 777 | 1729 | 36.9 | 295 | 1473 | 0.19 |
| 13 | 20809 | 31.7 | 0 | 8 | 5.8 | 740 | 1646 | 44.7 | 295 | 1473 | 0.13 |
| 14 | 35788 | 40.9 | 0 | 9 | 7.2 | 730 | 1776 | 5.7 | 101 | 1347 | 1 |
| 15 | 35788 | 34.6 | 0 | 9 | 7.2 | 695 | 1690 | 6.9 | 101 | 1347 | 0.77 |
| 16 | 12306 | 47.8 | −100 | 10 | 7.6 | 651 | 1614 | 43 | 614 | 1350 | 0.09 |
| 17 | 10580 | 56.4 | −100 | 10 | 7.4 | 696 | 1711 | 69.1 | 837 | 1371 | 0.09 |
| 18 | 24181 | 44.9 | −71 | 8 | 6.1 | 735 | 1667 | 24.2 | 202 | 1441 | 0.25 |
| 19 | 23523 | 41.7 | −3 | 8 | 6.4 | 770 | 1781 | 25.4 | 241 | 1449 | 0.28 |
| 20 | 18378 | 32.5 | −59 | 8 | 7.1 | 629 | 1515 | 23.4 | 319 | 1395 | 0.12 |
| 21 | 18401 | 26.3 | −7 | 8 | 6.2 | 673 | 1539 | 26 | 312 | 1380 | 0.13 |
| 22 | 21259 | 32.5 | −18 | 8 | 6.7 | 684 | 1615 | 25.7 | 266 | 1409 | 0.18 |
| 23 | 23255 | 53.5 | −98 | 9 | 7.7 | 673 | 1680 | 16.2 | 220 | 1408 | 0.25 |
| 24 | 20398 | 32.5 | −6 | 9 | 7.1 | 679 | 1644 | 19.5 | 259 | 1374 | 0.18 |
| 25 | 24432 | 62.9 | −54 | 9 | 7.6 | 760 | 1886 | 14.8 | 213 | 1477 | 0.31 |
| 26 | 19914 | 53.5 | −80 | 10 | 10.9 | 600 | 1698 | 10.1 | 258 | 1443 | 0.15 |
| 27 | 19790 | 53.4 | −66 | 10 | 10.4 | 625 | 1742 | 10.2 | 287 | 1402 | 0.17 |
| 28 | 24618 | 53.5 | −66 | 10 | 8.8 | 668 | 1752 | 8.4 | 171 | 1433 | 0.29 |
| 29 | 23073 | 62.9 | −63 | 10 | 10.1 | 671 | 1848 | 9.7 | 224 | 1444 | 0.26 |
| 30 | 24152 | 62.9 | −70 | 10 | 9.6 | 678 | 1832 | 7.6 | 197 | 1439 | 0.3 |
| 31 | 24437 | 82 | −93 | 10 | 10.5 | 690 | 1929 | 8.1 | 209 | 1478 | 0.3 |
| 32 | 23043 | 62.9 | −60 | 10 | 8.6 | 717 | 1866 | 11.7 | 212 | 1468 | 0.25 |
| 33 | 20310 | 34.9 | −98 | 8 | 7.2 | 598 | 1455 | 22.3 | 262 | 1429 | 0.12 |
| 34 | 23662 | 40.6 | −93 | 8 | 6.9 | 650 | 1551 | 17.3 | 206 | 1416 | 0.21 |
| 35 | 24039 | 51.2 | −98 | 9 | 8 | 654 | 1652 | 12.5 | 182 | 1474 | 0.22 |
| 36 | 20133 | 43 | −58 | 9 | 7.8 | 661 | 1657 | 17.7 | 261 | 1434 | 0.18 |
| 37 | 20410 | 58.8 | −14 | 10 | 9.9 | 711 | 1944 | 13.9 | 297 | 1474 | 0.25 |
| 38 | 22900 | 64.6 | −6 | 10 | 10 | 737 | 2020 | 11.6 | 255 | 1478 | 0.34 |
| 39 | 28164 | 40.6 | 0 | 10 | 9.2 | 665 | 1773 | 4.3 | 149 | 1347 | 0.56 |
| 40 | 25626 | 40.7 | 0 | 9 | 7.1 | 736 | 1774 | 11.4 | 199 | 1348 | 0.58 |
| 41 | 23225 | 40.6 | 0 | 10 | 8.3 | 691 | 1772 | 8.8 | 229 | 1350 | 0.4 |
| 42 | 21410 | 40.4 | 0 | 10 | 9.4 | 660 | 1770 | 8.6 | 256 | 1350 | 0.38 |
| 43 | 19521 | 40.7 | 0 | 9 | 7.1 | 735 | 1774 | 16.5 | 344 | 1350 | 0.28 |
| 44 | 18233 | 41 | 0 | 9 | 7.8 | 709 | 1778 | 16.6 | 378 | 1350 | 0.28 |
| 45 | 19710 | 40.1 | 0 | 9 | 6.3 | 766 | 1766 | 17.7 | 353 | 1350 | 0.23 |
| 46 | 18510 | 40.7 | 0 | 10 | 7.6 | 716 | 1774 | 13.9 | 374 | 1350 | 0.21 |
| 47 | 15207 | 40.1 | 0 | 10 | 10.3 | 636 | 1766 | 12.7 | 489 | 1350 | 0.18 |
| 48 | 17374 | 40.6 | 0 | 10 | 7.9 | 705 | 1773 | 13.1 | 419 | 1350 | 0.17 |
| 49 | 20022 | 40.8 | 0 | 9 | 7.6 | 715 | 1776 | 16.8 | 313 | 1450 | 0.23 |
| 50 | 19304 | 40.8 | 0 | 9 | 6.9 | 742 | 1776 | 18.2 | 351 | 1450 | 0.17 |
| 51 | 17220 | 40.9 | 0 | 9 | 8.4 | 689 | 1777 | 16.7 | 408 | 1450 | 0.15 |
| 52 | 18140 | 40.8 | 0 | 9 | 7.2 | 730 | 1775 | 17.1 | 392 | 1450 | 0.14 |
| 53 | 16123 | 40.8 | 0 | 9 | 8.8 | 678 | 1775 | 15.8 | 459 | 1450 | 0.13 |
| 54 | 18670 | 40.7 | 0 | 10 | 8.4 | 690 | 1774 | 14 | 350 | 1450 | 0.16 |
| 55 | 15873 | 39.9 | 0 | 10 | 10.7 | 627 | 1764 | 13.3 | 439 | 1450 | 0.13 |
| 56 | 27161 | 40.8 | 0 | 9 | 8.5 | 687 | 1776 | 5.7 | 156 | 1523 | 0.26 |
| 57 | 22208 | 39.4 | 0 | 10 | 12.5 | 591 | 1757 | 4.7 | 214 | 1557 | 0.14 |
| 58 | 24006 | 40.9 | 0 | 9 | 7.6 | 717 | 1776 | 11.8 | 217 | 1550 | 0.19 |
| 59 | 20495 | 41 | 0 | 9 | 8.4 | 691 | 1778 | 12.1 | 287 | 1550 | 0.13 |
| 60 | 17397 | 40.2 | 0 | 9 | 10.8 | 627 | 1767 | 11.4 | 361 | 1550 | 0.1 |
| 61 | 24405 | 40.1 | 0 | 9 | 5.6 | 803 | 1766 | 14.4 | 236 | 1550 | 0.14 |
| 62 | 18478 | 39.8 | 0 | 10 | 11 | 620 | 1762 | 9.5 | 319 | 1550 | 0.1 |
| 63 | 19700 | 40.9 | 0 | 9 | 7.6 | 717 | 1778 | 17.9 | 322 | 1550 | 0.13 |
| 64 | 20730 | 46.7 | 0 | 10 | 12.4 | 599 | 1774 | 5.6 | 248 | 1523 | 0.15 |
| 65 | 26513 | 48.5 | 0 | 8 | 7.3 | 739 | 1809 | 13 | 195 | 1523 | 0.34 |
| 66 | 20516 | 39.3 | 0 | 10 | 9.3 | 656 | 1756 | 6.7 | 259 | 1399 | 0.25 |
| 67 | 27440 | 40.3 | −25 | 9 | 7.6 | 714 | 1769 | 7.4 | 177 | 1484 | 0.32 |
| 68 | 22948 | 40.2 | −25 | 9 | 7.1 | 733 | 1768 | 11.1 | 262 | 1401 | 0.27 |
| 69 | 23902 | 42.3 | 0 | 8 | 8.5 | 693 | 1795 | 9.4 | 230 | 1538 | 0.24 |
| 70 | 23444 | 39.3 | 0 | 8 | 6.1 | 771 | 1755 | 17.7 | 237 | 1432 | 0.31 |
| 71 | 22409 | 44.2 | 0 | 9 | 8.7 | 670 | 1753 | 6.8 | 228 | 1550 | 0.15 |
| 72 | 26430 | 40.1 | 0 | 8 | 7.1 | 730 | 1766 | 9.5 | 194 | 1527 | 0.26 |
| 73 | 24926 | 45.2 | 0 | 10 | 8.4 | 685 | 1767 | 6.1 | 202 | 1369 | 0.38 |
| 74 | 24030 | 46.7 | −25 | 9 | 10.6 | 634 | 1779 | 5.1 | 203 | 1482 | 0.27 |
| 75 | 24497 | 47.3 | 0 | 10 | 10.9 | 630 | 1786 | 4 | 180 | 1448 | 0.33 |
| 76 | 25286 | 38.4 | −25 | 8 | 7.4 | 711 | 1743 | 10.3 | 203 | 1461 | 0.34 |
| 77 | 27176 | 39.2 | −25 | 8 | 5.6 | 801 | 1754 | 16.8 | 181 | 1501 | 0.3 |
| 78 | 24306 | 42.3 | −25 | 10 | 9.8 | 633 | 1726 | 4.2 | 197 | 1388 | 0.31 |
| 79 | 21613 | 38.2 | 0 | 9 | 8.4 | 676 | 1740 | 7.5 | 245 | 1534 | 0.14 |
| 80 | 27294 | 43.6 | 0 | 10 | 9.5 | 647 | 1744 | 4.1 | 162 | 1385 | 0.43 |
| 81 | 26052 | 43.3 | −25 | 10 | 9.5 | 646 | 1740 | 5.4 | 175 | 1355 | 0.49 |
| 82 | 26029 | 48.9 | 0 | 10 | 9.4 | 674 | 1808 | 4.8 | 187 | 1360 | 0.52 |
| 83 | 21762 | 48.9 | −25 | 10 | 10.9 | 637 | 1804 | 4.9 | 252 | 1452 | 0.22 |

TABLE 5-continued

| Emb. | $N2_{R/L}$ (RPM) | $OPR_{T/O}$ | $T_{IC}$ (°R) | $N_{Stg}$ | AR | $T25_{T/O}$ (°R) | $T3_{T/O}$ (°R) | $HSP_X$ (in²) | $A_{F,IN}$ (in²) | $U_{RIM,R/L}$ (ft/s) | $HSP\_U_{RIM,R/L}$ (in$^{-2/3}$(ft/s/°R)$^{-3}$) |
|---|---|---|---|---|---|---|---|---|---|---|---|
| 84 | 24839 | 44.3 | −25 | 10 | 8 | 720 | 1820 | 7.9 | 197 | 1376 | 0.45 |
| 85 | 25546 | 43.2 | −25 | 9 | 6.2 | 763 | 1749 | 13.4 | 210 | 1403 | 0.35 |
| 86 | 23396 | 45.3 | −25 | 10 | 12.4 | 593 | 1758 | 3.8 | 190 | 1468 | 0.28 |
| 87 | 21419 | 47.9 | 0 | 10 | 12.4 | 605 | 1789 | 4.3 | 253 | 1463 | 0.21 |
| 88 | 26095 | 44.8 | −25 | 10 | 9.6 | 651 | 1759 | 4.1 | 167 | 1443 | 0.32 |
| 89 | 23364 | 48.5 | −25 | 10 | 10.9 | 635 | 1799 | 4.9 | 223 | 1481 | 0.24 |
| 90 | 24653 | 40 | −25 | 10 | 11.1 | 620 | 1766 | 4.5 | 195 | 1396 | 0.4 |
| 91 | 23589 | 41.3 | −25 | 9 | 7.3 | 731 | 1782 | 12.5 | 247 | 1356 | 0.43 |
| 92 | 20805 | 47.8 | −25 | 10 | 13.9 | 579 | 1784 | 4.3 | 251 | 1497 | 0.19 |
| 93 | 23344 | 41.4 | 0 | 9 | 7.6 | 721 | 1783 | 12.1 | 244 | 1386 | 0.39 |
| 94 | 26303 | 47.6 | 0 | 10 | 10.7 | 637 | 1790 | 3.8 | 172 | 1407 | 0.44 |
| 95 | 23050 | 41.7 | −25 | 10 | 10.2 | 646 | 1787 | 4.7 | 230 | 1456 | 0.22 |
| 96 | 23094 | 42.4 | 0 | 10 | 8.9 | 683 | 1796 | 7.2 | 239 | 1367 | 0.39 |
| 97 | 24334 | 45.9 | −25 | 10 | 10.3 | 637 | 1770 | 5.2 | 206 | 1380 | 0.41 |
| 98 | 24109 | 46 | 0 | 10 | 10.8 | 627 | 1770 | 4.4 | 207 | 1477 | 0.23 |
| 99 | 27525 | 48.7 | 0 | 10 | 9 | 683 | 1806 | 4.3 | 151 | 1505 | 0.31 |
| 100 | 26067 | 48.4 | −25 | 8 | 6 | 801 | 1813 | 17.6 | 197 | 1541 | 0.28 |
| 101 | 24924 | 41.3 | −25 | 9 | 6.3 | 776 | 1782 | 13.1 | 230 | 1354 | 0.4 |
| 102 | 25797 | 39.3 | −25 | 10 | 9.6 | 648 | 1756 | 4.7 | 182 | 1355 | 0.49 |
| 103 | 24704 | 43.8 | −25 | 9 | 8.1 | 688 | 1751 | 9.7 | 214 | 1374 | 0.46 |
| 104 | 26645 | 43.6 | 0 | 10 | 7.4 | 713 | 1750 | 6.3 | 181 | 1355 | 0.43 |
| 105 | 23578 | 48.7 | 0 | 10 | 10.6 | 643 | 1803 | 4.6 | 221 | 1367 | 0.43 |
| 106 | 27652 | 45.3 | −25 | 10 | 8.6 | 680 | 1768 | 4.9 | 168 | 1406 | 0.41 |
| 107 | 21015 | 42.1 | −25 | 10 | 8.9 | 682 | 1793 | 8.5 | 271 | 1354 | 0.35 |
| 108 | 24454 | 47.1 | −25 | 9 | 8.9 | 679 | 1788 | 6.1 | 213 | 1523 | 0.22 |
| 109 | 25294 | 45 | −25 | 9 | 9.1 | 665 | 1763 | 5.8 | 177 | 1517 | 0.25 |
| 110 | 24002 | 43.8 | 0 | 10 | 9.7 | 667 | 1814 | 6.2 | 219 | 1384 | 0.42 |
| 111 | 25956 | 44.8 | −25 | 10 | 7.6 | 710 | 1764 | 6.1 | 191 | 1392 | 0.36 |
| 112 | 23911 | 46.1 | −25 | 10 | 9.6 | 654 | 1774 | 4.2 | 193 | 1368 | 0.4 |
| 113 | 24993 | 44.5 | 0 | 9 | 6.5 | 758 | 1764 | 13.1 | 228 | 1379 | 0.36 |
| 114 | 24106 | 46.7 | −25 | 8 | 8.4 | 694 | 1784 | 11 | 228 | 1537 | 0.24 |
| 115 | 26699 | 40.3 | −25 | 9 | 7.2 | 728 | 1769 | 8.6 | 182 | 1463 | 0.34 |
| 116 | 24229 | 44.4 | −25 | 8 | 8.3 | 685 | 1757 | 10.8 | 220 | 1510 | 0.28 |
| 117 | 21483 | 46.8 | −25 | 9 | 9.5 | 662 | 1783 | 9.1 | 252 | 1524 | 0.19 |
| 118 | 23965 | 43.5 | 0 | 10 | 8.7 | 695 | 1810 | 6.5 | 221 | 1423 | 0.32 |
| 119 | 26550 | 40.8 | −25 | 8 | 6.3 | 770 | 1776 | 13 | 179 | 1542 | 0.28 |
| 120 | 24214 | 42.7 | −25 | 10 | 7.9 | 715 | 1799 | 7.7 | 221 | 1404 | 0.32 |
| 121 | 32209 | 40.9 | −100 | 9 | 7.2 | 630 | 1533 | 5.7 | 95 | 1280 | 0.59 |
| 122 | 30420 | 41.6 | −100 | 9 | 7.2 | 634 | 1542 | 8.2 | 105 | 1280 | 0.56 |
| 123 | 32209 | 40.9 | −100 | 9 | 7.2 | 630 | 1533 | 5.7 | 95 | 1280 | 0.58 |
| 124 | 29302 | 40.3 | −100 | 9 | 6.2 | 673 | 1540 | 5.1 | 113 | 1280 | 0.46 |
| 125 | 29982 | 40.8 | −100 | 9 | 7.1 | 634 | 1534 | 4.6 | 107 | 1280 | 0.52 |
| 126 | 28112 | 41.0 | −100 | 9 | 7.9 | 606 | 1527 | 4.4 | 120 | 1280 | 0.53 |
| 127 | 28852 | 40.6 | −100 | 10 | 8.4 | 588 | 1515 | 4.4 | 108 | 1280 | 0.53 |
| 128 | 27120 | 52.7 | −100 | 10 | 9.4 | 614 | 1648 | 5.7 | 121 | 1280 | 0.64 |
| 129 | 28059 | 40.6 | −100 | 10 | 7.9 | 605 | 1522 | 4.4 | 101 | 1280 | 0.46 |
| 130 | 30335 | 41.1 | −100 | 9 | 7.6 | 618 | 1531 | 4.7 | 105 | 1280 | 0.52 |
| 131 | 28034 | 36.9 | −100 | 9 | 8.8 | 559 | 1462 | 4.1 | 121 | 1280 | 0.49 |
| 132 | 19914 | 53.5 | −80 | 10 | 10.9 | 600 | 1698 | 10.1 | 231 | 1443 | 0.34 |
| 133 | 24039 | 51.2 | −98 | 9 | 8.0 | 654 | 1652 | 12.5 | 182 | 1474 | 0.33 |
| 134 | 20133 | 43.0 | −58 | 9 | 7.8 | 661 | 1657 | 13.7 | 261 | 1434 | 0.31 |
| 135 | 23255 | 53.5 | −98 | 9 | 7.7 | 673 | 1680 | 16.2 | 220 | 1408 | 0.30 |
| 136 | 23344 | 36.1 | −50 | 8 | 7.5 | 645 | 1588 | 14.8 | 237 | 1426 | 0.30 |
| 137 | 20183 | 62.9 | −70 | 9 | 9.6 | 678 | 1832 | 9.4 | 197 | 1203 | 0.96 |
| 138 | 28788 | 42.1 | −100 | 8 | 7.7 | 618 | 1543 | 9.8 | 101 | 1084 | 1.17 |
| 139 | 23444 | 39.3 | −80 | 8 | 6.1 | 691 | 1573 | 17.7 | 237 | 1432 | 0.27 |
| 140 | 23344 | 48.7 | −100 | 9 | 7.6 | 657 | 1625 | 14.2 | 244 | 1386 | 0.34 |
| 141 | 25626 | 31.8 | −100 | 9 | 7.1 | 584 | 1407 | 10.7 | 199 | 1348 | 0.31 |
| 142 | 23344 | 36.1 | −100 | 9 | 7.5 | 595 | 1465 | 11.9 | 237 | 1426 | 0.26 |
| 143 | 23344 | 36.1 | −100 | 8 | 7.5 | 595 | 1465 | 16.2 | 237 | 1426 | 0.24 |
| 144 | 23344 | 40.7 | −100 | 9 | 7.5 | 621 | 1528 | 13.5 | 237 | 1426 | 0.28 |
| 145 | 28788 | 44.1 | −100 | 9 | 7.7 | 628 | 1568 | 9.2 | 101 | 1084 | 1.18 |

The embodiments 1 to 145 of TABLE 5 are the same as the embodiments 1 to 145 of TABLES 1 to 4, but TABLE 5 includes parameters in the $HSP\_U_{RIM,R/L}$ relationship (16) above. The ranges of $N2_{R/L}$, $OPR_{T/O}$, $T_{IC}$, $N_{STG}$, $A_{IN}$, $A_{EX}$, AR, $T25_{T/O}$, $T3_{T/O}$, $L_{CORE}/D_{CORE}$, $A_{F,IN}$, and $U_{RIM,R/L}$ are detailed above. In general, lower $FN_{T/O}$, higher EGT, and/or higher $OPR_{T/O}$ results in lower core size (e.g., lower $L_{CORE}$ and lower $D_{CORE}$), but higher $L_{CORE}/D_{CORE}$, higher $N2_{R/L}$, and higher HSR, and, thus, making it more challenging to meet dynamics margins (e.g., Alford stability and/or third mode margin). $A_{IN}$ and $A_{EX}$ is proportional to the engine core size. AI is indicative of the HP compressor inlet corrected flow and the HP compressor pressure ratio, and, thus, indicative of T25. AR is indictive of the HP compressor pressure ratio (e.g., indicative of T25). $U_{RIM,R/L}$ is indicative of the HP compressor exit hub radius and $N2_{R/L}$. $A_{F,IN}$ and $T3_{T/O}$ are indicative of the HP compressor inlet temperature and the corrected flow. Accordingly, embodiments 1 to 145 provide for lowering the core size, while accounting for the dynamics margins and overall engine performance.

Figure 24:
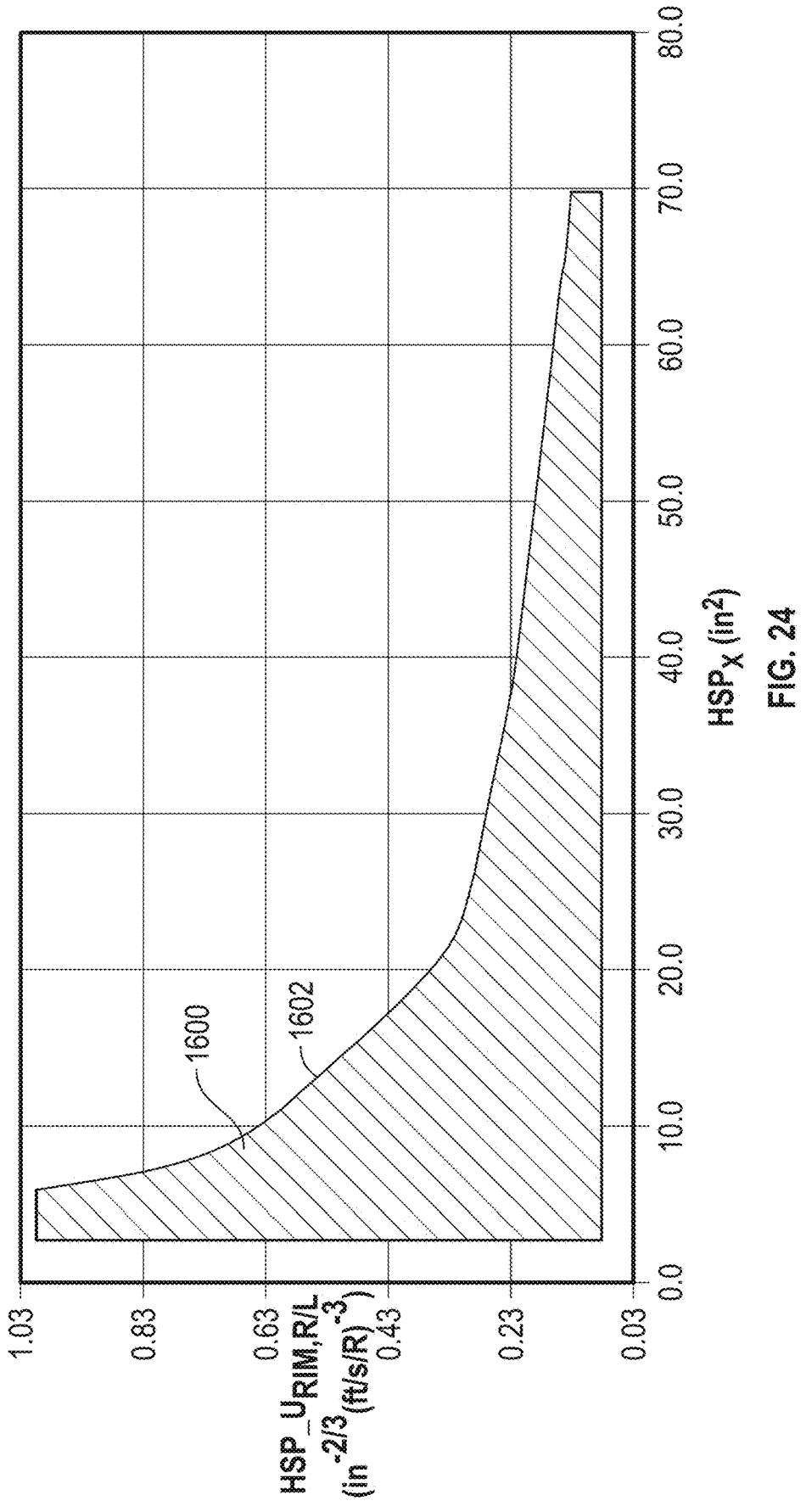
FIG. 24 represents, in graph form, an exit rim speed (at redline speeds) high-speed shaft rating ($HSP\_U_{RIM,R/L}$) as a function of the $HSP_X$.

FIG. 24 represents, in graph form, the $HSP\_U_{RIM,R/L}$ as a function of the $HSP_X$. $HSP_X$ is given by relationship (10)

detailed above. $HSP\_U_{RIM,R/L}$ is in a range from 0.09 in$^{-2/3}$ (ft/s/°R)$^{-3}$ to 1.00 in$^{-2/3}$ (ft/s/°R)$^{-3}$, and $HSP_X$ is in a range from 3.8 in$^2$ to 69.1 in$^2$. An area 1600 represents the boundaries of $HSP\_U_{RIM,R/L}$ and $HSP_X$. $HSP\_U_{RIM,R/L}$ and $HSP_X$ are bounded by an upper bound 1302. The upper bound 1602 is given by (29):

$$HSP\_U_{RIM,R/L} < \frac{6.6}{(HSP_X)} \tag{29}$$

With reference to TABLE 5 and FIG. 24, in general, $HSP\_U_{RIM,R/L}$ increases as $HSP_X$ increases, and $HSP\_U_{RIM,R/L}$ decreases as $HSP_X$ increases. $HSP_X$ increases with increased $A_{EX}$, increased $OPR_{T/O}$, and decreases with increased $FN_{T/O}$. In general, better engine performance, higher BPR, smaller engine core size, higher $L_{CORE}/D_{CORE}$, and higher T25 result in reduced dynamics margins. Higher $A_{F,IN}$, greater amount of HP compressor stages, higher HP compressor pressure ratio, lower T25, and higher inlet corrected flow result in lower $N2_{R/L}$. Higher $U_{RIM,R/L}$ and reduced blade height, or increased HP compressor speeds, and lower HP compressor pressure ratios result in improved dynamics margin with marginal performance penalties. Accordingly, embodiments 1 to 145 provide for balancing higher $N_{STG}$ and $A_{F,IN}$ with increased radius ratios to meet dynamics margins with improved performance of the engine core (and of the overall engine).

The lower the $HSP\_U_{RIM,R/L}$, the greater the third mode margin and the higher T3 (OPR capability) for performance. Thus, the $HSP\_U_{RIM,R/L}$ is selected for providing a balance among improving the third mode margin of the HP shaft, without overly reducing performance of the HP compressor and/or the HP turbine.

Accordingly, the area 1600 having the upper bound 1602 provides for an improved engine having: 1. an enhanced engine performance (i.e., a higher thermodynamic performance meaning a lower specific fuel consumption at a given thrust level and at a given overall pressure ratio (OPR) of the turbine engine, and 2. a dynamics constraint that ensures the HP shaft avoids operating at, or near, the third mode of the HP shaft to avoid exciting the third mode of the HP shaft during normal operation of the turbine engine, as detailed above with respect to FIGS. 17 to 19.

Figure 25:
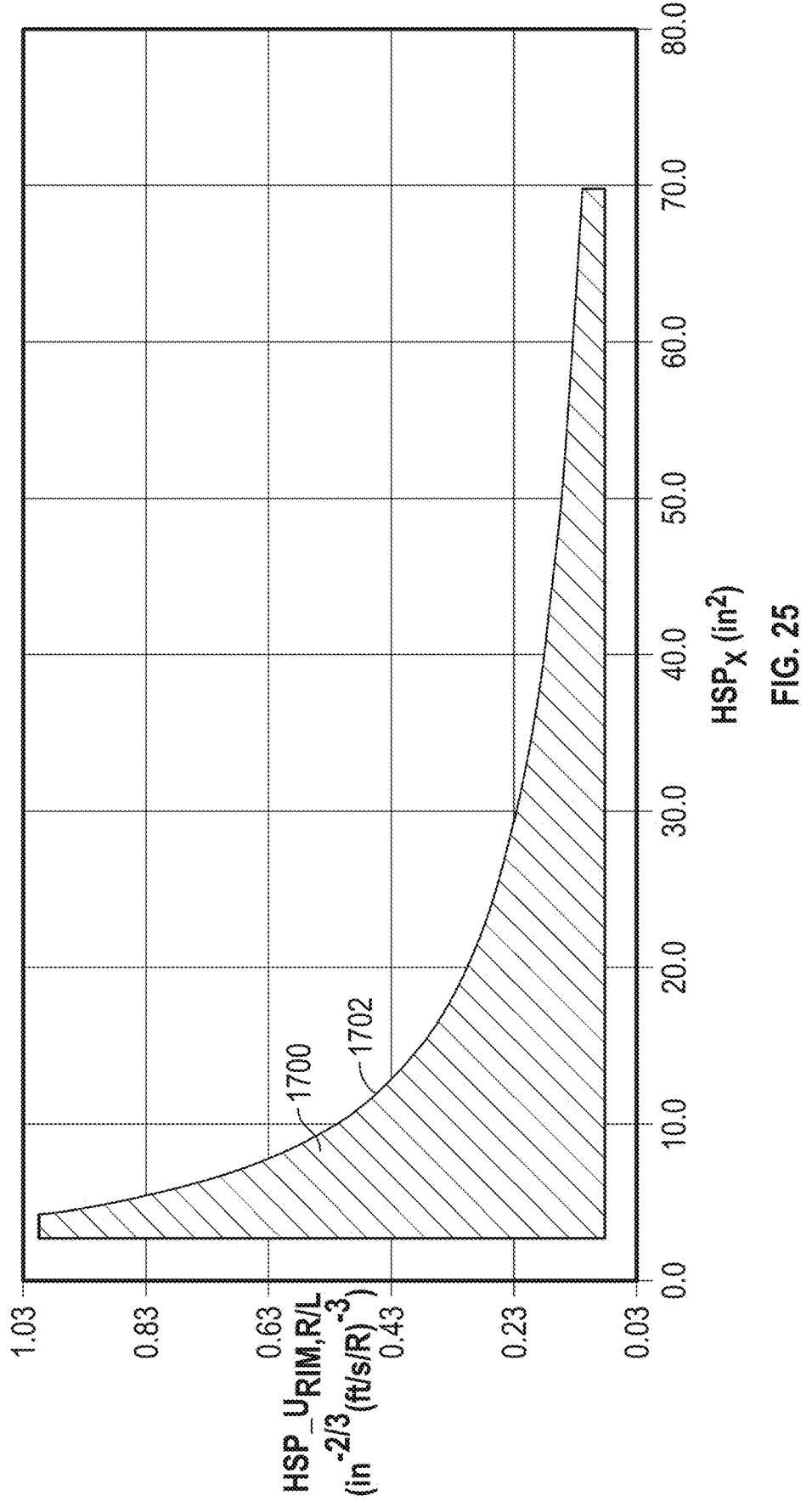
FIG. 25 represents, in graph form, an exit rim speed (at redline speeds) high-speed shaft rating ($HSP\_U_{RIM,R/L}$) as a function of the $HSP_X$, according to another embodiment.

FIG. 25 represents, in graph form, the $HSP\_U_{RIM,R/L}$ as a function of the $HSP_X$, according to another embodiment. $HSP_X$ is given by relationship (10) detailed above. $HSP\_U_{RIM,R/L}$ is in a range from 0.09 in$^{-2/3}$ (ft/s/°R)$^{-3}$ to 1.00 in$^{-2/3}$ (ft/s/°R)$^{-3}$, and $HSP_X$ is in a range from 3.8 in$^2$ to 69.1 in$^2$. An area 1700 represents the boundaries of $HSP\_U_{RIM,R/L}$ and $HSP_X$. $HSP\_U_{RIM,R/L}$ and $HSP_X$ are bounded by an upper bound 1702. The upper bound 1702 is given by (30):

$$HSP\_U_{RIM,R/L} < \frac{2.9}{HSP_X^{0.75}} \tag{30}$$

With reference to TABLE 5 and FIG. 25, in general, $HSP\_U_{RIM,R/L}$ increases as $HSP_X$ increases, and $HSP\_U_{RIM,R/L}$ decreases as $HSP_X$ increases, as detailed above. $HSP_X$ increases with increased $A_{EX}$, increased $OPR_{T/O}$, and decreases with increased $FN_{T/O}$, as detailed above.

In general, the area 1700 having the upper bound 1702 provides for an improved engine having: 1. an enhanced engine performance (i.e., a higher thermodynamic performance meaning a lower specific fuel consumption at a given thrust level and at a given overall pressure ratio (OPR) of the turbine engine, and 2. a dynamics constraint that ensures the HP shaft avoids operating at, or near, the third mode of the HP shaft to avoid exciting the third mode of the HP shaft during normal operation of the turbine engine, as detailed above with respect to FIGS. 17 to 19.

TABLE 6 lists embodiments of the HP compressor and the HP shaft along with the associated $HSP_{RR}$ values of the HP compressor and the HP shaft. The embodiments inform of the dimensions or qualities of the HP compressor and the HP shaft that are believed reasonable and practical for the HP compressor and the HP shaft for providing a balance among improving the third mode margin of the HP shaft, without overly reducing performance of the HP compressor and/or the HP turbine. In other words, the $HSP_{RR}$ indicates the operating range of interest, taking into account the constraints in which the HP compressor operates, e.g., the HP compressor inlet temperature and the HP compressor inlet corrected flow, that have not been previously considered in HP compressor and HP shaft designs, as detailed above.

TABLE 6

| Emb. | $OPR_{T/O}$ | $T_{IC}$ (°R) | $N_{Stg}$ | $R_{HUB,IN}/R_{TIP,IN}$ | $R_{TIP,IN}$ (in) | $R_{TIP,EX}$ (in) | AR | $T25_{T/O}$ (°R) | $HSP_X$ (in²) | $HSP_{RR}$ |
|---|---|---|---|---|---|---|---|---|---|---|
| 1 | 49.5 | 0 | 10 | 0.47 | 8.35 | 6.9 | 7.9 | 747 | 9.3 | 37.6 |
| 2 | 44.1 | 0 | 9 | 0.56 | 8.68 | 7.58 | 7.3 | 745 | 10.8 | 24.6 |
| 3 | 41.8 | 0 | 10 | 0.47 | 8.85 | 7.86 | 8.6 | 690 | 8.5 | 23.7 |
| 4 | 40.7 | 0 | 10 | 0.47 | 8.6 | 7.72 | 8.4 | 690 | 7.7 | 25 |
| 5 | 44.1 | 0 | 9 | 0.56 | 8.9 | 7.8 | 7.3 | 745 | 12.2 | 22.4 |
| 6 | 44.1 | 0 | 10 | 0.56 | 10.25 | 8.03 | 7.8 | 725 | 15.1 | 24.4 |
| 7 | 44.1 | 0 | 11 | 0.56 | 11.2 | 8.41 | 8.5 | 702 | 15 | 22.3 |
| 8 | 44.1 | 0 | 9 | 0.56 | 9.4 | 8.38 | 7.2 | 749 | 15.5 | 20.3 |
| 9 | 44.1 | 0 | 9 | 0.56 | 9.1 | 8.01 | 7.2 | 749 | 13.5 | 23.3 |
| 10 | 44.1 | 0 | 9 | 0.56 | 10.35 | 8.43 | 7.2 | 748 | 20.6 | 26.8 |
| 11 | 44.1 | 0 | 8 | 0.57 | 10.25 | 8.76 | 6.5 | 780 | 30.4 | 24 |
| 12 | 37.4 | 0 | 8 | 0.57 | 9.69 | 8.76 | 5.8 | 777 | 36.9 | 19.5 |
| 13 | 31.7 | 0 | 8 | 0.57 | 9.69 | 8.76 | 5.8 | 740 | 44.7 | 14.6 |
| 14 | 40.9 | 0 | 9 | 0.4 | 5.68 | 4.73 | 7.2 | 730 | 5.7 | 62.5 |
| 15 | 34.6 | 0 | 9 | 0.4 | 5.68 | 4.73 | 7.2 | 695 | 6.9 | 50.7 |
| 16 | 47.8 | −100 | 10 | 0.4 | 13.98 | 13.4 | 7.6 | 651 | 43 | 11.2 |
| 17 | 56.4 | −100 | 10 | 0.4 | 16.32 | 15.83 | 7.4 | 696 | 69.1 | 12.9 |
| 18 | 44.9 | −71 | 8 | 0.52 | 8.02 | 7.37 | 6.1 | 735 | 24.2 | 22.4 |
| 19 | 41.7 | −3 | 8 | 0.56 | 8.76 | 7.62 | 6.4 | 770 | 25.4 | 23.6 |
| 20 | 32.5 | −59 | 8 | 0.57 | 10.07 | 9.24 | 7.1 | 629 | 23.4 | 9.9 |
| 21 | 26.3 | −7 | 8 | 0.58 | 9.96 | 9.2 | 6.2 | 673 | 26 | 11.9 |

73 74

TABLE 6-continued

| Emb. | $OPR_{T/O}$ | $T_{IC}$ (°R) | $N_{Stg}$ | $R_{HUB,IN}/R_{TIP,IN}$ | $R_{TIP,IN}$ (in) | $R_{TIP,EX}$ (in) | AR | $T25_{T/O}$ (°R) | $HSP_X$ (in²) | $HSP_{RR}$ |
|---|---|---|---|---|---|---|---|---|---|---|
| 22 | 32.5 | −18 | 8 | 0.54 | 9.2 | 8.17 | 6.7 | 684 | 25.7 | 15.8 |
| 23 | 53.5 | −98 | 9 | 0.47 | 8.37 | 7.43 | 7.7 | 673 | 16.2 | 20.6 |
| 24 | 32.5 | −6 | 9 | 0.54 | 9.09 | 8.23 | 7.1 | 679 | 19.5 | 15.1 |
| 25 | 62.9 | −54 | 9 | 0.56 | 8.23 | 7.35 | 7.6 | 760 | 14.8 | 24.4 |
| 26 | 53.5 | −80 | 10 | 0.5 | 9.06 | 8.64 | 10.9 | 600 | 10.1 | 11.3 |
| 27 | 53.4 | −66 | 10 | 0.55 | 9.55 | 8.49 | 10.4 | 625 | 10.2 | 12.1 |
| 28 | 53.5 | −66 | 10 | 0.46 | 7.39 | 7.03 | 8.8 | 668 | 8.4 | 22.2 |
| 29 | 62.9 | −63 | 10 | 0.53 | 8.45 | 7.52 | 10.1 | 671 | 9.7 | 18.2 |
| 30 | 62.9 | −70 | 10 | 0.54 | 7.91 | 7.16 | 9.6 | 678 | 7.6 | 20.7 |
| 31 | 82 | −93 | 10 | 0.57 | 8.16 | 7.23 | 10.5 | 690 | 8.1 | 19.9 |
| 32 | 62.9 | −60 | 10 | 0.43 | 8.21 | 7.73 | 8.6 | 717 | 11.7 | 21.9 |
| 33 | 34.9 | −98 | 8 | 0.46 | 9.13 | 8.61 | 7.2 | 598 | 22.3 | 12.3 |
| 34 | 40.6 | −93 | 8 | 0.52 | 8.11 | 7.35 | 6.9 | 650 | 17.3 | 17.2 |
| 35 | 51.2 | −98 | 9 | 0.44 | 7.6 | 7.43 | 8 | 654 | 12.5 | 19.3 |
| 36 | 43 | −58 | 9 | 0.47 | 9.12 | 8.65 | 7.8 | 661 | 17.7 | 16 |
| 37 | 58.8 | −14 | 10 | 0.51 | 9.72 | 8.69 | 9.9 | 711 | 13.9 | 20.3 |
| 38 | 64.6 | −6 | 10 | 0.55 | 9.01 | 7.77 | 10 | 737 | 11.6 | 24.9 |
| 39 | 40.6 | 0 | 10 | 0.54 | 6.89 | 5.8 | 9.2 | 665 | 4.3 | 31.8 |
| 40 | 40.7 | 0 | 9 | 0.4 | 7.95 | 6.62 | 7.1 | 736 | 11.4 | 46.3 |
| 41 | 40.6 | 0 | 10 | 0.4 | 8.53 | 7.19 | 8.3 | 691 | 8.8 | 33.1 |
| 42 | 40.4 | 0 | 10 | 0.4 | 9.03 | 7.71 | 9.4 | 660 | 8.6 | 29.4 |
| 43 | 40.7 | 0 | 9 | 0.54 | 10.46 | 8.59 | 7.1 | 735 | 16.5 | 23.7 |
| 44 | 41 | 0 | 9 | 0.54 | 10.97 | 9.1 | 7.8 | 709 | 16.6 | 22 |
| 45 | 40.1 | 0 | 9 | 0.6 | 10.6 | 8.54 | 6.3 | 766 | 17.7 | 20.5 |
| 46 | 40.7 | 0 | 10 | 0.54 | 10.91 | 9 | 7.6 | 716 | 13.9 | 18.7 |
| 47 | 40.1 | 0 | 10 | 0.54 | 12.48 | 10.69 | 10.3 | 636 | 12.7 | 14.2 |
| 48 | 40.6 | 0 | 10 | 0.6 | 11.55 | 9.49 | 7.9 | 705 | 13.1 | 14.9 |
| 49 | 40.8 | 0 | 9 | 0.4 | 9.99 | 8.94 | 7.6 | 715 | 16.8 | 23.9 |
| 50 | 40.8 | 0 | 9 | 0.54 | 10.57 | 9.25 | 6.9 | 742 | 18.2 | 17 |
| 51 | 40.9 | 0 | 9 | 0.54 | 11.4 | 10.2 | 8.4 | 689 | 16.7 | 14.1 |
| 52 | 40.8 | 0 | 9 | 0.6 | 11.17 | 9.75 | 7.2 | 730 | 17.1 | 13.5 |
| 53 | 40.8 | 0 | 9 | 0.6 | 12.09 | 10.81 | 8.8 | 678 | 15.8 | 11.1 |
| 54 | 40.7 | 0 | 10 | 0.4 | 10.55 | 9.51 | 8.4 | 690 | 14 | 17.8 |
| 55 | 39.9 | 0 | 10 | 0.4 | 11.82 | 10.98 | 10.7 | 627 | 13.3 | 13.2 |
| 56 | 40.8 | 0 | 9 | 0.6 | 7.06 | 6.71 | 8.5 | 687 | 5.7 | 18.2 |
| 57 | 39.4 | 0 | 10 | 0.54 | 8.26 | 8.27 | 12.5 | 591 | 4.7 | 10 |
| 58 | 40.9 | 0 | 9 | 0.4 | 8.32 | 7.9 | 7.6 | 717 | 11.8 | 21.5 |
| 59 | 41 | 0 | 9 | 0.54 | 9.56 | 9.1 | 8.4 | 691 | 12.1 | 12.7 |
| 60 | 40.2 | 0 | 9 | 0.54 | 10.72 | 10.57 | 10.8 | 627 | 11.4 | 9.1 |
| 61 | 40.1 | 0 | 9 | 0.6 | 8.66 | 7.84 | 5.6 | 803 | 14.4 | 17.5 |
| 62 | 39.8 | 0 | 10 | 0.4 | 10.08 | 10.01 | 11 | 620 | 9.5 | 10.8 |
| 63 | 40.9 | 0 | 9 | 0.4 | 10.12 | 9.62 | 7.6 | 717 | 17.9 | 16.7 |
| 64 | 46.7 | 0 | 10 | 0.46 | 8.88 | 8.71 | 12.4 | 599 | 5.6 | 12 |
| 65 | 48.5 | 0 | 8 | 0.45 | 7.87 | 7.08 | 7.3 | 739 | 13 | 29.7 |
| 66 | 39.3 | 0 | 10 | 0.45 | 9.07 | 8.25 | 9.3 | 656 | 6.7 | 20.1 |
| 67 | 40.3 | −25 | 9 | 0.45 | 7.51 | 6.66 | 7.6 | 714 | 7.4 | 28.3 |
| 68 | 40.2 | −25 | 9 | 0.54 | 9.14 | 7.57 | 7.1 | 733 | 11.1 | 23.5 |
| 69 | 42.3 | 0 | 8 | 0.53 | 8.55 | 7.78 | 8.5 | 693 | 9.4 | 19.2 |
| 70 | 39.3 | 0 | 8 | 0.51 | 8.69 | 7.62 | 6.1 | 771 | 17.7 | 27.1 |
| 71 | 44.2 | 0 | 9 | 0.54 | 8.53 | 8.29 | 8.7 | 670 | 6.8 | 13.3 |
| 72 | 40.1 | 0 | 8 | 0.55 | 7.86 | 7.06 | 7.1 | 730 | 9.5 | 21.5 |
| 73 | 45.2 | 0 | 10 | 0.48 | 8.02 | 6.74 | 8.4 | 685 | 6.1 | 28.5 |
| 74 | 46.7 | −25 | 9 | 0.56 | 8.03 | 7.36 | 10.6 | 634 | 5.1 | 17.5 |
| 75 | 47.3 | 0 | 10 | 0.45 | 7.56 | 7.08 | 10.9 | 630 | 4 | 22.3 |
| 76 | 38.4 | −25 | 8 | 0.51 | 8.03 | 7.1 | 7.4 | 711 | 10.3 | 26.1 |
| 77 | 39.2 | −25 | 8 | 0.45 | 7.58 | 6.94 | 5.6 | 801 | 16.8 | 31.2 |
| 78 | 42.3 | −25 | 10 | 0.55 | 7.91 | 6.88 | 9.8 | 633 | 4.2 | 20.4 |
| 79 | 38.2 | 0 | 9 | 0.55 | 8.83 | 8.52 | 8.4 | 676 | 7.5 | 13 |
| 80 | 43.6 | 0 | 10 | 0.47 | 7.19 | 6.17 | 9.5 | 647 | 4.1 | 28.8 |
| 81 | 43.3 | −25 | 10 | 0.42 | 7.46 | 6.35 | 9.5 | 646 | 5.4 | 33.3 |
| 82 | 48.9 | 0 | 10 | 0.49 | 7.71 | 6.38 | 9.4 | 674 | 4.8 | 33.3 |
| 83 | 48.9 | −25 | 10 | 0.53 | 8.96 | 7.99 | 10.9 | 637 | 4.9 | 16.2 |
| 84 | 44.3 | −25 | 10 | 0.43 | 7.91 | 6.83 | 8 | 720 | 7.9 | 35.8 |
| 85 | 43.2 | −25 | 9 | 0.43 | 8.17 | 6.96 | 6.2 | 763 | 13.4 | 34.6 |
| 86 | 45.3 | −25 | 10 | 0.41 | 7.78 | 7.46 | 12.4 | 593 | 3.8 | 19.2 |
| 87 | 47.9 | 0 | 10 | 0.53 | 8.98 | 8.12 | 12.4 | 605 | 4.3 | 14 |
| 88 | 44.8 | −25 | 10 | 0.49 | 7.3 | 6.66 | 9.6 | 651 | 4.1 | 22.7 |
| 89 | 48.5 | −25 | 10 | 0.41 | 8.43 | 7.63 | 10.9 | 635 | 4.9 | 20.4 |
| 90 | 40 | −25 | 10 | 0.4 | 7.88 | 6.84 | 11.1 | 620 | 4.5 | 27.8 |
| 91 | 41.3 | −25 | 9 | 0.45 | 8.86 | 7.21 | 7.3 | 731 | 12.5 | 35.3 |
| 92 | 47.8 | −25 | 10 | 0.45 | 8.93 | 8.52 | 13.9 | 579 | 4.3 | 13.4 |
| 93 | 41.4 | 0 | 9 | 0.44 | 8.82 | 7.39 | 7.6 | 721 | 12.1 | 33 |
| 94 | 47.6 | 0 | 10 | 0.46 | 7.4 | 6.45 | 10.7 | 637 | 3.8 | 28.1 |
| 95 | 41.7 | −25 | 10 | 0.56 | 8.55 | 7.57 | 10.2 | 646 | 4.7 | 15.9 |
| 96 | 42.4 | 0 | 10 | 0.4 | 8.73 | 7.29 | 8.9 | 683 | 7.2 | 31.8 |
| 97 | 45.9 | −25 | 10 | 0.41 | 8.11 | 6.89 | 10.3 | 637 | 5.2 | 29.2 |
| 98 | 46 | 0 | 10 | 0.48 | 8.11 | 7.35 | 10.8 | 627 | 4.4 | 17.7 |

TABLE 6-continued

| Emb. | $OPR_{T/O}$ | $T_{IC}$ (°R) | $N_{Stg}$ | $R_{HUB,IN}/R_{TIP,IN}$ | $R_{TIP,IN}$ (in) | $R_{TIP,EX}$ (in) | AR | $T25_{T/O}$ (°R) | $HSP_X$ (in²) | $HSP_{RR}$ |
|---|---|---|---|---|---|---|---|---|---|---|
| 99 | 48.7 | 0 | 10 | 0.41 | 6.94 | 6.61 | 9 | 683 | 4.3 | 26.5 |
| 100 | 48.4 | −25 | 8 | 0.44 | 7.93 | 7.37 | 6 | 801 | 17.6 | 30.1 |
| 101 | 41.3 | −25 | 9 | 0.51 | 8.56 | 6.89 | 6.3 | 776 | 13.1 | 34.2 |
| 102 | 39.3 | −25 | 10 | 0.41 | 7.61 | 6.42 | 9.6 | 648 | 4.7 | 34.2 |
| 103 | 43.8 | −25 | 9 | 0.41 | 8.26 | 6.9 | 8.1 | 688 | 9.7 | 35.7 |
| 104 | 43.6 | 0 | 10 | 0.45 | 7.59 | 6.33 | 7.4 | 713 | 6.3 | 35 |
| 105 | 48.7 | 0 | 10 | 0.49 | 8.39 | 7.01 | 10.6 | 643 | 4.6 | 26.9 |
| 106 | 45.3 | −25 | 10 | 0.44 | 7.32 | 6.24 | 8.6 | 680 | 4.9 | 31.7 |
| 107 | 42.1 | −25 | 10 | 0.44 | 9.29 | 7.9 | 8.9 | 682 | 8.5 | 28 |
| 108 | 47.1 | −25 | 9 | 0.55 | 8.24 | 7.5 | 8.9 | 679 | 6.1 | 17.5 |
| 109 | 45 | −25 | 9 | 0.53 | 7.5 | 7.19 | 9.1 | 665 | 5.8 | 18.4 |
| 110 | 43.8 | 0 | 10 | 0.41 | 8.35 | 7.04 | 9.7 | 667 | 6.2 | 31.3 |
| 111 | 44.8 | −25 | 10 | 0.43 | 7.81 | 6.65 | 7.6 | 710 | 6.1 | 31.9 |
| 112 | 46.1 | −25 | 10 | 0.55 | 7.83 | 6.89 | 9.6 | 654 | 4.2 | 24.3 |
| 113 | 44.5 | 0 | 9 | 0.49 | 8.52 | 6.97 | 6.5 | 758 | 13.1 | 31.7 |
| 114 | 46.7 | −25 | 8 | 0.5 | 8.51 | 7.74 | 8.4 | 694 | 11 | 20.2 |
| 115 | 40.3 | −25 | 9 | 0.4 | 7.62 | 6.8 | 7.2 | 728 | 8.6 | 32.2 |
| 116 | 44.4 | −25 | 8 | 0.44 | 8.37 | 7.6 | 8.3 | 685 | 10.8 | 23.9 |
| 117 | 46.8 | −25 | 9 | 0.48 | 8.96 | 8.52 | 9.5 | 662 | 9.1 | 15.9 |
| 118 | 43.5 | 0 | 10 | 0.43 | 8.39 | 7.28 | 8.7 | 695 | 6.5 | 27.4 |
| 119 | 40.8 | −25 | 8 | 0.45 | 7.54 | 7.18 | 6.3 | 770 | 13 | 27.6 |
| 120 | 42.7 | −25 | 10 | 0.42 | 8.39 | 7.18 | 7.9 | 715 | 7.7 | 29.5 |
| 121 | 40.9 | −100 | 9 | 0.32 | 5.50 | 4.95 | 7.2 | 630 | 5.7 | 38.5 |
| 122 | 41.6 | −100 | 9 | 0.43 | 5.77 | 5.20 | 7.2 | 634 | 8.2 | 32.3 |
| 123 | 40.9 | −100 | 9 | 0.32 | 5.50 | 4.95 | 7.2 | 630 | 5.7 | 37.9 |
| 124 | 40.3 | −100 | 9 | 0.56 | 5.99 | 5.39 | 6.2 | 673 | 5.1 | 32.36 |
| 125 | 40.8 | −100 | 9 | 0.47 | 5.84 | 5.26 | 7.1 | 634 | 4.6 | 34.86 |
| 126 | 41.0 | −100 | 9 | 0.49 | 6.17 | 5.56 | 7.9 | 606 | 4.4 | 33.36 |
| 127 | 40.6 | −100 | 10 | 0.32 | 5.87 | 5.43 | 8.4 | 588 | 4.4 | 35.9 |
| 128 | 52.7 | −100 | 10 | 0.32 | 6.20 | 5.74 | 9.4 | 614 | 5.7 | 38.4 |
| 129 | 40.6 | −100 | 10 | 0.32 | 5.68 | 5.57 | 7.9 | 605 | 4.4 | 36.46 |
| 130 | 41.1 | −100 | 9 | 0.38 | 5.79 | 5.21 | 7.6 | 618 | 4.7 | 36.61 |
| 131 | 36.9 | −100 | 9 | 0.39 | 6.19 | 5.58 | 8.8 | 559 | 4.1 | 33.85 |
| 132 | 53.5 | −80 | 10 | 0.40 | 8.57 | 8.64 | 10.9 | 600 | 10.1 | 27.3 |
| 133 | 51.2 | −98 | 9 | 0.44 | 7.60 | 7.43 | 8.0 | 654 | 12.5 | 28.6 |
| 134 | 43.0 | −58 | 9 | 0.47 | 9.12 | 8.65 | 7.8 | 661 | 13.7 | 28.1 |
| 135 | 53.5 | −98 | 9 | 0.47 | 8.37 | 7.43 | 7.7 | 673 | 16.2 | 25.1 |
| 136 | 36.1 | −50 | 8 | 0.32 | 8.69 | 7.62 | 7.5 | 645 | 14.8 | 31.4 |
| 137 | 62.9 | −70 | 9 | 0.54 | 7.91 | 7.16 | 9.6 | 678 | 9.4 | 34.7 |
| 138 | 42.1 | −100 | 8 | 0.32 | 5.68 | 4.73 | 7.7 | 618 | 9.8 | 41.7 |
| 139 | 39.3 | −80 | 8 | 0.51 | 8.69 | 7.62 | 6.1 | 691 | 17.7 | 26.3 |
| 140 | 48.7 | −100 | 9 | 0.44 | 8.82 | 7.39 | 7.6 | 657 | 14.2 | 31.5 |
| 141 | 31.8 | −100 | 9 | 0.40 | 7.95 | 6.62 | 7.1 | 584 | 10.7 | 31.7 |
| 142 | 36.1 | −100 | 9 | 0.32 | 8.69 | 7.62 | 7.5 | 595 | 11.9 | 33.5 |
| 143 | 36.1 | −100 | 8 | 0.32 | 8.69 | 7.62 | 7.5 | 595 | 16.2 | 26.7 |
| 144 | 40.7 | −100 | 9 | 0.32 | 8.69 | 7.62 | 7.5 | 621 | 13.5 | 33.9 |
| 145 | 44.1 | −100 | 9 | 0.32 | 5.68 | 4.73 | 7.7 | 628 | 9.2 | 46.4 |

The embodiments 1 to 145 of TABLE 6 are the same as the embodiments 1 to 145 of TABLES 1 to 5, but TABLE 6 includes parameters in the $HSP_{RR}$ relationship (21) above. The ranges of $OPR_{T/O}$, $T_{IC}$, $R_{HUB,IN}/R_{TIP,IN}$, $R_{TIP,IN}$, $R_{HUB,EX}$, $A_{IN}$, $A_{EX}$, AR, $T25_{T/O}$, and $L_{CORE}/D_{CORE}$ are detailed above. In general, lower $FN_{T/O}$, higher EGT, and/or higher $OPR_{T/O}$ results in lower core size (e.g., lower $L_{CORE}$ and lower $D_{CORE}$), but higher $L_{CORE}/D_{CORE}$, higher $N2_{R/L}$, and higher HSR, and, thus, making it more challenging to meet dynamics margins (e.g., Alford stability and/or third mode margin). $A_{IN}$ and $A_{EX}$ are proportional to the engine core size. $A_{IN}$ is larger for higher HP compressor pressure ratios. The inlet radius ratio is indicative of the HP shaft speed. The exit radius ratio is indicative of the HP compressor pressure ratio and T25. Accordingly, embodiments 1 to 145 provide for lowering the core size, while accounting for the dynamics margins and overall engine performance.

Figure 26:
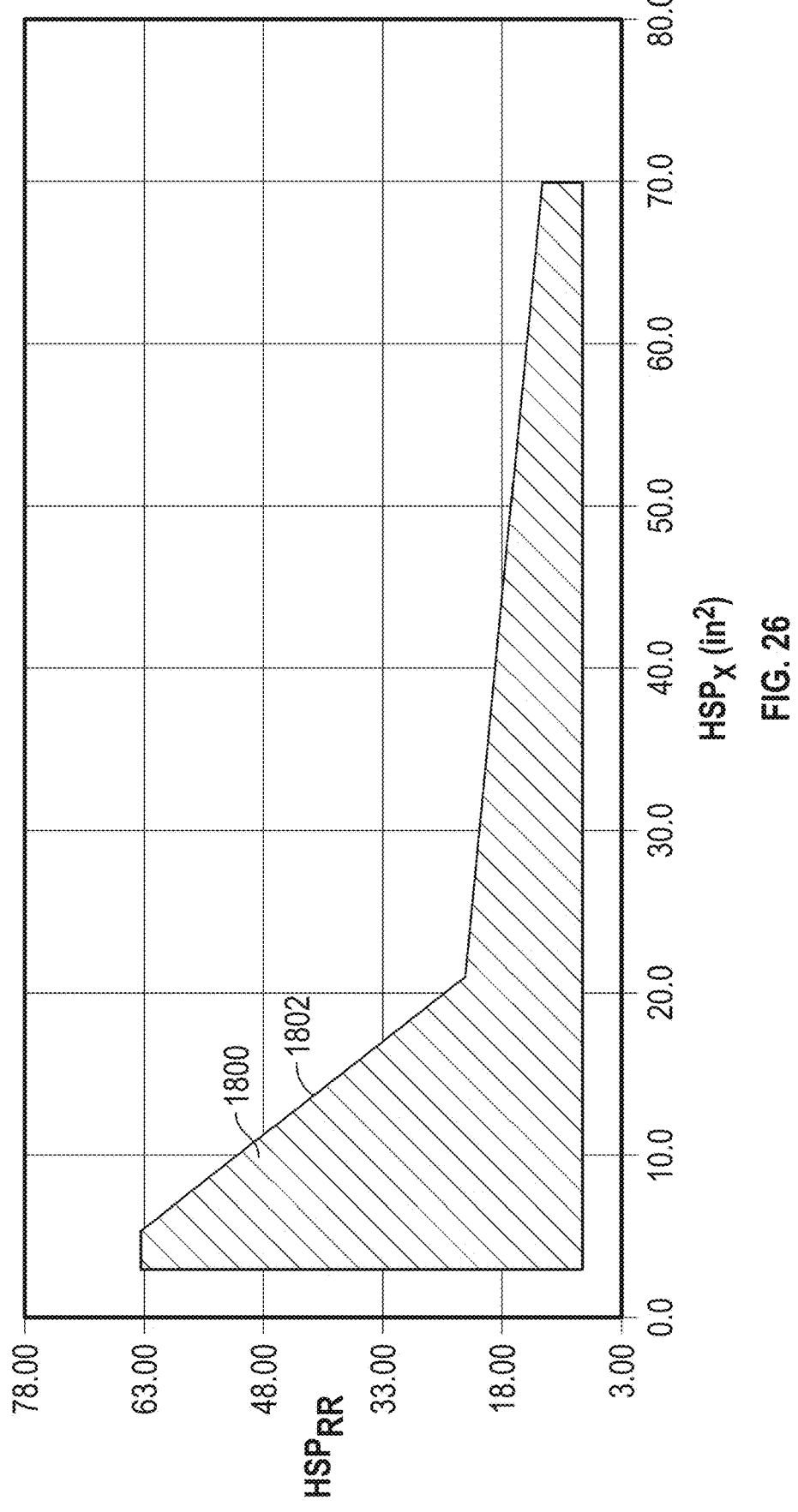
FIG. 26 represents, in graph form, a HP compressor tip radius ratio high-speed shaft rating ($HSP_{RR}$) as a function of the $HSP_X$.
Figure 27:
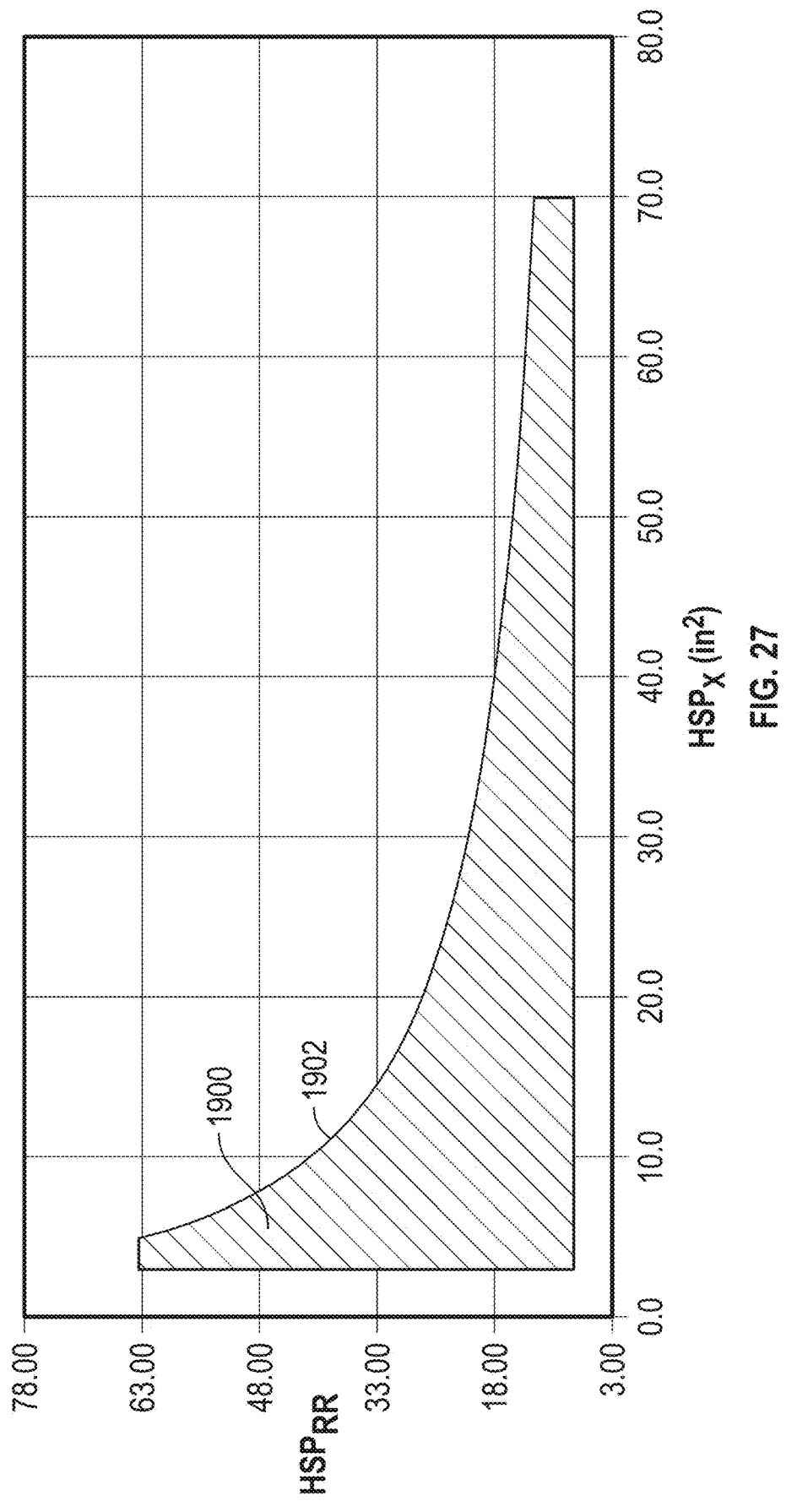
FIG. 27 represents, in graph form, a HP compressor tip radius ratio high-speed shaft rating ($HSP_{RR}$) as a function of the $HSP_X$, according to another embodiment.

FIG. 26 represents, in graph form, the $HSP_{RR}$ as a function of the $HSP_X$. $HSP_X$ is given by relationship (10) detailed above. $HSP_{RR}$ is in a range from 9.1 to 62.5, and $HSP_X$ is in a range from 3.8 in² to 69.1 in². An area 1800 represents the boundaries of $HSP_{RR}$ and $HSP_X$. $HSP_{RR}$ and $HSP_X$ are bounded by an upper bound 1802. The upper bound 1802 is given by (31):

$$HSP_{RR} < \text{MAX}(77 - 2.6 * (HSP_X),\ 27 - 0.2 * (HSP_X)) \qquad (31)$$

With reference to TABLE 6 and FIG. 26, in general, $HSP_{RR}$ increases as $HSP_X$ increases, and $HSP_{RR}$ decreases as $HSP_X$ increases. The upper bound 1802 is given by 77−2.6* $(HSP_X)$ for values of $HSP_X$ from 3.8 in² to 21 in², and is given by 27−0.2*$(HSP_X)$ for values of $HSP_X$ from 21 in² to 69.1 in². $HSP_X$ increases with increased $A_{EX}$, increased $OPR_{T/O}$, and decreases with increased $FN_{T/O}$. In general, better engine performance, higher BPR, smaller engine core size, higher $L_{CORE}/D_{CORE}$, and higher T25 result in reduced dynamics margins. Lower T25 and lower $N2_{R/L}$ result in higher HP compressor pressure ratio with similar work input. Increased radius ratio, reduced blade height, or reduced HP compressor speeds, and lower HP compressor pressure ratios result in diminishing returns on dynamics margin with poorer performance. Accordingly, embodiments 1 to 145 provide for balancing lower T25 with increased radius ratios to meet dynamics margins with improved performance of the engine core (and of the overall engine).

The lower the $HSP_{RR}$, the greater the third mode margin and the lower the HP compressor tip radius ratio for improved performance of the HP compressor and the HP turbine. Thus, the $HSP_{RR}$ is selected for providing a balance among improving the third mode margin of the HP shaft, without overly sacrificing performance of the HP compressor and/or the HP turbine.

Accordingly, the area 1800 having the upper bound 1802 provides for an improved engine having: 1. an enhanced engine performance (i.e., a higher thermodynamic performance meaning a lower specific fuel consumption at a given thrust level and at a given overall pressure ratio (OPR) of the turbine engine, and 2. a dynamics constraint that ensures the HP shaft avoids operating at, or near, the third mode of the HP shaft to avoid exciting the third mode of the HP shaft during normal operation of the turbine engine, as detailed above with respect to FIGS. 17 to 19.

FIG. 27 represents, in graph form, the $HSP_{RR}$ as a function of the $HSP_X$, according to another embodiment. $HSP_X$ is given by relationship (10) detailed above. $HSP_{RR}$ is in a range from 9.1 to 62.5, and $HSP_X$ is in a range from 3.8 $in^2$ to 69.1 $in^2$. An area 1900 represents the boundaries of $HSP_{RR}$ and $HSP_X$. $HSP_{RR}$ and $HSP_X$ are bounded by an upper bound 1902. The upper bound 1902 is given by (32):

$$HSP_{RR} < \frac{165}{HSP_X^{0.6}} \tag{32}$$

With reference to TABLE 6 and FIG. 27, in general, $HSP_{RR}$ increases as $HSP_X$ increases, and $HSP_{RR}$ decreases as $HSP_X$ increases, as detailed above. $HSP_X$ increases with increased $A_{EX}$, increased $OPR_{T/O}$, and decreases with increased $FN_{T/O}$, as detailed above.

In general, the area 1900 having the upper bound 1902 provides for an improved engine having: 1. an enhanced engine performance (i.e., a higher thermodynamic performance meaning a lower specific fuel consumption at a given thrust level and at a given overall pressure ratio (OPR) of the turbine engine, and 2. a dynamics constraint that ensures the HP shaft avoids operating at, or near, the third mode of the HP shaft to avoid exciting the third mode of the HP shaft during normal operation of the turbine engine, as detailed above with respect to FIGS. 17 to 19.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A gas turbine engine comprising: a turbomachine comprising a compressor section, a combustion section, and a turbine section arranged in serial flow order, the compressor section having a high-pressure compressor defining a high-pressure compressor exit area ($A_{HPCExit}$) in square inches; wherein the gas turbine engine defines a redline exhaust gas temperature (EGT) in degrees Celsius, a total sea level static thrust output ($Fn_{Total}$) in pounds, and a corrected specific thrust, wherein the corrected specific thrust is greater than or equal to 42 and less than or equal to 90, the corrected specific determined as follows: $Fn_{Total} \times EGT/(A_{HPCExit}^2 \times 1000)$.

The gas turbine engine of the preceding clauses wherein the corrected specific thrust is from 42 to 90, such as from 45 to 80, such as from 50 to 80.

The gas turbine engine of the preceding clauses, wherein the EGT is greater than 1000 degrees Celsius and less than 1300 degrees Celsius.

The gas turbine engine of any preceding clause, wherein the EGT is greater than 1100 degree Celsius and less than 1250 degrees Celsius.

The gas turbine engine of any preceding clause, wherein the EGT is greater than 1150 degree Celsius and less than 1250 degrees Celsius.

The gas turbine engine of any preceding clause, wherein the EGT is greater than 1000 degree Celsius and less than 1300 degrees Celsius, and wherein the corrected specific thrust is greater than or equal to 45.

The gas turbine engine of any preceding clause, wherein the EGT is greater than 1000 degree Celsius and less than 1300 degrees Celsius, and wherein the corrected specific thrust is greater than or equal to 50.

The gas turbine engine of any preceding clause, wherein the turbine section comprises a high-pressure turbine having a first stage of high-pressure turbine rotor blades, and wherein the gas turbine engine further comprises: a cooled cooling air system in fluid communication with the first stage of high-pressure turbine rotor blades.

The gas turbine engine of one or more of the preceding clause, wherein the cooled cooling air system is further in fluid communication with the high-pressure compressor for receiving an airflow from the high-pressure compressor, and wherein the cooled cooling air system further comprises a heat exchanger in thermal communication with the airflow for cooling the airflow.

The gas turbine engine of any preceding clause, wherein when the gas turbine engine is operated at a takeoff power level, the cooled cooling air system is configured to provide a temperature reduction of a cooling airflow equal to at least 15% of the EGT and up to 45% of the EGT.

The gas turbine engine of any preceding clause, wherein when the gas turbine engine is operated at a takeoff power level, the cooled cooling air system is configured to receive between 2.5% and 35% of an airflow through a working gas flowpath of the turbomachine at an inlet to a compressor of the compressor section.

The gas turbine engine of any preceding clause, further comprising a primary fan driven by the turbomachine.

The gas turbine engine of any preceding clause, further comprising an inlet duct downstream of the primary fan and upstream of the compressor section of the turbomachine; and a secondary fan located within the inlet duct.

The gas turbine engine of any preceding clause, wherein the gas turbine engine defines a bypass passage over the turbomachine, and wherein the gas turbine engine defines a third stream extending from a location downstream of the secondary fan to the bypass passage.

The gas turbine engine of any preceding clause, wherein the secondary fan is a single stage secondary fan.

A method of operating a gas turbine engine, comprising: operating the gas turbine engine at a takeoff power level, the gas turbine engine having a turbomachine with a high-pressure compressor defining a high-pressure compressor exit area ($A_{HPCExit}$) in square inches, the gas turbine engine defining a redline exhaust gas temperature (EGT) in degrees Celsius, a total sea level static thrust output ($Fn_{Total}$) in pounds, and a corrected specific thrust; wherein the corrected specific thrust is greater than or equal to 42 and less than or equal to 90, the corrected specific determined as follows: $Fn_{Total} \times EGT/(A_{HPCExit}^2 \times 1000)$.

The method of any preceding clause, wherein the EGT defined by the gas turbine engine is greater than 1000 degree Celsius and less than 1300 degrees Celsius.

The method of any preceding clause, wherein the EGT defined by the gas turbine engine is greater than 1100 degree Celsius and less than 1300 degrees Celsius.

The method of any preceding clause, wherein the EGT defined by the gas turbine engine is greater than 1000 degree Celsius and less than 1300 degrees Celsius, and wherein the corrected specific thrust defined by the gas turbine engine is greater than or equal to 45.

The method of any preceding clause, wherein operating the gas turbine engine at the takeoff power level further comprises reducing a temperature of a cooling airflow provided to a high-pressure turbine of the gas turbine engine with a cooled cooling air system.

The method of any preceding clause, wherein reducing the temperature of the cooling airflow provided to the high-pressure turbine of the gas turbine engine with the cooled cooling air system comprises providing a temperature reduction of the cooling airflow equal to at least 15% of the EGT and up to 45% of the EGT.

The gas turbine engine of any preceding clause, wherein the cooled cooling air systems includes a thermal bus cooled cooling air system (see, e.g., FIGS. 4 and 5).

The gas turbine engine of any preceding clause, wherein the cooled cooling air systems includes a dedicated heat exchanger cooled cooling air system (i.e., a cooled cooling air system including a heat exchanger dedicated to the cooled cooling air system).

The gas turbine engine of any preceding clause, wherein the cooled cooling air systems includes a bypass heat exchanger cooled cooling air system having a heat sink heat exchanger thermally coupled to an airflow through a bypass passage (see, e.g., FIG. 9).

The gas turbine engine of any preceding clause, wherein the cooled cooling air systems includes an air-to-air cooled cooling air system (a cooled cooling air system having a heat sink heat exchanger configured to transfer heat to an airflow; see, e.g., FIG. 9.

The gas turbine engine of any preceding clause, wherein the cooled cooling air systems includes an oil-to-air cooled cooling air system (a cooled cooling air system having a heat sink heat exchanger configured to transfer heat to an oil flow).

The gas turbine engine of any preceding clause, wherein the cooled cooling air systems includes a fuel-to-air cooled cooling air system (a cooled cooling air system having a heat sink heat exchanger configured to transfer heat to a fuel flow, such as a Jet A fuel flow, a liquid hydrogen or hydrogen gas fuel flow, etc.; see, e.g., FIG. 4). or a combination thereof. In one or more of the exemplary cooled cooling air systems described herein, the The gas turbine engine of any preceding clause, wherein the cooled cooling air systems is configured to receive the cooling air from a downstream end of a high-pressure compressor.

The gas turbine engine of any preceding clause, wherein the cooled cooling air systems is configured to receive the cooling air from an upstream end of the high-pressure compressor.

The gas turbine engine of any preceding clause, wherein the cooled cooling air systems is configured to receive the cooling air from a downstream end of a low-pressure compressor.

The gas turbine engine of any preceding clause, wherein the cooled cooling air systems is configured to receive the cooling air from an upstream end of the low-pressure compressor.

The gas turbine engine of any preceding clause, wherein the cooled cooling air systems is configured to receive the cooling air from a location between compressors.

The gas turbine engine of any preceding clause, wherein the cooled cooling air systems is configured to receive the cooling air from a bypass passage.

A turbomachine comprising a compressor section having a high-pressure compressor, a combustion section, and a turbine section having a high-pressure turbine arranged in serial flow order, the turbomachine includes an engine core including the high-pressure compressor, the combustion section, and the high-pressure turbine, the engine core having a length ($L_{CORE}$), the high-pressure compressor having an exit stage diameter ($D_{CORE}$), the high-pressure compressor defining a high-pressure compressor exit area ($A_{HPCExit}$) in square inches, and the high-pressure compressor including a high-pressure compressor flowpath and a plurality of stages of high-pressure compressor rotor blades and high-pressure compressor stator vanes, wherein the gas turbine engine defines a redline exhaust gas temperature (EGT) in degrees Celsius, a total sea level static thrust output ($Fn_{Total}$) in pounds, and a corrected specific thrust, wherein the corrected specific thrust is greater than or equal to 42 and less than or equal to 90, the corrected specific thrust determined as follows: $Fn_{Total} \times EGT/(A_{HPCExit}^2 \times 1000)$, the high-pressure shaft characterized by a high-speed shaft rating (HSR) from 1.5 to 6.2, and a ratio of $L_{CORE}/D_{CORE}$ is from 2.1 to 4.3.

The turbomachine engine of the preceding clause, an exhaust gas temperature of the turbomachine engine at redline speeds of the high-pressure shaft being from 1,063° C. to 1,282° C.

The turbomachine engine of any preceding clause, a bypass ratio of the turbomachine engine being greater than 8.0, greater than 10.0, or greater than 12.0.

The turbomachine engine of any preceding clause, the high-pressure compressor including eight stages, nine stages, ten stages, or eleven stages.

The turbomachine engine of any preceding clause, the high-pressure turbine including one stage or two stages.

The turbomachine engine of any preceding clause, HSR being given by:

$$HSR = \frac{1}{k} * N2_{R/L} * D_{CORE} * \left(\frac{L_{CORE}}{D_{CORE}}\right)^2,$$

where $N2_{R/L}$ is a redline speed of the high-pressure shaft, and k is a constant with a value of $10^6$ inch-RPM.

The turbomachine engine of any preceding clause, $N2_{R/L}$ being from 10,580 RPM to 35,788 RPM.

The turbomachine engine of any preceding clause, $L_{CORE}/D_{CORE}$ being a function of a high-speed shaft operating parameter $HSP_X$ is given by:

$$HSP_X = \frac{(A_{ex})^2 * P_{STD} * OPR_{T/O}}{FN_{T/O} * (N_{Stg}/10)^2},$$

where $N_{Stg}$ is the number of stages in the high-pressure compressor, $A_{EX}$ is an area of the exit stage of the high-pressure compressor, $P_{AMB}$ is ambient pressure, $OPR_{T/O}$ is an overall pressure ratio of the turbomachine engine at takeoff flight conditions corresponding to a maximum thrust rating for an engine core configuration, and $FN_{T/O}$ is a sea-level static thrust of the turbomachine engine at takeoff flight conditions corresponding to the maximum thrust rating for the engine core configuration.

The turbomachine engine of any preceding clause, $L_{CORE}/D_{CORE}$ being less than MAX(4.8–0.088*(HSP$_X$), 3.18–0.015*(HSP$_X$)).

The turbomachine engine of any preceding clause, $L_{CORE}/D_{CORE}$ being less than $$\frac{4.08}{(HSP_X - 8)^{0.14}}.$$

The turbomachine engine of any preceding clause, HSP$_X$ being from 3.8 in$^2$ to 69.1 in$^2$.

The turbomachine engine of any preceding clause, A$_{EX}$ being from 11 in$^2$ to 95 in$^2$.

The turbomachine engine of any preceding clause, P$_{STD}$ being approximately 14.7 psi.

The turbomachine engine of any preceding clause, OPR$_{T/O}$ being from 26.3 to 82.

The turbomachine engine of any preceding clause, FN$_{T/O}$ being from 12,000 lbf to 107,480 lbf.

The turbomachine engine of any preceding clause, A$_{EX}$ being given by A$_{EX}$=π*(R$_{TIP,EX}$–R$_{HUB,EX}$), where R$_{TIP,EX}$ is a radius of a tip of a high-pressure compressor blade of the exit stage of the high-pressure compressor, and R$_{HUB,EX}$ is a radius of a hub of the high-pressure compressor at the exit stage.

The turbomachine engine of any preceding clause, R$_{TIP,EX}$ being from 4.73 in. to 15.83 in.

The turbomachine engine of any preceding clause, R$_{HUB,EX}$ being from 4.31 in. to 14.85 in.

The turbomachine engine of any preceding clause, further comprising a power turbine and a low-pressure shaft coupled to the power turbine.

The turbomachine engine of any preceding clause, the high-pressure shaft being characterized by a second high-pressure shaft rating (HSR$_{LP}$) given by:

$$HSR_{LP} = \frac{1}{k} * N1_{r/l} * D_{CORE} * \left(\frac{L_{CORE}}{D_{CORE}}\right)^2,$$

where N1$_{r/l}$ is a redline speed of the low-pressure shaft, and k is a constant with a value of 10$^6$ inch-RPM.

The turbomachine engine of any preceding clause, HSR$_{LP}$ being in a range from 0.8 to 2.1.

A turbomachine comprising a compressor section having a high-pressure compressor, a combustion section, and a turbine section having a high-pressure turbine arranged in serial flow order, the turbomachine includes an engine core including the high-pressure compressor, the combustion section, and the high-pressure turbine, the engine core having a length (L$_{CORE}$), the high-pressure compressor having an exit stage diameter (D$_{CORE}$), the high-pressure compressor defining a high-pressure compressor exit area (A$_{HPCExit}$) in square inches, and the high-pressure compressor including a high-pressure compressor flowpath and a plurality of stages of high-pressure compressor rotor blades and high-pressure compressor stator vanes, wherein the gas turbine engine defines a redline exhaust gas temperature (EGT) in degrees Celsius, a total sea level static thrust output (Fn$_{Total}$) in pounds, and a corrected specific thrust, wherein the corrected specific thrust is greater than or equal to 42 and less than or equal to 90, the corrected specific thrust determined as follows: Fn$_{Total}$×EGT/(A$_{HPCExit}$$^2$× 1000), the high-pressure shaft characterized by a high-speed shaft rating (HSR) from 1.5 to 6.2, and the high-pressure shaft is further characterized by an area ratio high-speed shaft rating (HSP$_{AR}$) from 41 to 258.

The turbomachine engine of the preceding clause, a bypass ratio of the turbomachine engine being greater than 8.0. greater than 10.0, or greater than 12.0.

The turbomachine engine of any preceding clause, the high-pressure compressor including eight stages, nine stages, ten stages, or eleven stages.

The turbomachine engine of any preceding clause, the high-pressure turbine including one stage or two stages.

The turbomachine engine of any preceding clause, HSP$_{AR}$ being a function of a high-speed shaft operating parameter HSP$_x$, and HSP$_x$ is given by:

$$HSP_X = \frac{(A_{ex})^2 * P_{STD} * OPR_{T/O}}{FN_{T/O} * (N_{Stg}/10)^2},$$

where $N_{Stg}$ is the number of stages in the high-pressure compressor, $A_{EX}$ is an area of the exit stage of the high-pressure compressor, $P_{STD}$ is ambient pressure, $OPT_{T/O}$ is an overall pressure ratio of the turbomachine engine at takeoff flight conditions corresponding to the maximum thrust rating for an engine core configuration, and $FN_{T/O}$ is a sea-level static thrust of the turbomachine engine at takeoff flight conditions corresponding to the maximum thrust rating for an engine core configuration.

The turbomachine engine of any preceding clause, HSP$_{AR}$ being less than MAX(280–9*(HSP$_X$), 82–0.4*(HSP$_X$)).

The turbomachine engine of any preceding clause, HSP$_{AR}$ being less than $$\frac{350}{(HSP_X - 4)^{0.5}}.$$

The turbomachine engine of any preceding clause, HSP$_X$ being from 3.8 in$^2$ to 69.1 in$^2$.

The turbomachine engine of any preceding clause, HSP$_{AR}$ being less than MAX(258, 120*(HSP$_X$–16)$^{-0.2}$).

The turbomachine engine of any preceding clause, HSP$_{AR}$ being less than or equal to 258 for HSP$_X$ from 3.8 to 16, and less than 120*(HSP$_X$–16)$^{-0.2}$ for HSP$_X$ from 16 in$^2$ to 22 in$^2$.

The turbomachine engine of any preceding clause, A$_{EX}$ being from 11 in$^2$ to 95 in$^2$, P$_{STD}$ is approximately 14.7 psi, OPR$_{T/O}$ is from 26.3 to 82, and FN$_{T/O}$ is from 12,000 lbf to 107,480 lbf.

The turbomachine engine of any preceding clause, HSR being given by:

$$HSR = \frac{1}{k} * N2_{R/L} * D_{CORE} * \left(\frac{L_{CORE}}{D_{CORE}}\right)^2,$$

where $N2_{R/L}$ is a redline speed of the high-pressure shaft, $L_{CORE}$ is a length of the engine core, $D_{CORE}$ is a diameter of the engine core, and k is a constant with a value of $10^6$ inch-RPM.

The turbomachine engine of any preceding clause, $N2_{R/L}$ being from 10,580 RPM to 35,788 RPM.

The turbomachine engine of any preceding clause, $HSP_{AR}$ being given by:

$$HSP_{AR} = \frac{\left(\frac{L_{CORE}}{D_{CORE}}\right)^2 * AR}{\sqrt{\frac{R_{HUB,IN}}{R_{TIP\cdot IN}}} * \sqrt{\frac{R_{TIP,EX}}{R_{TIP,IN}}}},$$

where AR is an area ratio of the high-pressure compressor and is the ratio of the area at an inlet of the high-pressure compressor to the area at an exit of the high-pressure compressor ($A_{IN}/A_{EX}$), $R_{HUB,IN}$ is a radius of a hub at the inlet of the high-pressure compressor, $R_{TIP,IN}$ is a radius of a tip of a high-pressure compressor blade at the inlet of the high-pressure compressor, and $R_{TIP,EX}$ is a radius of a tip of a high-pressure compressor blade at an exit stage of the high-pressure compressor.

The turbomachine engine of any preceding clause, a ratio of the of the engine core to the diameter of the engine core ($L_{CORE}/D_{CORE}$) being from 2.1 to 4.3.

The turbomachine engine of any preceding clause, $R_{HUB,IN}/R_{TIP,IN}$ being a high-pressure compressor inlet radius ratio, and the high-pressure compressor inlet radius ratio is from 0.32 to 0.6.

The turbomachine engine of any preceding clause, $R_{TIP,EX}/R_{TIP,IN}$ being a high-pressure compressor tip radius ratio, and the high-pressure compressor tip radius ratio is from 0.75 to 1.01.

The turbomachine engine of any preceding clause, AR being from 5.6 to 13.9.

The turbomachine engine of any preceding clause, $A_{IN}$ being from 77 in$^2$ to 703 in$^2$.

The turbomachine engine of any preceding clause, $A_{EX}$ being from 11 in$^2$ to 95 in$^2$.

The turbomachine engine of any preceding clause, further comprising a power turbine and a low-pressure shaft coupled to the power turbine.

The turbomachine engine of any preceding clause, the high-pressure shaft being characterized by a second high-pressure shaft rating ($HSR_{LP}$) given by:

$$HSR_{LP} = \frac{1}{k} * N1_{r/l} * D_{CORE} * \left(\frac{L_{CORE}}{D_{CORE}}\right)^2,$$

where N1r/is a redline speed of the low-pressure shaft, and k is a constant with a value of $10^6$ inch-RPM.

The turbomachine engine of any preceding clause, $HSR_{LP}$ being in a range from 0.8 to 2.1.

A turbomachine comprising a compressor section having a high-pressure compressor, a combustion section, and a turbine section having a high-pressure turbine arranged in serial flow order, the turbomachine includes an engine core including the high-pressure compressor, the combustion section, and the high-pressure turbine, the engine core having a length ($L_{CORE}$), the high-pressure compressor having an exit stage diameter ($D_{CORE}$), the high-pressure compressor defining a high-pressure compressor exit area ($A_{HPCExit}$) in square inches, and the high-pressure compressor including a high-pressure compressor flowpath and a plurality of stages of high-pressure compressor rotor blades and high-pressure compressor stator vanes, wherein the gas turbine engine defines a redline exhaust gas temperature (EGT) in degrees Celsius, a total sea level static thrust output ($Fn_{Total}$) in pounds, and a corrected specific thrust, wherein the corrected specific thrust is greater than or equal to 42 and less than or equal to 90, the corrected specific thrust determined as follows: $Fn_{Total} \times EGT/(A_{HPCExit}^2 \times 1000)$, the high-pressure shaft characterized by a high-speed shaft rating (HSR) from 1.5 to 6.2, and the high-pressure shaft being further characterized by an inlet area high-speed shaft rating parameter ($HSP\_A_{IN}$) from 1,038 in$^2$ to 5,423 in$^2$.

The turbomachine engine of the preceding clause, a bypass ratio of the turbomachine engine being greater than 8.0, greater than 10.0, or greater than 12.0.

The turbomachine engine of any preceding clause, the high-pressure compressor including eight stages, nine stages, ten stages, or eleven stages.

The turbomachine engine of any preceding clause, the high-pressure turbine including one stage or two stages.

The turbomachine engine of any preceding clause, $HSP\_A_{IN}$ being a function of a high-speed shaft operating parameter ($HSP_{X1}$), and $HSP_{X1}$ is given by:

$$HSP_{X1} = \frac{A_{ex} * 1000}{FN_{T/O} * \left(N_{Stg}/10\right)^2},$$

where $N_{Stg}$ is the number of stages in the high-pressure compressor, $A_{EX}$ is an area of the exit stage of the high-pressure compressor, and $FN_{T/O}$ is a sea-level static thrust of the turbomachine engine at takeoff flight conditions corresponding to the maximum thrust rating for an engine core configuration.

The turbomachine engine of any preceding clause, $HSP\_A_{IN}$ being less than $$MAX\left(\frac{4200}{(HSP_{X1})^{1.5}}, 2850 - 500 * (HSP_{X1})\right).$$

The turbomachine engine of any preceding clause, $HSP_{X1}$ being from 0.4 to 2.79.

The turbomachine engine of any preceding clause, $A_{EX}$ being from 11 in$^2$ to 95 in$^2$.

The turbomachine engine of any preceding clause, $FN_{T/O}$ being from 12,000 lbf to 107,480 lbf.

The turbomachine engine of any preceding clause, HSR being given by:

$$HSR = \frac{1}{k} * N2_{R/L} * D_{CORE} * \left(\frac{L_{CORE}}{D_{CORE}}\right)^2,$$

where $N2_{R/L}$ is a redline speed of the high-pressure shaft, $L_{CORE}$ is a length of the engine core, $D_{CORE}$ is a diameter of the engine core, and k is a constant with a value of $10^6$ inch-RPM.

The turbomachine engine of any preceding clause, $N2_{R/L}$ being from 10,580 RPM to 35,788 RPM.

The turbomachine engine of any preceding clause, $HSP\_A_{IN}$ being given by:

$$HSP\_A_{IN} = \frac{\left(\frac{L_{CORE}}{D_{CORE}}\right)^2 * A_{IN}}{\sqrt{\frac{R_{HUB,IN}}{R_{TIP,IN}}} * \sqrt{\frac{R_{TIP,EX}}{R_{TIP,IN}}}},$$

where $A_{IN}$ is the area at an inlet of the high-pressure compressor, $R_{HUB,IN}$ is a radius of a hub at the inlet of the high-pressure compressor, $R_{TIP,IN}$ is a radius of a tip of a high-pressure compressor blade at the inlet of the high-pressure compressor, and $R_{TIP,EX}$ is a radius of a tip of a high-pressure compressor blade at an exit stage of the high-pressure compressor.

The turbomachine engine of any preceding clause, a ratio of the of the engine core to the diameter of the engine core ($L_{CORE}/D_{CORE}$) being from 2.1 to 4.3.

The turbomachine engine of any preceding clause, $A_{IN}$ being from 77 in² to 703 in².

The turbomachine engine of any preceding clause, $R_{HUB,IN}/R_{TIP,IN}$ being a high-pressure compressor inlet radius ratio, and the high-pressure compressor inlet radius ratio is from 0.32 to 0.6.

The turbomachine engine of any preceding clause, $R_{TIP,EX}$ being from 4.73 in. to 15.83 in.

The turbomachine engine of any preceding clause, $R_{TIP,IN}$ being from 5.5 in. to 16.32 in.

The turbomachine engine of any preceding clause, further comprising a power turbine and a low-pressure shaft coupled to the power turbine.

The turbomachine engine of any preceding clause, the high-pressure shaft being characterized by a second high-pressure shaft rating ($HSR_{LP}$) given by:

$$HSR_{LP} = \frac{1}{k} * N1_{r/l} * D_{CORE} * \left(\frac{L_{CORE}}{D_{CORE}}\right)^2,$$

where $N1r/$is a redline speed of the low-pressure shaft, and k is a constant with a value of $10^6$ inch-RPM.

The turbomachine engine of any preceding clause, $HSR_{LP}$ being in a range from 0.8 to 2.1

The turbomachine engine of any preceding clause, the redline speed of the low-pressure shaft being from 6,345 RPM to 13,225 RPM.

A turbomachine comprising a compressor section having a high-pressure compressor, a combustion section, and a turbine section having a high-pressure turbine arranged in serial flow order, the turbomachine includes an engine core including the high-pressure compressor, the combustion section, and the high-pressure turbine, the engine core having a length ($L_{CORE}$), the high-pressure compressor having an exit stage diameter ($D_{CORE}$), the high-pressure compressor defining a high-pressure compressor exit area ($A_{HPCExit}$) in square inches, and the high-pressure compressor including a high-pressure compressor flowpath and a plurality of stages of high-pressure compressor rotor blades and high-pressure compressor stator vanes, wherein the gas turbine engine defines a redline exhaust gas temperature (EGT) in degrees Celsius, a total sea level static thrust output ($Fn_{Total}$) in pounds, and a corrected specific thrust, wherein the corrected specific thrust is greater than or equal to 42 and less than or equal to 90, the corrected specific thrust determined as follows: $Fn_{Total} \times EGT/(A_{HPCExit}^2 \times 1000)$, the high-pressure shaft characterized by a high-speed shaft rating (HSR) from 1.5 to 6.2, and the high-pressure shaft being further characterized by an exit rim speed high-speed shaft rating ($HSP\_U_{RIM,R/L}$) from 0.09 to 1.00 in$^{-2/3}$ (ft/s/°R)$^{-3}$.

The turbomachine engine of the preceding clause, a bypass ratio of the turbomachine engine being greater than 8.0, greater than 10.0, or greater than 12.0.

The turbomachine engine of any preceding clause, the high-pressure compressor including eight stages, nine stages, ten stages, or eleven stages.

The turbomachine engine of any preceding clause, $HSP\_U_{RIM,R/L}$ being a function of a high-speed shaft operating parameter ($HSP_X$), and $HSP_X$ is given by:

$$HSP_X = \frac{(A_{ex})^2 * P_{STD} * OPR_{T/O}}{FN_{T/O} * \left(N_{Stg}/10\right)^2},$$

where $N_{Stg}$ is the number of stages in the high-pressure compressor, $A_{EX}$ is an area of the exit stage of the high-pressure compressor, $P_{STD}$ is standard pressure, $OPR_{T/O}$ is an overall pressure ratio of the turbomachine engine at takeoff flight conditions corresponding to the maximum thrust rating for a engine core configuration, and $FN_{T/O}$ is a sea-level static thrust of the turbomachine engine at takeoff flight conditions corresponding to the maximum thrust rating for an engine core configuration.

The turbomachine engine of any preceding clause, $HSP\_U_{RIM,R/L}$ being less than $$\frac{6.6}{(HSP_X)}.$$

The turbomachine engine of any preceding clause, $HSP\_U_{RIM,R/L}$ being less than $$\frac{2.9}{HSP_X^{0.75}}.$$

The turbomachine engine of any preceding clause, $HSP_X$ being from 3.8 in² to 69.1 in².

The turbomachine engine of any preceding clause, $A_{EX}$ being from 11 in² to 95 in², $P_{AMB}$ is approximately 14.7 psi, $OPR_{T/O}$ is from 26.3 to 82, and $FN_{T/O}$ is from 12,000 lbf to 107,480 lbf.

The turbomachine engine of any preceding clause, HSR being given by:

$$HSR = \frac{1}{k} * N2_{R/L} * D_{CORE} * \left(\frac{L_{CORE}}{D_{CORE}}\right)^2,$$

where $N2_{R/L}$ is a redline speed of the high-pressure shaft, $L_{CORE}$ is a length of the engine core, $D_{CORE}$ is a diameter of the engine core, and k is a constant with a value of $10^6$ inch-RPM.

The turbomachine engine of any preceding clause, $N2_{R/L}$ being from 10,580 RPM to 35,788 RPM.

The turbomachine engine of any preceding clause, $HSP\_U_{RIM,R/L}$ being given by:

$$HSP\_U_{RIM,R/L} = \frac{\left(\frac{L_{CORE}}{D_{CORE}}\right)^2}{N_{stg} * A_{F,IN}^{1/3}} * \left(\frac{T3_{T/O}}{U_{RIM,R/L}}\right)^3,$$

where $N_{stg}$ is a number of stages of the high-pressure compressor, $T3_{T/O}$ is a temperature at the exit of the high-pressure compressor at takeoff flight conditions, AFIN is a frontal area of the high-pressure compressor, and $U_{RIM,R/L}$ is an exit rim speed of the high-pressure compressor at redline speeds of the high-pressure shaft.

The turbomachine engine of any preceding clause, a ratio of the length of the engine core to the diameter of the engine core ($L_{CORE}/D_{CORE}$) being from 2.1 to 4.3.

The turbomachine engine of any preceding clause, $N_{stg}$ being eight stages, nine stage, ten stage, or eleven stages.

The turbomachine engine of any preceding clause, $A_{F,IN}$ being from 95 to 837.

The turbomachine engine of any preceding clause, $U_{RIM,R/L}$ being given by:

$$U_{RIM,R/L} = \frac{\pi * N2_{R/L}}{30} * \frac{R_{HUB,EX}}{12},$$

where $R_{HUB,EX}$ is a radius of a hub at an exit stage of the high-pressure compressor.

The turbomachine engine of any preceding clause, $T3_{T/O}$ being given by:

$$T3_{T/O} = T25_{T/O} * (3.465 * AR - 5.7)^{\frac{\gamma-1}{\gamma*\eta_{Poly}}},$$

where $T25_{T/O}$ is a temperature at an inlet of the high-pressure compressor, AR is an area ratio of the high-pressure compressor and is the ratio of the area at the inlet of the high-pressure compressor to the area at an exit of the high-pressure compressor ($A_{IN}/A_{EX}$), $\gamma$ is a gas constant of air and is equal to 1.37, and $\eta_{Poly}$ is a compressor efficiency of the high-pressure compressor and is approximately equal to 0.9.

The turbomachine engine of any preceding clause, AR being from 5.6 to 13.9.

The turbomachine engine of any preceding clause, $T25_{T/O}$ being from 579°R to 803°R.

The turbomachine engine of any preceding clause, $T25_{T/O}$ being given by:

$$T25_{T/O} = T_{ISA} * \left(\frac{1.25 * OPR_{T/O}}{3.465 * AR - 5.7}\right)^{\frac{\gamma-1}{\gamma*\eta_{Poly}}} + T_{IC},$$

where $T_{ISA}$ is ambient temperature and is approximately equal to 545.67°R, $OPR_{T/O}$ is an overall pressure ratio of the turbomachine engine at takeoff flight conditions corresponding to the maximum thrust rating for a engine core configuration, $\gamma$ is a gas constant of air and is equal to 1.37, $\eta_{Poly}$ is an overall compression efficiency of the turbomachine engine and is approximately equal to 0.9, and $T_{IC}$ is an intercooler temperature upstream of the high-pressure compressor.

The turbomachine engine of any preceding clause, further comprising a power turbine and a low-pressure shaft coupled to the power turbine.

The turbomachine engine of any preceding clause, the high-pressure shaft being characterized by a second high-pressure shaft rating ($HSR_{LP}$) given by:

$$HSR_{LP} = \frac{1}{k} * N1_{r/l} * D_{CORE} * \left(\frac{L_{CORE}}{D_{CORE}}\right)^2,$$

where N1r/is a redline speed of the low-pressure shaft, k is a constant with a value of $10^6$ inch-RPM, and $HSR_{LP}$ is in a range from 0.8 to 2.1.

A turbomachine comprising a compressor section having a high-pressure compressor, a combustion section, and a turbine section having a high-pressure turbine arranged in serial flow order, the turbomachine includes an engine core including the high-pressure compressor, the combustion section, and the high-pressure turbine, the engine core having a length ($L_{CORE}$), the high-pressure compressor having an exit stage diameter ($D_{CORE}$), the high-pressure compressor defining a high-pressure compressor exit area ($A_{HPCExit}$) in square inches, and the high-pressure compressor including a high-pressure compressor flowpath and a plurality of stages of high-pressure compressor rotor blades and high-pressure compressor stator vanes, wherein the gas turbine engine defines a redline exhaust gas temperature (EGT) in degrees Celsius, a total sea level static thrust output ($Fn_{Total}$) in pounds, and a corrected specific thrust, wherein the corrected specific thrust is greater than or equal to 42 and less than or equal to 90, the corrected specific thrust determined as follows: $Fn_{Total} \times EGT/(A_{HPCExit}^2 \times 1000)$, the high-pressure shaft characterized by a high-speed shaft rating (HSR) from 1.5 to 6.2, and the high-pressure shaft being further characterized by a radius ratio high-speed shaft rating ($HSP_{RR}$) from 9.1 to 62.5.

The turbomachine engine of the preceding clause, a bypass ratio of the turbomachine engine being greater than 8.0, greater than 10.0, or greater than 12.0.

The turbomachine engine of any preceding clause, the high-pressure compressor including eight stages, nine stages, ten stages, or eleven stages.

The turbomachine engine of any preceding clause, the high-pressure turbine including one stage or two stages.

The turbomachine engine of any preceding clause, $HSP_{RR}$ being a function of a high-speed shaft operating parameter ($HSP_X$), and $HSP_X$ is given by:

$$HSP_X = \frac{(A_{ex})^2 * P_{STD} * OPR_{T/O}}{FN_{T/O} * (N_{Stg}/10)^2},$$

where $N_{Stg}$ is the number of stages in HP compressor, $A_{EX}$ is an area of the exit stage of the high-pressure compressor, $P_{STD}$ is standard pressure, $OPR_{T/O}$ is an overall pressure ratio of the turbomachine engine at takeoff flight conditions corresponding to the maximum thrust rating for an engine core configuration, and $FN_{T/O}$ is a sea-level static thrust of the turbomachine engine at takeoff flight conditions corresponding to the maximum thrust rating for an engine core configuration.

The turbomachine engine of any preceding clause, $HSP_{RR}$ being less than MAX(77−2.6*($HSP_X$), 27−0.2*($HSP_X$)).

The turbomachine engine of any preceding clause, $HSP_{RR}$ being less than $$\frac{165}{HSP_X^{0.6}}.$$

The turbomachine engine of any preceding clause, $HSP_X$ being from 3.8 in$^2$ to 69.1 in$^2$.

The turbomachine engine of any preceding clause, $A_{EX}$ being from 11 in$^2$ to 95 in$^2$, $P_{AMB}$ is approximately 14.7 psi, $OPR_{T/O}$ is from 26.3 to 82, and $FN_{T/O}$ is from 12,000 lbf to 107,480 lbf.

The turbomachine engine of any preceding clause, HSR being given by:

$$HSR = \frac{1}{k} * N2_{R/L} * D_{CORE} * \left(\frac{L_{CORE}}{D_{CORE}}\right)^2,$$

where $N2_{R/L}$ is a redline speed of the high-pressure shaft, $L_{CORE}$ is a length of the engine core, $D_{CORE}$ is a diameter of the engine core, and k is a constant with a value of $10^6$ inch-RPM.

The turbomachine engine of any preceding clause, $N2_{R/L}$ being from 10,580 RPM to 35,788 RPM.

The turbomachine engine of any preceding clause, $HSP_{RR}$ being given by:

$$HSP_{RR} = \frac{\left(\frac{L_{core}}{D_{core}} * \frac{T25_{T/O}}{T_{STD}}\right)^2}{\sqrt{\frac{R_{HUB,IN}}{R_{TIP,IN}}} * \sqrt{\frac{T_{TIP,EX}}{R_{TIP,EX}}}},$$

where $T25_{T/O}$ is a temperature at an inlet of the high-pressure compressor, $T_{STD}$ is standard day temperature and is equal to 518.67°R, $R_{HUB,IN}$ is a radius of a hub at the inlet of the high-pressure compressor, $R_{TIP,IN}$ is a radius of a tip of a high-pressure compressor blade at the inlet of the high-pressure compressor, and $R_{TIP,EX}$ is a radius of a tip of a high-pressure compressor blade at an exit stage of the high-pressure compressor.

The turbomachine engine of any preceding clause, a ratio of the of the engine core to the diameter of the engine core ($L_{CORE}/D_{CORE}$) being from 2.1 to 4.3.

The turbomachine engine of any preceding clause, $R_{HUB,IN}/R_{TIP,IN}$ being a high-pressure compressor inlet radius ratio, and the high-pressure compressor inlet radius ratio is from 0.32 to 0.6.

The turbomachine engine of any preceding clause, $R_{TIP,EX}/R_{TIP,IN}$ being a high-pressure compressor tip radius ratio, and the high-pressure compressor tip radius ratio is from 0.75 to 1.01.

The turbomachine engine of any preceding clause, $T25_{T/O}$ being from 579°R to 803°R.

The turbomachine engine of any preceding clause, $T25_{T/O}$ being given by:

$$T25_{T/O} = T_{ISA} * \left(\frac{1.25 * OPR_{T/O}}{3.465 * AR - 5.7}\right)^{\frac{\gamma-1}{\gamma*\eta_{Poly}}} + T_{IC},$$

where $T_{ISA}$ is ambient temperature and is approximately equal to 545.67°R, $OPR_{T/O}$ is an overall pressure ratio of the turbomachine engine at takeoff flight conditions corresponding to a maximum thrust rating for an engine core configuration, $\gamma$ is a gas constant of air and is equal to 1.37, $\eta_{Poly}$ is an overall compression efficiency of the turbomachine engine and is approximately equal to 0.9, and $T_{IC}$ is an intercooler temperature upstream of the HP compressor.

The turbomachine engine of any preceding clause, $OPR_{T/O}$ being from 26.3 to 82.

The turbomachine engine of any preceding clause, $T_{IC}$ being from −100°R to 0°R.

The turbomachine engine of any preceding clause, AR being from 5.6 to 13.9.

The turbomachine engine of any preceding clause, wherein the high-pressure shaft first mode margin with respect to the low-pressure shaft redline speed is given by:

$$-0.1 > \left(\frac{0.55}{(HSR_{LP})^2} + LST\right) > 0,$$

wherein LST accounts for the effects that the HPC pressure ratio and the HPC exit temperature can have on the first mode.

The turbomachine engine of any preceding clause, wherein the high-pressure shaft first mode margin with respect to the low-pressure shaft redline speed is given by:

$$-0.2 > \left(\frac{0.55}{(HSR_{LP})^2} + LST\right) > 0,$$

wherein LST accounts for the effects that the HPC pressure ratio and the HPC exit temperature can have on the first mode.

The turbomachine engine of any preceding clause, wherein the high-pressure shaft first mode margin with respect to the low-pressure shaft redline speed is given by:

$$-0.3 > \left(\frac{0.55}{(HSR_{LP})^2} + LST\right) > 0,$$

wherein LST accounts for the effects that the HPC pressure ratio and the HPC exit temperature can have on the first mode.

The turbomachine engine of any preceding clause, wherein the high-pressure shaft first mode margin with respect to the low-pressure shaft redline speed is given by:

$$\left(\frac{0.55}{(HSR_{LP})^2} + LST\right) > -0.1,$$

wherein LST accounts for the effects that the HPC pressure ratio and the HPC exit temperature can have on the first mode.

The turbomachine engine of any preceding clause, wherein LST is from −0.67 to −0.15.

The turbomachine engine of any preceding clause, wherein the high-pressure shaft second mode margin with respect to the high-pressure shaft redline speed is given by:

$$\left(-0.1215 * HSR + \left(\frac{2 * HST - 1}{3}\right)\right) < -0.1,$$

wherein HST accounts for the effects that the HPC pressure ratio and the HPC exit temperature have on the third mode.

The turbomachine engine of any preceding clause, wherein the high-pressure shaft third mode margin with respect to the high-pressure shaft redline speed is given by: $-0.1 > (-0.1822 * HSR + HST) > 0$, wherein HST accounts for the effects that the HPC pressure ratio and the HPC exit temperature have on the third mode.

The turbomachine engine of any preceding clause, wherein the high-pressure shaft third mode margin with respect to the high-pressure shaft redline speed is given by: $-0.2 > (-0.1822 * HSR + HST) > 0$, wherein HST accounts for the effects that the HPC pressure ratio and the HPC exit temperature have on the third mode.

The turbomachine engine of any preceding clause, wherein the high-pressure shaft third mode margin with respect to the high-pressure shaft redline speed is given by: $-0.3 > (-0.1822 * HSR + HST) > 0$, wherein HST accounts for the effects that the HPC pressure ratio and the HPC exit temperature have on the third mode.

The turbomachine engine of any preceding clause, wherein the high-pressure shaft third mode margin with respect to the high-pressure shaft redline speed is given by: $(-0.1822 * HSR + HST) > -0.1$, wherein HST accounts for the effects that the HPC pressure ratio and the HPC exit temperature have on the third mode.

The turbomachine engine of any preceding clause, wherein HST is from 0.46 to 0.78.

The turbomachine engine of any preceding clause, wherein HST is given by: $HST = -0.726 * T25/T_{STD} + 1.61$, wherein T25 is from 615°R to 855°R and $T_{STD}$ is the standard temperature defined by a constant value of 518.67°R The turbomachine engine of any preceding clause, further comprising a power turbine and a low-pressure shaft coupled to the power turbine, the high-pressure shaft being characterized by a second high-pressure shaft rating ($HSR_{LP}$) given by:

$$HSR_{LP} = \frac{1}{k} * N1_{r/l} * D_{CORE} * \left(\frac{L_{CORE}}{D_{CORE}}\right)^2,$$

where N1r/is a redline speed of the low-pressure shaft, k is a constant with a value of $10^6$ inch-RPM, and $HSR_{LP}$ is in a range from 0.8 to 2.1.

The turbomachine engine of any preceding clause, further comprising an intermediate-pressure turbine, an intermediate-pressure compressor, and an intermediate-pressure shaft coupled to the intermediate-pressure turbine and the intermediate-pressure compressor.

The turbomachine engine of any preceding clause, further comprising an intercooler between the high-pressure compressor and the low-pressure compressor.

The turbomachine engine of any preceding clause, further comprising a fan, the fan being directly coupled to the low-pressure shaft.

The turbomachine engine of any preceding clause, further comprising a fan and a gearbox assembly, the fan coupled to the low-pressure shaft through the gearbox assembly.

The turbomachine engine of any preceding clause, the turbomachine engine being a ducted turbine engine.

The turbomachine engine of any preceding clause, the turbomachine engine being an unducted turbine engine.

The turbomachine engine of any preceding clause, the turbomachine engine being a three-stream turbine engine.

The turbomachine engine of any preceding clause, the fan including a plurality of fan blades, the plurality of fan blades being configured to pitch about a pitch axis.

The turbomachine engine of any preceding clause, the turbomachine engine including a counter rotating low-pressure architecture in which two shafts of the turbomachine engine rotate in opposite directions and pass through the engine core.

The turbomachine engine of any preceding clause, the turbomachine engine including a vaneless counter rotating turbine.

The turbomachine engine of any preceding clause, $L_{CORE}$ being from 36 in. to 67 in.

The turbomachine engine of any preceding clause, at least one of the high-pressure compressor, the high-pressure turbine, or the power turbine including a ceramic matrix composite (CMC) material.

The turbomachine engine of the preceding clause, the power turbine including the CMC material.

The turbomachine engine of the preceding clause, the CMC material being a first CMC material, and the high-pressure turbine including the first CMC material or a second CMC material.

The turbomachine engine of the preceding clause, the high-pressure compressor including the first CMC material or the second CMC material or a third CMC material.

The turbomachine engine of any preceding clause, the high-pressure turbine including the CMC material.

The turbomachine engine of the preceding clause, the high-pressure turbine including at least one nozzle and at least one airfoil, the at least one nozzle, the at least one airfoil, or both the at least one nozzle and the at least one airfoil including the CMC material.

The turbomachine engine of any preceding clause, the high-pressure turbine having one stage or two stages, and at least one stage including the CMC material.

The turbomachine engine of any preceding clause, the CMC material being a first CMC material, and the power turbine including the first CMC material or a second CMC material.

The turbomachine engine of any preceding clause, the high-pressure compressor including the first CMC material or the second CMC material or a third CMC material.

The turbomachine engine of any preceding clause, the high-pressure compressor including the CMC material.

The turbomachine engine of any preceding clause, the high-pressure compressor having eight stages, nine stages, ten stages, or eleven stages, and at least one stage including the CMC material.

The turbomachine engine of any preceding clause, the high-pressure compressor having nine stages and at least one stage of the nine stages includes the CMC material.

The turbomachine engine of any preceding clause, the CMC material being a first CMC material, and the high-pressure turbine including the first CMC material or a second CMC material.

The turbomachine engine of any preceding clause, the power turbine including the first CMC material, the second CMC material, or a third CMC material.

The turbomachine engine of any preceding clause, the first CMC material and the second CMC material being the same materials.

The turbomachine engine of any preceding clause, the first CMC material and the second CMC material being different materials.

The turbomachine engine of any preceding clause, the third CMC material being the same material as the first CMC material, the second CMC material, or both the first CMC material and the second CMC material.

The turbomachine engine of any preceding clause, the third CMC material being a different material than the first CMC material, the second CMC material, or both the first CMC material and the second CMC material.

A method of operating the turbomachine engine of any preceding clause, the method comprising operating the turbomachine engine to generate an engine thrust, a redline speed of the high-pressure shaft being from 10,580 RPM to 35,788 RPM.

Although the foregoing description is directed to the preferred embodiments of the present disclosure, other variations and modifications will be apparent to those skilled in the art and may be made without departing from the disclosure. Moreover, features described in connection with one embodiment of the present disclosure may be used in conjunction with other embodiments, even if not explicitly stated above.

The invention claimed is:

1. A gas turbine engine comprising:
a turbomachine comprising a compressor section having a high-pressure compressor, a combustion section, and a turbine section having a high-pressure turbine arranged in serial flow order, the turbomachine includes an engine core including the high-pressure compressor, the combustion section, and the high-pressure turbine, the engine core having a length ($L_{CORE}$) in inches, the high-pressure compressor having an exit stage diameter ($D_{CORE}$) in inches, the high-pressure compressor defining a high-pressure compressor exit area ($A_{HPCExit}$) in square inches, and the high-pressure compressor including a high-pressure compressor flowpath and a plurality of stages of high-pressure compressor rotor blades and high-pressure compressor stator vanes, wherein the gas turbine engine defines a redline exhaust gas temperature (EGT) in degrees Celsius, a total sea level static thrust output ($Fn_{Total}$) in pounds, and a corrected specific thrust, wherein the corrected specific thrust is greater than or equal to 42 and less than or equal to 90, the corrected specific thrust determined as follows: $Fn_{Total} \times EGT/(A_{HPCExit}^2 \times 1000)$; and
a high-pressure shaft coupled to the high-pressure compressor and the high-pressure turbine, the high-pressure shaft characterized by a ratio of $L_{CORE}/D_{CORE}$ greater than or equal to 2.1 and less than $$\frac{4.08}{(HSP_x - 8)^{0.14}},$$

wherein HSPx is a first high-speed shaft operating parameter given 2.1 and less than by:

$$HSPx = \frac{(A_{ex})^2 * P_{STD} * OPR_{T/O}}{FN_{T/O} * \left(\frac{N_{Stg}}{10}\right)^2},$$

where $N_{Stg}$ is a number of stages in the high-pressure compressor, $A_{EX}$ is equal to $A_{HPCExit}$, $P_{STD}$ is standard pressure in pounds per square inch, $OPR_{T/O}$ is an overall pressure ratio of the gas turbine engine at takeoff flight conditions corresponding to a maximum thrust rating for an engine core configuration, and $FN_{T/O}$ is a sea-level static thrust in lbf of the gas turbine engine at takeoff flight conditions corresponding to the maximum thrust rating for the engine core configuration.

2. The gas turbine engine of claim 1, wherein the high-pressure compressor includes nine stages, ten stages, or eleven stages.

3. The gas turbine engine of claim 1, wherein the high-pressure turbine includes one stage or two stages.

4. The gas turbine engine of claim 1, wherein the exhaust gas temperature (EGT) is from 1,063° C. to 1,282° C.

5. The gas turbine engine of claim 1, further comprising:
a fan; and
a reduction gearbox, wherein the fan is driven by the turbomachine across the reduction gearbox, wherein the reduction gearbox comprises a gear ratio between 3.2 and 4.5.

6. The gas turbine engine of claim 1, wherein $L_{CORE}/D_{CORE}$ is less than MAX(4.8–0.088*(HSP$_X$), 3.18–0.015*(HSP$_X$)).

7. The gas turbine engine of claim 1, wherein HSP$_X$ is from 3.8 in$^2$ to 69.1 in$^2$.

8. The gas turbine engine of claim 1, wherein $A_{EX}$ is from 11 in$^2$ to 95 in$^2$.

9. The gas turbine engine of claim 1, wherein $P_{STD}$ is approximately 14.7 psi.

10. The gas turbine engine of claim 1, wherein $OPR_{T/O}$ is from 26.3 to 82.

11. The gas turbine engine of claim 1, wherein $FN_{T/O}$ is from 12,674 lbf to 107,480 lbf.

12. The gas turbine engine of claim 1, wherein $A_{EX}$ is given by:
$A_{EX}=\pi*(R_{TIP,EX}^2-R_{HUB,EX}^2)$, where $R_{TIP,EX}$ is a radius in inches of a tip of a high-pressure compressor blade of the exit stage of the high-pressure compressor, and $R_{HUB,EX}$ is a radius in inches of a hub of the high-pressure compressor at the exit stage.

13. The gas turbine engine of claim 12, wherein $R_{TIP,EX}$ is from 4.73 in. to 15.83 in.

14. The gas turbine engine of claim 12, wherein $R_{HUB,EX}$ is from 4.31 in. to 14.85 in.

15. A method of operating the gas turbine engine of claim 1, the method comprising operating the gas turbine engine to generate an engine thrust, a redline speed of the high-pressure shaft being from 10,580 RPM to 35,788 RPM.

16. A gas turbine engine comprising:
a turbomachine comprising a compressor section having a high-pressure compressor, a combustion section, and a turbine section having a high-pressure turbine arranged in serial flow order, the turbomachine includes an engine core including the high-pressure compressor, the combustion section, and the high-pressure turbine, the engine core having a length ($L_{CORE}$) in inches, the high-pressure compressor having an exit stage diameter ($D_{CORE}$) in inches, the high-pressure compressor defining a high-pressure compressor exit area ($A_{HPCExit}$) in square inches, and the high-pressure compressor including a high-pressure compressor flowpath and a plurality of stages of high-pressure compressor rotor blades and high-pressure compressor stator vanes, wherein the gas turbine engine defines a redline exhaust gas temperature (EGT) in degrees Celsius, a total sea level static thrust output ($Fn_{Total}$) in pounds, and a corrected specific thrust, wherein the corrected specific thrust is greater than or equal to 42 and less than or equal to 90, the corrected specific thrust determined as follows: $Fn_{Total} \times EGT/(A_{HPCExit}^2 \times 1000)$;

a power turbine in flow communication with the high-pressure turbine;

a low-pressure shaft coupled to the power turbine; and a high-pressure shaft coupled to the high-pressure compressor and the high-pressure turbine, the high-pressure shaft characterized by a ratio of $L_{CORE}/D_{CORE}$ greater than or equal to 2.1 and less than $$\frac{4.08}{(HSP_x - 8)^{0.14}},$$

wherein HSPx is a first high-speed shaft operating parameter given by:

$$HSPx = \frac{\frac{(A_{ex})^2 * P_{STD} * OPR_{\frac{T}{O}}}{FN_{\frac{T}{O}} * \left(\frac{N_{Stg}}{10}\right)^2},$$

where $N_{Stg}$ is a number of stages in the high-pressure compressor, $A_{EX}$ equal to $A_{HPCExit}$, $P_{STD}$ is standard pressure in pounds per square inch, $OPR_{T/O}$ is an overall pressure ratio of the gas turbine engine at takeoff flight conditions corresponding to a maximum thrust rating for an engine core configuration, and $FN_{T/O}$ is a sea-level static thrust in lbf of the gas turbine engine at takeoff flight conditions corresponding to the maximum thrust rating for the engine core configuration.

17. The gas turbine engine of claim 16, wherein the high-pressure shaft is characterized by a high-pressure shaft rating ($HSR_{LP}$) from 0.8 to 1.6, and $HSR_{LP}$ is given by:

$$HSR_{LP} = \frac{1}{k} * N1_{r/l} * D_{CORE} * \left(\frac{L_{CORE}}{D_{CORE}}\right)^2,$$

where $N1_{r/l}$ is a redline speed of the low-pressure shaft in RPM, and k is a constant with a value of $10^6$ inch-RPM.

18. The gas turbine engine of claim 16, further comprising:

a fan; and a reduction gearbox, wherein the fan is driven by the turbomachine across the reduction gearbox, wherein the reduction gearbox comprises a gear ratio between 3.2 and 4.5.

19. The gas turbine engine of claim 16, wherein $L_{CORE}/D_{CORE}$ is less than MAX(4.8–0.088*($HSP_x$), 3.18–0.015*($HSP_X$)).

* * * * *